(12) United States Patent
Imuta et al.

(10) Patent No.: US 7,714,087 B2
(45) Date of Patent: May 11, 2010

(54) POLAR GROUP-CONTAINING OLEFIN COPOLYMER, PROCESS FOR PREPARING THE SAME, THERMOPLASTIC RESIN COMPOSITION CONTAINING THE COPOLYMER, AND USES THEREOF

(75) Inventors: Junichi Imuta, Sodegaura (JP); Norio Kashiwa, Sodegaura (JP); Seiji Ota, Sodegaura (JP); Satoru Moriya, Ichihara (JP); Tadahito Nobori, Sodegaura (JP); Kazumi Mizutani, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 12/153,003

(22) Filed: May 12, 2008

(65) Prior Publication Data

US 2009/0137757 A1 May 28, 2009

Related U.S. Application Data

(60) Division of application No. 10/713,278, filed on Nov. 17, 2003, now Pat. No. 7,393,907, which is a continuation of application No. 09/947,460, filed on Sep. 7, 2001, now abandoned.

(30) Foreign Application Priority Data

| Sep. 7, 2000 | (JP) | ............................. 2000-272345 |
| Nov. 13, 2000 | (JP) | ............................. 2000-345736 |
| Nov. 13, 2000 | (JP) | ............................. 2000-345737 |
| Nov. 13, 2000 | (JP) | ............................. 2000-345738 |
| Nov. 13, 2000 | (JP) | ............................. 2000-345814 |
| Nov. 13, 2000 | (JP) | ............................. 2000-345815 |
| Nov. 13, 2000 | (JP) | ............................. 2000-345816 |
| Nov. 29, 2000 | (JP) | ............................. 2000-362632 |

(51) Int. Cl.
*C08F 232/08* (2006.01)

(52) U.S. Cl. ...................... 526/281; 526/308; 526/318; 526/319; 526/348

(58) Field of Classification Search ................ 526/281, 526/308, 318, 319, 348
See application file for complete search history.

(56) References Cited

U.S. PATENT DOCUMENTS

| 4,330,649 A | 5/1982 | Kioka et al. |
| 4,370,455 A | 1/1983 | Ueda et al. |
| 4,584,348 A | 4/1986 | Nagano et al. |
| 4,715,975 A | 12/1987 | Kapusciniski et al. |
| 5,158,993 A | 10/1992 | Proctor et al. |
| 5,239,024 A | 8/1993 | Eisenbach et al. |
| 5,321,106 A | 6/1994 | LaPointe |
| 5,451,483 A | 9/1995 | Fuller et al. |
| 5,563,219 A | 10/1996 | Yasuda et al. |
| 5,925,442 A | 7/1999 | Shin |
| 6,001,941 A | 12/1999 | Tsutsui et al. |
| 6,066,603 A | 5/2000 | Emert et al. |
| 6,100,224 A | 8/2000 | Peiffer et al. |
| 6,156,846 A | 12/2000 | Tsuruoka et al. |
| 7,393,907 B2 | 7/2008 | Imuta et al. |
| 2006/0063898 A1* | 3/2006 | Inoue et al. ................. 526/161 |

FOREIGN PATENT DOCUMENTS

| DE | 199 -27- 347 A1 | 12/2000 |
| EP | 0 170 964 B1 | 2/1986 |
| EP | 0423438 | 4/1991 |
| EP | 0605952 A2 | 7/1994 |
| EP | 0320762 B1 | 3/1996 |
| EP | 0 787 755 B1 | 8/1997 |
| EP | 0816387 A1 | 1/1998 |
| EP | 1050558 A1 | 11/2000 |
| EP | 1113027 | 7/2001 |
| JP | 52-22988 | 6/1977 |
| JP | 61-47441 A | 3/1986 |
| JP | 64-078687 | 3/1989 |
| JP | 01-259012 | 10/1989 |

(Continued)

OTHER PUBLICATIONS

Paivi Aaltonen et al.; Macromolecules vol. 28, (1995); pp. 5353-5357.

(Continued)

*Primary Examiner*—Robert D. Harlan
(74) *Attorney, Agent, or Firm*—Birch, Stewart, Kolasch & Birch, LLP

(57) ABSTRACT

A polar group-containing olefin copolymer having excellent adhesion properties to metals or polar resins and excellent compatibility therewith, a process for preparing the copolymer, a thermoplastic resin composition containing the copolymer, and uses thereof. The polar group-containing olefin copolymer comprises a constituent unit derived from an □-olefin of 2 to 20 carbon atoms, and a constituent unit derived from a straight-chain, branched or cyclic polar group-containing monomer having at the end a polar group such as a hydroxyl group or an epoxy group and/or a constituent unit derived from a macromonomer having at the end a polymer segment obtained by anionic polymerization, ring-opening polymerization or polycondensation. The polar group-containing olefin copolymer can be prepared by polymerizing the α-olefin with the polar group-containing monomer and/or the macromonomer in the presence of a metallocene catalyst. The polar group-containing olefin copolymer and the thermoplastic resin composition containing the copolymer are used for films, sheets, modifiers, building/civil engineering materials, automobile exterior trim, electric/electronic parts, coating bases, compatibilizing agents, etc.

5 Claims, No Drawings

FOREIGN PATENT DOCUMENTS

| | | | |
|---|---|---|---|
| JP | 1-259012 | | 10/1989 |
| JP | 02-051510 | | 2/1990 |
| JP | 2-51511 | | 2/1990 |
| JP | 02-051511 | | 2/1990 |
| JP | 03-177403 | | 8/1991 |
| JP | 3-177403 | | 8/1991 |
| JP | 03-179005 | | 8/1991 |
| JP | 03-179006 | | 8/1991 |
| JP | 03-207703 | | 9/1991 |
| JP | 03-207704 | | 9/1991 |
| JP | 04-268307 | | 9/1992 |
| JP | 5-320330 | A | 12/1993 |
| JP | 6-25320 | A | 2/1994 |
| JP | 06-172447 | * | 6/1994 |
| JP | 6-172447 | | 6/1994 |
| JP | 6-263934 | A | 9/1994 |
| JP | 8-53516 | A | 2/1996 |
| JP | 9-77823 | A | 3/1997 |
| JP | 9-77826 | A | 3/1997 |
| JP | 9-208638 | A | 8/1997 |
| JP | 11-140238 | A | 5/1999 |
| JP | 2002-145944 | A | 5/2002 |
| JP | 2002-145945 | A | 5/2002 |
| JP | 2002-145946 | A | 5/2002 |
| JP | 2002-145947 | A | 5/2002 |
| JP | 2002-145948 | A | 5/2002 |
| JP | 2002-145949 | A | 5/2002 |
| WO | WO-88/05792 | | 8/1988 |
| WO | WO-88/05793 | | 8/1988 |
| WO | WO-92/16590 | A | 10/1992 |
| WO | WO-95/33806 | A | 12/1995 |
| WO | WO-97/11098 | A1 | 3/1997 |
| WO | WO-97/42236 | | 11/1997 |
| WO | WO-99-16851 | A | 4/1999 |
| WO | WO-99/30822 | | 6/1999 |

OTHER PUBLICATIONS

Paivi Aaltonen et al.; Macromolecules vol. 29, (1996); pp. 5255-5260.
Udo M. Stehling et al.; Macromolecules vol. 31, No. 7; (Apr. 7, 1998); pp. 2019-2027.
Udo M. Stehling et al. ; Macromolecules vol. 32; (1999); pp. 14-20.
Hiromitsu Tanaka et al.; Polymer Preprints vol. 49, No. 2; (2000); p. 209.
Hideaki Hagihara et al.; Polymer Reprints vol. 49, No. 2; (2000); p. 215.
Todd R. Younkin et al.; Science vol. 287; (2000); pp. 460-462.
James C. W. Chien et al.; Books of Abstracts.
Michael R. Kesti et al.; J. Am. Chem. Soc. vol. 114; (1992) ; pp. 9679-9680.
L.P. Lindeman et al.; Analytical Chemistry vol. 43, No. 10; (Aug. 1971), pp. 1245-1252.
J.C. Randall; Macromolecular Chemistry Physics; C29; (1989); (table of contents only).
S.L. Aggarwal et al.; Journal of Polymer Science vol. 18; (1955); pp. 17-26.
Ferdinand R.W.P. Wild et al.; Journal of Organometallic Chem. vol. 288; (1985); pp. 63-67.
Ahjopalo et al.; European Polymer Journal, vol. 35, pp. 1519-1528 (1999).
Stehling et al., Macromolecules, vol. 32, pp. 14-20 (1999).
Hagihara et al., Macromol. Rapid Commun., vol. 22, pp. 353-357 (2001).
Hakala et al., Polymer Bulletin, vol. 46, pp. 123-130 (2001).

* cited by examiner

POLAR GROUP-CONTAINING OLEFIN COPOLYMER, PROCESS FOR PREPARING THE SAME, THERMOPLASTIC RESIN COMPOSITION CONTAINING THE COPOLYMER, AND USES THEREOF

This is application is a Divisional of application Ser. No. 10/713,278, filed Nov. 17, 2003 now U.S. Pat. No. 7,393,907, which is a continuation of application Ser. No. 09/947,460, filed Sep. 7, 2001 now abandoned, and for which priority is claimed under 35 U.S.C. § 120, and this application claims priority of Application Nos. 2000-345815, 2000-272345, 2000-345736, 2000-345737, 2000-345738, 2000-345814, 2000-345816 and 2000-362632, filed in Japan on Nov. 13, 2000, Sep. 7, 2000, Nov. 13, 2000, and Nov. 29, 2000 respectively, under 35 U.S.C. § 119, the entire contents of all are hereby incorporated by reference.

FIELD OF THE INVENTION

The present invention relates to a polar group-containing olefin copolymer, a process for preparing the copolymer, a thermoplastic resin composition containing the copolymer and uses thereof. More particularly, the invention relates to a polar group-containing olefin copolymer having excellent adhesion properties to metals or polar resins and excellent flexibility, a process for preparing the copolymer, a thermoplastic resin composition containing the copolymer and uses thereof.

BACKGROUND OF THE INVENTION

Polyolefins generally have advantages such as excellent moldability, heat resistance, mechanical properties, hygienic qualities, water vapor permeation resistance and appearance of molded articles thereof, and hence they are broadly used for extrusion molded articles, blow molded articles and injection molded articles.

The polyolefins, however, contain no polar group in the molecule, so that they have low compatibility with polar resins such as nylon and EVOH and low adhesion properties to polar resins and metals. Therefore, it is difficult to use the polyolefins by blending or laminating them with these materials. In addition, molded products of the polyolefins have problems of poor surface hydrophilic properties and poor antistatic properties.

To solve such problems, there has been heretofore widely used a method of grafting polar group-containing monomers on the polyolefins through radical polymerization to enhance affinity for the polar materials.

Engineering plastics such as nylon have excellent heat resistance and strength, and hence they are used for electronic/electric parts. The engineering plastics such as nylon generally have low impact resistance, so that they are sometimes blended with olefin copolymers to improve the impact resistance.

The polyolefins, however, contain no polar group in the molecule and show low compatibility with polar resins, and therefore a method of grafting polar monomers on the polyolefins to improve compatibility with the polar resins has been heretofore widely used.

In this method, however, intermolecular crosslinking of polyolefins and breaking of molecular chains take place with the graft reaction, and hence viscosity matching of the graft polymer and the polar resin is difficult, and satisfactory compatibility is not obtained in some cases. Further, a gel component produced by intermolecular crosslinking or a foreign matter (foreign matter attached to a lip of a die) produced by breaking of molecular chains may cause bad appearance of the molded products.

In Japanese Patent Laid-Open Publications No. 259012/1989, No. 259012/1989, No. 51510/1990, No. 51511/1990 and No. 177403/1991, a process comprising copolymerizing an α-olefin and a polar group-containing monomer using a Ti catalyst or a V catalyst is described. According to this process, intermolecular crosslinking and breaking of molecular chains hardly take place, but in the use of these polymerization catalysts, the resulting copolymer has an ununiform molecular structure such as wide molecular weight distribution or high inversion content. On this account, orientation of the polar groups toward the interface between the copolymer and the polar material may be unsatisfactory, and adhesion properties to the polar materials and compatibility therewith may be insufficient. In the use as a composition, effects in adhesion properties and compatibility are not exhibited unless a graft copolymer is added in a large amount.

In order to enhance surface hydrophilic properties and antistatic properties, a method of adding a small amount of a low-molecular weight surface active agent to the polyolefin and molding the mixture has been used. In this method, however, the added surface active agent bleeds out on the surface, and after molding, the film surface sometimes has a problem of whitening. The surface active agent having bled out on the surface runs off together with water droplets sticking thereto, so that a problem that effects by the surface active agent do not last long may take place.

The present inventors have studied in the light of the above problems. As a result, they have found that a copolymer having a specific molecular structure and a composition containing the copolymer are excellent in compatibility with polar resins and adhesion properties to polar resins and metals, and they have also found that the copolymer and the composition have excellent surface hydrophilic properties and antistatic properties. Moreover, the present inventors have found the copolymer and the composition can be favorably applied to various uses.

As a process for preparing an olefin polymer such as an ethylene homopolymer, an ethylene/α-olefin copolymer, a propylene homopolymer or a propylene/α-olefin copolymer, a process comprising polymerizing an olefin in the presence of a titanium catalyst comprising a solid titanium catalyst component containing magnesium, halogen and an electron donor, and an organoaluminum compound, or a vanadium catalyst comprising a vanadium compound and an organoaluminum compound has been heretofore known. In the copolymerization of a polar monomer using such catalyst, there reside problems that the molecular weight distribution or the composition distribution is wide and the polymerization activity is low. As disclosed in Japanese Patent Laid-Open Publications No. 259012/1989, No. 51510/1990, No. 51511/1990 and No. 177403/1991, when an olefin and a polar group-containing monomer are copolymerized using a Ziegler catalyst to prepare, for example, a polyolefin containing a polar group, polymerization at low temperatures is only carried out, so that this process is known to have a problem of low activity. It is generally known that an olefin is polymerized in the presence of a metallocene catalyst comprising a transition metal compound such as zirconocene and an organoaluminum oxy-compound (aluminoxane). It is also known that if the metallocene catalyst is used, an olefin polymer having a high molecular weight is obtained with high activity and the resulting olefin polymer has narrow molecular weight distribution and narrow composition distribution.

As a process for preparing a polyolefin containing a polar group, a process using a metallocene catalyst is also known. For example, it is publicly known that polymerization of an OH group-containing olefin is conducted using a metallocene compound having a ligand of non-crosslinked cyclopentadienyl group, crosslinked or non-crosslinked bisindenyl group, or ethylene crosslinked unsubstituted indenyl group/fluorenyl group, as described in Macromolecules, 28, 5351 (1995), Macromolecules, 29, 5255 (1966), and Polymer Preprints, Japan, 49(2), 215 (2000).

If is publicly known that polymerization of an olefin having $NR_2$ (R: alkyl group) as a polar group is conducted using a metallocene compound having a ligand of non-crosslinked cyclopentadienyl group, crosslinked or non-crosslinked bisindenyl group, or crosslinked unsubstituted indenyl group/cyclopentadienyl group, as described in Macromolecules, 31, 2019 (1998) and Macromolecules, 32, 14 (1999).

A process using an organometallic compound other than the metallocene compound is publicly known, as described in Science, 287, 460 (2000), OCOP2000 at Oslo, and Books of Abstracts (C. W. Chien). These processes, however, have a disadvantage of extremely low polymerization activity.

On this account, protection of the polar group by a protective group is carried out. A method of protection is described in, for example, Macromolecules, 31, 2019 (1998), J. Am. Chem. Soc., 114, 9679 (1992), Polymer Preprints, Japan, 49(2), 209 (2000).

In the above processes, however, the protective group is introduced, and after the reaction, the protective group must be removed, so that the operations are complicated.

Under such circumstances, the present inventors have studied and found that an olefin polymer containing a polar group can be prepared with high polymerization activity by copolymerizing an olefin and a polar group-containing monomer in the presence of a transition metal catalyst into which a cyclopentadienyl group or other special ligands have been introduced, without using radical polymerization or a Ziegler polymerization catalyst. Based on the finding, the present invention has been accomplished.

A method of selectively introducing the polar group at only one end of the polymer chain or inside of the main chain and at one end of the main chain has been heretofore unknown. Then, the present inventors have found a method of selectively introducing the polar group at only one end of the polymer chain or inside of the main chain and at one end of the main chain, and accomplished the present invention.

OBJECT OF THE INVENTION

It is an object of the present invention to provide a polar group-containing olefin copolymer having excellent adhesion properties to metals or polar resins and excellent compatibility therewith, a process for preparing the copolymer, a thermoplastic resin composition containing the copolymer and uses thereof.

SUMMARY OF THE INVENTION

The first embodiment of the polar group-containing olefin copolymer according to the present invention comprises a constituent unit represented by the following formula (1), a constituent unit represented by the following formula (2) and a constituent unit represented by the following formula (3), has a molecular weight distribution (Mw/Mn) of not more than 3, and has an intensity ratio of Tαβ to Tαα (Tαβ/Tαα), as determined from a $^{13}$C-NMR spectrum of said copolymer, of not more than 1.0:

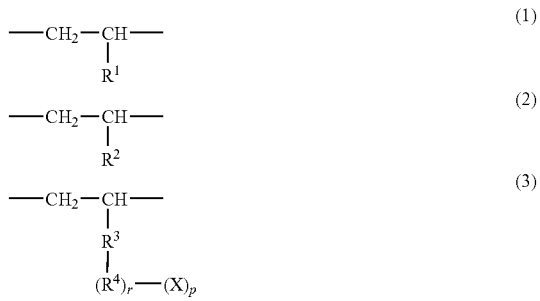

wherein $R^1$ and $R^2$ may be the same or different and are each a hydrogen atom or a straight-chain or branched aliphatic hydrocarbon group of 1 to 18 carbon atoms; $R^3$ is a hydrocarbon group; $R^4$ is a hetero atom or a group containing a hetero atom; r is 0 or 1; X is a polar group selected from an alcoholic hydroxyl group, a phenolic hydroxyl group, a carboxylic acid group, a carboxylic ester group, an acid anhydride group, an amino group, an amide group, an epoxy group and a mercapto group; p is an integer of 1 to 3; and when p is 2 or 3, each X may be the same or different, and in this case, if r is 0, X may be bonded to the same or different atom of $R^3$, and if r is 1, X may be bonded to the same or different atom of $R^4$.

In the present invention, $R^3$ in the constituent unit represented by the formula (3) is preferably a hydrocarbon group of 11 or more carbon atoms.

In the present invention, X in the constituent unit represented by the formula (3) is preferably a polar group selected from a phenolic hydroxyl group, a carboxylic ester group, an acid anhydride group, an amino group, an amide group, an epoxy group and a mercapto group In the present invention, it is preferable that $R^1$ in the constituent unit represented by the formula (1) and $R^2$ in the constituent unit represented by the formula (2) are each a hydrocarbon group of 2 or more carbon atoms, preferably 2 to 18 carbon atoms, and the crystallinity of said copolymer, as determined by X-ray diffractometry, is not less than 10%.

In the present invention, it is preferable that $R^1$ in the constituent unit represented by the formula (1) and $R^2$ in the constituent unit represented by the formula (2) are each a hydrocarbon group of 2 or more carbon atoms, preferably 2 to 18 carbon atoms, and the crystallinity of said copolymer, as determined by X-ray diffractometry, is preferably less than 10%.

The second embodiment of the polar group-containing olefin copolymer according to the present invention is a branched type copolymer comprising a constituent unit represented by the following formula (1) and a constituent unit represented by the following formula (4), and optionally a constituent unit represented by the following formula (5), having a molecular weight distribution (Mw/Mn) of not more than 3, and having an intensity ratio of Tαβ to Tαα (Tαβ+ Tαα), as determined from a $^{13}$C-NMR spectrum of said copolymer, of not more than 1.0:

-continued

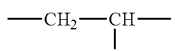
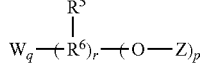         (4)

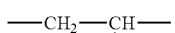
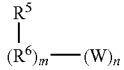         (5)

wherein $R^1$ is a hydrogen atom or a straight-chain or branched aliphatic hydrocarbon group of 1 to 18 carbon atoms; $R^5$ is a hydrocarbon group; $R^6$ is a hetero atom or a group containing a hetero atom; r is 0 or 1; Z is a polymer segment obtained by any one of anionic polymerization, ring-opening polymerization and polycondensation; W is a hydroxyl group or an epoxy group; p is an integer of 1 to 3, q is 0, 1 or 2, and p+q≦3; when p is 2 or 3, each —O—Z O—Z may be the same or different, and in this case, if r is 0, —O—Z may be bonded to the same or different atom of $R^5$, and if r is 1, —O—Z may be bonded to the same or different atom of $R^6$; when q is 2, each W may be the same or different, and in this case, if r is 0, W may be bonded to the same or different atom of $R^5$, and if r is 1, W may be bonded to the same or different atom of $R^6$; in case of p≧1 and q≧1, if r is 0, W and —O—Z may be bonded to the same or different atom of $R^5$, and if r is 1, W and —O—Z may be bonded to the same or different atom of $R^6$; m is 0 or 1; n is an integer of 1 to 3; and when n is 2 or 3, each W may be the same or different, and in this case, if m is 0, W may be bonded to the same or different atom of $R^5$, and if m is 1, W may be bonded to the same or different atom of $R^6$.

In the present invention, it is preferable that, in the formula (4), r is 0 and Z is a polymer segment obtained by anionic polymerization.

In the present invention, it is preferable that, in the formula (4), Z is a polymer segment obtained by ring-opening polymerization or polycondensation.

The third embodiment of the polar group-containing olefin copolymer according to the present invention comprises a constituent unit represented by the following formula (1) and a constituent unit represented by the following formula (6), and optionally a constituent unit represented by the following formula (3), has a molecular weight distribution (Mw/Mn) of not more than 3, and has an intensity ratio of Tαβ to Tαα (Tαβ+Tαα), as determined from a $^{13}$C-NMR spectrum of said copolymer, of not more than 1.0:

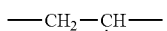         (1)

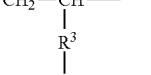         (3)

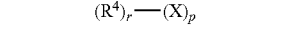
         (6)

wherein $R^1$ is a hydrogen atom or a straight-chain or branched aliphatic hydrocarbon group of 1 to 18 carbon atoms; $R^3$ is a hydrocarbon group; $R^4$ is a hetero atom or a group containing a hetero atom; $R^7$ is a direct bond or an aliphatic hydrocarbon group of 1 or more carbon atoms; $R^8$ is a hydrogen atom, a direct bond or an aliphatic hydrocarbon group of 1 or more carbon atoms; Y is a polar group containing O and/or N; m and n are each an integer of 0 to 2, and m+n is not 0; s is 0 or 1; r is 0 or 1; X is a polar group selected from an alcoholic hydroxyl group, a phenolic hydroxyl group, a carboxylic acid group, a carboxylic ester group, an acid anhydride group, an amino group, an amide group, an epoxy group and a mercapto group; p is an integer of 1 to 3; when p is 2 or 3, each X may be the same or different, and in this case, if r is 0, X may be bonded to the same or different atom of $R^3$, and if r is 1, X may be bonded to the same or different atom of $R^4$.

The first embodiment of the process for preparing a polar group containing olefin copolymer according to the present invention comprises copolymerizing at least one α-olefin selected from α-olefins of 2 to 20 carbon atoms and at least one polar group-containing monomer selected from a polar group-containing monomer represented by the following formula (7) and a polar group-containing monomer represented by the following formula (8) in the presence of a catalyst comprising:

(A) a compound of a transition metal selected from Group 3 (including lanthanoid and actinoid) to Group 10 of the periodic table, and (B) at least one compound selected from:
(B-1) an organoaluminum oxy-compound,
(B-2) a compound which reacts with the compound (A) to form an ion pair, and
(B-3) an organoaluminum compound;

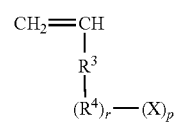         (7)

wherein $R^3$ is a hydrocarbon group; $R^4$ is a hetero atom or a group containing a hetero atom; r is 0 or 1; X is a polar group selected from an alcoholic hydroxyl group, a phenolic hydroxyl group, a carboxylic acid group, a carboxylic ester group, an acid anhydride group, an amino group, an amide group, an epoxy group and a mercapto group; p is an integer of 1 to 3; when p is 2 or 3, each X may be the same or different, and in this case, if r is 0, X may be bonded to the same or different atom of $R^3$, and if r is 1, X may be bonded to the same or different atom of $R^4$;

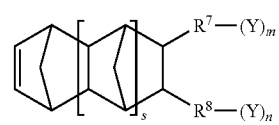         (8)

wherein $R^7$ is a direct bond or an aliphatic hydrocarbon group of 1 or more carbon atoms; $R^8$ is a hydrogen atom, a direct bond or an aliphatic hydrocarbon group of 1 or more carbon atoms; Y is a polar group containing O and/or N; m and n are each an integer of 0 to 2, and m+n is not 0; and s is 0 or 1.

In the first embodiment of the process for preparing a polar group-containing olefin copolymer according to the present invention, it is preferable that the transition metal compound (A) is represented by any one of the following formulas (11), (12), (13), (14), (15) and (16) and the polar group-containing monomer is a polar group-containing monomer of the formula (7) wherein X is —OH or an amino group;

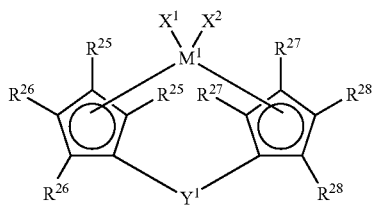
(11)

wherein $M^1$ is a transition metal atom of Group 4 of the periodic table; $R^{25}$, $R^{26}$, $R^{27}$ and $R^{28}$ may be the same or different and are each a hydrogen atom, a nitrogen-containing group, a phosphorus-containing group, a hydrocarbon group of 1 to 20 carbon atoms, a halogenated hydrocarbon group of 1 to 20 carbon atoms, an oxygen-containing group, a sulfur-containing group, a silicon-containing group or a halogen atom; of the groups indicated by $R^{25}$, $R^{26}$, $R^{27}$ and $R^{28}$, a part of the groups neighboring with each other may be bonded to form a ring together with carbon atoms to which those groups are bonded; $X^1$ and $X^2$ may be the same or different and are each a hydrocarbon group of 1 to 20 carbon atoms, a halogenated hydrocarbon group of 1 to 20 carbon atoms, an oxygen-containing group, a sulfur-containing group, a silicon-containing group, a hydrogen atom or a halogen atom; and $Y^1$ is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —Ge—, —Sn—, —NR$^{21}$—, —P(R$^{21}$)—, —P(O)(R$^{21}$)—, —BR$^{21}$— or —AlR$^{21}$— (each $R^{21}$ may be the same or different and is a hydrocarbon group of 1 to 20 carbon atoms, a halogenated hydrocarbon group of 1 to 20 carbon atoms, a hydrogen atom, a halogen atom or a nitrogen compound residue in which one or two hydrocarbon groups of 1 to 20 carbon atoms are bonded to the nitrogen atom);

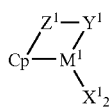
(12)

wherein $M^1$ is a transition metal atom selected from Group 4 of the periodic table; Cp is a cyclopentadienyl group or its derivative that is π-bonded to $M^1$; $Z^1$ is a ligand containing an oxygen atom, a sulfur atom, a boron atom or an element of Group 14 of the periodic table; $Y^1$ is a ligand containing an atom selected from a nitrogen atom, a phosphorus atom, an oxygen atom and a sulfur atom; and each $X^1$ may be the same or different and is a hydrogen atom, a halogen atom, a hydrocarbon group which has 20 or less carbon atoms and may contain 1 or more double bonds, a silyl group containing 20 or less silicon atoms, a germyl group containing 20 or less germanium atoms or a boronyl group containing 20 or less boron atoms;

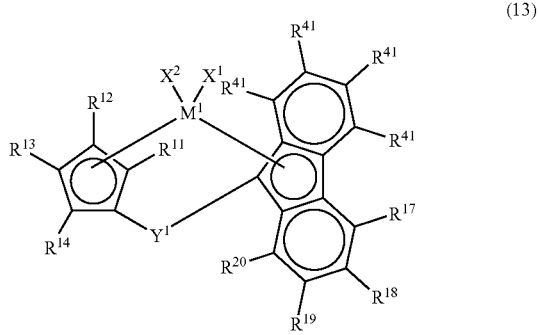
(13)

wherein $M^1$ is a transition metal atom selected from Group 4 of the periodic table; $R^{11}$ to $R^{14}$, $R^{17}$ to $R^{20}$, and $R^{41}$ may be the same or different and are each a hydrocarbon group of 1 to 40 carbon atoms, a halogenated hydrocarbon group of 1 to 40 carbon atoms, an oxygen-containing group, a sulfur-containing group, a silicon-containing group, a halogen atom or a hydrogen atom; of the groups indicated by $R^{11}$ $R^{12}$, $R^{13}$, $R^{14}$, $R^{17}$, $R^{18}$, $R^{19}$, $R^{20}$ and $R^{41}$, a part of the groups neighboring with each other may be bonded to form a ring together with carbon atoms to which those groups are bonded (except a case where all of $R^{11}$, $R^{12}$, $R^{13}$, $R^{14}$, $R^{17}$, $R^{18}$, $R^{19}$, $R^{20}$ and $R^{41}$ are hydrogen atoms and a case where $R^{12}$ or $R^{13}$ is a tert-butyl group and the residual $R^{11}$, $R^{12}$, $R^{13}$, $R^{14}$, $R^{17}$, $R^{18}$, $R^{19}$, $R^{20}$ and $R^{41}$ are hydrogen atoms); $X^1$ and $X^2$ may be the same or different and are each a hydrocarbon group of 1 to 20 carbon atoms, a halogenated hydrocarbon group of 1 to 20 carbon atoms, an oxygen-containing group, a sulfur-containing group, a silicon-containing group, a hydrogen atom or a halogen atom; and $Y^1$ is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —Ge—, —Sn—, —NR$^{21}$—, P(R$^{21}$)—, —P(O) (R$^{21}$)—, —BR$^{21}$— or —AlR$^{21}$— (each $R^{21}$ may be the same or different and is a hydrocarbon group of 1 to 20 carbon atoms, a halogenated hydrocarbon group of 1 to 20 carbon atoms, a hydrogen atom, a halogen atom or a nitrogen compound residue in which one or two hydrocarbon groups of 1 to 20 carbon atoms are bonded to the nitrogen atom);

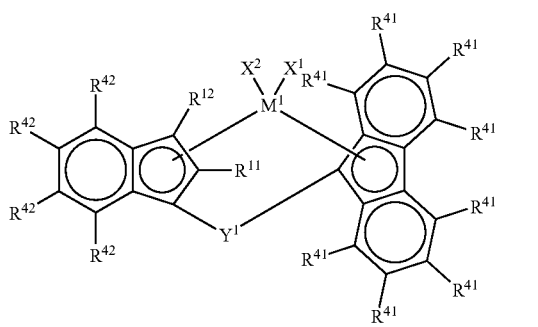
(14)

wherein M¹ is a transition metal atom selected from Group 4 of the periodic table; R¹¹, R¹², R⁴¹ and R⁴² may be the same or different and are each a hydrocarbon group of 1 to 40 carbon atoms, a halogenated hydrocarbon group of 1 to 40 carbon atoms, an oxygen-containing group, a sulfur-containing group, a silicon-containing group, a halogen atom or a hydrogen atom; of the groups indicated by R¹¹, R¹², R⁴¹ and R⁴², a part of the groups neighboring with each other may be bonded to form a ring together with carbon atoms to which those groups are bonded; X¹ and X² may be the same or different and are each a hydrocarbon group of 1 to 20 carbon atoms, a halogenated hydrocarbon group of 1 to 20 carbon atoms, an oxygen-containing group, a sulfur-containing group, a silicon-containing group, a hydrogen atom or a halogen atom; and Y¹ is a divalent hydrocarbon group of 1 to 20 carbon atoms (when all of R¹¹, R¹², R⁴¹ and R⁴² are hydrogen atoms, Y¹ is not ethylene), a divalent halogenated hydrocarbon group of 1 to 20 carbon atoms, a divalent silicon-containing group, a divalent germanium-containing group, a divalent tin-containing group, —O—, —CO—, —S—, —SO—, —SO₂—, —Ge—, —Sn—, —NR²¹—, —P(R²¹)—, —P(O) (R²¹)—, —BR²¹— or —AlR²¹— (each R²¹ may be the same or different and is a hydrocarbon group of 1 to 20 carbon atoms, a halogenated hydrocarbon group of 1 to 20 carbon atoms, a hydrogen atom, a halogen atom or a nitrogen compound residue in which one or two hydrocarbon groups of 1 to 20 carbon atoms are bonded to the nitrogen atom);

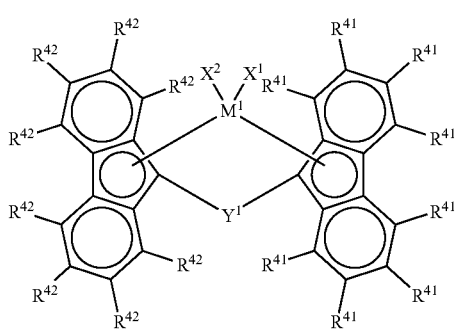

(15)

wherein M¹ is a transition metal atom selected from Group 4 of the periodic table; R⁴¹ and R⁴² may be the same or different and are each a hydrocarbon group of 1 to 40 carbon atoms, a halogenated hydrocarbon group of 1 to 40 carbon atoms, an oxygen-containing group, a sulfur-containing group, a silicon-containing group, a halogen atom or a hydrogen atom; of the groups indicated by R⁴¹ and R⁴², a part of the groups neighboring with each other may be bonded to form a ring together with carbon atoms to which those groups are bonded; X¹ and X² may be the same or different and are each a hydrocarbon group of 1 to 20 carbon atoms, a halogenated hydrocarbon group of 1 to 20 carbon atoms, an oxygen-containing group, a sulfur-containing group, a silicon-containing group, a hydrogen atom or a halogen atom; and Y¹ is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO₂—, —Ge—, —Sn—, —NR²¹—, —P(R²¹)—, —P(O)(R²¹)—, —BR²¹— or —AlR²¹— (each R²¹ may be the same or different and is a hydrocarbon group of 1 to 20 carbon atoms, a halogenated hydrocarbon group of 1 to 20 carbon atoms, a hydrogen atom, a halogen atom or a nitrogen compound residue in which one or two hydrocarbon groups of 1 to 20 carbon atoms are bonded to the nitrogen atom);

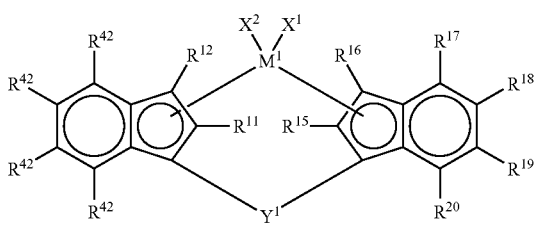

(16)

wherein M¹ is a transition metal atom selected from Group 4 of the periodic table; R¹¹, R¹², R¹⁵ to R²⁰, and R⁴² may be the same or different and are each a hydrocarbon group of 1 to 40 carbon atoms, a halogenated hydrocarbon group of 1 to 40 carbon atoms, an oxygen-containing group, a sulfur-containing group, a silicon-containing group, a halogen atom or a hydrogen atom; of the groups indicated by R¹¹, R¹², R¹⁵, R¹⁶, R¹⁷, R¹⁸, R¹⁹, R²⁰ and R⁴², a part of the groups neighboring with each other may be bonded to form a ring together with carbon atoms to which those groups are bonded; X¹ and X² may be the same or different and are each a hydrocarbon group of 1 to 20 carbon atoms, a halogenated hydrocarbon group of 1 to 20 carbon atoms, an oxygen-containing group, a sulfur-containing group, a silicon-containing group, a hydrogen atom or a halogen atom; and Y¹ is a divalent hydrocarbon group of 1 to 20 carbon atoms (when all of R¹¹, R¹², R¹⁵, R¹⁶, R¹⁷, R¹⁸, R¹⁹, R²⁰ and R⁴² are hydrogen atoms, Y¹ is not ethylene), a divalent halogenated hydrocarbon group of 1 to 20 carbon atoms, a divalent silicon-containing group, a divalent germanium-containing group, a divalent tin-containing group, —O—, —CO—, —S—, —SO—, —SO₂—, —Ge—, —Sn—, —NR²¹—, —P(R²¹)—, —P(O)(R²¹)—, —BR²¹— or —AlR²¹— (each R²¹ may be the same or different and is a hydrocarbon group of 1 to 20 carbon atoms, a halogenated hydrocarbon group of 1 to 20 carbon atoms, a hydrogen atom, a halogen atom or a nitrogen compound residue in which one or two hydrocarbon groups of 1 to 20 carbon atoms are bonded to the nitrogen atom).

In the first embodiment of the process for preparing a polar group-containing olefin copolymer according to the present invention, it is preferable that the transition metal compound (A) is represented by any one of the above formulas (11), (12), (13), (14), (15) and (16) and the polar group-containing monomer is a polar group-containing monomer of the above formula (7) wherein X is —NR'R'' (R' and R'' may be the same or different and are each a hydrogen atom or an alkyl group).

The second embodiment of the process for preparing a polar group-containing olefin copolymer according to the present invention comprises copolymerizing at least one α-olefin selected from α-olefins of 2 to 20 carbon atoms and at least one polar group-containing monomer selected from a polar group-containing monomer represented by the following formula (7), a polar group-containing monomer represented by the following formula (8) and a macromonomer represented by the following formula (9) in the presence of a catalyst comprising:

(A) a compound of a transition metal selected from Group 3 (including lanthanoid and actinoid) to Group 10 of the periodic table, and (B) at least one compound selected from:
(B-1) an organoaluminum oxy-compound,
(B-2) a compound which reacts with the compound (A) to form an ion pair, and
(B-3) an organoaluminum compound;

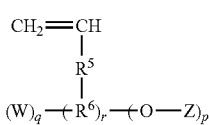
(9)

wherein $R^5$ is a hydrocarbon group; $R^6$ is a hetero atom or a group containing a hetero atom; r is 0 or 1; Z is a polymer segment obtained by any one of anionic polymerization, ring-opening polymerization and polycondensation; W is a hydroxyl group or an epoxy group; p is an integer of 1 to 3, q is 0, 1 or 2, and $p+q \leqq 3$; when p is 2 or 3, each —O—Z may be the same or different, and in this case, if r is 0, —O—Z may be bonded to the same or different atom of $R^5$, and if r is 1, —O—Z may be bonded to the same or different atom of $R^6$; when q is 2, each W may be the same or different, and in this case, if r is 0, W may be bonded to the same or different atom of $R^5$, and if r is 1, W may be bonded to the same or different atom of $R^6$; and in case of $p \geqq 1$ and $q \geqq 1$, if r is 0, W and —O—Z may be each bonded to the same or different atom of $R^5$, and if r is 1, W and —O—Z may be each bonded to the same or different atom of $R^6$.

The third embodiment of the process for preparing a branched type polar group-containing olefin copolymer according to the present invention comprises copolymerizing at least one olefin selected from α-olefins of 2 to 20 carbon atoms, a polar group-containing monomer represented by the following formula (10), and optionally, a polar group-containing monomer represented by the above formula (8) in the presence of a catalyst comprising:

(A) a compound of a transition metal selected from Group 3 (including lanthanoid and actinoid) to Group 10 of the periodic table, and (B) at least one compound selected from:
(B-1) an organoaluminum oxy-compound,
(B-2) a compound which reacts with the compound (A) to form an ion pair, and
(B-3) an organoaluminum compound, and then conducting any one of the following steps (i) and (ii);

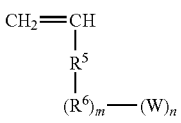
(10)

wherein $R^5$ is a hydrocarbon group; $R^6$ is a hetero atom or a group containing a hetero atom; m is 0 or 1; W is a hydroxyl group or an epoxy group; n is an integer of 1 to 3; and when n is 2 or 3, each W may be the same or different, and in this case, if m is 0, W may be bonded to the same or different atom of $R^5$, and if m is 1, W may be bonded to the same or different atom of $R^6$;

(i) from the W portion of the copolymerized polar group-containing monomer, a Z portion is formed by anionic polymerization, ring-opening polymerization or polycondensation;

(ii) the W portion of the copolymerized polar group-containing monomer is allowed to react with a terminal functional group of a polymer obtained by anionic polymerization, ring-opening polymerization and polycondensation.

The thermoplastic resin composition according to the present invention contains the polar group-containing olefin copolymer.

The adhesive resin according to the present invention comprises the polar group-containing olefin copolymer or the thermoplastic resin composition.

The compatibilizing agent according to the present invention comprises the polar group-containing olefin copolymer or the thermoplastic resin composition.

The resin modifier according to the present invention comprises the polar group-containing olefin copolymer or the thermoplastic resin composition.

The filler dispersant according to the present invention comprises the polar group-containing olefin copolymer or the thermoplastic resin composition.

The dispersant according to the present invention comprises the polar group-containing olefin copolymer or the thermoplastic resin composition.

The film or the sheet according to the invention comprises the polar group-containing olefin copolymer or the thermoplastic resin composition.

DETAILED DESCRIPTION OF THE INVENTION

The polar group-containing olefin copolymer, the process for preparing the copolymer, the thermoplastic resin composition containing the copolymer and their uses according to the invention are described in detail hereinafter.

Polar Group-containing Olefin Copolymer

The first embodiment of the polar group-containing olefin copolymer of the invention comprises a constituent unit represented by the following formula (1) (also referred to as a "constituent unit (1)" hereinafter), a constituent unit represented by the following formula (2) (also referred to as a "constituent unit (2)" hereinafter) and a constituent unit represented by the following formula (3) (also referred to as a "constituent unit (3)" hereinafter).

(1)

(2)

(3)

In the above formulas, $R^1$ and $R^2$ may be the same or different and are each a hydrogen atom or a straight-chain or branched aliphatic hydrocarbon group of 1 to 18 carbon atoms.

Examples of the straight-chain or branched aliphatic hydrocarbon groups of 1 to 18 carbon atoms include methyl, ethyl, n-propyl, isopropyl, 2-methylpropyl, n-butyl, isobutyl, sec-butyl, tert-butyl, 1,1-dimethylpropyl, 2,2-dimethylpropyl, pentyl, neopentyl, n-hexyl, 1-ethyl-1-methylpropyl, 1,1-dimethylpropyl, 2-ethylhexyl, octyl, decyl and dodecyl. Of these, preferable are hydrocarbon groups of 1 to 10 carbon atoms, particularly 1 to 6 carbon atoms.

$R^3$ is a hydrocarbon group, such as a saturated or unsaturated aliphatic hydrocarbon group, an alicyclic hydrocarbon group or an aromatic hydrocarbon group.

The saturated or unsaturated hydrocarbon group is, for example, a straight-chain or branched hydrocarbon group of 1 to 20 carbon atoms, and examples thereof include methylene, ethylene, trimethylene, methylethylene, tetramethylene, methyltrimethylene, pentamethylene, hexamethylene, heptamethylene, octamethylene, nonamethylene, decamethylene, undecamethylene, dodecamethylene, tetradecamethylene, pentadecamethylene, hexadecamethylene, heptadecamethylene, octadecamethylene, nonadecamethylene and eicosamethylene.

The alicyclic hydrocarbon group is preferably a group having an alicyclic structure as a part of its structure and having 3 to 20 carbon atoms, and examples thereof include cyclopropylene, cyclopentylene, cyclohexylene and cyclooctylene.

The aromatic hydrocarbon group is preferably a group having an aromatic ring as a part of its structure and having 6 to 20 carbon atoms, and examples thereof include -Ph-, -Ph-CH$_2$—, -Ph-(CH$_2$)$_2$—, -Ph-(CH$_2$)$_3$—, -Ph-(CH$_2$)$_6$—, -Ph-(CH$_2$)$_{10}$—, -Ph-(CH$_2$)$_{11}$—, -Ph-(CH$_2$)$_{12}$— and -Ph-(CH$_2$)$_{14}$—.

When r is 1 and $R^4$ is bonded to $R^3$, the valence of $R^3$ is 2. When r is 0 and each X of p is bonded to $R^3$, the valence of $R^3$ is p+1.

$R^4$ is a hetero atom or a group containing a hetero atom.

The hetero atom is, for example, an oxygen atom, a nitrogen atom or a sulfur atom, preferably an oxygen atom or a nitrogen atom.

The group containing a hetero atom is, for example, a group containing an oxygen atom, a nitrogen atom or a sulfur atom, and examples thereof include —O—, —C(=O)—, —C(=O)O—, —OC(=O)O—, —C(=O)NH—, —NH—, —N— (tertiary amine), —S—, and aliphatic, alicyclic or aromatic hydrocarbon groups containing these groups.

Specifically, there can be mentioned such structures as exemplified with respect to the later-described polar group-containing monomers.

The hetero atom in $R^4$ or the carbon atom to which the hetero atom is bonded is preferably bonded to $R^3$, and examples of such structures include —$R^3$—O—R—X, —$R^3$—C(=O)—R—X, —$R^3$—C(=O)O—R—X, —$R^3$—OC(=O)O—R—X, —$R^3$—C(=O)NH—R—X and —$R^3$—S—R—X (R is methylene, phenylene or cyclohexylene).

When $R^4$ contains a carbon atom, the number of carbon atoms to form $R^4$ is in the range of preferably 1 to 20, more preferably 1 to 10, particularly preferably 1 to 5.

r is 0 or 1. When r is 0, X is bonded to any one of carbon atoms for forming $R^3$. When r is 1, X is bonded to any one of carbon atoms for forming $R^4$.

X is a polar group selected from an alcoholic hydroxyl group, a phenolic hydroxyl group, a carboxylic acid group, a carboxylic ester group, an acid anhydride group, an amino group (primary, secondary and tertiary), an amide group, an epoxy group and a mercapto group.

When X is an alcoholic hydroxyl group, the polar group-containing olefin copolymer is excellent in coating properties, surface hydrophilic properties (anti-fogging properties), antistatic properties, adhesion properties to polar resins (urethane resin, epoxy resin, etc.), filler dispersibility, moisture absorption properties, gas barrier properties (in case of high content), water absorption properties (in case of high content of alcoholic hydroxyl group), dispersibility in water and oil resistance (in case of high content of alcoholic hydroxyl group).

When X is a phenolic hydroxyl group, the polar group-containing olefin copolymer is excellent in adhesion properties to polar resins (aromatic polymer, phenolic resin, etc.) and compatibility with polar resins (aromatic polymer, phenolic resin, etc.).

When X is a carboxyl group, the polar group-containing olefin copolymer is excellent in adhesion properties to metals, dispersibility in water (particularly in case of metallic salt), pigment dispersibility, filler dispersibility and oil resistance (in case of high content of carboxyl group).

When X is a carboxylic ester group, the polar group-containing olefin copolymer is excellent in adhesion properties to polar resins (nylon, EVOH, etc.), compatibility with polar resins (nylon, EVOH, etc.) and surface hydrophilic properties.

When X is an epoxy group, the polar group-containing olefin copolymer is excellent in adhesion properties to metals, adhesion properties to polar resins (polyester, epoxy resin, nylon, EVOH, urea resin, etc.), compatibility with polar resins (polyester, epoxy resin, nylon, EVOH, urea resin, etc.), pigment dispersibility and coating properties.

When X is an acid anhydride group, the polar group-containing olefin copolymer is excellent in adhesion properties to metals, adhesion properties to polar resins (nylon, EVOH, polyester, etc.), compatibility with polar resins (nylon, EVOH, polyester, etc.), pigment dispersibility, filler dispersibility and dispersibility in water (particularly in case of metallic salt).

When X is an amino group, the polar group-containing olefin copolymer is excellent in adhesion properties to polar resins (epoxy resin, polyketone, polyurethane, etc.), coating properties, antifungal properties (in case of ammonium salt), ion exchange properties (in case of ammonium salt), surface hydrophilic properties (particularly in case of ammonium salt), antistatic properties (particularly in case of ammonium salt), pigment dispersibility and filler dispersibility (particularly in case of ammonium salt).

When X is an amide group, the polar group-containing olefin copolymer is excellent in adhesion properties to polyamide and compatibility with polyamide.

When X is a mercapto group, the polar group-containing olefin copolymer is excellent in adhesion properties to rear periodic transition metals such as Fe, Cu, Co, Ni, Cd and Zn, compatibility with polyamide and polyester, and adhesion properties to polyamide and polyester.

p is an integer of 1 to 3, and when p is 2 or 3, each X may be the same or different. When p is 2 or 3 and r is 0, X may be bonded to the same or different atom of $R^3$, and when p is 2 or 3 and r is 1, X may be bonded to the same or different atom of $R^4$.

In the polar group-containing olefin copolymer of the invention, the constituent unit (1), the constituent unit (2) and the constituent unit (3) are bonded usually at random.

Composition of Copolymer

In the polar group-containing olefin copolymer of the invention, the molar ratio ((1)+(2):(3)) between the total of the constituent unit (1) and the constituent unit (2), and the constituent unit (3) is in the range of usually 99.99:0.01 to 0.01:99.99, preferably 99.95:0.05 to 10:90, more preferably 99.9:0.1 to 30:70.

The molar ratio ((1):(2)) between the constituent unit (1) and the constituent unit (2) is in the range of usually 99.99: 0.01 to 0.01:99.99, preferably 99:1 to 1:99, more preferably 90:10 to 10:90.

The polar group-containing olefin copolymer of the invention may contain two or more kinds of the constituent units (1), may contain two or more kinds of the constituent units (2), and may contain two or more kinds of the constituent units (3).

Other Copolymerizable Components

The polar group-containing olefin copolymer of the invention may contain constituent units other than the constituent unit (1), the constituent unit (2) and the constituent unit (3), within limits not detrimental to the objects of the present invention.

Examples of the constituent units which may be contained include constituent units derived from cyclic olefins other than the polar group-containing monomer represented by the formula (8), non-conjugated polyenes, hydroxyl group-containing ethylenically unsaturated compounds, amino group-containing ethylenically unsaturated compounds, epoxy group-containing ethylenically unsaturated compounds, aromatic vinyl compounds, unsaturated carboxylic acids and their derivatives, vinyl ester compounds, and vinyl chloride.

When these constituent units are contained, the amount thereof is not more than 30 mol %, preferably not more than 20 mol %, more preferably not more than 10 mol %, based on all constituent units to constitute the polar group-containing olefin copolymer.

Properties of Copolymer

The weight-average molecular weight (Mw) of the polar group-containing olefin copolymer of the invention is in the range of usually 500 to 2,000,000, preferably 800 to 1,500,000, more preferably 1,000 to 1,300,000, and the molecular weight distribution (Mw/Mn) thereof is usually not more than 3, preferably not more than 2.8, more preferably not more than 2.7.

When the molecular weight distribution (Mw/Mn) is not more than 3, the polar group-containing olefin copolymer is excellent in orientation of the polar groups toward the interface between said copolymer and a polar material and has excellent adhesion properties to a polar material and excellent compatibility with a polar material.

The Mw and Mw/Mn were determined from data obtained by the measurement at 140° C. in an orthodichlorobenzene solvent using GPC (gel permeation chromatography).

The intensity ratio (Tαβ/Tαα) of Tαβ to Tαα in the $^{13}$C-NMR spectrum of the polar group-containing olefin copolymer is not more than 1.0, preferably not more than 0.8, more preferably not more than 0.5.

When the intensity ratio (Tαβ/Tαα) is not more than 1.0, the polar group-containing olefin copolymer is excellent in orientation of the polar groups toward the interface between said copolymer and a polar material.

Tαα and Tαβ in the $^{13}$C-NMR spectrum are each a peak intensity of CH$_2$ present in the constituent unit derived from an α-olefin of 4 or more carbon atoms, and as shown below, they mean two kinds of CH$_2$ different in the position to the tertiary carbon.

Tαβ

Tαα

The Tαβ/Tαα) intensity ratio can be determined in the following manner.

A $^{13}$C-NMR spectrum of the polar group-containing olefin copolymer is measured by the use of, for example, a Japan Electron Optics Laboratory JEOL-GX270 NMR measuring device. The measurement is made using a mixed solution of hexachlorobutadiene/d6-benzene (2/1, by volume) having a sample concentration of 5 weight % under the conditions of 67.8 MHz, 25° C. and d6-benzene as a standard (128 ppm). The $^{13}$C-NMR spectrum measured is analyzed in accordance with the proposals by Lindemann Adams (Analysis Chemistry 43, p. 1245 (1971)) and J. C. Randall (Review Macromolecular Chemistry Physics, C29, 201 (1989)) to determine the (Tαβ/Tαα) intensity ratio.

Examples of the polar group-containing olefin copolymer according to the first embodiment of the invention include the following polar group-containing olefin copolymers (I) to (VI).

Polar Group-containing Olefin Copolymer (I)

In the polar group-containing olefin copolymer (I), it is preferable that $R^1$ in the formula (1) and $R^2$ in the formula (2) are each a hydrogen atom or a methyl group and $R^1$ and $R^2$ are the same as each other.

In the polar group-containing olefin copolymer (I), a preferred combination of the constituent unit (1), the constituent unit (2) and the constituent unit (3) is, for example, a combination of a constituent unit selected from examples of the constituent units (1) shown in Table 1 and a constituent unit selected from examples of the constituent units (3) shown in Table 1. Specific examples of such combinations include combinations of 1-A, 1-B, 1-C, 1-D, 1-E, 1-F, 1-G, 1-H, 1-I, 1-J, 1-K, 1-L, 1-M, 2-A, 2-B, 2-C, 2-D, 2-E, 2-F, 2-G, 2-H, 2-I, 2-J, 2-K, 2-L and 2-M.

The above combinations are those wherein $R^1$ and $R^2$ are the same as each other, and the constituent units (1) include the constituent units (2).

In the above-mentioned combination examples, numerals indicate examples of the constituent units (1), and alphabets indicate examples of the constituent units (3).

TABLE 1

| No. | Constituent unit (1) | No. | Constituent unit (3) |
|---|---|---|---|
| 1 | —CH$_2$—CH(H)— | A | —CH$_2$—CH(CH$_2$—CH$_2$—CH$_2$—OH)— |
| 2 | —CH$_2$—CH(CH$_3$)— | B | —CH$_2$—CH(CH$_2$—(CH$_2$)$_2$—CH$_2$—OH)— |
| | | C | —CH$_2$—CH(CH$_2$—(CH$_2$)$_6$—CH$_2$—OH)— |
| | | D | —CH$_2$—CH(CH$_2$—(CH$_2$)$_7$—CH$_2$—OH)— |
| | | E | —CH$_2$—CH(CH$_2$—(CH$_2$)$_9$—CH$_2$—OH)— |
| | | F | —CH$_2$—CH(CH$_2$—CH$_2$—CH$_2$—COOH)— |
| | | G | —CH$_2$—CH(CH$_2$—(CH$_2$)$_2$—CH$_2$—COOH)— |
| | | H | —CH$_2$—CH(CH$_2$—(CH$_2$)$_6$—CH$_2$—COOH)— |
| | | I | —CH$_2$—CH(CH$_2$—(CH$_2$)$_{10}$—CH$_2$—COOH)— |
| | | J | —CH$_2$—CH(CH$_2$—(CH$_2$)$_5$—CH—CH$_2$ (epoxide))— |
| | | K | —CH$_2$—CH(succinic anhydride—CH$_2$—CH=CH—CH$_2$—CH$_2$)— |
| | | L | —CH$_2$—CH(succinic anhydride—(CH$_2$—CH=CH)$_4$—CH$_2$)— |
| | | M | —CH$_2$—CH(CH$_2$—(CH$_2$)$_2$—CH$_2$—O—C$_6$H$_4$—OH)— |

The polar group-containing olefin copolymer (I) according to the invention is excellent in adhesion properties to polar materials such as metals and polar resins, compatibility and flexibility.

Polar Group-containing Olefin Copolymer (II)

In the polar group-containing olefin copolymer (II), $R^1$ in the formula (1) and $R^2$ in the formula (2) are different from each other.

In the polar group-containing olefin copolymer (II), a preferred combination of the constituent unit (1), the constituent unit (2) and the constituent unit (3) is, for example, a combination of a constituent unit selected from examples of the constituent units (1) and the constituent units (2) shown in Table 2 and a constituent unit selected from examples of the constituent units (3) shown in Table 2. Specific examples of such combinations include combinations of 1-A, 1-B, 1-C, 1-D, 1-E, 1-F, 1-G, 1-H, 1-I, 1-J, 1-K, 1-L, 1-M, 2-A, 2-B, 2-C, 2-D, 2-E, 2-F, 2-G, 2-H, 2-I, 2-J, 2-K, 2-L, 2-M, 3-A, 3-B, 3-C, 3-D, 3-E, 3-F, 3-G, 3-H, 3-I, 3-J, 3-K, 3-L, 3-M, 4-A, 4-B, 4-C, 4-D, 4-E, 4-F, 4-G, 4-H, 4-I, 4-J, 4-K, 4-L, 4-M, 5-A, 5-B, 5-C, 5-D, 5-E, 5-F, 5-G, 5-H, 5-I, 5-J, 5-K, 5-L, 5-M, 6-A, 6-B, 6-C, 6-D, 6-E, 6-F, 6-G, 6-H, 6-I, 6-J, 6-K, 6-L, 6-M, 7-A, 7-B, 7-C, 7-D, 7-E, 7-F, 7-G, 7-H, 7-I, 7-J, 7-K, 7-L and 7-M.

In the above-mentioned combination examples, numerals indicate examples of the constituent units (1) and (2), and alphabets indicate examples of the constituent units (3).

TABLE 2

| No. | Constituent unit (1), (2) | No. | Constituent unit (3) |
|---|---|---|---|
| 1 | —CH$_2$—CH(H)—  —CH$_2$—CH(CH$_3$)— | A | —CH$_2$—CH(—CH$_2$)—;  HO—CH$_2$—CH$_2$— |
| 2 | —CH$_2$—CH(H)—  —CH$_2$—CH(H$_3$C—CH$_2$)— | B | —CH$_2$—CH—;  HO—CH$_2$—(CH$_2$)$_2$—CH$_2$— |
| 3 | —CH$_2$—CH(H)—  —CH$_2$—CH(H$_3$C—CH$_2$—CH$_2$)— | C | —CH$_2$—CH—;  HO—CH$_2$—(CH$_2$)$_6$—CH$_2$— |
| 4 | —CH$_2$—CH(H)—  —CH$_2$—CH(H$_3$C—CH(CH$_3$)—CH$_2$)— | D | —CH$_2$—CH—;  HO—CH$_2$—(CH$_2$)$_7$—CH$_2$— |
| 5 | —CH$_2$—CH(H)—  —CH$_2$—CH(H$_3$C—(CH$_2$)$_4$—CH$_2$)— | E | —CH$_2$—CH—;  HO—CH$_2$—(CH$_2$)$_9$—CH$_2$— |
| 6 | —CH$_2$—CH(H)—  —CH$_2$—CH(CH$_3$)—  —CH$_2$—CH(H$_3$C—CH$_2$)— | F | —CH$_2$—CH—;  HOOC—CH$_2$—CH$_2$—CH$_2$— |
| 7 | —CH$_2$—CH(CH$_3$)—  —CH$_2$—CH(H$_3$C—CH$_2$)— | G | —CH$_2$—CH—;  HOOC—CH$_2$—(CH$_2$)$_2$—CH$_2$— |
|  |  | H | —CH$_2$—CH—;  HOOC—CH$_2$—(CH$_2$)$_6$—CH$_2$— |
|  |  | I | —CH$_2$—CH—;  HOOC—CH$_2$—(CH$_2$)$_{10}$—CH$_2$— |
|  |  | J | —CH$_2$—CH—;  epoxide-CH—(CH$_2$)$_5$—CH$_2$— |
|  |  | K | maleic anhydride-CH—CH$_2$—CH=CH—CH$_2$—CH$_2$—CH— |

TABLE 2-continued

| No. | Constituent unit (1), (2) | No. | Constituent unit (3) |
|---|---|---|---|
| | | L | (structure: succinic anhydride group—CH—CH(CH$_2$—)—(CH$_2$—CH=CH—)$_4$—CH$_2$—CH(—CH$_2$—)) |
| | | M | HO—C$_6$H$_4$—O—CH$_2$—(CH$_2$)$_2$—CH(—CH$_2$—)—CH$_2$ |

It is preferable that the polar group-containing olefin copolymer (II) contains no other copolymerizable components previously mentioned and is formed from only the constituent unit (1), the constituent unit (2) and the constituent unit (3). Especially when X is an alcoholic hydroxyl group, a phenolic hydroxyl group or an amino group, the polar group-containing olefin copolymer is particularly preferably formed from only the constituent unit (1), the constituent unit (2) and the constituent unit (3).

The polar group-containing olefin copolymer (II) according to the invention is excellent in adhesion properties to polar materials such as metals and polar resins, compatibility and flexibility.

Polar Group-containing Olefin Copolymer (III)

In the polar group-containing olefin copolymer (III), $R^3$ in the formula (3) is a hydrocarbon group of 11 or more carbon atoms.

In the polar group-containing olefin copolymer (III), a preferred combination of the constituent unit (1), the constituent unit (2) and the constituent unit (3) is, for example, a combination of a constituent unit selected from examples of the constituent units (1) and (2) shown in Table 3 and a constituent unit selected from examples of the constituent units (3) shown in Table 3. Specific examples of such combinations include combinations of 1-A, 1-B, 1-C, 2-A, 2-B, 2-C, 3-A, 3-B, 3-C, 4-A, 4-B, 4-C, 5-A, 5-B, 5-C, 6-A, 6-B, 6-C, 7-A, 7-B, 7-C, 8-A, 8-B, 8-C, 9-A, 9-B, 9-C, 10-A, 10-B and 10-C.

In Table 3, by the description of one kind of a constituent unit in the column of the constituent units (1) and (2) is meant that $R^1$ and $R^2$ are the same as each other, and by the description of three kinds of constituent units in the column of the constituent units (1) and (2) is meant that two kinds of the constituent units (1) or the constituent units (2) are contained.

In the above-mentioned combination examples, numerals indicate examples of the constituent units (1) and (2), and alphabets indicate examples of the constituent units (3).

TABLE 3

| No. | Constituent unit (1), (2) | No. | Constituent unit (3) |
|---|---|---|---|
| 1 | —CH$_2$—CH(H)— | A | HO—CH$_2$—(CH$_2$)$_9$—CH(—CH$_2$—) |
| 2 | —CH$_2$—CH(CH$_3$)— | B | HOOC—CH$_2$—(CH$_2$)$_{10}$—CH(—CH$_2$—) |
| 3 | —CH$_2$—CH(H$_3$C—CH$_2$)— | C | (succinic anhydride)—CH—CH(CH$_2$—)—(CH$_2$—CH=CH—)$_4$—CH$_2$—CH(—CH$_2$—) |
| 4 | —CH$_2$—CH(H)— —CH$_2$—CH(CH$_3$)— | | |
| 5 | —CH$_2$—CH(H)— —CH$_2$—CH(H$_3$C—CH$_2$)— | | |

TABLE 3-continued

| No. | Constituent unit (1), (2) | No. | Constituent unit (3) |
|---|---|---|---|
| 6 | —CH₂—CH—   —CH₂—CH— <br>       \|                       \| <br>       H          H₃C—CH₂—CH₂—CH₂ | | |
| 7 | —CH₂—CH—   —CH₂—CH— <br>       \|                       \| <br>       H          H₃C—CH—CH₂ <br>                       CH₃ | | |
| 8 | —CH₂—CH—   —CH₂—CH— <br>       \|                       \| <br>       H          H₃C—(CH₂)₄—CH₂ | | |
| 9 | —CH₂—CH—   —CH₂—CH—   —CH₂—CH— <br>       \|                \|                       \| <br>       H          CH₃          H₃C—CH₂ | | |
| 10 | —CH₂—CH—   —CH₂—CH— <br>        \|                      \| <br>        CH₃        H₃C—CH₂ | | |

It is preferable that the polar group-containing olefin copolymer (III) contains no other copolymerizable components previously mentioned and is formed from only the constituent unit (1), the constituent unit (2) and the constituent unit (3). Especially when X is an alcoholic hydroxyl group, a phenolic hydroxyl group or an amino group, the polar group-containing olefin copolymer is particularly preferably formed from only the constituent unit (1), the constituent unit (2) and the constituent unit (3).

The polar group-containing olefin copolymer (III) according to the invention is excellent in adhesion properties to polar materials such as metals and polar resins and compatibility.

Polar Group-containing Olefin Copolymer (IV)

In the polar group-containing olefin copolymer (IV), X in the formula (3) is a polar group selected from a phenolic hydroxyl group, a carboxylic ester group, an acid anhydride group, an amino group, an amide group, an epoxy group and a mercapto group.

In the polar group-containing olefin copolymer (IV), a preferred combination of the constituent unit (1), the constituent unit (2) and the constituent unit (3) is, for example, a combination of a constituent unit selected from examples of the constituent units (1) shown in Table 4 and a constituent unit selected from examples of the constituent units (3) shown in Table 4. Specific examples of such combinations include combinations of 1-A, 1-B, 1-C, 1-D, 2-A, 2-B, 2-C, 2-D, 3-A, 3-B, 3-C, 3-D, 4-A, 4-B, 4-C, 4-D, 5-A, 5-B, 5-C, 5-D, 6-A, 6-B, 6-C, 6-D, 7-A, 7-B, 7-C, 7-D, 8-A, 8-B, 8-C, 8-D, 9-A, 9-B, 9-C, 9-D, 10-A, 10-B, 10-C and 10-D.

The above combinations are those wherein $R^1$ and $R^2$ are the same as each other, and the constituent units (1) include the constituent units (2).

In the above-mentioned combination examples, numerals indicate examples of the constituent units (1), and alphabets indicate examples of the constituent units (3).

TABLE 4

| No. | Constituent unit (1) | No. | Constituent unit (3) |
|---|---|---|---|
| 1 | —CH₂—CH— <br>       \| <br>       H | A | epoxide-containing —CH₂—CH— group with CH—(CH₂)₅—CH₂ and H₂C—O ring |
| 2 | —CH₂—CH— <br>       \| <br>       CH₃ | B | maleic anhydride-containing group: O=C—O—C=O ring with CH₂—CH—CH₂—CH=CH—CH₂—CH₂—CH—CH₂ |

TABLE 4-continued

| No. | Constituent unit (1) | No. | Constituent unit (3) |
|---|---|---|---|
| 3 | —CH$_2$—CH(CH$_2$CH$_3$)— | C | (maleic anhydride)-CH$_2$—(CH$_2$—CH=CH)$_4$-CH$_2$-CH(CH$_2$)— |
| 4 | —CH$_2$—CH(H)— —CH$_2$—CH(CH$_3$)— | D | HO-C$_6$H$_4$-O-CH$_2$-(CH$_2$)$_2$-CH$_2$-CH(CH$_2$)— |
| 5 | —CH$_2$—CH(H)— —CH$_2$—CH(CH$_2$CH$_3$)— | | |
| 6 | —CH$_2$—CH(H)— —CH$_2$—CH(CH$_2$CH$_2$CH$_3$)— | | |
| 7 | —CH$_2$—CH(H)— —CH$_2$—CH(CH(CH$_3$)$_2$)— | | |
| 8 | —CH$_2$—CH(H)— —CH$_2$—CH(CH$_2$(CH$_2$)$_4$CH$_3$)— | | |
| 9 | —CH$_2$—CH(H)— —CH$_2$—CH(CH$_3$)— —CH$_2$—CH(CH$_2$CH$_3$)— | | |
| 10 | —CH$_2$—CH(CH$_3$)— —CH$_2$—CH(CH$_2$CH$_3$)— | | |

The polar group-containing olefin copolymer (IV) according to the invention is excellent in adhesion properties to polar materials such as metals and polar resins and compatibility.

Polar Group-containing Olefin Copolymer (V)

In the polar group-containing olefin copolymer (V), $R^1$ in the formula (1) and $R^2$ in the formula (2) are each a hydrocarbon group of 2 or more carbon atoms, preferably 2 to 18 carbon atoms, and the crystallinity of the copolymer, as determined by X-ray diffractometry, is not less than 10%, preferably 15 to 80%, more preferably 20 to 70%.

The crystallinity can be measured by X-ray diffractometry (in accordance with S. L. AGGARWAL, J. Polymer Sci., 18, 17 (1955)) or the like.

The stereoregularity (isotacticity) of the polar group-containing olefin copolymer (V) is usually not less than 20%, preferably 30 to 100%, more preferably 40 to 100%.

In the polar group-containing olefin copolymer (V), a preferred combination of the constituent unit (1), the constituent unit (2) and the constituent unit (3) is, for example, a combination of a constituent unit selected from examples of the constituent units (1) shown in Table 5 and a constituent unit selected from examples of the constituent units (3) shown in Table 5. Specific examples of such combinations include combinations of 1-A, 1-B, 1-C, 1-D, 1-E, 1-F, 1-G, 1-H, 1-I, 1-J, 1-K, 1-L, 1-M, 2-A, 2-B, 2-C, 2-D, 2-E, 2-F, 2-G, 2-H, 2-I, 2-J, 2-K, 2-L and 2-M.

The above combinations are those wherein $R^1$ and $R^2$ are the same as each other, and the constituent units (1) include the constituent units (2).

In the above-mentioned combination examples, numerals indicate examples of the constituent units (1), and alphabets indicate examples of the constituent units (3).

TABLE 5

| No. | Constituent unit (1) | No. | Constituent unit (3) |
|---|---|---|---|
| 1 | —CH$_2$—CH(CH$_2$CH$_3$)— | A | —CH$_2$—CH(CH$_2$-C(H$_2$)-C(H$_2$)-OH)— |

TABLE 5-continued
| No. | Constituent unit (1) | No. | Constituent unit (3) |
|---|---|---|---|
| 2 | 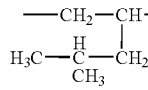 | B | 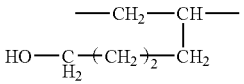 |
|  |  | C | 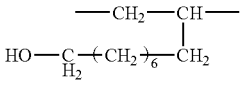 |
|  |  | D | 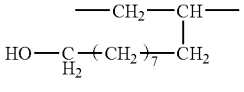 |
|  |  | E | 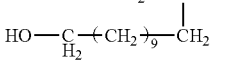 |
|  |  | F | 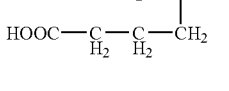 |
|  |  | G | 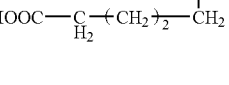 |
|  |  | H | 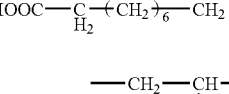 |
|  |  | I | 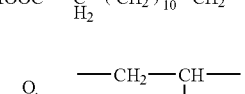 |
|  |  | J |  |
|  |  | K | 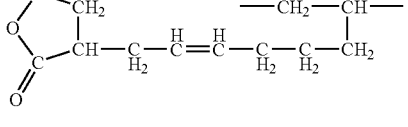 |
|  |  | L | 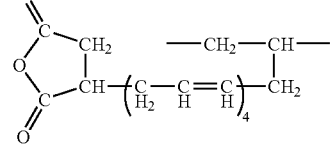 |
|  |  | M | 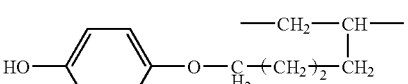 |

The polar group-containing olefin copolymer (V) according to the invention is excellent in adhesion properties to polar materials such as metals and polar resins, compatibility and rigidity.

Polar Group-containing Olefin Copolymer (VI)

In the polar group-containing olefin copolymer (VI), $R^1$ in the formula (1) and $R^2$ in the formula (2) are each a hydrocarbon group of 2 or more carbon atoms, preferably 2 to 18 carbon atoms, and the crystallinity of the copolymer, as determined by X-ray diffractometry, is less than 10%, preferably not more than 5%, more preferably not more than 2%.

It is preferable that the polar group-containing olefin copolymer (VI) contains no other copolymerizable components previously mentioned and is formed from only the constituent unit (1), the constituent unit (2) and the constituent unit (3). Especially when X is an alcoholic hydroxyl group, a phenolic hydroxyl group or an amino group, the polar group-containing olefin copolymer is particularly preferably formed from only the constituent unit (1), the constituent unit (2) and the constituent unit (3).

In the polar group-containing olefin copolymer (VI), a preferred combination of the constituent unit (1), the constituent unit (2) and the constituent unit (3) is, for example, a combination of a constituent unit selected from examples of the constituent units (1) shown in Table 6 and a constituent unit selected from examples of the constituent units (3) shown in Table 6. Specific examples of such combinations include combinations of 1-A, 1-B, 1-C, 1-D, 1-E, 1-F, 1-G, 1-H, 1-I. 1-J, 1-K, 1-L, 1-M, 2-A, 2-B, 2-C, 2-D, 2-E, 2-F, 2-G, 2-H, 2-I. 2-J, 2-K, 2-L and 2-M.

The above combinations are those wherein $R^1$ and $R^2$ are the same as each other, and the constituent units (1) include the constituent units (2).

In the above-mentioned combination examples, numerals indicate examples of the constituent units (1), and alphabets indicate examples of the constituent units (3).

TABLE 6

| No. | Constituent unit (1) | No. | Constituent unit (3) |
|---|---|---|---|
| 1 | —CH₂—CH— <br> \| <br> H₃C—CH₂—CH₂—CH₂ | A | —CH₂—CH— <br> \| <br> HO—CH₂—CH₂—CH₂ |
| 2 | —CH₂—CH— <br> \| <br> H₃C—(CH₂)₄—CH₂ | B | —CH₂—CH— <br> \| <br> HO—CH₂—(CH₂)₂—CH₂ |
|  |  | C | —CH₂—CH— <br> \| <br> HO—CH₂—(CH₂)₆—CH₂ |
|  |  | D | —CH₂—CH— <br> \| <br> HO—CH₂—(CH₂)₇—CH₂ |
|  |  | E | —CH₂—CH— <br> \| <br> HO—CH₂—(CH₂)₉—CH₂ |
|  |  | F | —CH₂—CH— <br> \| <br> HOOC—CH₂—CH₂—CH₂ |
|  |  | G | —CH₂—CH— <br> \| <br> HOOC—CH₂—(CH₂)₂—CH₂ |
|  |  | H | —CH₂—CH— <br> \| <br> HOOC—CH₂—(CH₂)₆—CH₂ |
|  |  | I | —CH₂—CH— <br> \| <br> HOOC—CH₂—(CH₂)₁₀—CH₂ |
|  |  | J | —CH₂—CH— <br> \| <br> epoxy-CH—(CH₂)₅—CH₂ |

TABLE 6-continued

| No. | Constituent unit (1) | No. | Constituent unit (3) |
|---|---|---|---|
| | | K | |
| | | L | |
| | | M | |

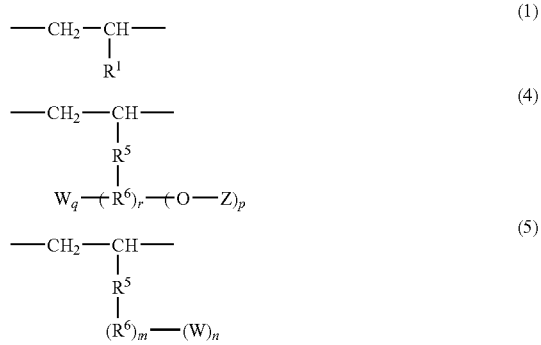

The polar group-containing olefin copolymer (VI) according to the invention is excellent in adhesion properties to polar materials such as metals and polar resins, compatibility, tackiness and flexibility.

The second embodiment of the polar group-containing olefin copolymer of the invention is a branched type polar group-containing olefin copolymer comprising a constituent unit represented by the following formula (1) and a constituent unit represented by the following formula (4) (also referred to as a "constituent unit (4)"), and optionally a constituent unit represented by the following formula (5) (also referred to as a "constituent unit (5)").

$$—CH_2—CH— \atop |\atop R^1 \quad (1)$$

$$—CH_2—CH— \atop |\atop R^5 \atop |\atop W_q—(R^6)_r—(O—Z)_p \quad (4)$$

$$—CH_2—CH— \atop |\atop R^5 \atop |\atop (R^6)_m—(W)_n \quad (5)$$

The constituent unit represented by the formula (1) is identical with the aforesaid constituent unit (1).

In the formulas (4) and (5), $R^5$ is a hydrocarbon group, such as a saturated or unsaturated hydrocarbon group, an alicyclic hydrocarbon group or an aromatic hydrocarbon group, and examples of such hydrocarbon groups include the same groups as previously described with respect to $R^3$ in the formula (3).

In the formula (4), when r is 1 and $R^6$ is bonded to $R^5$, the valence of $R^5$ is 2. When r is 0 and each —O—Z of p or each W of q is bonded to $R^5$, the valence of $R^5$ is p+q+1.

In the formula (5), when m is 1 and $R^6$ is bonded to $R^5$, the valence of $R^5$ is 2. When m is 0 and each W of n is bonded to $R^5$, the valence of $R^5$ is n+1.

Although $R^5$ in the formula (4) and $R^5$ in the formula (5) may be the same or different, they preferably are the same as each other.

In the formulas (4) and (5), $R^6$ is a hetero atom or a group containing a hetero atom, and examples the hetero atoms and the groups containing the hetero atom include the same atoms and groups as previously described with respect to $R^4$ in the formula (3).

In the formula (4), the hetero atom in $R^6$ or the carbon atom to which the hetero atom is bonded is preferably bonded to $R^5$, and examples of such structures include —$R^5$—O—R—O—Z, —$R^5$—C(=O)—R—O—Z, —$R^5$—C(=O)O—R—O—Z, —$R^5$—OC(=O)O—R—O—Z, —$R^5$—C(=O)NH—R—O—Z and —$R^5$—S—R—O—Z (R is methylene, phenylene or cyclohexylene). The above examples are those wherein p is 1 and q is 0 in the formula (4), and the same shall apply to other cases.

In the formula (5), the hetero atom in $R^6$ or the carbon atom to which the hetero atom is bonded is preferably bonded to $R^5$, and examples of such structures include —$R^5$—O—R—W, —$R^5$—C(=O)—R—W, —$R^5$—C(=O)O—R—W, —$R^5$—OC(=O)O—R—X, —$R^5$—C(=O)NH—R—W and —$R^5$—S—R—W (R is methylene, phenylene or cyclohexylene). The above examples are those wherein n is 1 in the formula (5), and the same shall apply to other cases.

When $R^6$ contains a carbon atom in the formulas (4) and (5), the number of carbon atoms to form $R^6$ is in the range of preferably 1 to 20, more preferably 1 to 10, particularly preferably 1 to 5.

Although $R^6$ in the formula (4) and $R^6$ in the formula (5) may be the same or different, they preferably are the same as each other.

In the formula (4), r is 0 or 1. When r is 0, —O—Z is bonded to any one of carbon atoms for forming $R^5$. When r is 1, —O—Z is bonded to any one of carbon atoms for forming $R^6$.

In the formula (5), m is 0 or 1. When m is 0, W is bonded to any one of carbon atoms for forming $R^5$. When m is 1, W is bonded to any one of carbon atoms for forming $R^6$.

In the formula (4), Z is a polymer segment obtained by anionic polymerization, ring-opening polymerization or polycondensation.

Examples of the polymer segments include segments obtained by anionic polymerization of one or more monomers selected from methyl methacrylate, ethyl methacrylate, butyl acrylate, acrylonitrile and acrylamide, segments obtained by ring-opening polymerization of lactone, lactide, siloxane, lactam, cyclic ether, oxazoline, ethylene oxide, propylene oxide, etc., and segments obtained by polycondensation of monomers, such as polycarboxylic acid and polyhydric alcohol, polycarboxylic acid and polyamine, or hydroxycarboxylic acid.

Examples of polar monomers employed in formation of the polymer segment include:

(meth)acrylic acid esters, such as monoesters of monovalent alcohols and acrylic acid or methacrylic acid, specifically, methylacrylate, methylmethacrylate, ethylacrylate, propylmethacrylate, butylacrylate, 2-ethylhexylmethacrylate, laurylacrylate, stearylmethacrylate, 1,1,1,3,3,3-hexafluoroisopropylacrylate, 1,1,1,3,3,3-hexafluoroisopropylmethacrylate, 2,2,2-trifluoroethylacrylate, 2,2,2-trifluoroethylmethacrylate, 1H,1H,2H,2H-heptadecafluorodecylacrylate, allylacrylate, allylmethacrylate, cyclohexylmethacrylate, glycidylacrylate, glycidylmethacrylate, tetrahydrofurfurylacrylate, benzylacrylate and -phenylethylmethacrylate;

monoesters of divalent alcohols with a terminal protected by an ether linkage and acrylic acid or methacrylic acid, such as 2-methoxyethylacrylate, 2-ethoxyethylmethacrylate, 2-phenoxyethylacrylate, 2-dicyclopentenyloxyethylacrylate, 1-methoxy-2-propylmethacrylate, 3-methoxypropylacrylate, 4-ethoxybutylmethacrylate, 6-methoxyhexamethylacrylate, methoxydiethyleneglycolacrylate, phenoxydipropyleneglycolmethacrylete, ethoxytripropyleneglycolmethacrylate, ethoxypolyethyleneglycolacrylate and methoxypolypropyleneglycolmethacrylate;

polyvalent esters of a divalent or more alcohol and acrylic acid or methacrylic acid, such as ethyleneglycoldiacrylate, ethyleneglycoldimethacrylate, propyleneglycoldiacrylate, propyleneglycoldimethacrylate, 1,3-propanediol dimethacrylate, 1,4-butanediol diacrylate, 1,6-hexanediol dimethacrylate, neopentylglycol diacrylate, neopentylglycol dimethacrylate, diethyleneglycol diacrylate, dipropyleneglycol dimethacrylate, triethyleneglycol dimethacrylate, tripropyleneglycol diacrylate, polyethyleneglycol diacrylate, polypropyleneglycol diacrylate, polypropyleneglycol dimethacrylate, glycerintriacrylate, glycerintrimethacrylate, pentaerythritol tetramethacrylate, dipentaerythritol hexaacrylate, trimethylolpropane triacrylate, poly(ethyleneoxido)triol triacrylate, poly(propyleneoxido)triol triacrylate and poly(propyleneoxido)triol trimethacrylate;

esters of alcohols having an ester linkage and acrylic or methacrylic acid, such as 2-benzyloxyethyl acrylate, 2-benzyloxyethyl methacrylate, 2-acetyloxy acrylate, 5-tetrahydrofurfuryloxycarbonylpentyl acrylate, 5-tetrahydrofurfuryloxycarbonylpentyl methacrylate and 2,2,6,6-tetramethyl-4-oxy-5-oxa-heptane-1,7-diyl-diacrylate;

esters of alcohols having a cyclic acetal linkage and acrylic acid or methacrylic acid, such as 2-tertial-butyl-1,3-dioxycyclopentane-2'-ylmethacrylate and 2-tertial-butyl-5-ethyl-5-vinylcarbonyloxymethyl-1,3-dioxycyclohexane-2'(2)-ylacrylate;

esters of oxysuccinimide and acrylic or methacrylic acid, such as N-oxysuccinimide acrylate and N-oxysuccinimide methacrylate;

esters of an alcohol having a secondary amino group and acrylic acid or methacrylic acid, such as 2-dimethylaminoethyl acrylate and 2-ethylpropylaminoethyl methacrylate; and esters of an alcohol having a cyano group and acrylic acid or methacrylic acid, such as 2-cyanoethyl acrylate and 2-cyanopropylmethacrylate.

Examples of (meth)acrylonitriles include acrylonitrile and methacrylonitrile.

Acrylamides include acrylamide, N-monosubstituted or N,N-disubstituted acrylamides, for example, acrylamide;

N-monosubstituted acrylamides, such as N-methylacrylamide, N-ethylacrylamide, N-propylacrylamide, N-butylacrylamide, N-octylacrylamide, N-phenylacrylamide, N-glycidylacrylamide and N,N'-methylenebisacrylamide;

N,N-disubstituted monoacrylamides, such as N,N-dimethylacrylamide, N-ethyl-N-methylacrylamide, N,N-diethylacrylamide, N,N-di-n-propylacrylamide, N,N-dioctylacrylamide, N,N-diphenylacrylamide, N-ethyl-N-glycidylacrylamide, N,N-diglycidylacrylamide, N-methyl-N-(4-glycidyloxybutyl)acrylamide, N-methyl-N-(5-glycidyloxypentyl)acrylamide, N-methyl-N-(6-glycidyloxyhexyl)acrylamide, N-acryloylpyrrolidine, N-acryloyl-L-prolinemethylester, N-acryloylpiperidine, N-acryloylmorpholine and 1-acryloylimidazole; and N,N'-disubstituted bisacrylamides, such as N,N'-diethyl-N,N'-ethylenebisacrylamide, N,N'-dimethyl-N,N'-hexamethylenebisacrylamide and di(N,N'-ethylene)bisacrylamide.

Examples of vinylpyridines include vinyl-or isopropenyl-substituted pyridines, such as 2-vinylpyridine, 2-isopropenylpyridine and 4-vinylpyridine.

Examples of N-substituted maleimide include:

N-aliphatic-substituted maleimides, such as N-methylmaleimide and N-ethylmaleimide; and N-aromatic-substituted maleimides, such as N-phenylmaleimide and N-(4-methylphenyl)maleimide.

Examples of vinyl ketones include: methyl vinyl ketone, isopropenyl methyl ketone, ethyl vinyl ketone, ethyl isopropenyl ketone, butyl vinyl ketone and phenyl vinyl ketone.

Examples of styrene derivatives include: p-methoxycarbonyl styrene, p-tertiary-butoxycarbonyl styrene and p-cyano styrene.

Examples of the polar monomer include alkylene oxide compounds, for example, epoxy compounds, such as ethylene oxide, propylene oxide, 1,2-butylene oxide, 2,3-butylene oxide, styrene oxide, cyclohexene oxide, epichlorohydrin, epibromohydrin, methylglycidylether, allylglycidylether and phenylglycidylether. Of these, preferable are ethylene oxide, propylene oxide, 1,2-butylene oxide and styrene oxide. Highly preferable are propylene oxide and ethylene oxide. Propylene oxide is extremely preferred.

Of these, preferable are polymer segments obtained by anionic polymerization of (meth)acrylic esters and polymer segments obtained by ring-opening polymerization of ethylene oxide or propylene oxide.

There is no specific limitation on the molecular weight of the polymer segment, and for example, the weight-average molecular weight is in the range of 200 to 1,000,000, preferably 500 to 100,000.

When Z is polyethylene oxide or polypropylene oxide, the polar group-containing olefin copolymer is excellent in coating properties, surface hydrophilic properties (anti-fogging properties), antistatic properties, adhesion properties to polar resins (urethane resin, epoxy resin, etc.), compatibility with the polar resins, moisture absorption properties, water absorption properties (in case of high content of Z), dispersibility in water and oil resistance (in case of high content of Z).

When Z is PMMA, the polar group-containing olefin copolymer is excellent in surface hardness, adhesion properties to metals, pigment dispersibility, filler dispersibility, oil resistance (in case of high content of Z), adhesion properties to polar resins (acrylic resin, nylon, EVOH, etc.) and compatibility with the polar resins.

When Z is polyacrylonitrile or polyacrylamide, the polar group-containing olefin copolymer is excellent in surface hardness, surface hydrophilic properties (anti-fogging properties), antistatic properties, coating properties, adhesion properties to metals, adhesion properties to polar resins (polyacrylonitrile, polyacrylamide, polyamide, polyester, etc.), compatibility with the polar resins, dispersibility in water, biocompatibility, stimulation response, moisture absorption properties and water absorption properties.

When Z is polyethyl methacrylate or polybutyl acrylate, the polar group-containing olefin copolymer is excellent in adhesion properties to metals, adhesion properties to polar resins (acrylic resin, nylon, EVOH, etc.), compatibility with the polar resins and oil resistance.

When Z is polyamide (including ring-opening polymer of lactam), the polar group-containing olefin copolymer is excellent in adhesion properties to polar resins (polyamide, etc.), compatibility with the polar resins, gas barrier properties and oil resistance.

When Z is polyester (including ring-opening polymer of lactam), the polar group-containing olefin copolymer is excellent in adhesion properties to polar resins (polyester, etc.), compatibility with the polar resins and gas barrier properties.

In the formula (4), p is an integer of 1 to 3, and when p is 2 or 3, each —O—Z may be the same or different. When p is 2 or 3 and r is 0, —O—Z may be bonded to the same or different atom of $R^5$. When p is 2 or 3 and r is 1, —O—Z may be bonded to the same or different atom of $R^6$.

In the formulas (4) and (5), W is a hydroxyl group or an epoxy group.

Although W in the formula (4) and W in the formula (5) may be the same or different, they are preferably the same as each other.

In the formula (4), q is 0, 1 or 2, and when q is 2, each W may be the same or different. When q is 2 and r is 0, W may be bonded to the same or different atom of $R^5$. When q is 2 and r is 1, W may be bonded to the same or different atom of $R^6$.

In case of $p \geq 1$ and $q \geq 1$, when r is 0, W and —O—Z may be each bonded to the same or different atom of $R^5$, and when r is 1, W and —O—Z may be each bonded to the same or different atom of $R^6$, and $$p+q \leq 3.$$

In the formula (5), n is an integer of 1 to 3, and when n is 2 or 3, each W may be the same or different. When n is 2 or 3 and m is 0, W may be bonded to the same or different atom of $R^5$. When n is 2 or 3 and m is 1, W may be bonded to the same or different atom of $R^6$.

In the second embodiment of the polar group-containing olefin copolymer of the invention, the constituent unit (1), the constituent unit (4), and optionally, the constituent unit (5) are bonded usually at random.

Composition of Copolymer

In the second embodiment of the polar group-containing olefin copolymer of the invention, the molar ratio ((1):(4)+(5)) between the constituent unit (1) and the total of the constituent unit (4) and the constituent unit (5) is in the range of usually 99.99:0.01 to 0.01:99.99, preferably 99.95:0.05 to 10:90, more preferably 99.9:0.1 to 30:70. The molar ratio ((4):(5)) between the constituent unit (4) and the constituent unit (5) is in the range of usually 100:0 to 0.01:99.99, preferably 100:0 to 1:99, more preferably 100:0 to 10:90.

The second embodiment of the polar group-containing olefin copolymer of the invention may contain two or more kinds of the constituent units (1), may contain two or more kinds of the constituent units (4), and may contain two or more kinds of the constituent units (5).

In the present invention, a preferred combination of the constituent unit (1), the constituent unit (4) and the constituent unit (5) is, for example, a combination of a constituent unit selected from examples of the constituent units (1) shown in Table 7, a constituent unit selected from examples of the —$R^5$—($R^6$)$_r$—O— portions and examples of the Z portions of constituent units (4) shown in Table 7, and a constituent unit selected from examples of the constituent units (5) shown in Table 7. Specific examples of such combinations include combinations of:

1-A-Z1-a, 1-A-Z2-a, 1-A-Z3-a, 1-A-Z4-a, 1-A-Z5-a, 1-A-Z6-a, 1-A-Z7-a, 1-B-Z1-b, 1-B-Z2-b, 1-B-Z3-b, 1-B-Z4-b, 1-B-Z5-b, 1-B-Z6-b, 1-B-Z7-b, 1-C-Z1-c, 1-C-Z2-c, 1-C-Z3-c, 1-C-Z4-c, 1-C-Z5-c, 1-C-Z6-c, 1-C-Z7-c,

2-A-Z1-a, 2-A-Z2-a, 2-A-Z3-a, 2-A-Z4-a, 2-A-Z5-a, 2-A-Z6-a, 2-A-Z7-a, 2-B-Z1-b, 2-B-Z2-b, 2-B-Z3-b, 2-B-Z4-b, 2-B-Z5-b, 2-B-Z6-b, 2-B-Z7-b, 2-C-Z1-c, 2-C-Z2-c, 2-C-Z3-c, 2-C-Z4-c, 2-C-Z5-c, 2-C-Z6-c, 2-C-Z7-c,

3-A-Z1-a, 3-A-Z2-a, 3-A-Z3-a, 3-A-Z4-a, 3-A-Z5-a, 3-A-Z6-a, 3-A-Z7-a, 3-B-Z1-b, 3-B-Z2-b, 3-B-Z3-b, 3-B-Z4-b, 3-B-Z5-b, 3-B-Z6-b, 3-B-Z7-b, 3-C-Z1-c, 3-C-Z2-c, 3-C-Z3-c, 3-C-Z4-c, 3-C-Z5-c, 3-C-Z6-c, 3-C-Z7-c,

4-A-Z1-a, 4-A-Z2-a, 4-A-Z3-a, 4-A-Z4-a, 4-A-Z5-a, 4-A-Z6-a, 4-A-Z7-a, 4-B-Z1-b, 4-B-Z2-b, 4-B-Z3-b, 4-B-Z4-b, 4-B-Z5-b, 4-B-Z6-b, 4-B-Z7-b, 4-C-Z1-c, 4-C-Z2-c, 4-C-Z3-c, 4-C-Z4-c, 4-C-Z5-c, 4-C-Z6-c, 4-C-Z7-c,

5-A-Z1-a, 5-A-Z2-a, 5-A-Z3-a, 5-A-Z4-a, 5-A-Z5-a, 5-A-Z6-a, 5-A-Z7-a, 5-B-Z1-b, 5-B-Z2-b, 5-B-Z3-b, 5-B-Z4-b, 5-B-Z5-b, 5-B-Z6-b, 5-B-Z7-b, 5-C-Z1-c, 5-C-Z2-c, 5-C-Z3-c, 5-C-Z4-c, 5-C-Z5-c, 5-C-Z6-c, 5-C-Z7-c,

6-A-Z1-a, 6-A-Z2-a, 6-A-Z3-a, 6-A-Z4-a, 6-A-Z5-a, 6-A-Z6-a, 6-A-Z7-a, 6-B-Z1-b, 6-B-Z2-b, 6-B-Z3-b, 6-B-Z4-b, 6-B-Z5-b, 6-B-Z6-b, 6-B-Z7-b, 6-C-Z1-c, 6-C-Z2-c, 6-C-Z3-c, 6-C-Z4-c, 6-C-Z5-c, 6-C-Z6-c, 6-C-Z7-c,

7-A-Z1-a, 7-A-Z2-a, 7-A-Z3-a, 7-A-Z4-a, 7-A-Z5-a, 7-A-Z6-a, 7-A-Z7-a, 7-B-Z1-b, 7-B-Z2-b, 7-B-Z3-b, 7-B-Z4-b, 7-B-Z5-b, 7-B-Z6-b, 7-B-Z7-b, 7-C-Z1-c, 7-C-Z2-c, 7-C-Z3-c, 7-C-Z4-c, 7-C-Z5-c, 7-C-Z6-c, 7-C-Z7-c,

8-A-Z1-a, 8-A-Z2-a, 8-A-Z3-a, 8-A-Z4-a, 8-A-Z5-a, 8-A-Z6-a, 8-A-Z7-a, 8-B-Z1-b, 8-B-Z2-b, 8-B-Z3-b, 8-B-Z-4-b, 8-B-Z5-b, 8-B-Z6-b, 8-B-Z7-b, 8-C-Z1-c, 8-C-Z2-c, 8-C-Z3-c, 8-C-Z4-c, 8-C-Z5-c, 8-C-Z6-c, 8-C-Z7-c,

9-A-Z1-a, 9-A-Z2-a, 9-A-Z3-a, 9-A-Z4-a, 9-A-Z5-a, 9-A-Z6-a, 9-A-Z7-a, 9-B-Z1-b, 9-B-Z2-b, 9-B-Z3-b, 9-B-Z4-b, 9-B-Z5-b, 9-B-Z6-b, 9-B-Z7-b, 9-C-Z1-c, 9-C-Z2-c, 9-C-Z3-c, 9-C-Z4-c, 9-C-Z5-c, 9-C-Z6-c and 9-C-Z7-c.

In the above-mentioned combination examples, numerals indicate examples of the constituent units (1), A, B and C indicate examples of the —$R^5$—($R^6$)$_r$—O-portions of the constituent units (4), Z1 to Z7 indicate examples of the Z portions of the constituent units (4), and a, b and C indicate examples of the —$R^5$—($R^6$)$_m$—W$_n$-portions of the constituent units (5).

TABLE 7

| No. | Constituent unit (1) | Constituent unit (4) No. | $-R^5-(R^6)_r-O-$ |
|---|---|---|---|
| 1 | $-CH_2-CH(H)-$ | A | $-(CH_2)_3-O-$ (r = 0) |
| 2 | $-CH_2-CH(CH_3)-$ | B | $-(CH_2)_8-O-$ (r = 0) |
| 3 | $-CH_2-CH(CH_2CH_3)-$ (H$_3$C—CH$_2$) | C | $-(CH_2)_4CH(OH)CH_2-O-$ (r = 0) |
| 4 | $-CH_2-CH(H)-$   $-CH_2-CH(CH_3)-$ | | |
| 5 | $-CH_2-CH(H)-$   $-CH_2-CH(CH_2CH_3)-$ | | |
| 6 | $-CH_2-CH(H)-$   $-CH_2-CH(CH_2C(H_2)C(H_2)CH_3)-$ | | |
| 7 | $-CH_2-CH(H)-$   $-CH_2-CH(CH_2(CH_2)_4CH_3)-$ | | |
| 8 | $-CH_2-CH(CH_3)-$   $-CH_2-CH(CH_2CH_3)-$ | | |
| 9 | $-CH_2-CH(H)-$   $-CH_2-CH(CH_3)-$   $-CH_2-CH(CH_2CH_3)-$ | | |

| | | Constituent unit (4) | | Constituent unit (5) | |
|---|---|---|---|---|---|
| No. | No. | Z | No. | $-R^5-(R^6)_m-W_n$ | |
| 1 | Z1 | Polyethylene oxide | a | $-(CH_2)_3-OH$ (m = 0) | |
| 2 | Z2 | Polypropylene oxide | b | $-(CH_2)_8-OH$ (m = 0) | |
| 3 | Z3 | Polymethyl methacrylate | c | $-(CH_2)_4CH(OH)CH_2-OH$ (m = 0) | |
| 4 | Z4 | Polyacrylonitrile | | | |
| 5 | Z5 | Polyacrylamide | | | |
| 6 | Z6 | Polyε-caprolactone | | | |
| 7 | Z7 | Polyε-caprolactam | | | |
| 8 | | | | | |
| 9 | | | | | |

Other Copolymerizable Components

The branched type polar group-containing olefin copolymer of the invention may contain constituent units other than the constituent unit (1), the constituent unit (4) and the constituent unit (5), within limits not detrimental to the objects of the present invention.

Examples of the constituent units which may be contained include constituent units derived from cyclic olefins other than the polar group-containing monomer represented by the following formula (10), non-conjugated polyenes, hydroxyl group-containing ethylenically unsaturated compounds, amino group-containing ethylenically unsaturated compounds, epoxy group-containing ethylenically unsaturated compounds, aromatic vinyl compounds, unsaturated carboxylic acids and their derivatives, vinyl ester compounds, and vinyl chloride.

When these constituent units are contained, the amount thereof is not more than 30 mol %, preferably not more than 20 mol %, more preferably not more than 10 mol %, based on all constituent units to constitute the polar group-containing olefin copolymer.

Properties of Copolymer

The weight-average molecular weight (Mw) of the polar group-containing olefin copolymer of the second embodiment of the invention is in the range of usually 500 to 2,000,000, preferably 1,000 to 1,500,000, more preferably 5,000 to 1,300,000, and the molecular weight distribution (Mw/Mn) thereof is usually not more than 3, preferably not more than 2.8, more preferably not more than 2.5.

When the molecular weight distribution (Mw/Mn) is not more than 3, the polar group-containing olefin copolymer is excellent in orientation of the polar groups toward the interface between said copolymer and a polar material and has excellent adhesion properties to a polar material and excellent compatibility with a polar material.

The intensity ratio (Tαβ/(Tαα+Tαβ)) of Tαβ to Tαα+Tαβ in the $^{13}$C-NMR spectrum of the polar group-containing olefin copolymer is not more than 1.0, preferably not more than 0.8, more preferably not more than 0.5.

When the intensity ratio (Tαβ/(Tαα+Tαβ)) is not more than 1.0, the polar group-containing olefin copolymer is excellent in orientation of the polar groups toward the interface between said copolymer and a polar material.

The second embodiment of the polar group-containing olefin copolymer of the invention is excellent in adhesion properties to metals and polar materials such as polar resins, compatibility therewith, surface hydrophilic properties, coating properties, printability, anti-fogging properties, antistatic properties, oil resistance, biocompatibility, dispersibility in water, dispersibility in solvent, pigment dispersibility, filler dispersibility, transparency, mechanical strength and moldability.

The third embodiment of the polar group-containing olefin copolymer of the invention comprises a constituent unit represented by the following formula (1) and a constituent unit represented by the following formula (6) (also referred to as a "constituent unit (6)), and optionally a constituent unit represented by the following formula (3).

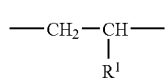
(1)

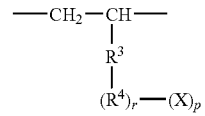
(3)

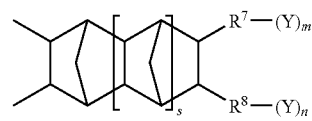
(6)

The constituent unit represented by the formula (1) is identical with the aforesaid constituent unit (1), and the constituent unit represented by the formula (3) is identical with the aforesaid constituent unit (3).

In the third embodiment of the polar group-containing olefin copolymer of the invention, the constituent unit represented by the formula (3) is also preferably a constituent unit represented by the following formula (3').

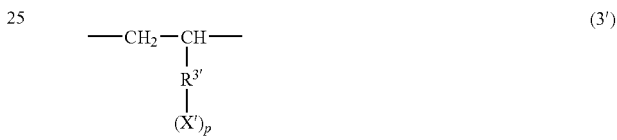
(3')

In the formula (3'), $R^{3'}$ is a hydrocarbon group, preferably a hydrocarbon group of 1 to 20 carbon atoms, more preferably a hydrocarbon group of 3 to 20 carbon atoms.

p is an integer of 1 to 3, preferably 1.

X' is a polar group containing 0 and/or N, preferably —OR, —COOR, —CRO, —NR$_2$, an epoxy group,

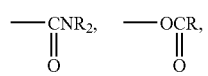

(R is hydrogen or hydrocarbon group)

—C≡N, —OH, —COOH or NH$_2$.

The constituent unit represented by the formula (3') is, for example, a constituent unit derived from the polar group-containing monomer represented by the following formula (7').

In the formula (6), $R^7$ is a direct bond or an aliphatic hydrocarbon group of 1 or more carbon atoms, preferably a direct bond or a hydrocarbon group of 1 to 10 carbon atoms.

$R^8$ is a hydrogen atom, a direct bond or an aliphatic hydrocarbon group of 1 or more carbon atoms, preferably a direct bond or a hydrocarbon group of 1 to 10 carbon atoms.

Y is a polar group containing 0 and/or N, and preferred examples of such polar groups include the same groups as previously described with respect to X'.

m and n are each an integer of 0 to 2, and m+n is not 0. s is 0 or 1.

The constituent unit represented by the formula (6) is, for example, a constituent unit derived from the polar group-containing monomer represented by the following formula (8).

In the third embodiment of the polar group-containing olefin copolymer of the invention, the constituent unit (1), the constituent unit (3) and the constituent unit (6) are bonded usually at random.

Composition of Copolymer

In the third embodiment of the polar group-containing olefin copolymer of the invention, the molar ratio ((1):(3)+(6)) between the constituent unit (1) and the total of the constituent unit (3) and the constituent unit (6) is in the range of usually 99.99:0.01 to 0.01:99.99, preferably 99.95:0.05 to 10:90, more preferably 99.9:0.1 to 30:70. The molar ratio ((3):(6)) between the constituent unit (3) and the constituent unit (6) is in the range of usually 0:100 to 99.99:0.01, preferably 0:100 to 99:1, more preferably 0:100 to 90:10.

The third embodiment of the polar group-containing olefin copolymer of the invention may contain two or more kinds of the constituent units (1), may contain two or more kinds of the constituent units (3), and may contain two or more kinds of the constituent units (6).

Other Copolymerizable Components

The polar group-containing olefin copolymer of the invention may contain constituent units other than the constituent unit (1), the constituent unit (3) and the constituent unit (6), within limits not detrimental to the objects of the present invention.

Examples of the constituent units which may be contained include constituent units derived from cyclic olefins other than the polar group-containing monomer represented by the following formula (8) or (7), non-conjugated polyenes, hydroxyl group-containing ethylenically unsaturated compounds, amino group-containing ethylenically unsaturated compounds, epoxy group-containing ethylenically unsaturated compounds, aromatic vinyl compounds, unsaturated carboxylic acids and their derivatives, vinyl ester compounds, and vinyl chloride.

When these constituent units are contained, the amount thereof is not more than 30 mol %, preferably not more than 20 mol %, more preferably not more than 10 mol %, based on all constituent units to constitute the polar group-containing olefin copolymer.

Properties of Copolymer

The weight-average molecular weight (Mw) of the third embodiment of the polar group-containing olefin copolymer of the invention is in the range of usually 500 to 2,000,000, preferably 1,000 to 1,500,000, more preferably 5,000 to 1,300,000, and the molecular weight distribution (Mw/Mn) thereof is usually not more than 3, preferably not more than 2.8, more preferably not more than 2.5.

When the molecular weight distribution (Mw/Mn) is not more than 3, the polar group-containing olefin copolymer is excellent in orientation of the polar groups toward the interface between said copolymer and a polar material and has excellent adhesion properties to a polar material and excellent compatibility with a polar material.

The intensity ratio (T$\alpha\beta$+T$\alpha\alpha$) of T$\alpha\beta$ an to T$\alpha\alpha$ in the $^{13}$C-NMR spectrum of the polar group-containing olefin copolymer is not more than 1.0, preferably not more than 0.8, more preferably not more than 0.5.

When the intensity ratio (T$\alpha\beta$/T$\alpha\alpha$) is not more than 1.0, the polar group-containing olefin copolymer is excellent in orientation of the polar groups toward the interface between said copolymer and a polar material.

The third embodiment of the polar group-containing olefin copolymer of the invention is excellent in adhesion properties to metals and polar materials such as polar resins, compatibility and flexibility.

Process for Preparing Polar Group-containing Olefin Copolymer

The first embodiment of the process for preparing a polar-group containing olefin copolymer according to the invention comprises copolymerizing at least one α-olefin selected from α-olefins of 2 to 20 carbon atoms and at least one polar group-containing monomer selected from a polar group-containing monomer represented by the following formula (7) and a polar group-containing monomer represented by the following formula (8) in the presence of an olefin polymerization catalyst comprising:

(A) a compound of a transition metal selected from Group 3 (including lanthanoid and actinoid) to Group 10 of the periodic table, and (B) at least one compound selected from:

(B-1) an organoaluminum oxy-compound, (B-2) a compound which reacts with the compound (A) to form an ion pair (sometimes referred to as an "ionizing ionic compound" hereinafter), and (B-3) an organoaluminum compound.

When a polar group-containing monomer represented by the following formula (7) is used as the polar group-containing monomer in the invention, the aforesaid first embodiment of the polar group-containing olefin copolymer is obtained. When a polar group-containing monomer represented by the following formula (8) and optionally a polar group-containing monomer represented by the following formula (7) are used as the polar group-containing monomers in the invention, the aforesaid third embodiment of the polar group-containing olefin copolymer is obtained.

First, the components for forming the olefin polymerization catalyst used in the invention are described.

(A) Transition Metal Compound

The transition metal compound (A) for use in the invention is a compound of a transition metal selected from Group 3 (including lanthanoid and actinoid) to Group 10 of the periodic table.

Examples of transition metals selected from Group 3 (including lanthanoid and actinoid) to Group 10 of the periodic table include scandium, titanium, zirconium, hafnium, vanadium, niobium, tantalum, palladium, nickel, cobalt, rhodium, yttrium, chromium, molybdenum, tungsten, manganese, rhenium, iron and ruthenium. Of these, preferable are scandium, titanium, zirconium, hafnium, vanadium, niobium, tantalum, palladium, nickel, cobalt and rhodium. Particularly preferable are titanium, zirconium and hafnium.

As the transition metal compound (A), not only Ziegler-Natta catalyst and a metallocene catalyst but also a known organometallic complex is employable in the invention.

Examples of the transition metal compounds (A) preferably used are any compounds represented by the following formulae (11) to (16).

The transition metal compound represented by the formula (11) is described below.

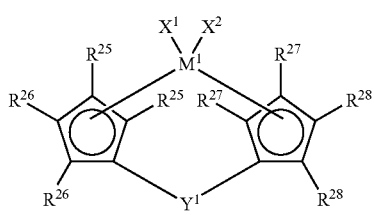

(11)

In the above formula, $M^1$ is a transition metal atom of Group 3 (including lanthanoid and actinoid) to Group 10 of the periodic table, preferably a transition metal atom of Group 4, specifically zirconium, titanium or hafnium, preferably zirconium.

$R^{25}$, $R^{26}$, $R^{27}$ and $R^{28}$ may be the same or different and are each a hydrogen atom, a nitrogen-containing group, a phosphorus-containing group, a hydrocarbon group of 1 to 20 carbon atoms, a halogenated hydrocarbon group of 1 to 20 carbon atoms, an oxygen-containing group, a sulfur-containing group, a silicon-containing group or a halogen atom.

Examples of the nitrogen-containing groups include amino group; primary amino group; alkylamino groups, such as methylamino, dimethylamino, diethylamino, dipropylamino, dibutylamino and dicyclohexylamino; and arylamino groups or alkylaryl amino groups, such as phenylamino, diphenylamino, ditolylamino, dinaphthylamino and methylphenylamino.

Examples of the phosphorus-containing groups include phosphino groups, such as dimethylphosphino and diphenylphosphino.

Examples of the hydrocarbon groups of 1 to 20 carbon atoms include alkyl groups, cycloalkyl groups, alkenyl groups, arylalkyl groups and aryl groups. More specifically, there can be mentioned alkyl groups, such as methyl, ethyl, propyl, butyl, hexyl, octyl, nonyl, dodecyl and eicosyl; cycloalkyl groups, such as cyclopentyl, cyclohexyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenylyl, naphthyl, methylnaphthyl, anthryl and phenanthryl.

Examples of the halogenated hydrocarbon groups of 1 to 20 carbon atoms include groups wherein the above-mentioned hydrocarbon groups of 1 to 20 carbon atoms are substituted with halogens.

Examples of the oxygen-containing groups include hydroxyl group; alkoxyl groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include groups wherein oxygen is replaced with sulfur in the above-mentioned oxygen-containing groups; sulfonate groups, such as methylsulfonate, trifluoromethanesulfonate, phenylsulfonate, benzylsulfonate, p-toluenesulfonate, trimethylbenzenesulfonate, triisobutylbenzenesulfonate, p-chlorobenzenesulfonate and pentafluorobenzenesulfonate; and sulfinate groups, such as methylsulfonate, phenylsulfinate, benzylsulfinate, p-toluenesulfinate, trimethylbenzenesulfinate and pentafluorobenzenesulfinate.

Examples of the silicon-containing groups include monohydrocarbon-substituted silyls, such as methylsilyl and phenylsilyl; dihydrocarbon-substituted silyls, such as dimethylsilyl and diphenylsilyl; trihydrocarbon-substituted silyls, such as trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl; silyl ethers of hydrocarbon-substituted silyls, such as trimethylsilyl ether; silicon-substituted alkyl groups, such as trimethylsilylmethyl; and silicon-substituted aryl groups, such as triethylsilylphenyl.

Examples of the halogen atoms include a fluorine atom, a chlorine atom, a bromine atom and an iodine atom.

Of the groups indicated by $R^{25}$, $R^{26}$, $R^{27}$ and $R^{28}$, a part of the groups neighboring with each other may be bonded to form a ring together with carbon atoms to which those groups are bonded.

$R^{25}$, $R^{26}$, $R^{27}$ and $R^{28}$ are each shown at two positions, and for example, $R^{25}$ and $R^{25}$ may be the same groups or different groups. Of the groups indicted by $R^{25}$ to $R^{28}$, the groups with the same symbols are a preferred combination of groups which are linked to form a ring.

Examples of the rings formed from a part of the neighboring groups out of $R^{25}$, $R^{26}$, $R^{27}$ and $R^{28}$ together with carbon atoms to which those groups are bonded include condensed rings, such as benzene ring, naphthalene ring, acenaphthene ring and indene ring; and groups wherein hydrogen atoms on these rings are replaced with alkyl groups such as methyl, ethyl, propyl and butyl.

Of these, preferable is a hydrocarbon group of 1 to 20 carbon atoms or a hydrogen atom, and particularly preferable is a hydrocarbon group of 1 to 4 carbon atoms such as methyl, ethyl, propyl or butyl, a benzene ring formed by bonding of a hydrocarbon group, or a group wherein a hydrogen atom on a benzene ring formed by bonding of a hydrocarbon group is replaced with an alkyl group such as methyl, ethyl, n-propyl, isopropyl, n-butyl, isobutyl or tert-butyl.

$X^1$ and $X^2$ may be the same or different and are each the same hydrocarbon group of 1 to 20 carbon atoms, halogenated hydrocarbon group of 1 to 20 carbon atoms, oxygen-containing group, sulfur-containing group, silicon-containing group, hydrogen atom or halogen atom as described above with respect to $R^{25}$, $R^{26}$, $R^{27}$ and $R^{28}$. Of these, preferable is a halogen atom, a hydrocarbon group of 1 to 20 carbon atoms or a sulfonate group.

$Y^1$ is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —Ge—, —Sn—, —NR$^{21}$—, —P(R$^{21}$)—, —P(O)(R$^{21}$)—, —BR$^{21}$— or —AlR$^{21}$— (each $R^{21}$ may be the same or different and is a hydrocarbon group of 1 to 20 carbon atoms, a halogenated hydrocarbon group of 1 to 20 carbon atoms, a hydrogen atom or a halogen atom).

Examples of the divalent hydrocarbon groups of 1 to 20 carbon atoms include alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene; and arylalkylene groups, such as diphenylmethylene and diphenyl-1,2-ethylene.

Examples of the divalent halogenated hydrocarbon groups of 1 to 20 carbon atoms include groups wherein the above-mentioned divalent hydrocarbon groups of 1 to 20 carbon atoms are halogenated, such as chloromethylene.

Examples of the divalent silicon-containing groups include alkylsilylene groups, such as silylene, methylsilylene, dimethylsilylene, dimethylsilylene, di(n-propyl)silylene, di(i-propyl)silylene, di(cyclohexyl)silylene, methylphenylsilylene, diphenylsilylene, di(p-tolyl)silylene and di(p- chlorophenyl)silylene; alkylarylsilylene groups; arylsilylene groups; alkyldisilylene groups, such as tetramethyl-1,2-disilylene and tetraphenyl-1,2-disilylene; alkylaryldisilylene groups; and aryldisilylene groups.

Examples of the divalent germanium-containing groups include groups wherein silicon is replaced with germanium in the above-mentioned divalent silicon-containing groups.

Examples of the divalent tin-containing groups include groups wherein silicon is replaced with tin in the above-mentioned divalent silicon-containing groups.

$R^{21}$ is the same hydrocarbon group of 1 to 20 carbon atoms, halogenated hydrocarbon group of 1 to 20 carbon atoms or halogen atom as described above with respect to $R^{25}$, $R^{26}$, $R^{27}$ and $R^{28}$, or a nitrogen compound residue in which one or two hydrocarbon groups of 1 to 20 carbon atoms are bonded to the nitrogen atom.

Of these, a substituted silylene group, such as dimethylsilylene, diphenylsilylene or methylphenylsilylene, is particularly preferable as $Y^1$.

Examples of the transition metal compounds represented by the formula (11) include ethylene-bis(indenyl)dimethyl zirconium, ethylene-bis(indenyl)zirconium dichloride, ethylene-bis(indenyl)zirconium-bis(trifluoromethanesulfonate), ethylene-bis(indenyl)zirconium-bis(methanesulfonate), ethylene-bis(indenyl)zirconium-bis(p-toluenesulfonate), ethylene-bis(indenyl)zirconium bis(p-chlorobenzenesulfonate), ethylene-bis(4,5,6,7-tetrahydroindenyl)zirconium dichloride, isopropylidene-bis(cyclopentadienyl)fluorenylzirconium dichloride, isopropylidene-bis(cyclopentadienyl)(methylcyclopentadienyl)zirconium dichloride, dimethylsilylene-bis(cyclopentadienyl)zirconium dichloride, dimethylsilylene-bis(methylcyclopentadienyl)zirconium dichloride, dimethylsilylene-bis(dimethylcyclopentadienyl)zirconium dichloride, dimethylsilylene-bis (trimethylcyclopentadienyl)zirconium dichloride, dimethylsilylene-bis(indenyl)zirconium dichloride, dimethylsilylene-bis(indenyl)zirconium-bis(trifluoromethanesulfonate), dimethylsilylene-bis(4,5,6,7-tetrahydroindenyl) zirconium dichloride, dimethylsilylene-bis (cyclopentadienyl)(fluorenyl) zirconium dichloride, diphenylsilylene-bis(indenyl)zirconium dichloride, methylphenylsilylene-bis(indenyl)zirconium dichloride, rac-dimethylsilylene-bis(2,3,5-trimethylcyclopentadienyl)zirconium dichloride, rac-dimethylsilylene-bis(2,4,7-trimethylcyclopentadienyl)zirconium dichloride, rac-dimethylsilylene-bis(2-methyl-4-tert-butylcyclopentadienyl)zirconium dichloride, isopropylidene-(cyclopentadienyl)(fluorenyl)zirconium dichloride, dimethylsilylene-(3-tert-butylcyclopentadienyl)(indenyl)zirconium dichloride, isopropylidene-(4-methylcyclopentadienyl)(3-methylindenyl)zirconium dichloride, isopropylidene(4-tert-butylcyclopentadienyl)(3-methylindenyl)zirconium dichloride, isopropylidene(4-tert-butylcyclopentadienyl)(3-tert-butylindenyl)zirconium dichloride, dimethylsilylene-(4-methylcyclopentadienyl)(3-methylindenyl)zirconium dichloride, dimethylsilylene-(4-tert-butylcyclopentadienyl)(3-methylindenyl)zirconium dichloride, dimethylsilylene-(4-tert-butylcyclopentadienyl)(3-tert-butylindenyl)zirconium dichloride, dimethylsilylene-(3-tert-butylcyclopentadienyl)(fluorenyl)zirconium dichloride, isopropylidene-(3-tert-butylcyclopentadienyl)(fluorenyl)zirconium dichloride, N,N-diphenylaminoborylidene-bis(cyclopentadienyl)zirconium dichloride, N,N-dinaphthylaminoborylidene-bis(cyclopentadienyl)zirconium dichloride, N,N-dimethylaminoborylidene-bis(cyclopentadienyl)zirconium dichloride and N-methyl-N-phenylaminoborylidene-bis (cyclopentadienyl) zirconium dichloride.

Also available are compounds wherein zirconium is replaced with titanium or hafnium in the above-mentioned compounds.

The transition metal compound represented by the formula (11) is more specifically a transition metal compound represented by the following formula (11a) or (11b).

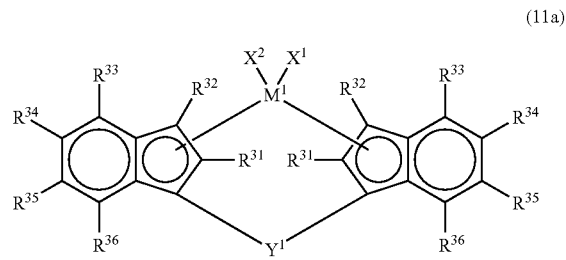

(11a)

In the above formula, $M^1$ is a transition metal atom of Group 4 of the periodic table, specifically zirconium, titanium or hafnium, preferably zirconium.

Each $R^{31}$ may be the same or different and is a hydrocarbon group of 1 to 6 carbon atoms. Examples of such hydrocarbon groups include alkyl groups, such as methyl, ethyl, n-propyl, isopropyl, n-butyl, isobutyl, sec-butyl, tert-butyl, n-pentyl, neopentyl, n-hexyl and cyclohexyl; and alkenyl groups, such as vinyl and propenyl. Of these, preferable are alkyl groups whose carbon atoms bonded to indenyl groups are primary carbon atoms, more preferable are alkyl groups of 1 to 4 carbon atoms, and particularly preferable are methyl and ethyl.

$R^{32}$, $R^{34}$, $R^{35}$ and $R^{36}$ may be the same or different and are each a hydrogen atom, a halogen atom or the same hydrocarbon group of 1 to 6 carbon atoms as described above with respect to $R^{31}$.

Each $R^{33}$ may be the same or different and is a hydrogen atom or an aryl group of 6 to 16 carbon atoms. Examples of such aryl groups include phenyl, α-naphthyl, β-naphthyl, anthryl, phenanthryl, pyrenyl, acenaphthyl, phenalenyl, aceanthrylenyl, tetrahydronaphthyl, indanyl and biphenylyl. Of these, preferable are phenyl, naphthyl, anthryl and phenanthryl.

These aryl groups may be substituted with:

halogen atoms, such as fluorine, chlorine, bromine and iodine;

hydrocarbon groups of 1 to 20 carbon atoms, e.g., alkyl groups, such as methyl, ethyl, propyl, butyl, hexyl, cyclohexyl, octyl, nonyl, dodecyl, eicosyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenylyl, α- or β-naphthyl, methylnaphthyl, anthryl, phenanthryl, benzylphenyl, pyrenyl, acenaphthyl, phenalenyl, aceanthrylenyl, tetrahydronaphthyl, indanyl and biphenylyl; and organosiylyl groups, such as trimethylsilyl, triethylsilyl and triphenylsilyl.

$X^1$ and $X^2$ may be the same or different and have the same meanings as those of $X^1$ and $X^2$ in the formula (11). Of the aforesaid atoms and groups, preferable is a halogen atom or a hydrocarbon group of 1 to 20 carbon atoms.

$Y^1$ has the same meaning as that of $Y^1$ in the formula (11). Of the aforesaid groups, preferable is a divalent silicon-containing group, a divalent germanium-containing group, a divalent alkylene group or a divalent boron-containing boronyl group, more preferable is a divalent silicon-containing group or a divalent alkylene group, and particularly preferable is alkylsilylene, alkylarylsilylene, arylsilylene, alkylarylene or arylalkylene.

Examples of the transition metal compounds represented by the formula (11a) include rac-dimethylsilylene-bis[1-(2-methyl-4-phenylindenyl)]zirconium dichloride, rac-dimethylsilylene-bis[1-(2-methyl-4-(α-naphthyl)indenyl)]zirconium dichloride, rac-dimethylsilylene-bis[1-(2-methyl-4-(β-naphthyl)indenyl)]zirconium dichloride, rac-dimethylsilylene-bis[1-(2-methyl-4-(1-anthryl)indenyl)]zirconium dichloride, rac-dimethylsilylene-bis[1-(2-methyl-4-(2-anthryl)indenyl)]zirconium dichloride, rac-dimethylsilylene-bis[1-(2-methyl-4-(9-anthryl)indenyl)]zirconium dichloride, rac-dimethylsilylene-bis[1-(2-methyl-4-(9-phenanthryl)indenyl)]zirconium dichloride, rac-dimethylsilylene-bis[1-(2-methyl-4-(p-fluorophenyl)indenyl)]zirconium dichloride, rac-dimethylsilylene-bis[1-(2-methyl-4-(pentafluorophenyl)indenyl)]zirconium dichloride, rac-dimethylsilylene-bis[1-(2-methyl-4-(p-chlorophenyl)indenyl)]zirconium dichloride, rac-dimethylsilylene-bis[1-(2-methyl-4-(m-chlorophenyl)indenyl)]zirconium dichloride, rac-dimethylsilylene-bis[1-(2-methyl-4-(o-chlorophenyl)indenyl)]zirconium dichloride, rac-dimethylsilylene-bis[1-(2-methyl-4-(o,p-dichlorophenyl)phenylindenyl)]zirconium dichloride, rac-dimethylsilylene-bis[1-(2-methyl-4-(p-bromophenyl)indenyl)]zirconium dichloride, rac-dimethylsilylene-bis[1-(2-methyl-4-(p-tolyl)indenyl)]zirconium dichloride, rac-dimethylsilylene-bis[1-(2-methyl-4-(m-tolyl)indenyl)]zirconium dichloride, rac-dimethylsilylene-bis[1-(2-methyl-4-(o-tolyl)indenyl)]zirconium dichloride, rac-dimethylsilylene-bis[1-(2-methyl-4-(o,o'-dimethylphenyl)-1-indenyl)]zirconium dichloride, rac-dimethylsilylene-bis[1-(2-methyl-4-(p-ethylphenyl)indenyl)]zirconium dichloride, rac-dimethylsilylene-bis[1-(2-methyl-4-(p-i-propylphenyl)indenyl)]zirconium dichloride, rac-dimethylsilylene-bis[1-(2-methyl-4-(p-benzylphenyl)indenyl)]zirconium dichloride, rac-dimethylsilylene-bis[1-(2-methyl-4-(p-biphenylyl)indenyl)]zirconium dichloride, rac-dimethylsilylene-bis[1-(2-methyl-4-(m-biphenylyl)indenyl)]zirconium dichloride, rac-dimethylsilylene-bis[1-(2-methyl-4-(p-trimethylsilylenephenyl)indenyl)]zirconium dichloride, rac-dimethylsilylene-bis[1-(2-methyl-4-(m-trimethylsilylenephenyl)indenyl)]zirconium dichloride, rac-dimethylsilylene-bis[1-(2-phenyl-4-phenyl)indenyl)]zirconium dichloride, rac-dimethylsilylene-bis[1-(2-methyl-4-phenyl)indenyl)]zirconium dichloride, rac-di-(i-propyl)silylene-bis[1-(2-methyl-4-phenylindenyl)]zirconium dichloride, rac-di-(n-butyl)silylene-bis[1-(2-methyl-4-phenylindenyl)]zirconium dichloride, rac-dicyclohexylsilylene-bis[1-(2-methyl-4-phenylindenyl)]zirconium dichloride, rac-methylphenylsilylene-bis[1-(2-methyl-4-phenylindenyl)]zirconium dichloride, rac-diphenylsilylene-bis[1-(2-methyl-4-phenylindenyl)]zirconium dichloride, rac-di(p-tolyl)silylene-bis[1-(2-methyl-4-phenylindenyl)]zirconium dichloride, rac-di(p-chlorophenyl)silylene-bis[1-(2-methyl-4-phenylindenyl)]zirconium dichloride, rac-methylene-bis[1-(2-methyl-4-phenylindenyl)]zirconium dichloride, rac-ethylene-bis[1-(2-methyl-4-phenylindenyl)]zirconium dichloride, rac-dimethylgermylene-bis[1-(2-methyl-4-phenylindenyl)]zirconium dichloride, rac-dimethylstannylene-bis[1-(2-methyl-4-phenylindenyl)]zirconium dichloride, rac-dimethylsilylene-bis[1-(2-methyl-4-phenylindenyl)]zirconium dibromide, rac-dimethylsilylene-bis[1-(2-methyl-4-phenylindenyl)]zirconium dimethyl, rac-dimethylsilylene-bis[1-(2-methyl-4-phenylindenyl)]zirconium methylchloride, rac-dimethylsilylene-bis[1-(2-methyl-4-phenylindenyl)]zirconium chlorideSO$_2$Me, rac-dimethylsilylene-bis[1-(2-methyl-4-phenylindenyl)]zirconium chlorideOSO$_2$Me, rac-dimethylsilylene-bis[1-(2-ethyl-4-phenylindenyl)]zirconium dichloride, rac-dimethylsilylene-bis[1-(2-ethyl-4-α-naphtyl)indenyl]zirconium dichloride, rac-dimethylsilylene-bis[1-(2-ethyl-4-(β-naphthyl)indenyl)]zirconium dichloride, rac-dimethylsilylene-bis[1-(2-ethyl-4-(2-methyl-1-naphthyl)indenyl)]zirconium dichloride, rac-dimethylsilylene-bis[1-(2-ethyl-4-(5-acenaphthyl)indenyl)]zirconium dichloride, rac-dimethylsilylene-bis[1-(2-ethyl-4-(9-anthryl)indenyl)]zirconium dichloride, rac-dimethylsilylene-bis[1-(2-ethyl-4-(9-phenanthryl)indenyl)]zirconium dichloride, rac-dimethylsilylene-bis[1-(2-ethyl-4-(o-methylphenyl)indenyl)]zirconium dichloride, rac-dimethylsilylene-bis[1-(2-ethyl-4-(m-methylphenyl)indenyl)]zirconium dichloride, rac-dimethylsilylene-bis[1-(2-ethyl-4-(p-methylphenyl)indenyl)]zirconium dichloride, rac-dimethylsilylene-bis[1-(2-ethyl-4-(2,3-dimethylphenyl)indenyl)]zirconium dichloride, rac-dimethylsilylene-bis[1-(2-ethyl-4-(2,4-dimethylphenyl)indenyl)]zirconium dichloride, rac-dimethylsilylene-bis[1-(2-ethyl-4-(2,5-dimethylphenyl)indenyl)]zirconium dichloride, rac-dimethylsilylene-bis[1-(2-ethyl-4-(2,4,6-trimethylphenyl)indenyl)]zirconium dichloride, rac-dimethylsilylene-bis[1-(2-ethyl-4-(o-chlorophenyl)indenyl)]zirconium dichloride, rac-dimethylsilylene-bis[1-(2-ethyl-4-(m-chlorophenyl)indenyl)]zirconium dichloride, rac-dimethylsilylene-bis[1-(2-ethyl-4-(p-chlorophenyl)indenyl)]zirconium dichloride, rac-dimethylsilylene-bis[1-(2-ethyl-4-(2,3-dichlorophenyl)indenyl)]zirconium dichloride, rac-dimethylsilylene-bis[1-(2-ethyl-4-(2,6-dichlorophenyl)indenyl)]zirconium dichloride, rac-dimethylsilylene-bis[1-(2-ethyl-4-(3,5-dichlorophenyl)indenyl)]zirconium dichloride, rac-dimethylsilylene-bis[1-(2-ethyl-4-(2-bromophenyl)indenyl)]zirconium dichloride, rac-dimethylsilylene-bis[1-(2-ethyl-4-(3-bromophenyl)indenyl)]zirconium dichloride, rac-dimethylsilylene-bis[1-(2-ethyl-4-(4-bromophenyl)indenyl)]zirconium dichloride, rac-dimethylsilylene-bis[1-(2-ethyl-4-(4-biphenylyl)indenyl)]zirconium dichloride, rac-dimethylsilylene-bis[1-(2-ethyl-4-(4-triethylsilylphenyl)indenyl)]zirconium dichloride, rac-dimethylsilylene-bis[1-(2-n-propyl-4-phenylindenyl)]zirconium dichloride, rac-dimethylsilylene-bis[1-(2-n-propyl-4-(α-naphthyl)indenyl)]zirconium dichloride, rac-dimethylsilylene-bis[1-(2-n-propyl-4-(β-naphthyl)indenyl)]zirconium dichloride, rac-dimethylsilylene-bis[1-(2-n-propyl-4-(2-methyl-1-naphthyl)indenyl)]zirconium dichloride, rac-dimethylsilylene-bis[1-(2-n-propyl-4-(5-acenaphthyl)indenyl)]zirconium dichloride, rac-dimethylsilylene-bis[1-(2-n-propyl-4-(9-anthryl)indenyl)]zirconium dichloride, rac-dimethylsilylene-bis[1-(2-n-propyl-4-(9-phenanthryl)indenyl)]zirconium dichloride, rac-dimethylsilylene-bis[1-(2-i-propyl-4-phenylindenyl)]zirconium dichloride, rac-dimethylsilylene-bis[1-(2-i-propyl-4-(α-naphthyl)indenyl)]zirconium dichloride, rac-dimethylsilylene-bis[1-(2-i-propyl-4-(β-naphthyl)indenyl)]zirconium dichloride, rac-dimethylsilylene-bis[1-(2-i-propyl-4-(8-methyl-9-naphthyl)indenyl)]zirconium dichloride, rac-dimethylsilylene-bis[1-(2-i-propyl-4-(5-acenaphthyl)indenyl)]zirconium dichloride, rac-dimethylsilylene-bis[1-(2-i-propyl-4-(9-anthryl)indenyl)]zirconium dichloride, rac-dimethylsilylene-bis[1-(2-i-propyl-4-(9-phenanthryl)indenyl)]zirconium dichloride, rac-dimethylsilylene-bis[1-(2-s-butyl-4-phenylindenyl)]zirconium dichloride, rac-dimethylsilylene-bis[1-(2-s-butyl-4-(α-naphthyl)indenyl)]zirconium dichloride, rac-dimethylsilylene-bis[1-(2-s-butyl-4-(β-naphthyl)indenyl)]zirconium dichloride, rac-dimethylsilylene-bis[1-(2-s-butyl-4-(2-methyl-1-naphthyl)indenyl)]zirconium dichloride, rac-dimethylsilylene-bis[1-(2-s-butyl-4-(5-acenaphthyl)indenyl)]zirconium dichloride, rac-dimethylsilylene-bis[1-(2-s-butyl-4-(9-anthryl)indenyl)]zirconium dichloride, rac-dimethylsilylene-bis[1-(2-s-butyl-4-(9-phenanthryl)indenyl)]zirconium dichloride, rac-dimethylsilylene-bis[1-(2-n-pentyl-4-phenylindenyl)]zirconium dichloride, rac-dimethylsilylene-bis[1-(2-n-pentyl-4-(α-naphthyl)indenyl)]zirconium dichloride, rac-dimethylsilylene-bis[1-(2-n-butyl-4-phenylindenyl)]zirconium dichloride, rac-dimethylsilylene-bis[1-(2-n-butyl-4-(α-naphthyl)indenyl)]zirconium dichloride, rac-dimethylsilylene-bis[1-(2-n-butyl-4-(β-naphthyl)indenyl)]zirconium dichloride, rac-dimethylsilylene-bis[1-(2-n-butyl-4-(2-methyl-1-naphthyl)indenyl)]zirconium dichloride, rac-dimethylsilylene-bis[1-(2-n-butyl-4-(5-acenaphthyl)indenyl)]zirconium dichloride, rac-dimethylsilylene-bis[1-(2-n-butyl-4-(9-anthryl)indenyl)]zirconium dichloride, rac-dimethylsilylene-bis[1-(2-n-butyl-4-(9-phenanthryl)indenyl)]zirconium dichloride, rac-dimethylsilylene-bis[1-(2-i-butyl-4-phenylindenyl)]zirconium dichloride, rac-dimethylsilylene-bis[1-(2-i-butyl-4-(α-naphthyl)indenyl)]zirconium dichloride, rac-dimethylsilylene-bis[1-(2-i-butyl-4-(β-naphthyl)indenyl)]zirconium dichloride, rac-dimethylsilylene-bis[1-(2-i-butyl-4-(2-methyl-1-naphthyl)indenyl)]zirconium dichloride, rac-dimethylsilylene-bis[1-(2-i-butyl-4-(5-acenaphthyl)indenyl)]zirconium dichloride, rac-dimethylsilylene-bis[1-(2-i-butyl-4-(9-anthryl)indenyl)]zirconium dichloride, rac-dimethylsilylene-bis[1-(2-i-butyl-4-(9-phenanthryl)indenyl)]zirconium dichloride, rac-dimethylsilylene-bis[1-(2-neopentyl-4-phenylindenyl)]zirconium dichloride, rac-dimethylsilylene-bis[1-(2-neopentyl-4-(α-naphthyl)indenyl)]zirconium dichloride, rac-dimethylsilylene-bis[1-(2-n-hexyl-4-phenylindenyl)]zirconium dichloride, rac-dimethylsilylene-bis[1-(2-n-hexyl-4-(α-naphthyl)indenyl)]zirconium dichloride, rac-methylphenylsilylene-bis[1-(2-ethyl-4-phenylindenyl)]zirconium dichloride, rac-methylphenylsilylene-bis[1-(2-ethyl-4-α-naphthyl)indenyl)]zirconium dichloride, rac-methylphenylsilylene-bis[1-(2-ethyl-4-(9-anthryl)indenyl)]zirconium dichloride, rac-methylphenylsilylene-bis[1-(2-ethyl-4-(9-phenanthryl)indenyl)]zirconium dichloride, rac-diphenylsilylene-bis[1-(2-ethyl-4-phenylindenyl)]zirconium dichloride, rac-diphenylsilylene-bis[1-(2-ethyl-4-(α-naphthyl)indenyl)]zirconium dichloride, rac-diphenylsilylene-bis[1-(2-ethyl-4-(9-anthryl)indenyl)]zirconium dichloride, rac-diphenylsilylene-bis[1-(2-ethyl-4-(9-phenanthryl)indenyl)]zirconium dichloride, rac-diphenylsilylene-bis[1-(2-ethyl-4-(4-biphenylyl)indenyl)]zirconium dichloride, rac-methylene-bis[1-(2-ethyl-4-(4-phenylindenyl))zirconium dichloride, rac-methylene-bis[1-(2-ethyl-4-(α-naphthyl)indenyl)]zirconium dichloride, rac-ethylene-bis(1-(2-ethyl-4-phenylindenyl)]zirconium dichloride, rac-ethylene-bis[1-(2-ethyl-4-(α-naphthyl)indenyl)]zirconium dichloride, rac-ethylene-bis[1-(2-n-propyl-4-(α-naphthyl)indenyl)]zirconium dichloride, rac-dimethylgermyl-bis[1-(2-ethyl-4-phenylindenyl)]zirconium dichloride, rac-dimethylgermyl-bis[1-(2-ethyl-4-(α-naphthyl)indenyl)]zirconium dichloride and rac-dimethylgermyl-bis[1-(2-n-propyl-4-phenylindenyl)]zirconium dichloride.

Also available are compounds wherein zirconium is replaced with titanium or hafnium in the above-mentioned compounds.

In the present invention, a racemic modification of the transition metal compound represented by the formula (11a) is usually used as a catalyst component, but R-form or S-form is also employable.

The transition metal compound represented by the formula (11a) can be prepared in accordance with the specification and examples of European Patent A No. 0,320,762 described in *Journal of Organometallic Chem.*, 288, pp. 63-67 (1985).

Next, the transition metal compound represented by the formula (11b) is described.

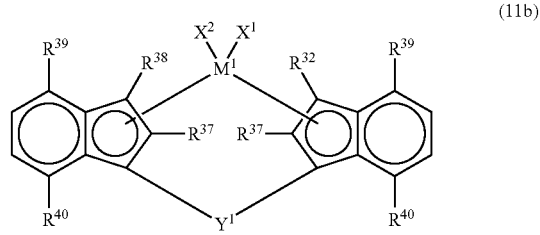

(11b)

In the above formula, $M^1$ is a transition metal atom of Group 4 of the periodic table, specifically titanium, zirconium or hafnium, preferably zirconium.

$R^{37}$ and $R^{38}$ may be the same or different and are each a hydrogen atom or the same nitrogen-containing group, phosphorus-containing group, hydrocarbon group of 1 to 20 carbon atoms, halogenated hydrocarbon group of 1 to 20 carbon atoms, oxygen-containing group, sulfur-containing group, silicon-containing group or halogen atom as described above with respect to $R^{25}$, $R^{26}$, $R^{27}$ and $R^{28}$ in the formula (11).

$R^{37}$ is preferably a hydrocarbon group of 1 to 20 carbon atoms, particularly preferably a hydrocarbon group of 1 to 3 carbon atoms such as methyl, ethyl or propyl. $R^{38}$ is preferably a hydrogen atom or a hydrocarbon group of 1 to 20 carbon atoms, particularly preferably a hydrogen atom or a hydrocarbon group of 1 to 3 carbon atoms such as methyl, ethyl or propyl.

$R^{39}$ and $R^{40}$ may be the same or different and are each an alkyl group of 1 to 20 carbon atoms. Examples of such alkyl groups include straight-chain or branched alkyl groups, such as methyl, ethyl, n-propyl, isopropyl, n-butyl, isobutyl, sec-butyl, tert-butyl, n-pentyl, neopentyl, n-hexyl, cyclohexyl, octyl, nonyl, dodecyl and eicosyl; and cycloalkyl groups, such as norbornyl and adamantyl.

$R^{39}$ is preferably a secondary or tertiary alkyl group.

$X^1$ and $X^2$ may be the same or different and have the same meanings as those of $X^1$ and $X^2$ in the formula (11).

$Y^1$ has the same meaning as that of $Y^1$ in the formula (11).

Examples of the transition metal compounds represented by the formula (11b) include rac-dimethylsilylene-bis[1-(2,7-dimethyl-4-ethylindenyl)]zirconium dichloride, rac-dimethylsilylene-bis[1-(2,7-dimethyl-4-n-propylindenyl)]zirconium dichloride, rac-dimethylsilylene-bis[1-(2,7-dimethyl-4-i-propylindenyl)]zirconium dichloride, rac-dimethylsilylene-bis[1-(2,7-dimethyl-4-n-butylindenyl)]zirconium dichloride, rac-dimethylsilylene-bis[1-(2,7-dimethyl-4-sec-butylindenyl)]zirconium dichloride, rac-dimethylsilylene-bis[1-(2,7-dimethyl-4-t-butylindenyl)]zirconium dichloride, rac-dimethylsilylene-bis[1-(2,7-dimethyl-4-n-pentylindenyl)]zirconium dichloride, rac-dimethylsilylene-bis[1-(2,7-dimethyl-4-n-hexylindenyl)]zirconium dichloride, rac-dimethylsilylene-bis[1-(2,7-dimethyl-4-cyclohexylindenyl)]zirconium dichloride, rac-dimethylsilylene-bis[1-(2,7-dimethyl-4- methylcyclohexylindenyl)]zirconium dichloride, rac-dimethylsilylene-bis[1-(2,7-dimethyl-4-phenylethylindenyl)]zirconium dichloride, rac-dimethylsilylene-bis[1-(2,7-dimethyl-4-phenyldichloromethylindenyl)]zirconium dichloride, rac-dimethylsilylene-bis[1-(2,7-dimethyl-4-chloromethylindenyl)]zirconium dichloride, rac-dimethylsilylene-bis[1-(2,7-dimethyl-4-trimethylsilylmethylindenyl)]zirconium dichloride, rac-dimethylsilylene-bis[1-(2,7-dimethyl-4-trimethylsiloxymethylindenyl)]zirconium dichloride, rac-diethylsilylene-bis[1-(2,7-dimethyl-4-i-propylindenyl)]zirconium dichloride, rac-di(i-propyl)silylene-bis[1-(2,7-dimethyl-4-i-propylindenyl)]zirconium dichloride, rac-di(n-butyl)silylene-bis[1-(2,7-dimethyl-4-i-propylindenyl)]zirconium dichloride, rac-di(cyclohexyl)silylene-bis[1-(2,7-dimethyl-4-i-propylindenyl)]zirconium dichloride, rac-methylphenylsilylene-bis[1-(2,7-dimethyl-4-i-propylindenyl)]zirconium dichloride, rac-methylphenylsilylene-bis[1-(2,7-dimethyl-4-t-butylindenyl)]zirconium dichloride, rac-diphenylsilylene-bis[1-(2,7-dimethyl-4-t-butylindenyl)]zirconium dichloride, rac-diphenylsilylene-bis[1-(2,7-dimethyl-4-i-propylindenyl)]zirconium dichloride, rac-diphenylsilylene-bis[1-(2,7-dimethyl-4-ethylindenyl)]zirconium dichloride, rac-di(p-tolyl)silylene-bis[1-(2,7-dimethyl-4-i-propylindenyl)]zirconium dichloride, rac-di(p-chlorophenyl)silylene-bis[1-(2,7-dimethyl-4-i-propylindenyl)]zirconium dichloride, rac-dimethylsilylene-bis[1-(2-methyl-4-i-propyl-7-ethylindenyl)]zirconium dibromide, rac-dimethylsilylene-bis[1-(2,3,7-trimethyl-4-ethylindenyl)]zirconium dichloride, rac-dimethylsilylene-bis[1-(2,3,7-trimethyl-4-n-propylindenyl)]zirconium dichloride, rac-dimethylsilylene-bis[1-(2,3,7-trimethyl-4-i-propylindenyl)]zirconium dichloride, rac-dimethylsilylene-bis[1-(2,3,7-trimethyl-4-n-butylindenyl)]zirconium dichloride, rac-dimethylsilylene-bis[1-(2,3,7-trimethyl-4-sec-butylindenyl)]zirconium dichloride, rac-dimethylsilylene-bis[1-(2,3,7-trimethyl-4-t-butylindenyl)]zirconium dichloride, rac-dimethylsilylene-bis[1-(2,3,7-trimethyl-4-n-pentylindenyl)]zirconium dichloride, rac-dimethylsilylene-bis[1-(2,3,7-trimethyl-4-n-hexylindenyl)]zirconium dichloride, rac-dimethylsilylene-bis[1-(2,3,7-trimethyl-4-cyclohexylindenyl)]zirconium dichloride, rac-dimethylsilylene-bis[1-(2,3,7-trimethyl-4-methylcyclohexylindenyl)]zirconium dichloride, rac-dimethylsilylene-bis[1-(2,3,7-trimethyl-4-trimethylsilylmethylindenyl)]zirconium dichloride, rac-dimethylsilylene-bis[1-(2,3,7-trimethyl-4-trimethylsiloxlymethylindenyl)]zirconium dichloride, rac-dimethylsilylene-bis[1-(2,3,7-trimethyl-4-phenylethylindenyl)]zirconium dichloride, rac-dimethylsilylene-bis[1-(2,3,7-trimethyl-4-phenyldichloromethylindenyl)]zirconium dichloride, rac-dimethylsilylene-bis[1-(2,3,7-trimethyl-4-chloromethylindenyl)]zirconium dichloride, rac-diethylsilylene-bis[1-(2,3,7-trimethyl-4-i-propylindenyl)]zirconium dichloride, rac-di(i-propyl)silylene-bis[1-(2,3,7-trimethyl-4-i-propylindenyl)]zirconium dichloride, rac-di(n-butyl)silylene-bis[1-(2,3,7-trimethyl-4-i-propylindenyl)]zirconium dichloride, rac-di(cyclohexyl)silylene-bis[1-(2,3,7-trimethyl-4-i-propylindenyl)]zirconium dichloride, rac-methylphenylsilylene-bis[1-(2,3,7-trimethyl-4-i-propylindenyl)]zirconium dichloride, rac-methylphenylsilylene-bis[1-(2,3,7-trimethyl-4-t-butylindenyl)]zirconium dichloride, rac-diphenylsilylene-bis[1-(2,3,7-trimethyl-4-t-butylindenyl)]zirconium dichloride, rac-diphenylsilylene-bis[1-(2,3,7-trimethyl-4-i-propylindenyl)]zirconium dichloride, rac-diphenylsilylene-bis[1-(2,3,7-trimethyl-4-ethylindenyl)]zirconium dichloride, rac-di(p-tolyl)silylene-bis[1-(2,3,7-trimethyl-4-i-propylindenyl)]zirconium dichloride, rac-di(p-chlorophenyl)silylene-bis[1-(2,3,7-trimethyl-4-i-propylindenyl)]zirconium dichloride, rac-dimethylsilylene-bis[1-(2-methyl-4-i-propyl-7-methyl-indenyl)]zirconium dimethyl, rac-dimethylsilylene-bis[1-(2-methyl-4-i-propyl-7-methylindenyl)]zirconium methylchloride, rac-dimethylsilylene-bis[1-(2-methyl-4-i-propyl-7-methylindenyl)]zirconium-bis(methanesulfonate), rac-dimethylsilylene-bis[1-(2-methyl-4-i-propyl-7-methylindenyl)]zirconium-bis(p-phenylsulfinate), rac-dimethylsilylene-bis[1-(2-methyl-3-methyl-4-i-propyl-7-methylindenyl)]zirconium dichloride, rac-dimethylsilylene-bis[1-(2-methyl-4,6-di-1-propylindenyl)]zirconium dichloride, rac-dimethylsilylene-bis[1-(2-ethyl-4-i-propyl-7-methylindenyl)]zirconium dichloride, rac-dimethylsilylene-bis[1-(2-phenyl-4-i-propyl-7-methylindenyl)]zirconium dichloride, rac-dimethylsilylene-bis[1-(2-methylindenyl)]zirconium dichloride, rac-ethylene-bis[1-(2,4,7-trimethylindenyl)]zirconium dichloride and rac-isopropylidene-bis[1-(2,4,7-trimethylindenyl)]zirconium dichloride.

Also available are compounds wherein zirconium is replaced with titanium or hafnium in the above-mentioned compounds.

Of the above compounds, particularly preferable are compounds having a branched alkyl group, such as i-propyl, sec-butyl or tert-butyl, at the 4-position.

In the present invention, a racemic modification of the transition metal compound represented by the formula (11b) is usually used as a catalyst component, but R-form or S-form is also employable.

The transition metal compound represented by the formula (11b) can be synthesized from an indene derivative by a known process, for example, a process described in Japanese Patent Laid-Open Publication No. 268307/1992.

Next, the transition metal compound represented by the formula (12) is described.

(12)

In the above formula, $M^1$ is a transition metal atom selected from Group 3 to Group 10 of the periodic table, preferably a transition metal atom selected from Group 4 of the periodic table, more preferably zirconium, titanium or hafnium, particularly preferably zirconium.

Cp is a cyclopentadienyl group or its derivative that is π-bonded to $M^1$.

$Z^1$ is a ligand containing an oxygen atom, a sulfur atom, a boron atom or an element of Group 14 of the periodic table, for example, —Si($R^{22}_2$)—, —C($R^{22}_2$)—, —Si($R^{22}_2$)Si($R^{22}_2$)—, —C($R^{22}_2$)C($R^{22}_2$)—, —C($R^{22}_2$)C($R^{22}_2$)C($R^{22}_2$)—, —C($R^{22}$)=C($R^{22}$)—, —C($R^{22}_2$)Si($R^{22}_2$)— or —Ge($R^{22}_2$)—.

$Y^1$ is a ligand containing a nitrogen atom, a phosphorus atom, an oxygen atom or a sulfur atom, for example, —N($R^{23}$)—, —O—, —S— or —P($R^{23}$)—.

$Z^1$ and $Y^1$ may together form a condensed ring.

$R^{22}$ is a hydrogen atom, an alkyl, aryl, silyl, halogenated alkyl or halogenated aryl group having up to 20 of non-hydrogen atoms, or a combination of such groups. $R^{23}$ is an alkyl group of 1 to 10 carbon atoms, an aryl group of 6 to 10 carbon atom or an aralkyl group of 7 to 10 carbon atoms, or may form a condensed ring of up to 30 non-hydrogen atoms together with one or more $R^{22}$.

Each $X^1$ may be the same or different and is a hydrogen atom, a halogen atom, a hydrocarbon group which has 20 or less carbon atoms and may contain 1 or more double bonds, a silyl group containing 20 or less silicon atoms, a germyl group containing 20 or less germanium atoms or a boronyl group containing 20 or less boron atoms.

Examples of the transition metal compounds represented by the formula (12) include (tert-butylamide)(tetramethyl-$\eta^5$-cyclopentadienyl)-1,2-ethanediylzirconium dichloride, (tert-butylamide)(tetramethyl-$\eta^5$-cyclopentadienyl)-1,2-ethanediyltitanium dichloride, (methylamide)(tetramethyl-$\eta^5$-cyclopentadienyl)-1,2-ethanediylzirconium dichloride, (methylamide)(tetramethyl-$\eta^5$-cyclopentadienyl)-1,2-ethanediyltinanium dichloride, (ethylamide)(tetramethyl-$\eta^5$-cyclopentadienyl)methylenetitanium dichloride, (tert-butylamide)dimethyl(tetramethyl-$\eta^5$-cyclopentadienyl) silanetitanium dichloride, (tert-butylamide)dimethyl (tetramethyl-$\eta^5$-cyclopentadienyl)silanezirconium dichloride, (benzylamide)dimethyl(tetramethyl-$\eta^5$-cyclopentadienyl)silanetitanium dichloride and (phenylphosphine)dimethyl(tetramethyl-$\eta^5$-cyclopentadienyl)silanezirconium dibenzyl.

Next, the transition metal compound represented by the formula (13) is described.

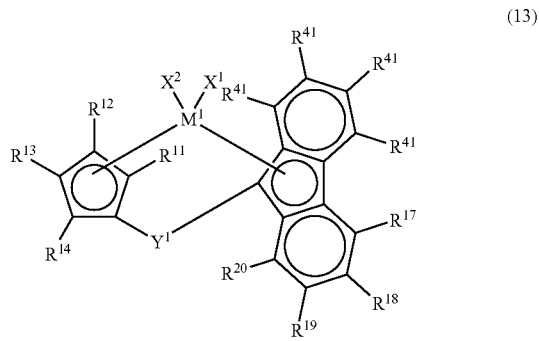

(13)

In the above formula, $M^1$ is a transition metal atom selected from Group 3 to Group 10 of the periodic table, preferably a transition metal atom selected from Group 4 of the periodic table, more preferably titanium, zirconium or hafnium, particularly preferably zirconium.

$R^{11}$ to $R^{14}$, $R^{17}$ to $R^{20}$, and $R^{41}$ may be the same or different and are each a hydrocarbon group of 1 to 40 carbon atoms, a halogenated hydrocarbon group of 1 to 40 carbon atoms, an oxygen-containing group, a sulfur-containing group, a silicon-containing group, a halogen atom or a hydrogen atom; of the groups indicated by $R^{11}$, $R^{12}$, $R^{13}$, $R^{14}$, $R^{17}$, $R^{18}$, $R^{19}$, $R^{20}$ and $R^{41}$, a part of the groups neighboring with each other may be bonded to form a ring together with carbon atoms to which those groups are bonded (except a case where all of $R^{11}$, $R^{12}$, $R^{13}$, $R^{14}$, $R^{17}$, $R^{18}$, $R^{19}$, $R^{20}$ and $R^{41}$ are hydrogen atoms and a case where $R^{12}$ or $R^{13}$ is a tert-butyl group and the residual $R^{11}$, $R^{12}$, $R^{13}$, $R^{14}$, $R^{17}$, $R^{18}$, $R^{19}$, $R^{20}$ and $R^{41}$ are hydrogen atoms).

Examples of hydrocarbons of 1 to 40 carbon atoms are alkyl groups of 1 to 20 carbon atoms such as methyl, ethyl, propyl, butyl, hexyl, cyclohexyl, octyl, nonyl, dodecyl and eicosyl;

aryl groups of 6 to 20 carbon atoms such as phenyl, α- or β-naphthyl, biphenylyl, anthryl and phenanthryl;

aryl alkyl groups of 7 to 40 carbon atoms such as benzyl, phenylethyl, phenylpropyl, phenanthrylethyl, phenanthrylethyl and phenanthrylpropyl;

aryl alkenyl groups of 8 to 40 carbon atoms such as vinylphenanthryl;

alkyl aryl groups of 7 to 40 carbon atoms such as methylphenanthryl, ethylphenanthryl and propylphenanthryl; and alkenyl groups of 2 to 10 carbon atoms such as vinyl, propenyl and cyclohexenyl.

Examples of the halogenated hydrocarbon groups of 1 to 40 carbon atoms include groups wherein the above-mentioned hydrocarbon groups of 1 to 40 carbon atoms are substituted with halogens.

Examples of the oxygen-containing groups, the sulfur-containing groups, the silicon-containing groups and the halogen atoms include the same groups and atoms as previously described with respect to $R^{25}$, $R^{26}$, $R^{27}$ and $R^{28}$ in the formula (11).

$X^1$ and $X^2$ may be the same or different and have the same meanings as those of $X^1$ and $X^2$ in the formula (11).

$Y^1$ has the same meaning as that of $Y^1$ in the formula (11).

Examples of the transition metal compounds represented by the formula (13) include isopropylidene-(cyclopentadienyl)(fluorenyl)zirconium dichloride, dimethylsilylene-(3-tert-butylcyclopentadienyl)(fluorenyl)zirconium dichloride, isopropylidene-(3-tert-butylcyclopentadienyl)(fluorenyl)zirconium dichloride, isopropylidene-(cyclopentadienyl)(2,7-tert-butylfluorenyl)zirconium dichloride, dimethylsilylene-(2-methyl-cyclopentadienyl)(2,7-tert-butylfluorenyl) zirconium dichloride, dimethylsilylene-(2-methyl-cyclopentadienyl)(fluorenyl)zirconium dichloride, dimethylsilylene-(cyclopentadienyl)(2,7-tert-butylfluorenyl)zirconium dichloride, isopropylidene-(2-methyl-cyclopentadienyl)(2,7-tert-butylfluorenyl)zirconium dichloride, isopropylidene-(2-methyl-cyclopentadienyl)(3,6-tert-butylfluorenyl)zirconium dichloride, dimethylsilylene-(2-methyl-cyclopentadienyl)(3,6-tert-butylfluorenyl)zirconium dichloride and diphenylmethylene(cyclopentadienyl)(fluorenyl)zirconium dichloride.

Also available are compounds wherein zirconium is replaced with titanium or hafnium in the above-mentioned compounds.

Next, the transition metal compound represented by the formula (14) is described.

(14)

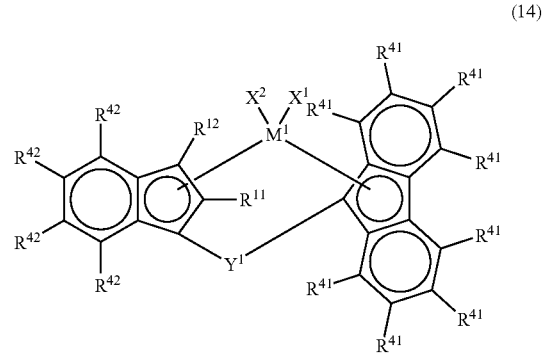

In the above formula, $M^1$ is a transition metal atom selected from Group 3 to Group 10 of the periodic table, preferably a transition metal atom selected from Group 4 of the periodic table, more preferably titanium, zirconium or hafnium, particularly preferably zirconium.

$R^{11}$, $R^{12}$, $R^{41}$ and $R^{42}$ may be the same or different and are each a hydrocarbon group of 1 to 40 carbon atoms, a halogenated hydrocarbon group of 1 to 40 carbon atoms, an oxygen-containing group, a sulfur-containing group, a silicon-containing group, a halogen atom or a hydrogen atom.

Examples of the hydrocarbon groups of 1 to 40 carbon atoms include the same groups as previously described with respect to $R^{11}$ to $R^{14}$, $R^{17}$ to $R^{20}$ and $R^{41}$ in the formula (13).

Examples of the oxygen-containing groups, the sulfur-containing group, the silicon-containing groups and the halogen atoms include the same groups and atoms as previously described with respect to $R^{25}$, $R^{26}$, $R^{27}$ and $R^{28}$ in the formula (11). Of the groups indicated by $R^{11}$, $R^{12}$, $R^{41}$ and $R^{42}$, a part of the groups neighboring with each other may be bonded to form a ring together with carbon atoms to which those groups are bonded.

$X^1$ and $X^2$ may be the same or different and have the same meanings as those of $X^1$ and $X^2$ in the formula (11).

$Y^1$ has the same meaning as that of $Y^1$ in the formula (11), but when all of $R^{11}$, $R^{12}$, $R^{41}$ and $R^{42}$ are hydrogen atoms, $Y^1$ is not ethylene.

Examples of the transition metal compounds represented by the formula (14) include Ethylene[2-methyl-4(9-phenanthryl)-1-indenyl](9-fluorenyl)zirconium dichloride, Ethylene[2-methyl-4(9-phenanthryl)-1-indenyl](2,7-dimethyl-9-fluorenyl)zirconium dichloride, Ethylene[2-methyl-4(9-phenanthryl)-1-indenyl](2,7-di-t-butyl-9-fluorenyl)zirconium dichloride, ethylene(2-methyl-4,5-benzo-1-indenyl)(9-fluorenyl)zirconium dichloride, ethylene(2-methyl-4,5-benzo-1-indenyl)(2,7-dimethyl-9-fluorenyl)zirconium dichloride, ethylene(2-methyl-4,5-benzo-1-indenyl)(2,7-di-t-butyl-9-fluorenyl)zirconium dichloride, ethylene(2-methyl-4,5-benzo-1-indenyl)(2,7-dibromo-9-fluorenyl)zirconium dichloride, ethylene(2,6-dimethyl-4,5-benzo-1-indenyl)(2,7-di-t-butyl-9-fluorenyl)zirconium dichloride, ethylene(2,6-dimethyl-4,5-benzo-1-indenyl)(2,7-dibromo-9-fluorenyl)zirconium dichloride, ethylene (2-methyl-α-acenaphtho-1-indenyl)(9-fluorenyl)zirconium dichloride, ethylene (2-methyl-α-acenaphtho-1-indenyl)(2,7-dimethyl-9-fluorenyl)zirconium dichloride, ethylene (2-methyl-α-acenaphtho-1-indenyl)(2,7-di-t-butyl-9-fluorenyl)zirconium dichloride, dimethylsilylene[2-methyl-4(9-phenanthryl)-1-indenyl](9-fluorenyl)zirconium dichloride, dimethylsilylene[2-n-propyl-4(9-phenanthryl)-1-indenyl](9-fluorenyl)zirconium dichloride, dimethylsilylene[2-methyl-4(9-phenanthryl)-1-indenyl](2,7-dimethyl-9-fluorenyl)zirconium dichloride, dimethylsilylene[2-methyl-4(9-phenanthryl)-1-indenyl](2,7-di-t-butyl-9-fluorenyl)zirconium dichloride, dimethylsilylene(2-methyl-4,5-benzo-1-indenyl)(9-fluorenyl)zirconium dichloride, dimethylsilylene(2-methyl-4,5-benzo-1-indenyl)(2,7-dimethyl-9-fluorenyl)zirconium dichloride, dimethylsilylene(2-methyl-4,5-benzo-1-indenyl)(2,7-di-t-butyl-9-fluorenyl)zirconium dichloride, dimethylsilylene(2-methyl-α-acenaphto-1-indenyl)(9-fluorenyl)zirconium dichloride, dimethylsilylene(2-methyl-α-acenaphto-1-indenyl)(2,7-dimethyl-9-fluorenyl)zirconium dichloride, dimethylsilylene (2-methyl-α-acenaphto-1-indenyl)(2,7-di-t-butyl-9-fluorenyl)zirconium dichloride, diphenylsilylene[2-methyl-4(9-phenanthryl)-1-indenyl](9-fluorenyl)zirconium dichloride, diphenylsilylene[2-methyl-4(9-phenanthryl)-1-indenyl](2, 7-dimethyl-9-fluorenyl)zirconium dichloride, diphenylsilylene[2-methyl-4(9-phenanthryl)-1-indenyl](2,7-di-t-butyl-9-fluorenyl)zirconium dichloride, diphenylsilylene(2-methyl-4,5-benzo-1-indenyl)(9-fluorenyl)zirconium dichloride, diphenylsilylene(2-methyl-4,5-benzo-1-indenyl)(2,7-dimethyl-9-fluorenyl)zirconium dichloride, diphenylsilylene(2-methyl-4,5-benzo-1-indenyl)(2,7-di-t-butyl-9-fluorenyl)zirconium dichloride, diphenylsilylene(2-methyl-α-acenaphto-1-indenyl)(9-fluorenyl)zirconium dichloride, diphenylsilylene(2-methyl-α-acenaphto-1-indenyl)(2,7-dimethyl-9-fluorenyl)zirconium dichloride, diphenylsilylene(2-methyl-α-acenaphto-1-indenyl)(2,7-di-t-butyl-9-fluorenyl)zirconium dichloride, methylphenylsilylene[2-methyl-4(9-phenanthryl)-1-indenyl](9-fluorenyl)zirconium dichloride, methylphenylsilylene[2-methyl-4(9-phenanthryl)-10-indenyl](2,7-dimethyl-9-fluorenyl)zirconium dichloride, methylphenylsilylene[2-methyl-4(9-phenanthryl)-1-indenyl](2,7-di-t-butyl-9-fluorenyl)zirconium dichloride, methylphenylsilylene(2-methyl-4,5-benzo-1-indenyl)(9-fluorenyl)zirconium dichloride, methylphenylsilylene(2-methyl-4,5-benzo-1-indenyl)(2,7-dimethyl-9-fluorenyl)zirconium dichloride, methylphenylsilylene(2-methyl-4,5-benzo-1-indenyl)(2,7-di-t-butyl-9-fluorenyl)zirconium dichloride, methylphenylsilylene(2-methyl-α-acenaphto-1-indenyl)(9-fluorenyl)zirconium dichloride, methylphenylsilylene(2-methyl-α-acenaphto-1-indenyl)(2,7-dimethyl-9-fluorenyl)zirconium dichloride, methylphenylsilylene(2-methyl-α-acenaphto-1-indenyl)(2,7-di-t-butyl-9-fluorenyl) zirconium dichloride, ethylene[3-methyl-4(9-phenanthryl)-1-indenyl](9-fluorenyl)zirconium dichloride, ethylene[3-methyl-4(9-phenanthryl)-1-indenyl](2,7-dimethyl-9-fluorenyl)zirconium dichloride, ethylene[3-methyl-4(9-phenanthryl)-1-indenyl](2,7-di-t-butyl-9-fluorenyl) zirconium dichloride, ethylene(3-methyl-4,5-benzo-1-indenyl)(9-fluorenyl)zirconium dichloride, ethylene(3-methyl-4,5-benzo-1-indenyl)(2,7-dimethyl-9-fluorenyl) zirconium dichloride, ethylene(3-methyl-4,5-benzo-1-indenyl)(2,7-di-t-butyl-9-fluorenyl)zirconium dichloride, ethylene (3-methyl-α-acenaphto-1-indenyl)(9-fluorenyl)zirconium dichloride, ethylene (3-methyl-α-acenaphto-1-indenyl)(2,7-dimethyl-9-fluorenyl)zirconium dichloride, ethylene(3-methyl-α-acenaphto-1-indenyl)(2,7-di-t-butyl-9-fluorenyl)zirconium dichloride, dimethylsilylene[3-methyl-4(9-phenanthryl)-1-indenyl](9-fluorenyl)zirconium dichloride, dimethylsilylene[3-methyl-4(9-phenanthryl)-1-indenyl](2,7-dimethyl-9-fluorenyl)zirconium dichloride, dimethylsilylene[3-methyl-4(9-phenanthryl)-1-indenyl](2, 7-di-t-butyl-9-fluorenyl)zirconium dichloride, dimethylsilylene(3-methyl-4,5-benzo-1-indenyl)(9-fluorenyl)zirconium dichloride, dimethylsilylene(3-methyl-4,5-benzo-1-indenyl)(2,7-dimethyl-9-fluorenyl)zirconium dichloride, dimethylsilylene(3-methyl-4,5-benzo-1-indenyl)(2,7-di-t-butyl-9-fluorenyl)zirconium dichloride, dimethylsilylene(3-methyl-α-acenaphto-1-indenyl)(9-fluorenyl)zirconium dichloride, dimethylsilylene(3-methyl-α-acenaphto-1-indenyl)(2,7-dimethyl-9-fluorenyl)zirconium dichloride, dimethylsilylene(3-methyl-α-acenaphto-1-indenyl)(2,7-di-t-butyl-9-fluorenyl)zirconium dichloride, diphenylsilylene[3-methyl-4(9-phenanthryl)-1-indenyl](9-fluorenyl)zirconium dichloride, diphenylsilylene[3-methyl-4(9-phenanthryl)-1-indenyl](2,7-dimethyl-9-fluorenyl)zirconium dichloride, diphenylsilylene[3-methyl-4(9-phenanthryl)-1-indenyl](2, 7-di-t-butyl-9-fluorenyl)zirconium dichloride, diphenylsilylene(3-methyl-4,5-benzo-1-indenyl)(9-fluorenyl)zirconium dichloride, diphenylsilylene(3-methyl-4,5-benzo-1-indenyl)(2,7-dimethyl-9-fluorenyl)zirconium dichloride, diphenylsilylene(3-methyl-4,5-benzo-1-indenyl)(2,7-di-t-butyl-9-fluorenyl)zirconium dichloride, diphenylsilylene(3-methyl-α-acenaphto-1-indenyl)(9-fluorenyl)zirconium dichloride, diphenylsilylene(3-methyl-α-acenaphto-1-indenyl)(2,7-dimethyl-9-fluorenyl)zirconium dichloride, diphenylsilylene(3-methyl-α-acenaphto-1-indenyl)(2,7-di-t-butyl-9-fluorenyl)zirconium dichloride, methylphenylsilylene[3-methyl-4(9-phenanthryl)-1-indenyl](9-fluorenyl)zirconium dichloride, methylphenylsilylene[3-methyl-4(9-phenanthryl)-1-indenyl](2,7-dimethyl-9-fluorenyl)zirconium dichloride, methylphenylsilylene[3-methyl-4(9-phenanthryl)-1-indenyl](2,7-di-t-butyl-9-fluorenyl)zirconium dichloride, methylphenylsilylene(3-methyl-4,5-benzo-1-indenyl)(9-fluorenyl)zirconium dichloride, methylphenylsilylene(3-methyl-4,5-benzo-1-indenyl)(2,7-dimethyl-9-fluorenyl)zirconium dichloride, methylphenylsilylene(3-methyl-4,5-benzo-1-indenyl)(2,7-di-t-butyl-9-fluorenyl)zirconium dichloride, methylphenylsilylene(3-methyl-α-acenaphto-1-indenyl)(9-fluorenyl)zirconium dichloride, methylphenylsilylene(3-methyl-α-acenaphto-1-indenyl)(2,7-dimethyl-9-fluorenyl)zirconium dichloride, methylphenylsilylene(3-methyl-α-acenaphto-1-indenyl)(2,7-di-t-butyl-9-fluorenyl)zirconium dichloride, ethylene(2-methyl-4,5-benzo-1-indenyl)(2,7-ditrimethylsilyl-9-fluorenyl)zirconium dichloride, ethylene(2,6-dimethyl-4,5-benzo-1-indenyl)(2,7-di-t-butyl-9-fluorenyl)zirconium dichloride, ethylene(2,7-dimethyl-4,5-benzo-1-indenyl)(2,7-di-t-butyl-9-fluorenyl)zirconium dichloride, ethylene(2,7-dimethyl-4,5-(2-methyl-benzo)-1-indenyl)(2,7-di-t-butyl-9-fluorenyl)zirconium dichloride, dimethylsilylene(2-methyl-4,5-benzo-1-indenyl)(2,7-ditrimethylsilyl-9-fluorenyl)zirconium dichloride, dimethylsilylene(2-methyl-4,5-benzo-1-indenyl)(2,7-di-t-butyl-9-fluorenyl)zirconium-bis(methanesulfonate), dimethylsilylene(2-methyl-4,5-benzo-1-indenyl)(2,7-di-t-butyl-9-fluorenyl)zirconium-bis(trifluoromethanesulfonate), dimethylsilylene(2,6-dimethyl-4,5-benzo-1-indenyl)(2,7-di(trimethylsilyl)-9-fluorenyl)zirconium dichloride, dimethylsilylene(2,6-dimethyl-4,5-benzo-1-indenyl)(2,7-di(trimethylsilyl)-9-fluorenyl)zirconium-bis(methanesulfonate), dimethylsilylene(2,6-dimethyl-4,5-benzo-1-indenyl)(2,7-di(trimethylsilyl)-9-fluorenyl)zirconium-bis(trifluoromethanesulfonate), dimethylsilylene(2,6-dimethyl-4,5-benzo-1-indenyl)(2,7-di-t-butyl-9-fluorenyl)zirconium dichloride, dimethylsilylene(2,7-dimethyl-4,5-benzo-1-indenyl)(2,7-di-t-butyl-9-fluorenyl)zirconium dichloride, dimethylsilylene(2,7-dimethyl-4,5-(2-methyl-benzo)-1-indenyl)(2,7-di-t-butyl-9-fluorenyl)zirconium dichloride, dimethylsilylene(2-methyl-4,5-benzo-1-indenyl)(2,7-dibromo-9-fluorenyl)zirconium dichloride, dimethylsilylene(2,6-dimethyl-4,5-benzo-1-indenyl)(2,7-dibromo-9-fluorenyl)zirconium dichloride, dimethylsilylene(2-methyl-4,5-benzo-1-indenyl)(2,7-di-t-butoxy-9-fluorenyl)zirconium dichloride, dimethylsilylene(2,6-dimethyl-4,5-benzo-1-indenyl)(2,7-di-t-butoxy-9-fluorenyl)zirconium dichloride, dimethylsilylene(2-methyl-4,5-benzo-1-indenyl)(2,7-diphenyl-9-fluorenyl)zirconium dichloride, dimethylsilylene(2,6-dimethyl-4,5-benzo-1-indenyl)(2,7-diphenyl-9-fluorenyl)zirconium dichloride, dimethylsilylene(2-methyl-4,5-benzo-1-indenyl)(2,7-di-1-propyl-9-fluorenyl)zirconium dichloride, dimethylsilylene(2,6-dimethyl-4,5-benzo-1-indenyl)(2,7-di-1-propyl-9-fluorenyl)zirconium dichloride, dimethylsilylene(2,6-dimethyl-4,5-benzo-1-indenyl)(2,7-dimethyl-9-fluorenyl)zirconium dichloride, dimethylsilylene(2,6-dimethyl-4,5-(1-methyl-benzo)-1-indenyl)(2,7-di-t-butyl-9-fluorenyl)zirconium dichloride, dimethylsilylene(2,7-dimethyl-4,5-(2-methyl-benzo)-1-indenyl)(2,7-di(trimethylsilyl)-9-fluorenyl)zirconium dichloride, dimethylsilylene(2,7-dimethyl-4,5-(2-methyl-benzo)-1-indenyl)(2,7-dibromo-9-fluorenyl)zirconium dichloride, dimethylsilylene(2,7-dimethyl-4,5-(2-methyl-benzo)-1-indenyl)(2,7-di-t-butoxy-9-fluorenyl)zirconium dichloride, dimethylsilylene(2,7-dimethyl-4,5-(2-methyl-benzo)-1-indenyl)(2,7-diphenyl-9-fluorenyl)zirconium dichloride, dimethylsilylene(2,7-dimethyl-4,5-(2-methyl-benzo)-1-indenyl)(2,7-di-1-propyl-9-fluorenyl)zirconium dichloride, dimethylsilylene(2,7-dimethyl-4,5-(2-methyl-benzo)-1-indenyl)(2,7-dimethyl-9-fluorenyl)zirconium dichloride, dimethylsilylene(2,7-dimethyl-4,5-(1-methyl-benzo)-1-indenyl)(2,7-di-t-butyl-9-fluorenyl)zirconium dichloride, dimethylsilylene(2,7-dimethyl-4,5-(1-methyl-benzo)-1-indenyl)(2,7-di(trimethylsilyl)-9-fluorenyl)zirconium dichloride, dimethylsilylene(2,7-dimethyl-4,5-(1-methyl-benzo)-1-indenyl)(2,7-dibromo-9-fluorenyl)zirconium dichloride, dimethylsilylene(2,7-dimethyl-4,5-(1-methyl-benzo)-1-indenyl)(2,7-di-t-butoxy-9-fluorenyl)zirconium dichloride, dimethylsilylene(2,7-dimethyl-4,5-(1-methyl-benzo)-1-indenyl)(2,7-diphenyl-9-fluorenyl)zirconium dichloride, dimethylsilylene(2,7-dimethyl-4,5-(1-methyl-benzo)-1-indenyl)(2,7-di-1-propyl-9-fluorenyl)zirconium dichloride, dimethylsilylene(2,7-dimethyl-4,5-(1-methyl-benzo)-1-indenyl)(2,7-dimethyl-9-fluorenyl)zirconium dichloride, dimethylsilylene(2-methyl-4,5-benzo-1-indenyl)(2,7-dibromo-9-fluorenyl)zirconium-bis(methanesulfonate), dimethylsilylene(2,6-dimethyl-4,5-benzo-1-indenyl)(2,7-dibromo-9-fluorenyl)zirconium-bis(methanesulfonate), dimethylsilylene(2-methyl-4,5-benzo-1-indenyl)(2,7-di-t-butoxy-9-fluorenyl)zirconium-bis(methanesulfonate), dimethylsilylene(2,6-dimethyl-4,5-benzo-1-indenyl)(2,7-di-t-butoxy-9-fluorenyl)zirconium-bis(methanesulfonate), dimethylsilylene(2-methyl-4,5-benzo-1-indenyl)(2,7-diphenyl-9-fluorenyl)zirconium-bis(methanesulfonate), dimethylsilylene(2,6-dimethyl-4,5-benzo-1-indenyl)(2,7-diphenyl-9-fluorenyl)zirconium-bis(methanesulfonate), dimethylsilylene(2-methyl-4,5-benzo-1-indenyl)(2,7-di-1-propyl-9-fluorenyl)zirconium-bis(methanesulfonate), dimethylsilylene(2,6-dimethyl-4,5-benzo-1-indenyl)(2,7-di-1-propyl-9-fluorenyl)zirconium-bis(methanesulfonate), dimethylsilylene(2,6-dimethyl-4,5-benzo-1-indenyl)(2,7-dimethyl-9-fluorenyl)zirconium-bis(methanesulfonate), dimethylsilylene(2,7-dimethyl-4,5-(2-methyl-benzo)-1-indenyl)(2,7-di(trimethylsilyl-9-fluorenyl)zirconium-bis(methanesulfonate), dimethylsilylene(2,7-dimethyl-4,5-(2-methyl-benzo)-1-indenyl)(2,7-dibromo-9-fluorenyl)zirconium-bis(methanesulfonate), dimethylsilylene(2,7-dimethyl-4,5-(2-methyl-benzo)-1-indenyl)(2,7-di-t-butoxy-9-fluorenyl)zirconium-bis(methanesulfonate), dimethylsilylene(2,7-dimethyl-4,5-(2-methyl-benzo)-1-indenyl)(2,7-diphenyl-9-fluorenyl)zirconium-bis(methanesulfonate), dimethylsilylene(2,7-dimethyl-4,5-(2-methyl-benzo)-1-indenyl)(2,7-di-1-propyl-9-fluorenyl)zirconium-bis(methanesulfonate), dimethylsilylene(2,7-dimethyl-4,5-(2-methyl-benzo)-1-indenyl)(2,7-dimethyl-9-fluorenyl)zirconium-bis(methanesulfonate), dimethylsilylene(2,7-dimethyl-4,5-(1-methyl-benzo)-1-indenyl)(2,7-di-t-butyl-9-fluorenyl)zirconium-bis(methanesulfonate), dimethylsilylene(2,7-dimethyl-4,5-(1-methyl-benzo)-1-indenyl)(2,7-di(trimethylsilyl)-9-fluorenyl)zirconium-bis(methanesulfonate), dimethylsilylene(2,7-dimethyl-4,5-(1-methyl-benzo)-1-indenyl)(2,7-dibromo-9-fluorenyl)zirconium-bis(methanesulfonate), dimethylsilylene(2,7-dimethyl-4,5-(1-methyl-benzo)-1-indenyl)(2,7-di-t-butoxy-9-fluorenyl)zirconium-bis(methanesulfonate), dimethylsilylene(2,7-dimethyl-4,5-(1-methyl-benzo)-1-indenyl)(2,7-diphenyl-9-fluorenyl)zirconium-bis(methanesulfonate), dimethylsilylene(2,7-dimethyl-4,5-(1-methyl-benzo)-1-indenyl)(2,7-di-1-propyl-9-fluorenyl)zirconium-bis(methanesulfonate), dimethylsilylene(2,7-dimethyl-4,5-(1-methyl-benzo)-1-indenyl)(2,7-dimethyl-9-fluorenyl)zirconium-bis(methanesulfonate), dimethylsilylene(2- methyl-4,5-benzo-1-indenyl)(2,7-dibromo-9-(4,5-methylenephenanthryl))zirconium dichloride, dimethylsilylene(2,6-dimethyl-4,5-benzo-1-indenyl)(2,7-dibromo-9-(4,5-methylenephenanthryl))zirconium dichloride, dimethylsilylene(2-methyl-4,5-benzo-1-indenyl)(2,7-di-t-butoxy-9-(4,5-methylenephenanthryl))zirconium dichloride, dimethylsilylene(2,6-dimethyl-4,5-benzo-1-indenyl)(2,7-di-t-butoxy-9-(4,5-methylenephenanthryl))zirconium dichloride, dimethylsilylene(2-methyl-4,5-benzo-1-indenyl)(2,7-diphenyl-9-(4,5-methylenephenanthryl))zirconium dichloride, dimethylsilylene(2,6-dimethyl-4,5-benzo-1-indenyl)(2,7-diphenyl-9-(4,5-methylenephenanthryl))zirconium dichloride, dimethylsilylene(2-methyl-4,5-benzo-1-indenyl)(2,7-di-1-propyl-9-(4,5-methylenephenanthryl)) zirconium dichloride, dimethylsilylene(2,6-dimethyl-4,5-benzo-1-indenyl)(2,7-di-1-propyl-9-(4,5-methylenephenanthryl))zirconium dichloride, dimethylsilylene(2,6-dimethyl-4,5-benzo-1-indenyl)(2,7-dimethyl-9-(4,5-methylenephenanthryl))zirconium dichloride, dimethylsilylene(2,7-dimethyl-4,5-(2-methyl-benzo)-1-indenyl)(2,7-di(trimethylsilyl)-9-(4,5-methylenephenanthryl))zirconium dichloride, dimethylsilylene(2,7-dimethyl-4,5-(2-methyl-benzo)-1-indenyl)(2,7-dibromo-9-(4,5-methylenephenanthryl))zirconium dichloride, dimethylsilylene(2,7-dimethyl-4,5-(2-methyl-benzo)-1-indenyl)(2,7-di-t-butoxy-9-(4,5-methylenephenanthryl))zirconium dichloride, dimethylsilylene(2,7-dimethyl-4,5-(2-methyl-benzo)-1-indenyl)(2,7-diphenyl-9-(4,5-methylenephenanthryl))zirconium dichloride, dimethylsilylene(2,7-dimethyl-4,5-(2-methyl-benzo)-1-indenyl)(2,7-di-1-propyl-9-(4,5-methylenephenanthryl))zirconium dichloride, dimethylsilylene(2,7-dimethyl-4,5-(2-methyl-benzo)-1-indenyl)(2,7-dimethyl-9-(4,5-methylenephenanthryl))zirconium dichloride, dimethylsilylene(2,7-dimethyl-4,5-(1-methyl-benzo)-1-indenyl)(2,7-di-t-butyl-9-(4,5-methylenephenanthryl))zirconium dichloride, dimethylsilylene(2,7-dimethyl-4,5-(1-methyl-benzo)-1-indenyl)(2,7-di-trimethylsilyl)-9-(4,5-methylenephenanthryl))zirconium dichloride, dimethylsilylene(2,7-dimethyl-4,5-(1-methyl-benzo)-1-indenyl)(2,7-dibromo-9-(4,5-methylenephenanthryl))zirconium dichloride, dimethylsilylene(2,7-dimethyl-4,5-(1-methyl-benzo)-1-indenyl)(2,7-di-t-butoxy-9-(4,5-methylenephenanthryl))zirconium dichloride, dimethylsilylene(2,7-dimethyl-4,5-(1-methyl-benzo)-1-indenyl)(2,7-diphenyl-9-(4,5-methylenephenanthryl))zirconium dichloride, dimethylsilylene(2,7-dimethyl-4,5-(1-methyl-benzo)-1-indenyl)(2,7-di-1-propyl-9-(4,5-methylenephenanthryl))zirconium dichloride, dimethylsilylene(2,7-dimethyl-4,5-(1-methyl-benzo)-1-indenyl)(2,7-dimethyl-9-(4,5-methylenephenanthryl))zirconium dichloride, dimethylsilylene(2-methyl-4,5-benzo-1-indenyl)(2,7-di-t-butyl-9-(4,5-methylenephenanthryl))zirconium dichloride, dimethylsilylene(2-methyl-4,5-benzo-1-indenyl)(2,7-di(trimethylsilyl)-9-(4,5-methylenephenanthryl))zirconium dichloride, dimethylsilylene(2,6-dimethyl-4,5-benzo-1-indenyl)(2,7-di-t-butyl-9-(4,5-methylenephenanthryl))zirconium dichloride, dimethylsilylene(2,6-dimethyl-4,5-benzo-1-indenyl)(2,7-di(trimethylsilyl)-9-(4,5-methylenephenanthryl))zirconium dichloride, dimethylsilylene(2,7-dimethyl-4,5-(2-methyl-benzo)-1-indenyl)(2,7-di-t-butyl-9-(4,5-methylenephenanthryl))zirconium dichloride, dimethylsilylene(2,7-dimethyl-4,5-(2-methyl-benzo)-1-indenyl)(2,7-di(trimethylsilyl)-9-(4,5-methylenephenanthryl))zirconium dichloride, dimethylmethylene(2-methyl-4,5-benzo-1-indenyl)(2,7-dibromo-9-fluorenyl)zirconium dichloride, dimethylmethylene(2,6-dimethyl-4,5-benzo-1-indenyl)(2,7-dibromo-9-fluorenyl)zirconium dichloride, dimethylmethylene(2-methyl-4,5-benzo-1-indenyl)(2,7-di-t-butoxy-9-fluorenyl)zirconium dichloride, dimethylmethylene(2,6-dimethyl-4,5-benzo-1-indenyl)(2,7-di-t-butoxy-9-fluorenyl)zirconium dichloride, dimethylmethylene(2-methyl-4,5-benzo-1-indenyl)(2,7-diphenyl-9-fluorenyl)zirconium dichloride, dimethylmethylene(2,6-dimethyl-4,5-benzo-1-indenyl)(2,7-diphenyl-9-fluorenyl)zirconium dichloride, dimethylmethylene(2-methyl-4,5-benzo-1-indenyl)(2,7-di-1-propyl-9-fluorenyl)zirconium dichloride, dimethylmethylene(2,6-dimethyl-4,5-benzo-1-indenyl)(2,7-di-1-propyl-9-fluorenyl)zirconium dichloride, dimethylmethylene(2,6-dimethyl-4,5-benzo-1-indenyl)(2,7-dimethyl-9-fluorenyl)zirconium dichloride, dimethylmethylene(2,7-dimethyl-4,5-(2-methyl-benzo)-1-indenyl)(2,7-di(trimethylsilyl)-9-fluorenyl))zirconium dichloride, dimethylmethylene(2,7-dimethyl-4,5-(2-methyl-benzo)-1-indenyl)(2,7-dibromo-9-fluorenyl)zirconium dichloride, dimethylmethylene(2,7-dimethyl-4,5-(2-methyl-benzo)-1-indenyl)(2,7-di-t-butoxy-9-fluorenyl)zirconium dichloride, dimethylmethylene(2,7-dimethyl-4,5-(2-methyl-benzo)-1-indenyl)(2,7-diphenyl-9-fluorenyl)zirconium dichloride, dimethylmethylene(2,7-dimethyl-4,5-(2-methyl-benzo)-1-indenyl)(2,7-di-1-propyl-9-fluorenyl)zirconium dichloride, dimethylmethylene(2,7-dimethyl-4,5-(2-methyl-benzo)-1-indenyl)(2,7-dimethyl-9-fluorenyl)zirconium dichloride, dimethylmethylene(2,7-dimethyl-4,5-(1-methyl-benzo)-1-indenyl)(2,7-di-t-butyl-9-fluorenyl)zirconium dichloride, dimethylmethylene(2,7-dimethyl-4,5-(1-methyl-benzo)-1-indenyl)(2,7-di(trimethylsilyl)-9-fluorenyl)zirconium dichloride, dimethylmethylene(2,7-dimethyl-4,5-(1-methyl-benzo)-1-indenyl)(2,7-dibromo-9-fluorenyl) zirconium dichloride, dimethylmethylene(2,7-dimethyl-4,5-(1-methyl-benzo)-1-indenyl)(2,7-di-t-butoxy-9-fluorenyl) zirconium dichloride, dimethylmethylene(2,7-dimethyl-4,5-(1-methyl-benzo)-1-indenyl)(2,7-diphenyl-9-fluorenyl) zirconium dichloride, dimethylmethylene(2,7-dimethyl-4,5-(1-methyl-benzo)-1-indenyl)(2,7-di-1-propyl-9-fluorenyl) zirconium dichloride, dimethylmethylene(2,7-dimethyl-4,5-(1-methyl-benzo)-1-indenyl)(2,7-dimethyl-9-fluorenyl) zirconium dichloride, dimethylmethylene(2-methyl-4,5-benzo-1-indenyl)(2,7-di-t-butyl-9-fluorenyl)zirconium dichloride, dimethylmethylene(2-methyl-4,5-benzo-1-indenyl)(2,7-di(trimethylsilyl)-9-fluorenyl)zirconium dichloride, dimethylmethylene(2,6-dimethyl-4,5-benzo-1-indenyl)(2,7-di-t-butyl-9-fluorenyl)zirconium dichloride, dimethylmethylene(2,6-dimethyl-4,5-benzo-1-indenyl)(2,7-di(trimethylsilyl)-9-fluorenyl))zirconium dichloride, dimethylmethylene (2,7-dimethyl-4,5-(2-methyl-benzo)-1-indenyl)(2,7-di-t-butyl-9-fluorenyl)zirconium dichloride, dimethylmethylene (2,7-dimethyl-4,5-(2-methyl-benzo)-1-indenyl)(2,7-di(trimethylsilyl)-9-fluorenyl)zirconium dichloride, dimethylsilylene(2-methyl-4,5-benzo-1-indenyl)(2,7-di-t-butyl-9-fluorenyl))zirconium η4-i-phenyl-1,3-pentadiene, dimethylsilylene(2-methyl-4,5-benzo-1-indenyl)(2,7-di(trimethylsilyl)-9-fluorenyl))zirconium η4-1,4-diphenylbutadiene, dimethylsilylene(2-methyl-4,5-benzo-1-indenyl)(2,7-dibromo-9-fluorenyl)zirconium 174-2,4-hexadiene, dimethylsilylene(2,6-dimethyl-4,5-benzo-1-indenyl)(2,7-di-t-butyl-9-fluorenyl)zirconium η4-1,4-diphenyl-1,3-butadiene, dimethylsilylene(2,6-dimethyl-4,5-benzo-1-indenyl)(2,7-di(trimethylsilyl)-9-fluorenyl))zirconium 174-3-methyl-1,3-pentadiene, dimethylsilylene(2,6-dimethyl-4,5-benzo-1-indenyl)(2,7-dibromo-9-fluorenyl)zirconium η4-2,4-hexadiene, diphenylsilylene(2-methyl-4,5-benzo-1-indenyl)(2,7-ditrimethylsilyl-9-fluorenyl)zirconium dichloride, diphenylsilylene(2,6-dimethyl-4,5-benzo-1-indenyl)(2,7-di-t-butyl-9-fluorenyl)zirconium dichloride, diphenylsilylene (2,7-dimethyl-4,5-benzo-1-indenyl)(2,7-di-t-butyl-9-fluorenyl)zirconium dichloride, diphenylsilylene(2,7-dimethyl-4,5-(2-methyl-benzo)-1-indenyl)(2,7-di-t-butyl-9-fluorenyl) zirconium dichloride, methylphenylsilylene(2-methyl-4,5-benzo-1-indenyl)(2,7-di(trimethyl)silyl-9-fluorenyl)) zirconium dichloride, methylphenylsilylene(2,6-dimethyl-4,5-benzo-1-indenyl)(2,7-di-t-butyl-9-fluorenyl))zirconium dichloride, methylphenylsilylene(2,7-dimethyl-4,5-benzo-1-indenyl)(2,7-di-t-butyl-9-fluorenyl))zirconium dichloride, methylphenylsilylene(2,7-dimethyl-4,5-(2-methyl-benzo)-1-indenyl)(2,7-di-t-butyl-9-fluorenyl))zirconium dichloride, ethylene(2-methyl-7-trimethylsilyl-4,5-benzo-1-indenyl)(2,7-di-t-butyl-9-fluorenyl)zirconium dichloride and dimethylsilylene(2-methyl-7-trimethylsilyl-4,5-(1-methyl-benzo)-1-indenyl)(2,7-di-t-butyl-9-fluorenyl)zirconium dichloride.

Also available are compounds wherein zirconium is replaced with titanium or hafnium in the above-mentioned compounds.

Next, the transition metal compound represented by the formula (15) is described.

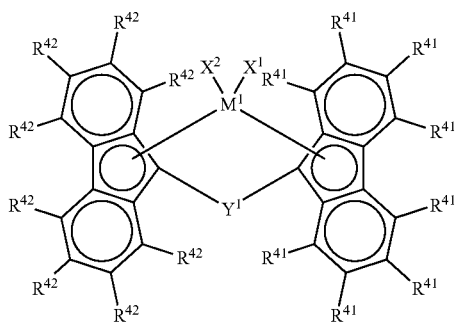

(15)

In the above formula, $M^1$ is a transition metal atom selected from Group 3 to Group 10 of the periodic table, preferably a transition metal atom selected from Group 4 of the periodic table, more preferably titanium, zirconium or hafnium, particularly preferably zirconium.

$R^{41}$ and $R^{42}$ may be the same or different and are each a hydrocarbon group of 1 to 40 carbon atoms, a halogenated hydrocarbon group of 1 to 40 carbon atoms, an oxygen-containing group, a sulfur-containing group, a silicon-containing group, a halogen atom or a hydrogen atom.

Examples of the hydrocarbon groups of 1 to 40 carbon atoms include the same groups as previously described with respect to $R^{11}$ to $R^{14}$, $R^{17}$ to $R^{20}$ and $R^{41}$ in the formula (13).

Examples of the oxygen-containing groups, the sulfur-containing group, the silicon-containing groups and the halogen atoms include the same groups and atoms as previously described with respect to $R^{25}$, $R^{26}$, $R^{27}$ and $R^{28}$ in the formula (11). Of the groups indicated by $R^{41}$ and $R^{42}$, a part of the groups neighboring with each other may be bonded to form a ring together with carbon atoms to which those groups are bonded $X^1$ and $X^2$ may be the same or different and have the same meanings as those of $X^1$ and $X^2$ in the formula (11).

$Y^1$ has the same meaning as that of $Y^1$ in the formula (11).

Examples of the transition metal compounds represented by the formula (15) include ethylene-bis(fluorenyl)dimethyl zirconium, ethylene-bis(fluorenyl)zirconium dichloride, ethylene-bis(fluorenyl)zirconium-bis(trifluoromethanesulfonate), ethylene-bis(fluorenyl)zirconium-bis(methanesulfonate), dimethylsilylene-bis(fluorenyl)zirconium dichloride, dimethylsilylene-bis(fluorenyl)zirconium-bis(trifluoromethanesulfonate), diphenylsilylene-bis(fluorenyl)zirconium dichloride, dimethylmethylene-bis(fluorenyl)zirconium dichloride, dimethylmethylene-bis(2,7-tert-butylfluorenyl)zirconium dichloride, dimethylsilylene-bis(2,7-tert-butylfluorenyl)zirconium dichloride, dimethylmethylene-bis(3,6-tert-butylfluorenyl)zirconium dichloride, dimethylsilylene-bis(3,6-tert-butylfluorenyl)zirconium dichloride, and N,N-diphenylaminoboryliden-bis(fluorenyl)zirconium dichloride.

Next, the transition metal compound represented by the formula (16) is described.

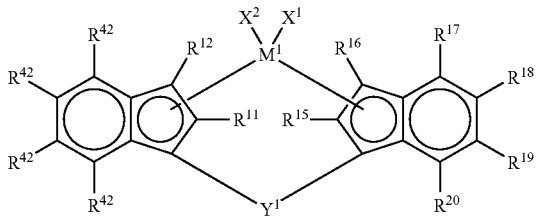

(16)

In the above formula, $M^1$ is a transition metal atom selected from Group 4 of the periodic table, specifically titanium, zirconium or hafnium, preferably zirconium.

$R^{11}$, $R^{12}$, $R^{15}$ to $R^{20}$, and $R^{42}$ may be the same or different and are each a hydrocarbon group of 1 to 40 carbon atoms, a halogenated hydrocarbon group of 1 to 40 carbon atoms, an oxygen-containing group, a sulfur-containing group, a silicon-containing group, a halogen atom or a hydrogen atom.

Examples of the hydrocarbon groups of 1 to 40 carbon atoms include the same groups as previously described with respect to $R^{11}$ to $R^{14}$, $R^{17}$ to $R^{20}$ and $R^{41}$ in the formula (13).

Examples of the oxygen-containing groups, the sulfur-containing group, the silicon-containing groups and the halogen atoms include the same groups and atoms as previously described with respect to $R^{25}$, $R^{26}$, $R^{27}$ and $R^{28}$ in the formula (11). Of the groups indicated by $R^{11}$, $R^{12}$, $R^{15}$, $R^{16}$, $R^{17}$, $R^{18}$, $R^{19}$, $R^{20}$ and $R^{42}$, a part of the groups neighboring with each other may be bonded to form a ring together with carbon atoms to which those groups are bonded.

$X^1$ and $X^2$ may be the same or different and have the same meanings as those of $X^1$ and $X^2$ in the formula (11).

$Y^1$ has the same meaning as that of $Y^1$ in the formula (11).

Examples of the transition metal compounds represented by the formula (16) include the same compounds as previously exemplified with respect to the compounds of the formula (11a) or (11b).

Also available are compounds wherein zirconium is replaced with titanium or hafnium in the above-mentioned compounds.

The transition metal compounds (A) mentioned above can be used singly or in combination of two or more kinds.

(B-1) Organoaluminum Oxy-Compound

The organoaluminum oxy-compound (B-1) for use in the invention may be conventional aluminoxane (also referred to as "alumoxane") or such a benzene-insoluble organoaluminum oxy-compound as exemplified in Japanese Patent Laid-Open Publication No. 78687/1990.

The conventional aluminoxane can be prepared by, for example, the following processes, and is generally obtained as a hydrocarbon solvent solution.

(1) An organoaluminum compound such as trialkylaluminum is added to a hydrocarbon medium suspension of a compound containing adsorption water or a salt containing water of crystallization, e.g., magnesium chloride hydrate, copper sulfate hydrate, aluminum sulfate hydrate, nickel sulfate hydrate or cerous chloride hydrate, to allow the organoaluminum compound to react with the adsorption water or the water of crystallization.

(2) Water, ice or water vapor is allowed to directly act on an organoaluminum compound such as trialkylaluminum in a medium such as benzene, toluene, ethyl ether or tetrahydrofuran.

(3) An organotin oxide such as dimethyltin oxide or dibutyltin oxide is allowed to react with an organoaluminum compound such as trialkylaluminum in a medium such as decane, benzene or toluene.

The aluminoxane may contain a small amount of an organometallic component. Further, it is possible that the solvent or the unreacted organoaluminum compound is distilled off from the recovered solution of aluminoxane and the remainder is redissolved in a solvent.

Examples of the organoaluminum compounds used for preparing the aluminoxane include trialkylaluminums, such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tridecylaluminum;

tricycloalkylaluminums, such as tricyclohexylaluminum and tricyclooctylaluminum;

dialkylaluminum halides, such as dimethylaluminum chloride, diethylaluminum chloride, diethylaluminum bromide and diisobutylaluminum chloride;

dialkylaluminum hydrides, such as diethylaluminum hydride and diisobutylaluminum hydride;

dialkylaluminum alkoxides, such as dimethylaluminum methoxide and diethylaluminum ethoxide; and dialkylaluminum aryloxides, such as diethylaluminum phenoxide.

Of these, preferable are trialkylaluminums and tricycloalkylaluminums.

Additionally, examples of the organoaluminum compounds used for preparing the aluminoxane include isoprenylaluminum represented by the formula $(i-C_4H_9)_xAl_y(C_5H_{10})_z$ (wherein x, y and z are each a positive number, and $z \geq 2x$).

The organoaluminum compounds are used singly or in combination of two or more kinds.

Examples of the solvents used for preparing the aluminoxane include aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; petroleum fractions, such as gasoline, kerosine and gas oil; and halogenated products of these aromatic, aliphatic and alicyclic hydrocarbons (e.g., chlorinated or brominated products thereof). Also employable are ethers such as ethyl ether and tetrahydrofuran. Of the solvents, particularly preferable are aromatic hydrocarbons.

The organoaluminum oxy-compound for use in the invention is, for example, an organoaluminum oxy-compound containing boron and represented by the following formula (17):

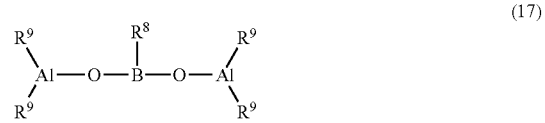

(17)

wherein $R^8$ is a hydrocarbon group of 1 to 10 carbon atoms; and each $R^9$ may be the same or different and is a hydrogen atom, a halogen atom or a hydrocarbon group of 1 to 10 carbon atoms.

(B-2) Ionizing Ionic Compound

Examples of the compound (B-2) which reacts with the transition metal compound (A) to form an ion pair (sometimes referred to as an "ionizing ionic compound" hereinafter), that is used in the invention, include Lewis acid, an ionic compound, a borane compound and a carborane compound, which are described in National Publications of International Patents No. 501950/1989 and No. 502036/1989, Japanese Patent Laid-Open Publications No. 179005/1991, No. 179006/1991, No. 207703/1991 and No. 207704/1991, and U.S. Pat. No. 5,321,106. A heteropoly compound and an isopoly compound are also available.

Examples of the Lewis acid include magnesium-containing Lewis acid, aluminum-containing Lewis acid and boron-containing Lewis acid. Of these, boron-containing Lewis acid is preferable. The ionic compound is a salt comprising a cationic compound and an anionic compound. The anion reacts with the transition metal compound to make the transition metal compound cationic and thereby form an ion pair, whereby the transition metal cationic species are stabilized. Examples of such anions include organoboron compound anion, organoarsenic compound anion and organoaluminum compound anion. Preferable are those which are relatively bulky and stabilize the transition metal cationic species.

The Lewis acids containing boron atoms are, for example, compounds represented by the following formula (18);

BR'R''R''' (18)

wherein R', R'' and R''' may be the same or different and are each a fluorine atom or a phenyl group which may have a substituent such as a fluorine atom, a methyl group or a trifluoromethyl group.

Examples of compounds represented by the formula (18) include trifluoroboron, triphenylboron, tris(4-fluorophenyl) boron, tris(3,5-difluorophenyl)boron, tris(4-fluoromethylphenyl)boron, tris(pentafluorophenyl)boron, tris(p-tolyl) boron, tris(o-tolyl)boron, tris(3,5-dimethylphenyl)boron and tris[3,5-di(trifluoromethylphenyl)]boron. Of these, preferable is tris(pentafluorophenyl)boron.

The ionic compound is a salt comprising a cationic compound and an anionic compound. An anion is reacted with the above transition metal compound to cationize it and form an ion pair which has a function of stabilizing the cation species of the transition metal compound. Examples of such anions include organic boron compound anion, organic arsenic compound anion and organic aluminum compound anion, and preferable are relatively bulky and can stabilize the transition metal cationic species. Cations include metal cation, organic metal cation, carbonium cation, tropylium cation, oxisonium cation, sulfonium cation, phosphonium cation and ammonium cation and, more in detail, triphenylcarbenium cation, tributylammonium cation, N,N-dimethylammonium cation and ferrocenium cation.

Of these, preferable anions are ionic compounds containing boron compounds as anion.

Examples of the trialkyl-substituted ammonium salts include;
triethylammoniumtetra(phenyl)boron, tripropylammoniumtetra(phenyl)boron, tri(n-butyl)ammoniumtetra(phenyl)boron, trimethylammoniumtetra(p-tolyl)boron, trimethylammoniumtetra(o-tolyl)boron, tributylammoniumtetra(pentafluorophenyl)boron, tripropylammoniumtetra(o,p-dimethylphenyl)boron, tributylammoniumtetra(m,m-dimethylphenyl)boron, tributylammoniumtetra(p-trifluoromethylphenyl)boron, tri(n-butyl)ammoniumtetra(o-tolyl)boron and tri(n-butyl)ammoniumtetra(4-fluorophenyl)boron.

Examples of the N,N-dialkylanilinium salts include N,N-dimethylaniliniumtetra(phenyl)boron, N,N-diethylaniliniumtetra(phenyl)boron and N,N-2,4,6-pentamethylaniliniumtetra(phenyl)boron.

Examples of the dialkylammonium salts include di(n-propyl)ammoniumtetra(pentafluorophenyl)boron and dicyclohexylammoniumtetra(phenyl)boron.

Examples of the triarylphosphonium salts include triphenylphosphoniumtetra(phenyl)boron, tri(methylphenyl)phosphoniumtetra(phenyl)boron and tri(dimethylphenyl)phosphoniumtetra(phenyl)boron.

Further employable as the ionic compounds containing boron are triphenylcarbeniumtetrakis(pentafluorophenyl)borate, N,N-dimethylaniliniumtetrakis(pentafluorophenyl)borate, ferroceniumtetra(pentafluorophenyl)borate triphenylcarbeniumpentaphenylcyclopentadienyl complex, N,N-diethylaniliniumpentaphenylcyclopentadienyl complex and a boron compound represented by the following formula (19) or (20):

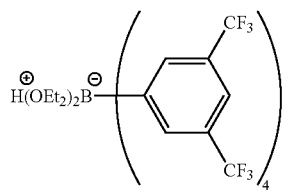

(19)

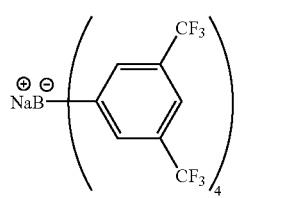

(20)

Furthermore employable as the ionic compounds having a boron atom are the following compounds. (In the following ionic compounds, the counter ion is tri(n-butyl)ammonium but not restricted.)

Examples of salts of anions include bis[tri(n-butyl)ammonium]nonaborate, bis[tri(n-butyl)ammonium]decaborate, bis[tri(n-butyl)ammonium]undecaborate, bis[tri(n-butyl)ammonium]dodecaborate, bis[tri(n-butyl)ammonium]decachlorodecaborate, bis[tri(n-butyl)ammonium]dodecachlorododecaborate, tri(n-butyl)ammonium-1-carbadecaborate, tri(n-butyl)ammonium-1-carbaundecaborate, tri(n-butyl)ammonium-1-carbadodecaborate, tri(n-butyl)ammonium-1-trimethylsilyl-1-carbadecaborate and tri(n-butyl)ammoniumbromo-1-carbadodecaborate.

Examples of salts of borane compounds, carborane compolex compounds and carborane anion include
decaborane(14), 7,8-dicarbaundecaborane(13), 2,7-dicarbaundecaborane(13), undecahydrido-7,8-dimethyl-7,8-dicarbaundecaborane, dodecahydrido-11-methyl-2,7-dicarbaundecaborane, tri(n-butyl)ammonium-6-carbadecaborate (14), tri(n-butyl)ammonium-6-carbadecaborate(12), tri(n-butyl)ammonium-7-carbaundecaborate(13), tri(n-butyl)ammonium-7,8-dicarbaundecaborate(12), tri(n-butyl)ammonium-2,9-dicarbaundecaborate(12), tri(n-butyl)ammoniumdodecahydrido-8-methyl-7,9-dicarbaundecaborate, tri(n-butyl)ammoniumundecahydrido-8-ethyl-7,9-dicarbaundecaborate, tri(n-butyl)ammoniumundecahydrido-8-butyl-7,9-dicarbaundecaborate, tri(n-butyl)ammoniumundecahydrido-8-allyl-7,9-dicarbaundecaborate, tri(n-butyl)ammoniumundecahydrido-9-trimethylsilyl-7,8-dicarbaundecaborate and tri(n-butyl)ammoniumundecahydrido-4,6-dibromo-7-carbaundecaborate.

Examples of salts of carborane compounds and carborane include
4-carbanonaborane(14), 1,3-dicarbanonaborane(13), 6,9-dicarbadecaborane(14), dodecahydrido-1-phenyl-1,3-dicarbanonaborane, dodecahydrido-1-methyl-1,3-dicarbanonaborane and undecahydrido-1,3-dimethyl-1,3-dicarbanonaborane.

Further employable as the ionic compounds containing a boron atom are following metallic carborane salts and metallic boran anion. (In the following ionic compounds, the counter ion is tri(n-butyl)ammonium but not restricted.)

Employable are tri(n-butyl)ammoniumbis(nonahydrido-1,3-dicarbanonaborate)cobaltate(III), tri(n-butyl)ammoniumbis(undecahydrido-7,8-dicarbaundecaborate)ferrate(III), tri(n-butyl)ammoniumbis(undecahydrido-7,8-dicarbaundecaborate)cobaltate(III), tri(n-butyl)ammoniumbis(undecahydrido-7,8-dicarbaundecaborate)nickelate(III), tri(n-butyl)ammoniumbis(undecahydrido-7,8-dicarbaundecaborate)cuprate(III), tri(n-butyl)ammoniumbis(undecahydrido-7,8-dicarbaundecaborate)aurate(III), tri(n-butyl)ammoniumbis(nonahydrido-7,8-dimethyl-7,8-dicarbaundecaborate)ferrate(III), tri(n-butyl)ammoniumbis(nonahydrido-7,8-dimethyl-7,8-dicarbaundecaborate)chromate(III), tri(n-butyl)ammoniumbis(tribromooctahydrido-7,8-dicarbaundecaborate)cobaltate(III), tri(n-butyl)ammoniumbis(dodecahydridodicarbadodecaborate)cobaltate(III), bis[tri(n-butyl)ammonium]bis(dodecahydrododecaborate)nickelate(III), tris[tri(n-butyl)ammonium]bis(undecahydrido-7-carbaundecaborate)chromate(III), bis[tri(n-butyl)ammonium]bis(undecahydrido-7-carbaundecaborate)manganate(IV), bis[tri(n-butyl)ammonium]bis(undecahydrido-7-carbaundecaborate)cobaltate(III) and bis[tri(n-butyl)ammonium]bis(undecahydrido-7-carbaundecaborate)nickelate(IV).

Further examples of the ionic compounds containing a boron atom include following compounds such as triphenylcarbeniumtetrakis[(2,3,5,6-tetrafluoro-4-triisopropylsilyl)phenyl]borate, N,N-dimethylaniliniumtetrakis[(2,3,5,6-tetrafluoro-4-triisopropylsilyl)phenyl]borate, triphenylcarbeniumtetrakis[(2,3,5,6-tetrafluoro-4-dimethyl-t-butylsilyl)phenyl]borate, N,N-dimethylaniliniumtetrakis[(2,3,5,6-tetrafluoro-4-dimethyl-t-butylsilyl)phenyl]borate, triphenylcarbeniumbis(octafluorobiphenylene)borate, N,N-dimethylaniliniumbis(octafluorobiphenylene)borate, triphenylcarbeniumbis(octafluoro-1,1'-spiro)biboronol and N,N-dimethylaniliniumbis(octafluoro-1,1'-spiro)biboronol.

The heteropoly compound comprises an atom selected from silicon, phosphorus, titanium, germanium, arsenic or tin and one or more atoms selected from vanadium, niobium, molybdenum and tungsten. Examples of such compounds include phosphovanadic acid, germanovanadic acid, arsenovanadic acid, phosphoniobic acid, germanoniobic acid, silicomolybdic acid, phosphomolybdic acid, titanomolybdic acid, germanomolybdic acid, arsenomolybdic acid, stannomolybdic acid, phosphotungstic acid, germanotungstic acid, stannotungstic acid, phosphomolybdovanadic acid, phosphotungstovanadic acid, germanotungstovanadic acid, phosphomolybdotungstovanadic acid, germanomolybdotungstovanadic acid, phosphomolybdotungstic acid, phosphomolybdoniobic acid, salts of these acids, specifically, salts of these acids, for example with metals of Group 1 or 2 of the periodic table such as lithium, sodium, potassium, rubidium, cesium, beryllium, magnesium, calcium, strontium and barium and organic salts of the above acids such as with triphenylethyl salt.

The ionizing ionic compounds may be used singly or in combination of two or more kinds.

(B-3) Organoaluminum Compound

The organoaluminum compounds (B-3) used in the present invention can be represented by the following formula (21):

$$R^a{}_n AlX_{3-n} \quad (21)$$

wherein $R^a$ is a hydrocarbon group of 1 to 12 carbon atoms, X is a halogen atom or a hydrogen atom, and n is 1 to 3.

In the above formula (21), $R^a$ is a hydrocarbon group of 1 to 12 carbon atoms, for example, an alkyl group, a cycloalkyl group or an aryl group. Examples include a methyl group, ethyl group, n-propyl group, isopropyl group, isobutyl group, pentyl group, hexyl group, octyl group, cyclopentyl group, cyclohexyl group, phenyl group and tolyl group.

Examples of the organoaluminum compounds include trialkylaluminums, such as trimethylaluminum, triethylaluminum, triisopropylaluminum, triisobutylaluminum, trioctylaluminum and tri-2-ethylhexylaluminum;

alkenylaluminums, such as isoprenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichloride, ethylaluminum sesquichloride, isopropylaluminum sesquichloride, butylaluminum sesquichloride and ethylaluminum sesquibromide, alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Further the organoaluminum compounds (B-3) can be also represented by the following formula (22):

$$R^a{}_n AlY_{3-n} \quad (22)$$

wherein $R^a$ is the same as previously described, Y is a —$OR^b$ group, —$OSiR^c{}_3$ group, —$OAlR^d{}_2$ group, —$NR^e{}_2$ group, —$SiR^f{}_3$ group or —$N(R^g)AlR^h{}_2$ group, n is 1 to 2, and $R^b$, $R^c$, $R^d$ and $R^h$ are each a methyl group, ethyl group, isopropyl group, isobutyl group, cyclohexyl group and phenyl group, $R^e$ is hydrogen, a methyl group, ethyl group, isopropyl group, phenyl group and trimethyl group, and $R^f$ and $R^g$ are each a methyl group and ethyl group.

Examples of the organoaluminum compounds include (i) compounds represented by $R^a{}_n Al(OR^b)_{3-n}$ such as dimethylaluminum methoxide, diethylaluminum ethoxide and diisobutylaluminum methoxide;

(ii) compounds represented by $R^a{}_n Al(OSiR^c{}_3)_{3-n}$ such as $(C_2H_5)_2Al(OSi(CH_3)_3)$, $(iso-C_4H_9)_2Al(OSi(CH_3)_3)$ and $(iso-C_4H_9)_2Al(OSi(C_2H_5)_3)$;

(iii) compounds represented by $R^a{}_n Al(OAlR^d{}_2)_{3-n}$ such as $(C_2H_5)_2Al(OAl(C_2H_5)_2)$ and $(iso-C_4H_9)_2Al(OAl(iso-C_4H_9)_2)$;

(iv) compounds represented by $R^a{}_n Al(NR^e{}_2)_{3-n}$ such as $(CH_3)_2Al(N(C_2H_5)_2)$, $(C_2H_5)_2Al(NH(CH_3))$, $(CH_3)_2Al(NH(C_2H_5))$, $(C_2H_5)_2Al[N(Si(CH_3)_3)_2]$ and $(iso-C_4H_9)_2Al[N(Si(CH_3)_3)_2]$; and (v) compounds represented by $R^a{}_n Al(SiR^f{}_3)_{3-n}$ such as $(iso-C_4H_9)_2Al(Si(CH_3)_3)$.

In the present invention, of these, preferable are organoaluminum compounds represented by $R^a{}_3Al$, $R^a{}_n Al(OR^b)_{3-n}$, and $R^a{}_n Al(OAlR^d{}_2)_{3-n}$. Particularly preferable are compounds wherein $R^a$ is an isoalkyl group and n=2.

The organoaluminum compounds can be used in combination of two or more kinds.

The olefin polymerization catalyst used in the present invention comprises the transition metal compound (A) and at least one compound selected from the group consisting of the organoaluminum-oxy compound (B-1), the ionizing ionic compound (B-2) and the organoaluminum compound (B-3). For example, in the case that the transition metal compound (A) contains a ligand having a cyclopentadienyl skeleton, the catalyst comprises said compound (A) and the organoaluminum-oxy compound (B-1) and/or the ionizing ionic compound (B-2), and optionally the organoaluminum compound (B-3).

The olefin polymerization catalyst for use in the invention may be a solid catalyst in which the transition metal compound (A) and at least one component selected from the organoaluminum oxy-compound (B-1), the ionizing ionic compound (B-2) and the organoaluminum compound (B-3) are supported on a particle carrier, or a prepolymerized catalyst comprising a particle carrier, the transition metal compound (A), the organoaluminum oxy-compound (B-1) (or the ionizing ionic compound (B-2)), an olefin polymer produced by prepolymerization, and if necessary, the organoaluminum compound (B-3).

An particulate carriers used in the solid catalyst and the prepolymerized catalyst is an inorganic or organic compound in the form of granular or particulate solid having a particle diameter of 10 to 300 μm, preferably 20 to 200 μm.

Preferable examples of the inorganic carrier are porous oxides, inorganic chlorides, clay, clay minerals and ion-exchange layered compounds. Examples of porous oxides include $SiO_2$, $Al_2O_3$, MgO, ZrO, $TiO_2$, $B_2O_3$, CaO, ZnO, BaO, $ThO_2$, and mixtures containing these oxides, such as $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO. Of these, preferable are compounds containing $SiO_2$ and/or $Al_2O_3$ as the main component.

The inorganic oxides may contain small amounts of carbonate, sulfate, nitrate and oxide components, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$.

Although the particulate carriers differ in their properties depending upon the type and the preparation process thereof, the particulate carrier preferably has a specific surface area of 50 to 1,000 $M^2/g$, preferably 100 to 700 $M^2/g$, and a pore volume of 0.3 to 2.5 cm³/g. If necessary, the particulate carrier may be calcined at 100 to 1,000° C., preferably 150 to 700° C., prior to use.

Further the particulate carrier is, for example, a granular or particulate solid organic compound having a particle diameter of 10 to 300 µm. Examples of such organic compounds include (co)polymers produced using an α-olefin of 2 to 14 carbon atoms such as ethylene, propylene, 1-butene or 4-methyl-1-pentene as a main ingredient and (co)polymers produced using vinylcyclohexane or styrene as a main ingredient.

Examples of the inorganic chlorides employable in the invention include $MgCl_2$, $MgBr_2$, $MnCl_2$ and $MnBr_2$. The inorganic chloride may be used as it is, or may be used after pulverized by, for example, a ball mill or an oscillating mill. The inorganic chloride may also be used as fine particles of a obtained by dissolving the inorganic chloride in a solvent such as alcohol and then precipitating using a precipitant.

The clay is generally composed mainly of clay minerals. The ion-exchange layered compounds are compounds having a crystal structure wherein planes formed by ionic bonding or the like are laminated in parallel to one another with a weak bond strength, and the ions contained therein are exchangeable. Most of clay minerals are ion-exchange layered compounds. The clay, the clay minerals and the ion-exchange layered compounds employable in the invention are not limited to natural ones but include synthetic ones.

Examples of such clay, clay minerals and ion-exchange layered compounds include clay, clay minerals and ion crystalline compounds having layered crystal structures such as hexagonal closest packing type, antimony type, $CdCl_2$ type and $CdI_2$ type.

Particular examples of the clay and the clay minerals include kaolin, bentonite, kibushi clay, gairome clay, allophane, hisingerite, pyrophyllite, mica, montmorillonite, vermiculite, chlorite, palygorskite, kaolinite, nacrite, dickite and halloysite. Particular examples of the ion-exchange layered compounds include crystalline acid salts of polyvalent metals, such as $\alpha\text{-}Zr(HAsO_4)_2 \cdot H_2O$, $\alpha\text{-}Zr(HPO_4)_2$, $\alpha\text{-}Zr(KPO_4)_2 \cdot 3H_2O$, $\alpha\text{-}Ti(HPO_4)_2$, $\alpha\text{-}Ti(HAsO_4)_2 H_2O$, $\alpha\text{-}Sn(HPO_4)_2 \cdot H_2O$, $\gamma\text{-}Zr(HPO_4)_2$, $\gamma\text{-}Ti(HPO_4)_2$ and $\gamma\text{-}Ti(NH_4PO_4)_2 \cdot H_2O$.

The clay, the clay minerals and the ion-exchange layered compounds are preferably those having a pore volume, as measured on pores having a radius of not less than 20 Å by a mercury penetration method, of not less than 0.1 cc/g, and are particularly preferably those having a pore volume of 0.3 to 5 cc/g. The pore volume is measured on the pores having a radius of 20 to 3×10⁴ Å by a mercury penetration method using a mercury porosimeter.

If a compound having a pore volume, as measured on pores having a radius of not less than 20 Å, of less than 0.1 cc/g is used as the carrier, high polymerization activity tends to be hardly obtained.

It is also preferable that the clay and the clay minerals are subjected to chemical treatments. Any of surface treatments, for example, to remove impurities attached to the surface and to influence on the crystal structure of the clay, are employable.

Examples of such chemical treatments include acid treatment, alkali treatment, salt treatment and organic substance treatment. The acid treatment can contribute to not only removing impurities from the surface but also eluting cations such as Al, Fe and Mg present in the crystal structure to increase the surface area. The alkali treatment can destroy crystal structure of clay to bring about change in the structure of the clay. The salt treatment and the organic substance treatment can produce, for example, ionic composites, molecular composites, or organic derivative to change the surface area or the distance between layers.

The ion-exchange layered compound may be a layered compound in which the exchangeable ions between layers have been exchanged with other large and bulky ions utilizing ion exchange properties to enlarge the distance between the layers. The bulky ion plays a pillar-like role to support the layer structure and is generally called a "pillar". Introduction of other substances between layers of a layered compound is called "intercalation". Examples of the guest compounds to be intercalated include cationic inorganic compounds, such as $TiCl_4$ and $ZrCl_4$; metallic alkoxides, such as $Ti(OR)_4$, $Zr(OR)_4$, $PO(OR)_3$ and $B(OR)_3$ (R is a hydrocarbon group or the like); and metallic hydroxide ions, such as $[Al_{13}O_4(OH)_{24}]^{7+}$, $[Zr_4(OH)_{14}]^{2+}$ and $[Fe_3O(OCOCH_3)_6]^+$. The compounds mentioned above may be used singly or in combination of two or more kinds.

The intercalation of the compounds may be carried out in the presence of polymers obtained by hydrolysis of metallic alkoxides such as $Si(OR)_4$, $Al(OR)_3$ and $Ge(OR)_4$ (R is a hydrocarbon group or the like) or in the presence of colloidal inorganic compounds such as $SiO_2$. Examples of the pillars include oxides produced by intercalation of the above-mentioned metallic hydroxide ions between layers, followed by dehydration under heating.

The clay, clay minerals and ion-exchange layered compounds mentioned above may be used as they are, or may be used after they are subjected to a treatment of ball milling, sieving or the like. Moreover, they may be used after they are subjected to water adsorption or dehydration under heating. The clay, clay minerals and ion-exchange layered compounds may be used singly or in combination of two or more kinds.

Of the above-mentioned materials, preferable are clay and clay minerals, and particularly preferable are montmorillonite, vermiculite, hectorite, taeniolite and synthetic mica.

The olefin polymerization catalyst for use in the invention may contain the following organosilicon compound (C) and/ or the following dialkylzinc compound (D).

(C) Organosilicon Compound

The organosilicon compound (C) which is used optionally is represented by the following formula (22):

$$R^1 R^2 R^3 SiH \qquad (22)$$

wherein $R^1$, $R^2$ and $R^3$ may be the same or different and are each a hydrogen atom, an alkyl group of 1 to 4 carbon atoms, such as methyl, ethyl, propyl, isopropyl, butyl, isobutyl or tert-butyl, an aryl group of 6 to 12 carbon atoms, such as phenyl or tolyl, an alkylaryl group of 7 to 20 carbon atoms, such as ethylphenyl or ethyltolyl, an arylalkyl group of 7 to 20 carbon atoms, such as phenylethyl or benzyl, an alkoxyl group of 1 to 4 carbon atoms, such as methoxy, ethoxy, propoxy or butoxy, a fluorinated alkyl group of 3 to 6 carbon atoms, such as 3,3,3-trifluoropropyl, a dialkylamino group containing an alkyl group of 1 to 4 carbon atoms, such as dimethylamino, or a diorganopolysiloxane chain containing 1 to 10 siloxane units and represented by $R^6_3SiO(SiR^6_2O)_n$— ($R^6$ is methyl, phenyl, 3,3,3-trifluoropropyl, methoxy or ethoxy, and n is an integer of 0 to 9).

Of these, preferable is a hydrogen atom, methyl, ethyl, isopropyl, isobutyl, 3,3,3-trifluoropropyl dimethylamino or a group represented by $R^6_3SiO(SiR^6_2O)_n$—.

Preferred examples of the organosilicon compounds represented by the formula (22) include phenylsilane, diphenylsilane, phenylmethylsilane, pentamethyldisiloxane, methylsilane and dimethylsilane.

The organosilicon compounds mentioned above can be used singly or in combination of two or more kinds.

(D) Dialkylzinc Compound

The dialkylzinc compound (D) which is used optionally is represented by the following formula (23):

$$ZnR^4R^5 \qquad (23)$$

wherein $R^4$ and $R^5$ may be the same or different and are each an alkyl group of 1 to 20 carbon atoms, such as methyl, ethyl, propyl, isopropyl, butyl, isobutyl, tert-butyl, hexyl, octyl, nonyl, decyl, dodecyl or eicosyl.

Of these, preferable is an alkyl group of 1 to 12 carbon atoms, and more preferable is an alkyl group of 1 to 6 carbon atoms.

Preferred examples of the dialkylzinc compounds represented by the formula (23) include diethylzinc, diisobutylzinc an di-n-decylzinc. Of these, diethylzinc is particularly preferable.

The dialkylzinc compounds (D) mentioned above can be used singly or in combination of two or more kinds.

The organosilicon compound (C) and the dialkylzinc compound (D) can be each used as a chain transfer agent in combination with hydrogen. When the organosilicon compound (C) is used as a chain transfer agent, an olefin polymer having a silyl group at the end is obtained.

Examples of the α-olefins of 2 to 20 carbon atoms include ethylene, propylene, 1-butene, 2-butene, 1-pentene, 3-methyl-1-butene, 1-hexene, 4-methyl-1-pentene, 3-methyl-1-pentene, 3-ethyl-1-pentene, 4,4-dimethyl-1-pentene, 4-methyl-1-hexene, 4,4-dimethyl-1-hexene, 4-ethyl-1-hexene, 3-ethyl-1-hexene, 1-octene, 1-decene, 1-dodecene, 1-tetradecene, 1-hexadecene, 1-octadecene and 1-eicosene. Of these, preferable is an α-olefin selected from ethylene, propylene, 1-butene, 4-methyl-1-pentene, 1-hexene and 1-octene.

Next, the polar group-containing monomer represented by the formula (7) is described more in detail, below.

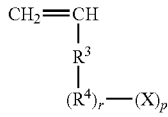

(7)

wherein $R^3$, $R^4$, r, X and p have the same meanings as those of $R^3$, $R^4$, r, X and p, respectively, in the formula (3).

Examples of the polar group-containing monomers include:

compounds of the formula (7) wherein X is an alcoholic hydroxyl group, specifically ω-alkenylalcohols, such as allylalcohol, 4-pentene-1-ol, 5-hexene-1-ol, 6-heptene-1-ol, 7-octene-1-ol, 8-nonene-1-ol, 9-decene-1-ol, 10-undecene-1-ol and 11-dodecene-1-ol;

alcohols having a straight-chain hydrocarbon group, such as 5-hexene-2-ol, 6-heptene-2-ol, 7-octene-2-ol, 8-nonene-2-ol, 9-decene-2-ol, 10-undecene-2-ol, 6-heptene-3-ol, 7-octene-3-ol, 8-nonene-3-ol, 9-decene-3-ol, 10-undecene-3-ol, 11-dodecene-3-ol, 7-octene-4-ol, 8-nonene-4-ol, 9-decene-4-ol, 10-undecene-4-ol, 8-nonene-5-ol, 9-decene-5-ol and 10-undecene-5-ol;

alcohols having a branched hydrocarbon group, such as 2-ethyl-5-hexene-1-ol, 3-methyl-6-heptene-1-ol, 3-methyl-7-octene-1-ol, 4-methyl-8-nonene-1-ol, 3-ethyl-9-decene-1-ol, 2-methyl-10-undecene-2-ol, 2,2-dimethyl-7-octene-1-ol, 3-ethyl-2-methyl-8-nonene-1-ol, 2,2,3-trimethyl-9-decene-1-ol and 2,3,3,4-tetramethyl-10-undecene-2-ol;

diols, such as 9-decene-1,2-diol, 10-undecene-1,2-diol, 11-dodecene-1,2-diol and 11-dodecene-1,2-diol; and triols, such as 10-undecene-1,2,3-triol;

compounds of the formula (7) wherein X is a carboxylic acid group, specifically

ω-alkenylcarboxylic acids, such as 3-butenoic acid, 5-hexanoic acid, 6-heptenoic acid, 7-octenoic acid, 8-nonenoic acid, 9-decanoic acid, 10-undecanoic acid and 11-dodecanoic acid;

alkenylcarboxylic acids having a straight-chain hydrocarbon group, such as 2-methyl-5-hexanoic acid, 2-methyl-6-heptenoic acid, 2-methyl-7-octenoic acid, 2-methyl-8-nonenoic acid, 2-methyl-9-decanoic acid, 2-methyl-10-undecanoic acid, 2-methyl-11-dodecanoic acid, 2-ethyl-5-hexanoic acid, 2-ethyl-6-heptenoic acid, 2-ethyl-7-octenoic acid, 2-ethyl-8-nonenoic acid, 2-ethyl-9-decanoic acid, 2-ethyl-10-undecanoic acid, 2-propyl-5-hexanoic acid, 2-propyl-6-heptenoic acid, 2-propyl-7-octenoic acid, 2-propyl-8-nonenoic acid, 2-propyl-9-decanoic acid, 2-propyl-10-undecanoic acid, 2-butyl-5-hexanoic acid, 2-butyl-6-heptenoic acid, 2-butyl-7-octenoic acid, 2-butyl-8-nonenoic acid, 2-butyl-9-decanoic acid and 2-butyl-10-undecanoic acid; and alkenylcarboxylic acids having a branched hydrocarbon group, such as 2-isopropyl-5-hexanoic acid, 2-isopropyl-6-heptenoic acid, 2-isopropyl-7-octenoic acid, 2-isopropyl-8-nonenoic acid, 2-isopropyl-9-decanoic acid, 2-isopropyl-10-undecanoic acid, 2-isobutyl-5-hexanoic acid, 2-t-butyl-6-heptenoic acid, 2-isopropyl-3-methyl-7-octenoic acid, 2-methyl-3-isopropyl-8-nonenoic acid, 3-isobutyl-3-methyl-9-decanoic acid, 2,2-dimethyl-10-undecanoic acid and 2,3,3-trimethyl-11-dodecanoic acid;

compounds of the formula (7) wherein X is a carboxylic acid ester, specifically

ω-alkenylcarboxylic acid esters, such as methyl 3-butenoate, methyl 5-hexenoate, methyl 6-heptanoate, methyl 7-octanoate, methyl 8-nonanoate, methyl 9-decanoate, methyl 10-undecanoate, methyl 11-dodecanoate, ethyl 5-hexenoate, ethyl 6-heptanoate, ethyl 7-octanoate, ethyl 8-nonanoate, ethyl 9-decanoate, ethyl 10-undecanoate, ethyl 11-dodecanoate, isopropyl 5-hexenoate, isopropyl 6-heptanoate, isopropyl 7-octanoate, isopropyl 8-nonanoate, isopropyl 9-decanoate, isopropyl 10-undecanoate, isopropyl 11-dodecanoate, butyl 5-hexenoate, butyl 6-heptanoate, butyl 7-octanoate, butyl 8-nonanoate, butyl 9-decanoate, butyl 10-undecanoate, butyl 11-dodecanoate, pentyl 5-hexenoate, pentyl 6-heptanoate, pentyl 7-octanoate, pentyl 8-nonanoate, pentyl 9-decanoate, pentyl 10-undecanoate and pentyl 11-dodecanoate;

alkenylcarboxylic acid esters having a straight-chain hydrocarbon group, such as methyl 2-methyl-5-hexenoate, methyl 2-methyl-6-heptanoate, ethyl 2-methyl-7-octanoate, methyl 2-methyl-8-nonanoate, butyl 2-methyl-9-decanoate, ethyl 2-methyl-10-undecanoate, butyl 2-ethyl-5-hexenoate, ethyl 2-ethyl-6-heptanoate, isopropyl 2-ethyl-7-octanoate, ethyl 2-ethyl-8-nonanoate, methyl 2-ethyl-9-decanoate, ethyl 2-ethyl-10-undecanoate, methyl 2-propyl-5-hexenoate, methyl 2-propyl-6-heptanoate, ethyl 2-propyl-7-octanoate, methyl 2-propyl-9-decanoate, ethyl 2-propyl-10-undecanoate, methyl 2-butyl-7-octanoate, methyl 2-butyl-8-nonanoate, methyl 2-butyl-9-decanoate and methyl 2-butyl-10-undecanoate; and alkenylcarboxylic acids having a branched hydrocarbon group, such as butyl 2-isopropyl-5-hexenoate, ethyl 2-isopropyl-6-heptanoate, methyl 2-isopropyl-7-octanoate, methyl 2-isopropyl-8-nonanoate, butyl 2-isopropyl-9-decanoate, methyl 2-isopropyl-10-undecanoate, methyl 2-isobutyl-5-hexenoate, methyl 2-t-butyl-6-heptanoate, ethyl 2-isopropyl-3-methyl-7-octanoate and propyl 3-isobutyl-3-methyl-9-decanoate;

compounds wherein X in the formula (7) is an acid anhydride group, such as (2,7-octadienyl)succinic anhydride, pentapropenylsuccinic anhydride and compounds wherein the carboxylic acid group is replaced with a carboxylic anhydride group in the above-exemplified compounds wherein X is a carboxylic acid group;

compounds of the formula (7) wherein X is an amino group, specifically

ω-alkenylamines, such as allylamine, 5-hexene amine, 6-heptene amine, 7-octene amine, 8-nonene amine, 9-decene amine, 10-undecene amine and 11-dodecene amine;

alkenylamines having a straight-chain hydrocarbon group, such as 2-methyl-5-hexene amine, 2-methyl-6-heptene amine, 2-methyl-7-octene amine, 2-methyl-8-nonene amine, 2-methyl-9-decene amine, 2-methyl-10-undecene amine, 2-methyl-11-dodecene amine, 2-ethyl-5-hexene amine, 2-ethyl-6-heptene amine, 2-ethyl-7-octene amine, 2-ethyl-8-nonene amine, 2-ethyl-9-decene amine, 2-ethyl-10-undecene amine, 2-propyl-5-hexene amine, 2-propyl-6-heptene amine, 2-propyl-5-hexene amine, 2-propyl-6-heptene amine, 2-propyl-7-octene amine, 2-propyl-8-nonene amine, 2-propyl-9-decene amine, 2-propyl-10-undecene amine, 2-butyl-5-hexene amine, 2-butyl-6-heptene amine, 2-butyl-7-octene amine, 2-butyl-8-nonene amine, 2-butyl-9-decene amine and 2-butyl-10-undecene amine;

alkenylamines having a branched hydrocarbon group, such as 2-isopropyl-5-hexene amine, 2-isopropyl-6-heptene amine, 2-isopropyl-7-octene amine, 2-isopropyl-8-nonene amine, 2-isopropyl-9-decene amine, 2-isopropyl-10-undecene amine, 2-isobutyl-5-hexene amine, 2-t-butyl-6-heptene amine, 2-isopropyl-3-methyl-7-octene amine, 2-methyl-3-isopropyl-8-nonene amine, 3-isobutyl-3-methyl-9-decene amine, 2,2-dimethyl-10-undecene amine and 2,3,3-trimethyl-11-dodecene amine;

N-alkyl-ω-alkenylamines, such as N-methyl-5-hexene amine, N-methyl-6-heptene amine, N-methyl-7-octene amine, N-methyl-8-nonene amine, N-methyl-9-decene amine, N-methyl-10-undecene amine, N-methyl-11-dodecene amine, N-ethyl-5-hexene amine, N-ethyl-6-heptene amine, N-ethyl-7-octene amine, N-ethyl-8-nonene amine, N-ethyl-9-decene amine, N-ethyl-10-undecene amine and N-ethyl-11-dodecene amine;

N-alkylalkenylamines having a straight-chain hydrocarbon group, such as N-methyl-6-heptene-2-amine, N-ethyl-7-octene-2-amine, N-methyl-8-nonene-2-amine, N-ethyl-9-decene-2-amine, N-methyl-10-undecene-2-amine, N-ethyl-8-nonene-3-amine, N-methyl-9-decene-3-amine, N-ethyl-10-undecene-3-amine, N-ethyl-8-nonene-4-amine, N-methyl-9-decene-4-amine and N-ethyl-10-undecene-4-amine;

N-alkylalkenylamines having a branched hydrocarbon group, such as N-methyl-2-methyl-5-hexene amine, N-ethyl-2-methyl-6-heptene amine, N-methyl-2-methyl-7-octene amine, N-ethyl-2-methyl-8-nonene amine, N-ethyl-2-methyl-9-decene amine, N-methyl-2-methyl-10-undecene amine, N-methyl-2-ethyl-7-octene amine, N-ethyl-2-ethyl-9-decene amine and N-methyl-2-ethyl-10-undecene amine;

N,N-dialkyl-ω-alkenylamines, such as N,N-dimethyl-5-hexene amine, N,N-dimethyl-6-heptene amine, N,N-dimethyl-7-octene amine, N,N-dimethyl-8-nonene amine, N,N-dimethyl-9-decene amine, N,N-dimethyl-10-undecene amine, N,N-dimethyl-11-dodecene amine, N,N-diethyl-5-hexene amine, N,N-diethyl-6-heptene amine, N,N-diethyl-7-octene amine, N,N-diethyl-8-nonene amine, N,N-diethyl-9-decene amine, N,N-diethyl-10-undecene amine and N,N-diethyl-11-dodecene amine;

N,N-dialkylalkenylamines having a straight-chain hydrocarbon group, such as N,N-dimethyl-6-heptene-2-amine, N,N-diethyl-7-octene-2-amine, N,N-dimethyl-8-nonene-2-amine, N,N-diethyl-9-decene-2-amine, N,N-dimethyl-10-undecene-2-amine, N,N-diethyl-8-nonene-3-amine, N,N-dimethyl-9-decene-3-amine, N,N-diethyl-10-undecene-3-amine, N,N-diethyl-8-nonene-4-amine, N,N-dimethyl-9-decene-4-amine and N,N-diethyl-10-undecene-4 amine; and N,N-dialkylalkenylamines having a branched hydrocarbon group, such as N,N-dimethyl-2-methyl-5-hexene amine, N,N-diethyl-2-methyl-6-heptene amine, N,N-dimethyl-2-methyl-7-octene amine, N,N-diethyl-2-methyl-8-nonene amine, N,N-diethyl-2-methyl-9-decene amine, N,N-dimethyl-2-methyl-10-undecene amine, N,N-dimethyl-2-ethyl-7-octene amine, N,N-diethyl-2-ethyl-9-decene amine and N,N-dimethyl-2-ethyl-10-undecene amine;

compounds of the formula (7) wherein X is an amido group, specifically

ω-alkenylamides, such as alkylamide, 5-hexene amide, 6-heptene amide, 7-octene amide, 8-nonene amide, 9-decene amide, 10-undecene amide and 11-dodecene amide;

alkenylamides having a straight-chain hydrocarbon group, such as 6-heptene-2-amide, 7-octene-2-amide, 8-nonene-2-amide, 9-decene-2-amide, 10-undecene-2-amide, 8-nonene-3-amide, 9-decene-3-amide, 10-undecene-3-amide, 11-dodecene-3-amide, 8-nonene-4-amide, 9-decene-4-amide, 10-undecene-4-amide, 11-dodecene-4-amide, 9-decene-5-amide and 10-undecene-5-amide;

N-alkyl-ω-alkenylamides, such as N-methyl-5-hexene amide, N-methyl-6-heptene amide, N-methyl-7-octene amide, N-methyl-8-nonene amide, N-methyl-9-decene amide, N-methyl-10-undecene amide, N-methyl-11-dodecene amide, N-ethyl-5-hexene amide, N-ethyl-6-heptene amide, N-ethyl-7-octene amide, N-ethyl-8-nonene amide, N-ethyl-9-decene amide, N-ethyl-10-undecene amide and N-ethyl-11-dodecene amide;

N,N-dialkyl-ω-alkenylamides, such as N,N-dimethyl-5-hexene amide, N,N-dimethyl-6-heptene amide, N,N-dimethyl-7-octene amide, N,N-dimethyl-8-nonene amide, N,N-dimethyl-9-decene amide, N,N-dimethyl-10-undecene amide, N,N-dimethyl-11-dodecene amide, N,N-diethyl-5-hexene amide, N,N-diethyl-6-heptene amide, N,N-diethyl-7-octene amide, N,N-diethyl-8-nonene amide, N,N-diethyl-9-decene amide, N,N-diethyl-10-undecene amide and N,N-diethyl-11-dodecene amide;

alkenylamides having a branched hydrocarbon group, such as 2-methyl-5-hexene amide, 2-methyl-6-heptene amide, 2-methyl-7-octene amide, 2-methyl-8-nonene amide, 2-methyl-9-decene amide, 2-methyl-10-undecene amide, 2-ethyl-5-hexene amide, 2-ethyl-6-heptene amide, 2-ethyl-7-octene amide, 2-ethyl-8-nonene amide, 2-ethyl-9-decene amide, 2-ethyl-10-undecene amide, 2-ethyl-11-dodecene amide, 2-propyl-5-hexene amide, 2-propyl-6-heptene amide, 2-propyl-7-octene amide, 2-propyl-8-nonene amide, 2-propyl-9-decene amide, 2-propyl-10-undecene amide, 2-propyl-11-dodecene amide, 2-butyl-5-hexene amide, 2-butyl-6-heptene amide, 2-butyl-7-octene amide, 2-butyl-8-nonene amide, 2-butyl-9-decene amide and 2-butyl-10-undecene amide;

N,N-dialkylalkenylamides having a branched hydrocarbon group, such as N,N-dimethyl-2-methyl-5-hexene amide, N,N-diethyl-2-methyl-6-heptene amide, N,N-dimethyl-2-methyl-7-octene amide, N,N-diethyl-2-methyl-8-nonene amide, N,N-diethyl-2-methyl-9-decene amide, N,N-diethyl-2-methyl-10-undecene amide, N,N-dimethyl-2-ethyl-7-octene amide, N,N-diethyl-2-ethyl-9-decene amide and N,N-dimethyl-2-ethyl-10-undecene amide;

alkenyldiamides, such as 6-heptene-1,2-diamide, 7-octene-1,2-diamide, 8-nonene-1,2-diamide, 9-decene-1,3-diamide, 10-undecene-1,3-diamide and 11-dodecene-1,3-diamide;

alkenyltriamides, such as 9-decene-1,2,3-triamide and 10-undecene-1,2,3-triamide; and compounds of the formula (7) wherein X is an epoxy group, specifically ω-alkenylepoxides, such as 5-hexene epoxide, 6-heptene epoxide, 7-octene epoxide, 8-nonene epoxide, 9-decene epoxide, 10-undecene epoxide and 11-dodecene epoxide; and ω-alkenylepoxides having a branched hydrocarbon group, such as 2-methyl-5-hexene epoxide, 2-methyl-6-heptene epoxide, 2-methyl-7-octene epoxide, 2-methyl-8-nonene epoxide, 2-methyl-9-decene epoxide and 2-methyl-10-undecene epoxide; and compounds wherein X in the formula (7) is a mercapto group, such as $CH_2=CH-CH_2-CH_2-CH_2-CH_2-O-Ph-SH$.

Other examples of the polar group-containing monomers include compounds represented by the following formulas.

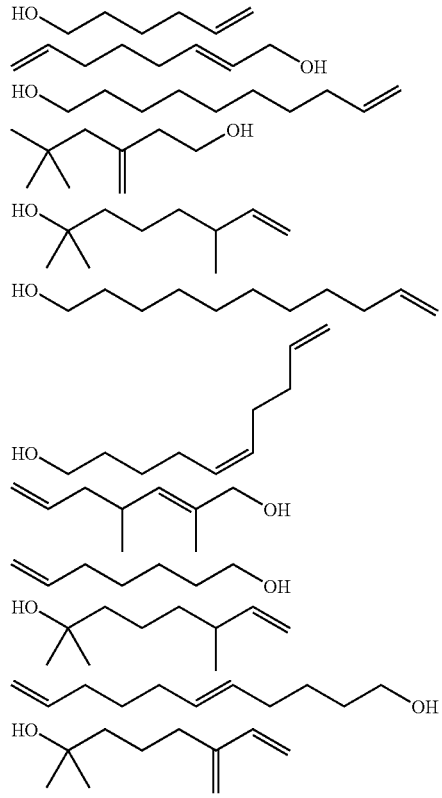

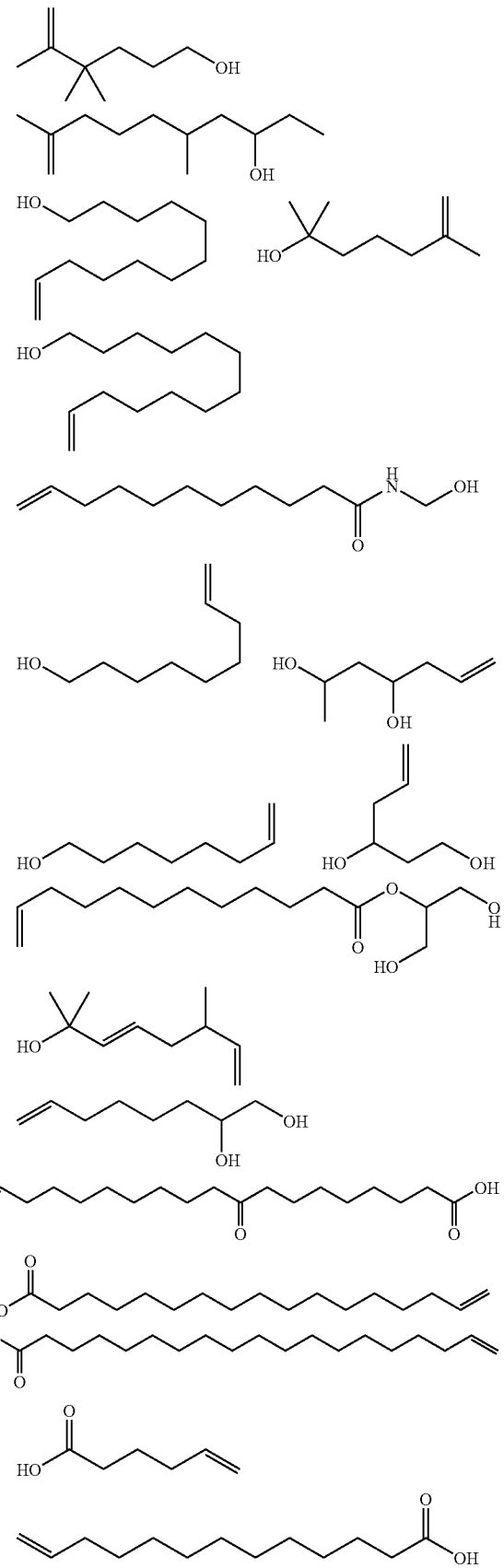

-continued

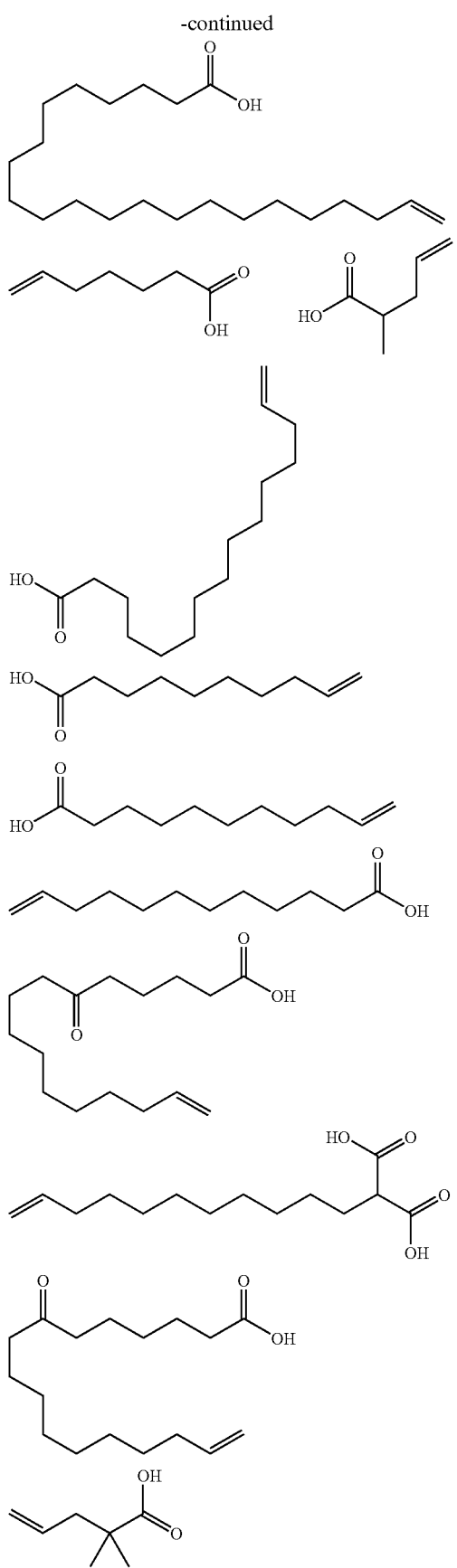
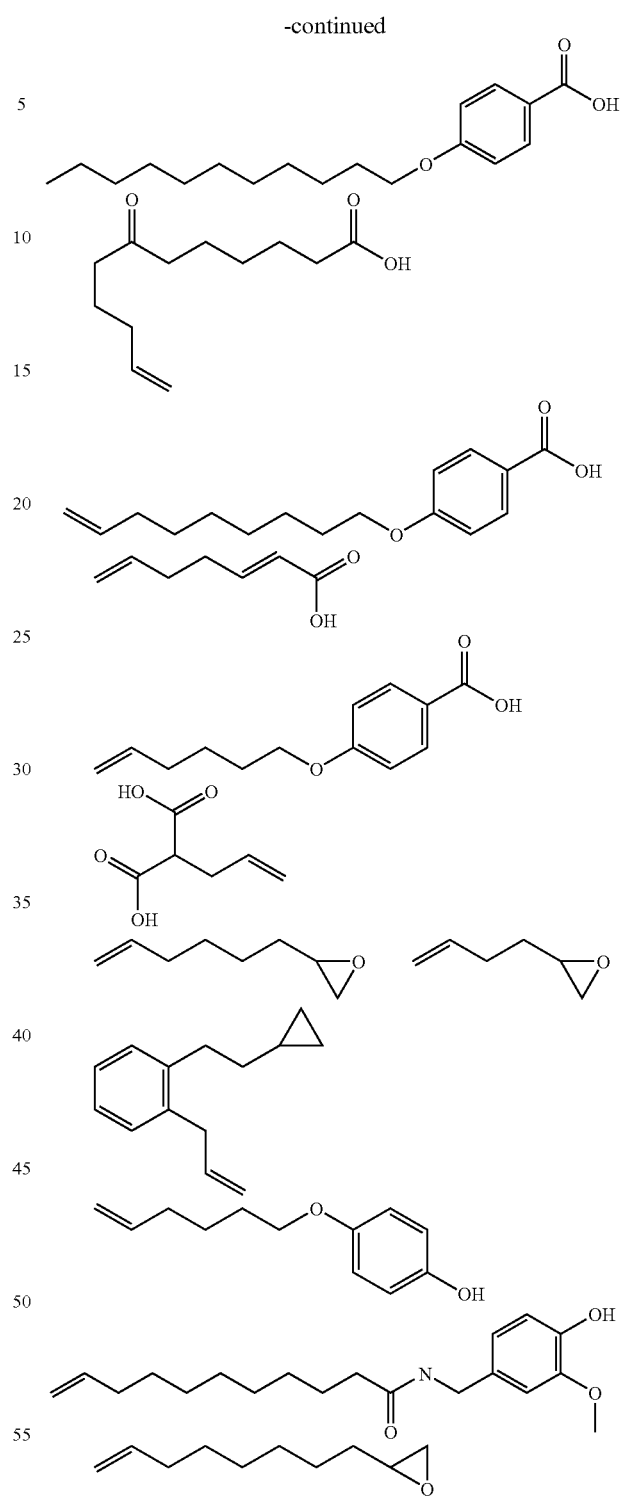

Also available are n-nonyl-1-ol, n-nonyl-1-carboxylic acid, n-nonyl-1-carboethoxy, 1,2-epoxy-nonyl, (6-hexen-1-yl)succinic anhydride, n-undecyl-1-ol, n-dodecyl-1-carboxylic acid, n-dodecyl-1-carboethoxy, 4-hexenyloxyphenol, 4-hexenyloxy-thiophenol, n-nonyl-1-carboxamide, n-nonyl-1-amino and n-nonyl-1-N-methylamino.

In the process for preparing the polar group-containing olefin copolymer according to the first embodiment of the invention, the polar group-containing monomer represented by the formula (7) may be the polar group-containing monomer represented by the following formula (7');

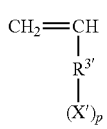

(7')

wherein $R^{3'}$, p and X' have the same meanings as those of $R^{3'}$, p and X', respectively, in the formula (3').

Examples of polar group-containing monomers of the formula (7') wherein X' is —OR include:

ω-alkoxy-α-olefins, such as 3-methoxy-1-propene, 5-methoxy-1-pentene, 6-methoxy-1-hexene, 7-methoxy-1-heptene, 8-methoxy-1-octene, 9-methoxy-1-nonene, 10-methoxy-1-decene, 11-methoxy-1-undecene, 5-ethoxy-1-pentene, 6-ethoxy-1-hexene, 7-ethoxy-1-heptene, 8-ethoxy-1-octene, 9-ethoxy-1-nonene, 10-ethoxy-1-decene, 11-ethoxy-1-undecene, 5-propoxy-1-pentene, 6-propoxy-1-hexene, 7-propoxy-1-heptene, 8-propoxy-1-octene, 9-propoxy-1-nonene, 10-propoxy-1-decene, 11-propoxy-1-undecene, 5-butoxy-1-pentene, 6-butoxy-1-hexene, 7-butoxy-1-heptene, 8-butoxy-1-octene, 9-butoxy-1-nonene, 10-butoxy-1-decene and 11-butoxy-1-undecene;

ethers having a branched hydrocarbon group, such as 7-methoxy-7-methyl-1-heptene, 8-methoxy-8-methyl-1-octene, 9-methoxy-8-methyl-1-nonene, 10-methoxy-9-methyl-1-decene, 11-methoxy-7-ethyl-1-undecene, 7-ethoxy-6-methyl-1-heptene, 8-ethoxy-6-ethyl-1-octene, 9-ethoxy-7-ethyl-1-nonene, 10-ethoxy-ethyl-1-decene, 11-ethoxy-8-propyl-1-undecene, 6-propoxy-6-methyl-1-hexene, 7-propoxy-7-methyl-1-heptene, 8-propoxy-8,8-dimethyl-1-octene, 9-propoxy-9-methyl-1-nonene, 10-propoxy-9,9-dimethyl-1-decene, 11-propoxy-10-methyl-1-undecene, 5-butoxy-5-ethyl-1-pentene, 6-butoxy-6,6-dimethyl-1-hexene, 7-butoxy-6-methyl-1-heptene, 8-butoxy-6-ethyl-1-octene, 9-butoxy-9-methyl-1-nonene, 10-butoxy-8,8-dimethyl-1-decene and 11-butoxy-8,9-diethyl-1-undecene;

dialkoxy-α-olefins, such as 9,10-dimethoxy-1-dodecene and 10,11-dimethoxy-1-undecene; and trialkoxy-α-olefins, such as 9,10,11-trimethoxy-1-undecene.

Examples of the polar group-containing monomer of the formula (7') wherein X' is —COOR include:

ω-alkenylcarboxylic acid esters, such as methyl 5-hexenoate, methyl 6-heptanoate, methyl 7-octanoate, methyl 8-nonanoate, methyl 9-decanoate, methyl 10-undecanoate, methyl 11-dodecanoate, ethyl 5-hexenoate, ethyl 6-heptanoate, ethyl 7-octanoate, ethyl 8-nonanoate, ethyl 9-decanoate, ethyl 10-undecanoate, ethyl 11-dodecanoate, isopropyl 5-hexenoate, isopropyl 6-heptanoate, isopropyl 7-octanoate, isopropyl 8-nonanoate, isopropyl 9-decanoate, isopropyl 10-undecanoate, isopropyl 11-dodecanoate, butyl 5-hexenoate, butyl 6-heptanoate, butyl 7-octanoate, butyl 8-nonanoate, butyl 9-decanoate, butyl 10-undecanoate, butyl 11-dodecanoate, pentyl 5-hexenoate, pentyl 6-heptanoate, pentyl 7-octanoate, pentyl 8-nonanoate, pentyl 9-decanoate, pentyl 10-undecanoate and pentyl 11-dodecanoate;

alkenylcarboxylic acid esters having a straight-chain hydrocarbon group, such as methyl 2-methyl-5-hexenoate, methyl 2-methyl-6-heptanoate, ethyl 2-methyl-7-octanoate, methyl 2-methyl-8-nonanoate, butyl 2-methyl-9-decanoate, ethyl 2-methyl-10-undecanoate, butyl 2-ethyl-5-hexenoate, ethyl 2-ethyl-6-heptanoate, isopropyl 2-ethyl-7-octanoate, ethyl 2-ethyl-8-nonanoate, methyl 2-ethyl-9-decanoate, ethyl 2-ethyl-10-undecanoate, methyl 2-propyl-5-hexenoate, methyl 2-propyl-6-heptanoate, ethyl 2-propyl-7-octanoate, methyl 2-propyl-9-decanoate, ethyl 2-propyl-10-undecanoate, methyl 2-butyl-7-octanoate, methyl 2-butyl-8-nonanoate, methyl 2-butyl-9-decanoate, and methyl 2-butyl-10-undecanoate; and alkenylcarboxylic acids having a branched hydrocarbon group, such as butyl 2-isopropyl-5-hexenoate, ethyl 2-isopropyl-6-heptanoate, methyl 2-isopropyl-7-octanoate, methyl 2-isopropyl-8-nonanoate, butyl 2-isopropyl-9-decanoate, methyl 2-isopropyl-10-undecanoate, methyl 2-isobutyl-5-hexenoate, methyl 2-t-butyl-6-heptanoate, ethyl 2-isopropyl-3-methyl-7-octanoate and propyl 3-isobutyl-3-methyl-9-decanoate.

Examples of polar group-containing monomers of the formula (7') wherein X' is —CRO include:

alkenylketone having a straight-chain hydrocarbon group, such as 5-hexene-2-one, 6-heptene-2-one, 7-octene-2-one, 8-nonene-2-one, 9-decene-2-one, 10-undecene-2-one, 11-dodecene-2-one, 6-heptene-3-one, 7-octene-3-one, 8-nonene-3-one, 9-decene-3-one, 10-undecene-3-one, 11-dodecene-3-one, 7-octene-4-one, 8-nonene-4-one, 9-decene-4-one, 10-undecene-4-one, 11-dodecene-4-one, 9-decene-5-one, 10-undecene-5-one and 11-dodecene-5-one;

alkenylketone having a branched hydrocarbon group, such as 3-methyl-6-heptene-2-one, 3-methyl-7-octene-2-one, 3-methyl-8-nonene-2-one, 3-methyl-9-decene-2-one, 3-ethyl-10-undecene-2-one, 3-methyl-11-dodecene-2-one, 2-methyl-7-octene-3-one, 2-methyl-8-nonene-3-one, 2-methyl-9-decene-3-one, 2-methyl-10-undecene-3-one, 3-methyl-7-octene-4-one, 3-ethyl-8-nonene-4-one, 3-ethyl-9-decene-4-one, 3-ethyl-10-undecene-4-one, 3-ethyl-11-dodecene-4-one, 3-ethyl-9-decene-5-one, 3-ethyl-10-undecene-5-one and 3-ethyl-11-dodecene-5-one;

alkenyldiketone, such as 8-nonene-2,4-one, 9-decene-2,4-one and 10-undecene-2,4-one; and alkenyltriketone, such as 10-undecene-2,4,6-one and 11-dodecene-2,4,6-one.

Examples of the polar group-containing monomer of the formula (7') wherein X' is —NR'R" (R' and R" may be the same or different and are a hydrogen atom and/or a hydrocarbon group) include:

ω-alkenylamines, such as 5-hexene amine, 6-heptene amine, 7-octene amine, 8-nonene amine, 9-decene amine, 10-undecene amine and 11-dodecene amine;

alkenylamines having a straight-chain hydrocarbon group, such as 2-methyl-5-hexene amine, 2-methyl-6-heptene amine, 2-methyl-7-octene amine, 2-methyl-8-nonene amine, 2-methyl-9-decene amine, 2-methyl-10-undecene amine, 2-methyl-11-dodecene amine, 2-ethyl-5-hexene amine, 2-ethyl-6-heptene amine, 2-ethyl-7-octene amine, 2-ethyl-8-nonene amine, 2-ethyl-9-decene amine, 2-ethyl-10-undecene amine, 2-propyl-5-hexene amine, 2-propyl-6-heptene amine, 2-propyl-5-hexene amine, 2-propyl-6-heptene amine, 2-propyl-7-octene amine, 2-propyl-8-nonene amine, 2-propyl-9-decene amine, 2-propyl-10-undecene amine, 2-butyl-5-hexene amine, 2-butyl-6-heptene amine, 2-butyl-7-octene amine, 2-butyl-8-nonene amine, 2-butyl-9-decene amine and 2-butyl-10-undecene amine; and alkenylamines having a branched hydrocarbon group, such as 2-isopropyl-5-hexene amine, 2-isopropyl-6-heptene amine, 2-isopropyl-7-octene amine, 2-isopropyl-8-nonene amine, 2-isopropyl-9-decene amine, 2-isopropyl-10-undecene amine, 2-isobutyl-5-hexene amine, 2-t-butyl-6-heptene amine, 2-isopropyl-3-methyl-7-octene amine, 2-methyl-3-isopropyl-8-nonene amine, 3-isobutyl-3-methyl-9-decene amine, 2,2-dimethyl-10-undecene amine and 2,3,3-trimethyl-11-dodecene amine.

Also employable are N-alkyl-ω-alkenylamines, such as N-methyl-5-hexene amine, N-methyl-6-heptene amine, N-methyl-7-octene amine, N-methyl-8-nonene amine, N-methyl-9-decene amine, N-methyl-10-undecene amine, N-methyl-11-dodecene amine, N-ethyl-5-hexene amine, N-ethyl-6-heptene amine, N-ethyl-7-octene amine, N-ethyl-8-nonene amine, N-ethyl-9-decene amine, N-ethyl-10-undecene amine and N-ethyl-11-dodecene amine;

N-alkylalkenylamines having a straight-chain hydrocarbon group, such as N-methyl-6-heptene-2-amine, N-ethyl-7-octene-2-amine, N-methyl-8-nonene-2-amine, N-ethyl-9-decene-2-amine, N-methyl-10-undecene-2-amine, N-ethyl-8-nonene-3-amine, N-methyl-9-decene-3-amine, N-ethyl-10-undecene-3-amine, N-ethyl-8-nonene-4-amine, N-methyl-9-decene-4-amine and N-ethyl-10-undecene-4-amine;

N-alkylalkenylamines having a branched hydrocarbon group, such as N-methyl-2-methyl-5-hexene amine, N-ethyl-2-methyl-6-heptene amine, N-methyl-2-methyl-7-octene amine, N-ethyl-2-methyl-8-nonene amine, N-ethyl-2-methyl-9-decene amine, N-methyl-2-methyl-10-undecene amine, N-methyl-2-ethyl-7-octene amine, N-ethyl-2-ethyl-9-decene amine and N-methyl-2-ethyl-10-undecene amine;

N,N-dialkyl-ω-alkenylamines, such as N,N-dimethyl-5-hexene amine, N,N-dimethyl-6-heptene amine, N,N-dimethyl-7-octene amine, N,N-dimethyl-8-nonene amine, N,N-dimethyl-9-decene amine, N,N-dimethyl-10-undecene amine, N,N-dimethyl-11-dodecene amine, N,N-diethyl-5-hexene amine, N,N-diethyl-6-heptene amine, N,N-diethyl-7-octene amine, N,N-diethyl-8-nonene amine, N,N-diethyl-9-decene amine, N,N-diethyl-10-undecene amine and N,N-diethyl-11-dodecene amine;

N,N-dialkylalkenylamines having a straight-chain hydrocarbon group, such as N,N-dimethyl-6-heptene-2-amine, N,N-diethyl-7-octene-2-amine, N,N-dimethyl-8-nonene-2-amine, N,N-diethyl-9-decene-2-amine, N,N-dimethyl-10-undecene-2-amine, N,N-diethyl-8-nonene-3-amine, N,N-dimethyl-9-decene-3-amine, N,N-diethyl-10-undecene-3-amine, N,N-diethyl-8-nonene-4-amine, N,N-dimethyl-9-decene-4-amine and N,N-diethyl-10-undecene-4-amine; and N,N-dialkylalkenylamines having a branched hydrocarbon group, such as N,N-dimethyl-2-methyl-5-hexene amine, N,N-diethyl-2-methyl-6-heptene amine, N,N-dimethyl-2-methyl-7-octene amine, N,N-diethyl-2-methyl-8-nonene amine, N,N-diethyl-2-methyl-9-decene amine, N,N-dimethyl-2-methyl-10-undecene amine, N,N-dimethyl-2-ethyl-7-octene amine, N,N-diethyl-2-ethyl-9-decene amine and N,N-dimethyl-2-ethyl-10-undecene amine.

Examples of polar group-containing monomers of the formula (7') wherein X' is —CONR$_2$ (R is a hydrogen atom or a hydrocarbon group) include:

ω-alkenylamides, such as 5-hexene amide, 6-heptene amide, 7-octene amide, 8-nonene amide, 9-decene amide, 10-undecene amide and 11-dodecene amide;

alkenylamides having a straight-chain hydrocarbon group, such as 6-heptene-2-amide, 7-octene-2-amide, 8-nonene-2-amide, 9-decene-2-amide, 10-undecene-2-amide, 8-nonene-3-amide, 9-decene-3-amide, 10-undecene-3-amide, 11-dodecene-3-amide, 8-nonene-4-amide, 9-decene-4-amide, 10-undecene-4-amide, 11-dodecene-4-amide, 9-decene-5-amide and 10-undecene-5-amide;

N-alkyl-ω-alkenylamides, such as N-methyl-5-hexene amide, N-methyl-6-heptene amide, N-methyl-7-octene amide, N-methyl-8-nonene amide, N-methyl-9-decene amide, N-methyl-10-undecene amide, N-methyl-11-dodecene amide, N-ethyl-5-hexene amide, N-ethyl-6-heptene amide, N-ethyl-7-octene amide, N-ethyl-8-nonene amide, N-ethyl-9-decene amide, N-ethyl-10-undecene amide and N-ethyl-11-dodecene amide;

N,N-dialkyl-ω-alkenylamides, such as N,N-dimethyl-5-hexene amide, N,N-dimethyl-6-heptene amide, N,N-dimethyl-7-octene amide, N,N-dimethyl-8-nonene amide, N,N-dimethyl-9-decene amide, N,N-dimethyl-10-undecene amide, N,N-dimethyl-11-dodecene amide, N,N-diethyl-5-hexene amide, N,N-diethyl-6-heptene amide, N,N-diethyl-7-octene amide, N,N-diethyl-8-nonene amide, N,N-diethyl-9-decene amide, N,N-diethyl-10-undecene amide and N,N-diethyl-11-dodecene amide;

alkenylamides having a branched hydrocarbon group, such as 2-methyl-5-hexene amide, 2-methyl-6-heptene amide, 2-methyl-7-octene amide, 2-methyl-8-nonene amide, 2-methyl-9-decene amide, 2-methyl-10-undecene amide, 2-ethyl-5-hexene amide, 2-ethyl-6-heptene amide, 2-ethyl-7-octene amide, 2-ethyl-8-nonene amide, 2-ethyl-9-decene amide, 2-ethyl-10-undecene amide, 2-ethyl-11-dodecene amide, 2-propyl-5-hexene amide, 2-propyl-6-heptene amide, 2-propyl-7-octene amide, 2-propyl-8-nonene amide, 2-propyl-9-decene amide, 2-propyl-10-undecene amide, 2-propyl-11-dodecene amide, 2-butyl-5-hexene amide, 2-butyl-6-heptene amide, 2-butyl-7-octene amide, 2-butyl-8-nonene amide, 2-butyl-9-decene amide and 2-butyl-10-undecene amide;

N,N-dialkylalkenylamides having a branched hydrocarbon group, such as N,N-dimethyl-2-methyl-5-hexene amide, N,N-diethyl-2-methyl-6-heptene amide, N,N-dimethyl-2-methyl-7-octene amide, N,N-diethyl-2-methyl-8-nonene amide, N,N-diethyl-2-methyl-9-decene amide, N,N-diethyl-2-methyl-10-undecene amide, N,N-dimethyl-2-ethyl-7-octene amide, N,N-diethyl-2-ethyl-9-decene amide and N,N-dimethyl-2-ethyl-10-undecene amide;

alkenyldiamides, such as 6-heptene-1,2-diamide, 7-octene-1,2-diamide, 8-nonene-1,2-diamide, 9-decene-1,3-diamide, 10-undecene-1,3-diamide and 11-dodecene amide; and alkenyltriamides, such as 9-decene-1,2,3-triamide and 10-undecene-1,2,3-triamide.

Examples of the polar group-containing monomer of the formula (7') wherein X' is —OCOR(R is a hydrocarbon group) are:

carboxylic acid-ω-alkenyl, such as formic acid-5-hexenyl, formic acid-6-heptenyl, formic acid-7-octenyl, formic acid-8-nonenyl, formic acid-9-decenyl, formic acid-10-undecenyl, formic acid-11-dodecenyl, acetic acid-5-hexenyl, acetic acid-6-heptenyl, acetic acid-7-octenyl, acetic acid-8-nonenyl, acetic acid-9-decenyl, acetic acid-10-undecenyl, acetic acid-11-dodecenyl, propionic acid-5-hexenyl, propionic acid-6-heptenyl, propionic acid-7-octenyl, propionic acid-8-nonenyl, propionic acid-9-decenyl, propionic acid-10-undecenyl, propionic acid-11-dodecenyl, butyric acid-5-hexenyl, butyric acid-6-heptenyl, butyric acid-7-octenyl, butyric acid-8-nonenyl, butyric acid-9-decenyl, butyric acid-10-undecenyl and butyric acid-11-dodecenyl; and carboxylic acid-ω-alkenyl having a branched hydrocarbon group, such as formic acid-2-methyl-5-hexenyl, formic acid-2-methyl-6-heptenyl, formic acid-3-ethyl-7-octenyl, formic acid-2-methyl-8-nonenyl, formic acid-3-ethyl-9-decenyl, formic acid-2-methyl-10-undecenyl, formic acid-2-methyl-11-dodecenyl, acetic acid-2-methyl-5-hexenyl, acetic acid-2-methyl-6-heptenyl, acetic acid-3-ethyl-7-octenyl, acetic acid-2-methyl-8-nonenyl, acetic acid-3-ethyl-9-decenyl, acetic acid-2-methyl-10-undecenyl, acetic acid-3-ethyl-11- dodecenyl, propionic acid-2-methyl-5-hexenyl, propionic acid-2-methyl-6-heptenyl, propionic acid-2-methyl-7-octenyl, propionic acid-2-methyl-8-nonenyl, propionic acid-2-methyl-9-decenyl, propionic acid-2-methyl-10-undecenyl, propionic acid-2-methyl-11-dodecenyl, butyric acid-2-methyl-5-hexenyl, butyric acid-2-methyl-6-heptenyl, butyric acid-2-methyl-7-octenyl, butyric acid-3-methyl-8-nonenyl, butyric acid-3-methyl-9-decenyl, butyric acid-4-methyl-10-undecenyl and butyric acid-3-methyl-11-dodecenyl.

Examples of the polar group-containing monomer of the formula (7') wherein X' is —CN include:

ω-alkenylnitriles, such as 5-hexanenitrile, 6-heptenenitrile, 7-octenenitrile, 8-nonenenitrile, 9-decenenitrile, 10-undecenenitrile and 11-dodecenenitrile;

alkenylnitriles having a straight-chain hydrocarbon group, such as 2-methyl-5-hexanenitrile, 2-methyl-6-heptenenitrile, 2-methyl-7-octenenitrile, 2-methyl-8-nonenenitrile, 2-methyl-9-decenenitrile, 2-methyl-10-undecenenitrile, 2-methyl-11-dodecenenitrile, 2-ethyl-5-hexanenitrile, 2-ethyl-6-heptenenitrile, 2-ethyl-7-octenenitrile, 2-ethyl-8-nonenenitrile, 2-ethyl-9-decenenitrile, 2-ethyl-10-undecenenitrile, 2-propyl-5-hexanenitrile, 2-propyl-6-heptenenitrile, 2-propyl-7-octenenitrile, 2-propyl-8-nonenenitrile, 2-propyl-9-decenenitrile, 2-propyl-10-undecenenitrile, 2-butyl-5-hexanenitrile, 2-butyl-6-heptenenitrile, 2-butyl-7-octenenitrile, 2-butyl-8-nonenenitrile, 2-butyl-9-decenenitrile and 2-butyl-10-undecenenitrile;

alkenylnitriles having a branched hydrocarbon group, such as 2-isopropyl-5-hexanenitrile, 2-isopropyl-6-heptenenitrile, 2-isopropyl-7-octenenitrile, 2-isopropyl-8-nonenenitrile, 2-isopropyl-9-decenenitrile, 2-isopropyl-10-undecenitrile, 2-isobutyl-5-hexanenitrile, 2-t-butyl-6-heptenenitrile, 2-isopropyl-3-methyl-7-octenenitrile, 2-methyl-3-isopropyl-8-nonenitrile, 3-isobutyl-3-methyl-9-decenenitrile, 2,2-dimethyl-10-undecenenitrile and 2,3,3-trimethyl-11-dodecenenitrile;

alkenyldinitriles, such as 10-undecene-1,2-dinitrile and 11-dodecene-1,2-dinitrile; and alkenyltrinitriles, such as 10-undecene-1,2,3-trinitrile.

Examples of the polar group-containing monomers of the formula (7') wherein X' is —OH include:

ω-alkenylalcohols, such as 4-pentene-1-ol, 5-hexene-1-ol, 6-heptene-1-ol, 7-octene-1-ol, 8-nonene-1-ol, 9-decene-1-ol, 10-undecene-1-ol and 11-dodecene-1-ol;

alcohols having a straight-chain hydrocarbon group, such as 5-hexene-2-ol, 6-heptene-2-ol, 7-octene-2-ol, 8-nonene-2-ol, 9-decene-2-ol, 10-undecene-2-ol, 6-heptene-3-ol, 7-octene-3-ol, 8-nonene-3-ol, 9-decene-3-ol, 10-undecene-3-ol, 11-dodecene-3-ol, 7-octene-4-ol, 8-nonene-4-ol, 9-decene-4-ol, 10-undecene-4-ol, 8-nonene-5-ol, 9-decene-5-ol and 10-undecene-5-ol;

alcohols having a branched hydrocarbon group, such as 2-ethyl-5-hexene-1-ol, 3-methyl-6-heptene-1-ol, 3-methyl-7-octene-1-ol, 4-methyl-8-nonene-1-ol, 3-ethyl-9-decene-1-ol, 2-methyl-10-undecene-2-ol, 2,2-dimethyl-7-octene-1-ol, 3-ethyl-2-methyl-8-nonene-1-ol, 2,2,3-trimethyl-9-decene-1-ol and 2,3,3,4-tetramethyl-10-undecene-2-ol;

diols, such as 9-decene-1,2-diol, 10-undecene-1,2-diol, 11-dodecene-1,2-diol and 11-dodecene-1,2-diol; and triols, such as 10-undecene-1,2,3-triol.

Examples of the polar group-containing monomer of the formula (7') wherein X' is —CHO include:

ω-alkenylaldehydes, such as 5-hexenal, 6-heptenal, 7-octenal, 8-nonenal, 9-decenal, 10-undecenal and 11-dodecenal;

alkenylaldehydes having a straight-chain hydrocarbon group, such as 2-methyl-5-hexenal, 2-methyl-6-heptenal, 2-methyl-7-octenal, 2-methyl-8-nonenal, 2-methyl-9-decenal, 2-methyl-10-undecenal, 2-methyl-11-dodecenal, 2-ethyl-5-hexenal, 2-ethyl-6-heptenal, 2-ethyl-7-octenal, 2-ethyl-8-nonenal, 2-ethyl-9-decenal, 2-ethyl-10-undecenal, 2-propyl-5-hexenal, 2-propyl-6-heptenal, 2-propyl-7-octenal, 2-propyl-8-nonenal, 2-propyl-9-decenal, 2-propyl-10-undecenal, 2-butyl-5-hexenal, 2-butyl-6-heptenal, 2-butyl-7-octenal, 2-butyl-8-nonenal, 2-butyl-9-decenal and 2-butyl-10-undecenal; and alkenylaldehydes having a branched hydrocarbon group, such as 2-isopropyl-5-hexenal, 2-isopropyl-6-heptenal, 2-isopropyl-7-octenal, 2-isopropyl-8-nonenal, 2-isopropyl-9-decenal, 2-isopropyl-10-undecenal, 2-isobutyl-5-hexenal, 2-t-butyl-6-heptenal, 2-isopropyl-3-methyl-7-octenal, 2-methyl-3-isopropyl-8-nonenal, 3-isobutyl-3-methyl-9-decenal, 2,2-dimethyl-10-undecenal and 2,3,3-trimethyl-11-dodecenal.

Examples of the polar group-containing monomers of the formula (7') wherein X' is —COOH include:

ω-alkenylcarboxylic acids, such as acryl acid, 5-hexanoic acid, 6-heptenoic acid, 7-octenoic acid, 8-nonenoic acid, 9-decanoic acid, 10-undecanoic acid and 11-dodecanoic acid;

alkenylcarboxylic acids having a straight-chain hydrocarbon group, such as 2-methyl-5-hexanoic acid, 2-methyl-6-heptenoic acid, 2-methyl-7-octenoic acid, 2-methyl-8-nonenoic acid, 2-methyl-9-decanoic acid, 2-methyl-10-undecanoic acid, 2-methyl-11-dodecanoic acid, 2-ethyl-5-hexanoic acid, 2-ethyl-6-heptenoic acid, 2-ethyl-7-octenoic acid, 2-ethyl-8-nonenoic acid, 2-ethyl-9-decanoic acid, 2-ethyl-10-undecanoic acid, 2-propyl-5-hexanoic acid, 2-propyl-6-heptenoic acid, 2-propyl-7-octenoic acid, 2-propyl-8-nonenoic acid, 2-propyl-9-decanoic acid, 2-propyl-10-undecanoic acid, 2-butyl-5-hexanoic acid, 2-butyl-6-heptenoic acid, 2-butyl-7-octenoic acid, 2-butyl-8-nonenoic acid, 2-butyl-9-decanoic acid and 2-butyl-10-undecanoic acid; and alkenylcarboxylic acids having a branched hydrocarbon group, such as 2-isopropyl-5-hexanoic acid, 2-isopropyl-6-heptenoic acid, 2-isopropyl-7-octenoic acid, 2-isopropyl-8-nonenoic acid, 2-isopropyl-9-decanoic acid, 2-isopropyl-10-undecanoic acid, 2-isobutyl-5-hexanoic acid, 2-t-butyl-6-heptenoic acid, 2-isopropyl-3-methyl-7-octenoic acid, 2-methyl-3-isopropyl-8-nonenoic acid, 3-isobutyl-3-methyl-9-decanoic acid, 2,2-dimethyl-10-undecanoic acid and 2,3,3-trimethyl-11-dodecanoic acid.

Examples of the polar group-containing monomer of the formula (7') wherein X' is an epoxy group include:

ω-alkenylepoxides, such as 5-hexene epoxide, 6-heptene epoxide, 7-octene epoxide, 8-nonene epoxide, 9-decene epoxide, 10-undecene epoxide and 11-dodecene epoxide; and alkenylepoxides having a branched hydrocarbon group, such as 2-methyl-5-hexene epoxide, 2-methyl-6-heptene epoxide, 2-methyl-7-octene epoxide, 2-methyl-8-nonene epoxide, 2-methyl-9-decene epoxide and 2-methyl-10-undecene epoxide.

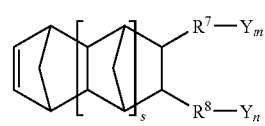

(8)

wherein $R^7$, $R^8$, Y, m, n and s have the same meanings as those of $R^7$, $R^8$, Y, m, n and s, respectively, in the formula (6).

In the above formula (8), $R^7$ and $R^8$ are preferably a direct bond or a hydrocarbon group of 1 to 10 carbon atoms and Y is preferably —OR, —COOR, —CRO, —$NR_2$, an epoxy group,

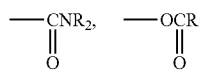

(R is a hydrogen atom or a hydrocarbon group), —C≡N, —OH, —COOH or —$NH_2$.

Examples of polar group-containing monomer represented by the formula (8) wherein Y is —OR(R is a hydrogen atom or a hydrocarbon group) include bicyclic monoethers such as

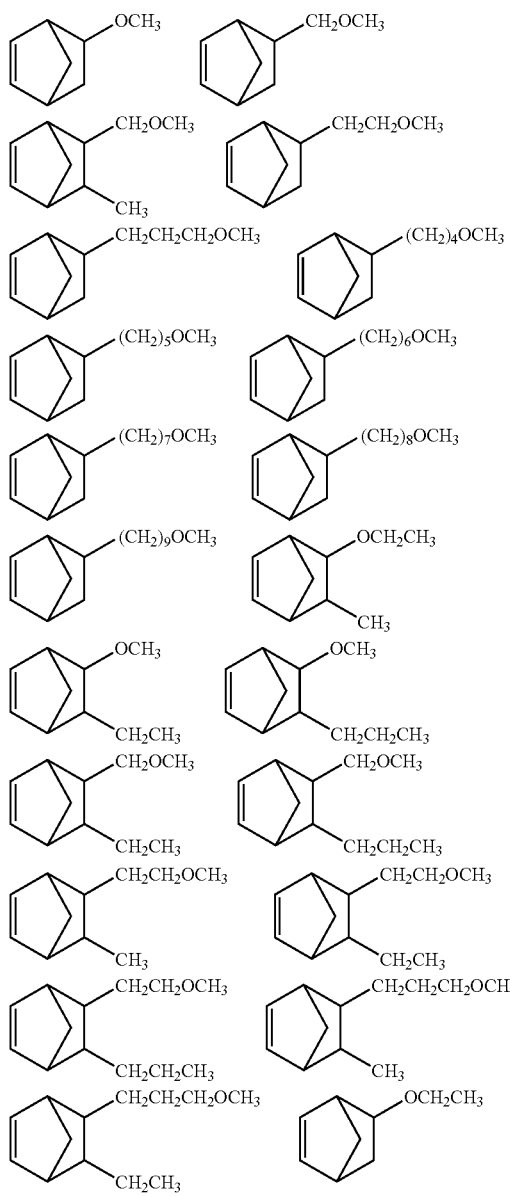

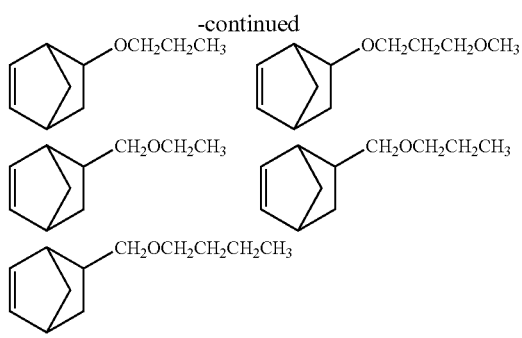

bicyclic diethers such as

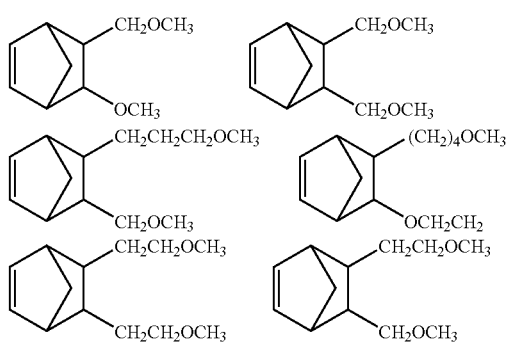

tetracyclic monoethers such as

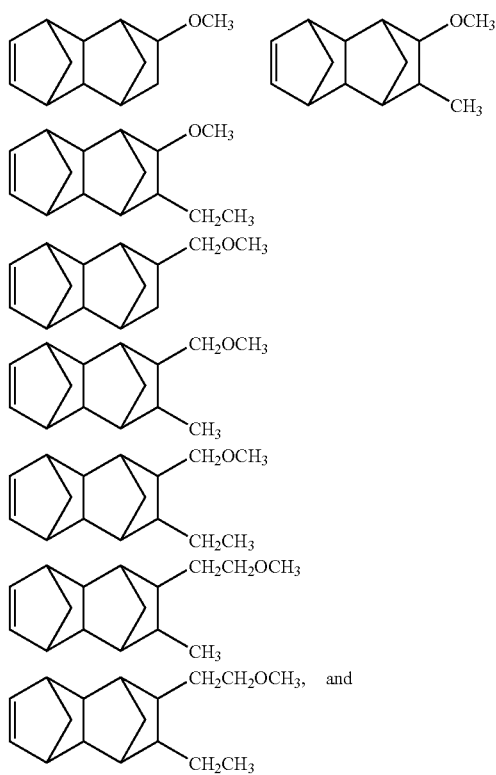

tetracyclic diethers such as
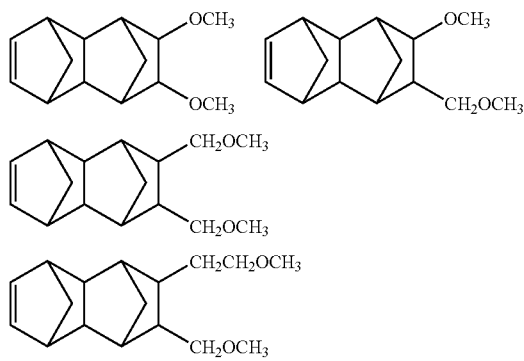
Examples of polar group-containing monomer represented by the formula (8) wherein Y is —COOR(R is a hydrogen atom or a hydrocarbon group) include
bicyclic carboxylic acid esters such as
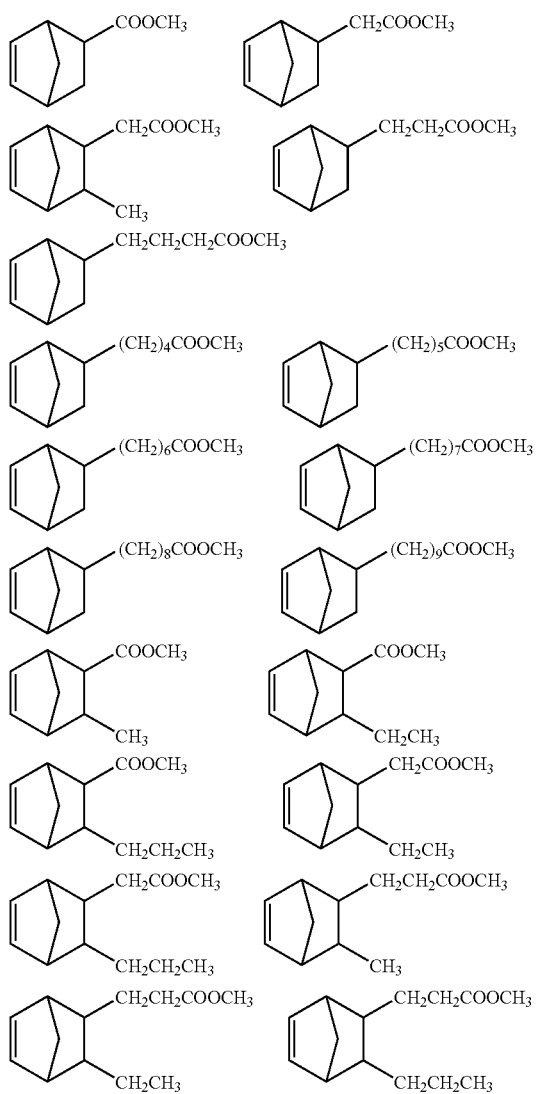
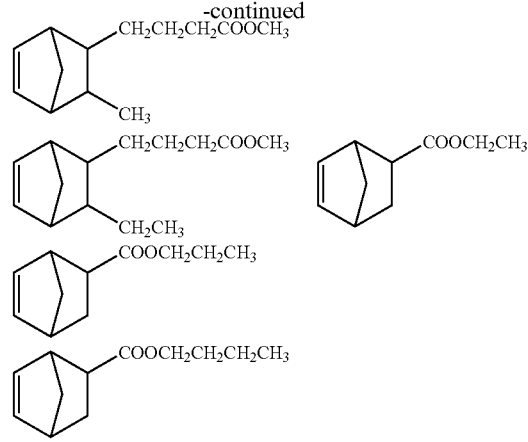
bicyclic dicarboxylic acid esters such as
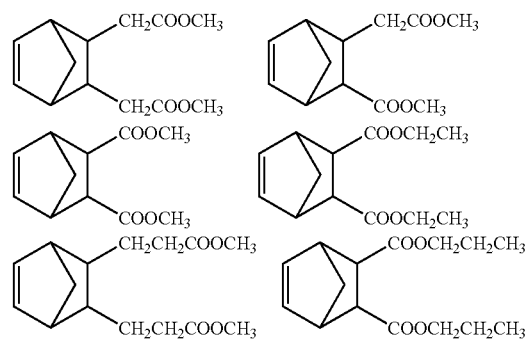
tetracyclic monocarboxylic acid esters such as
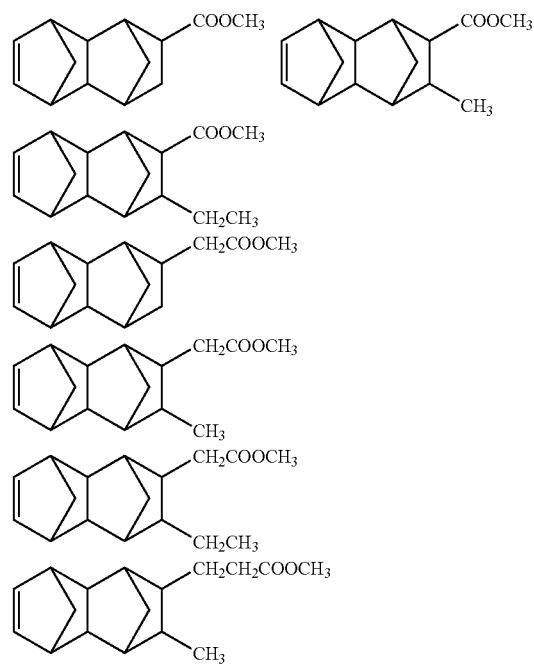

tetracyclic dicarboxylic acid esters such as
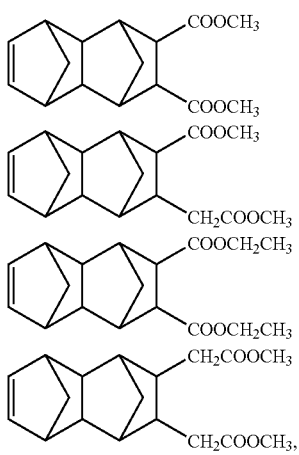
acid anhydrides such as
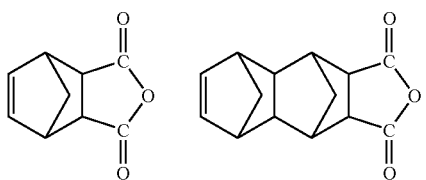
Examples of polar group-containing monomer represented by the formula (8) wherein Y is —CRO(R is a hydrocarbon group) include
bicyclic ketones such as
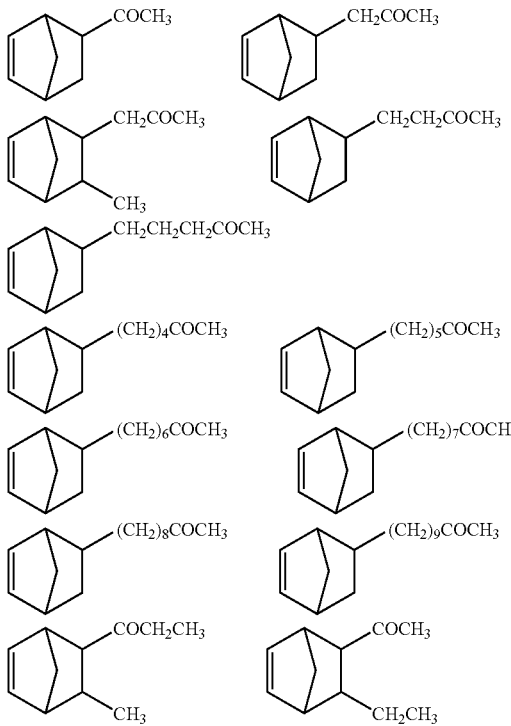
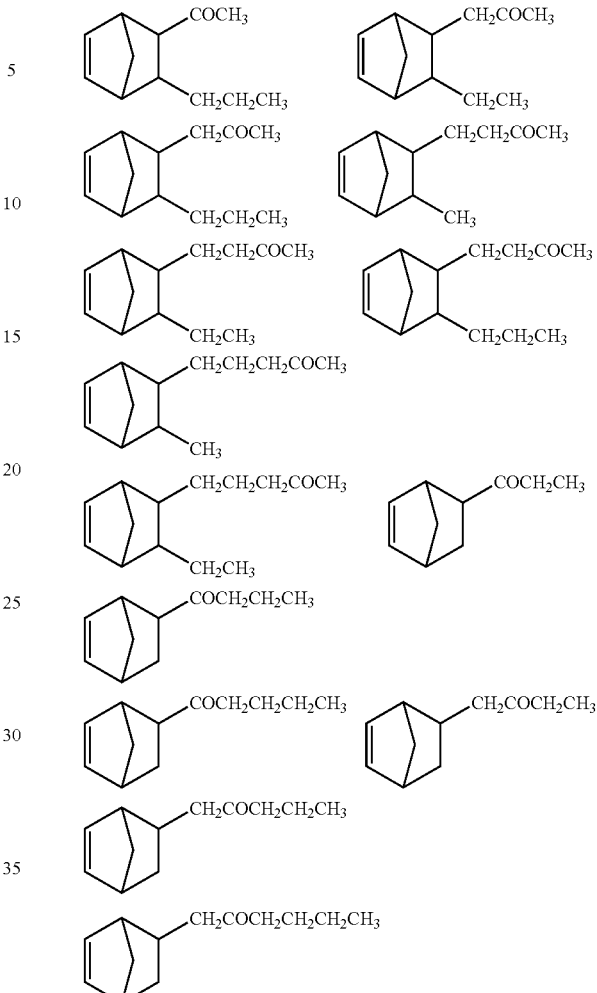
bicyclic diketones such as
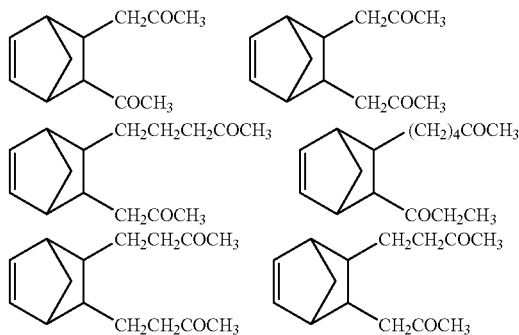
tetracyclic ketones such as
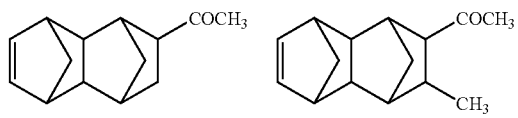

-continued
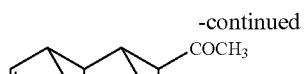
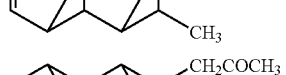
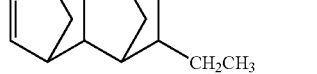
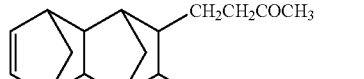
tetracyclic diketones such as
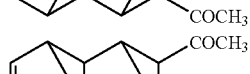
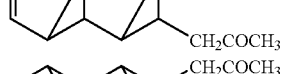
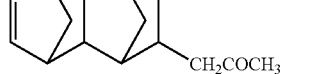
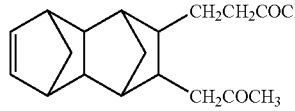
Examples of polar group-containing monomer represented by the formula (8) wherein Y is —NR$_2$ (R is a hydrogen atom or a hydrocarbon group) include
bicyclic amines such as
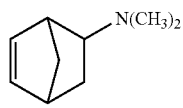 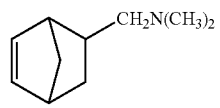
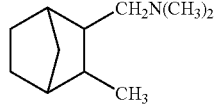 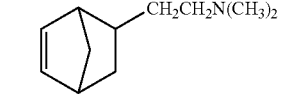
-continued
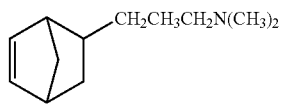
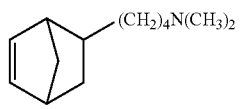 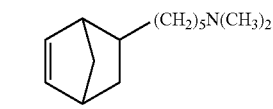
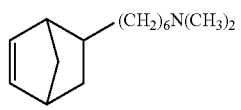 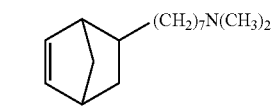
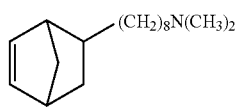 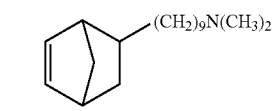
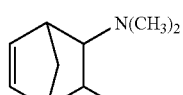 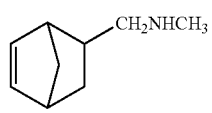
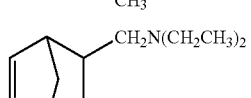 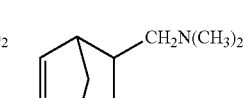
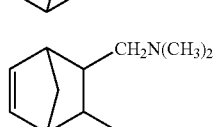 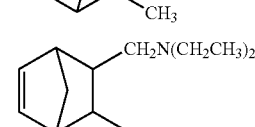
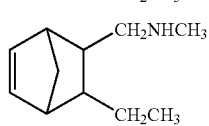 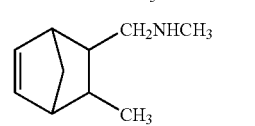
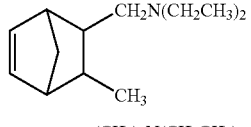 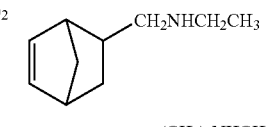
bicyclic diamines such as
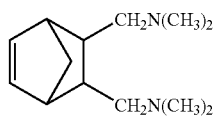 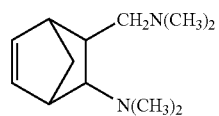
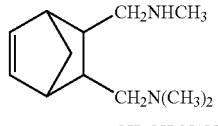 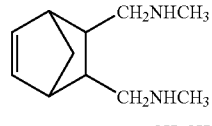
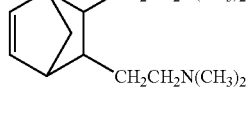 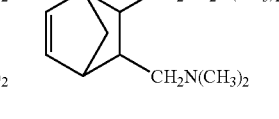

tetracyclic amines such as
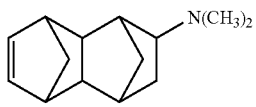 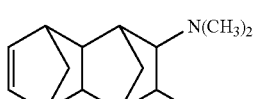
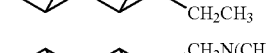
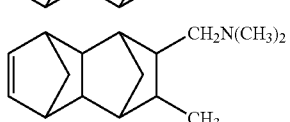
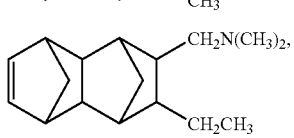 and
tetracyclic diamines such as
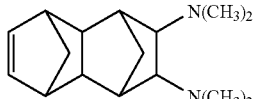
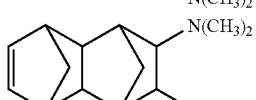
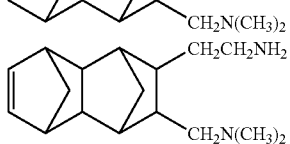
Examples of polar group-containing monomer represented by the formula (8) wherein Y is
(R is a hydrogen atom or a hydrocarbon group) include
bicyclic amides such as
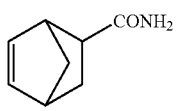 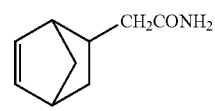
-continued
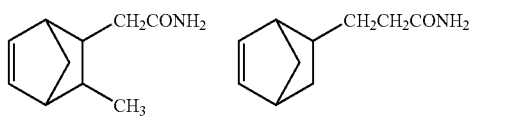
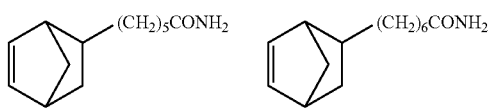
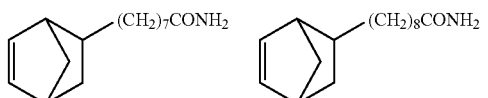
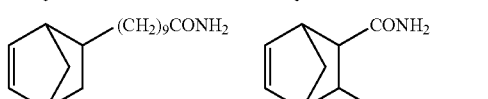
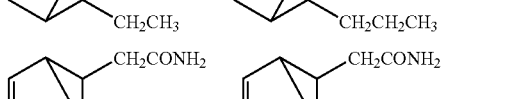
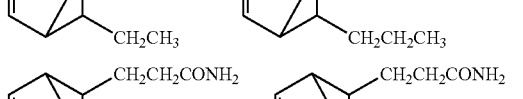
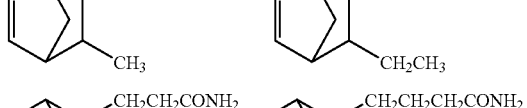
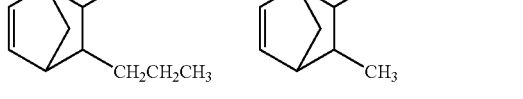
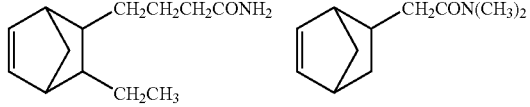
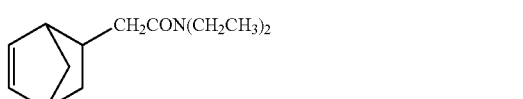
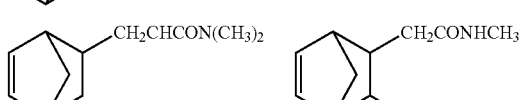
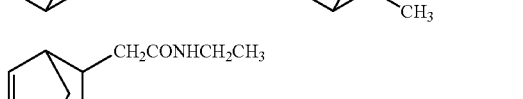
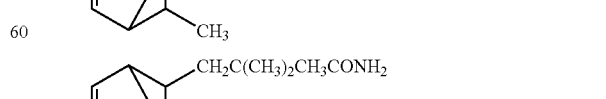

bicyclic diamides such as
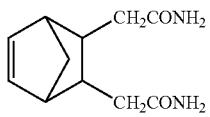 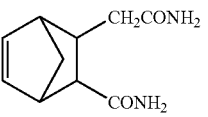
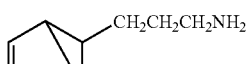 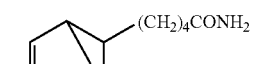
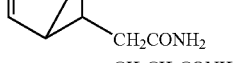 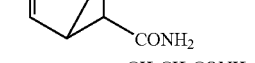
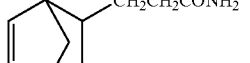 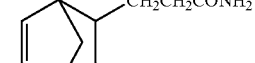
tetracyclic amides such as
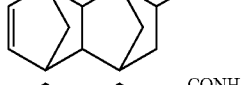
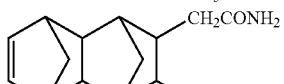 and
tetracyclic diamides such as
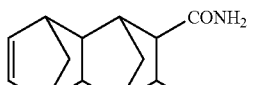
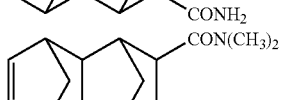
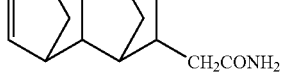
-continued
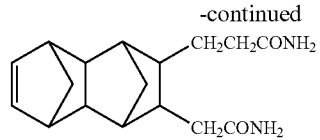
Examples of polar group-containing monomer represented by the formula (8) wherein Y is
(R is a hydrogen atom or a hydrocarbon group) include bicyclic esters such as
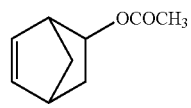 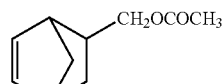
 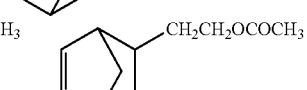
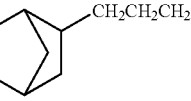 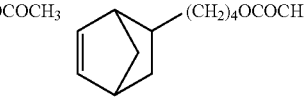
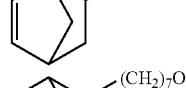 
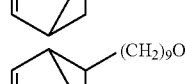 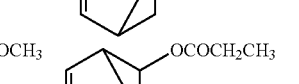
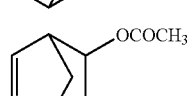 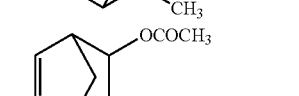
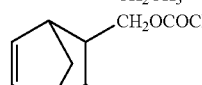 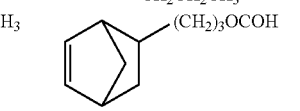
 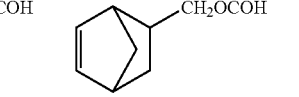
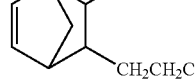 
 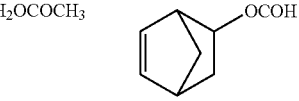

-continued
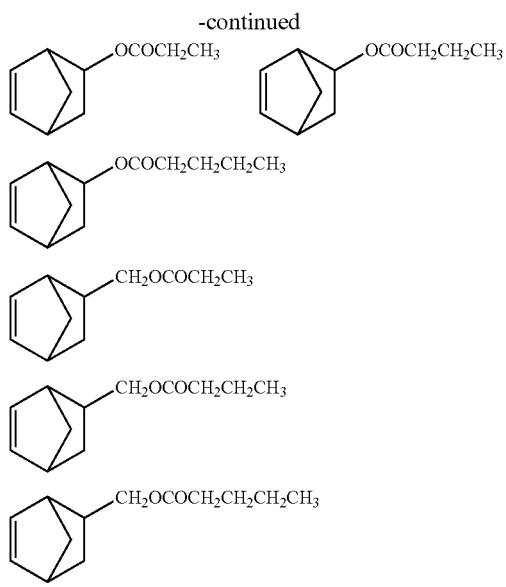
bicyclic diesters such as
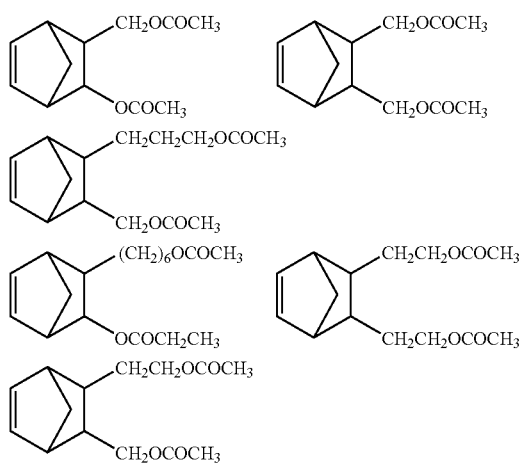
tetracyclic esters such as
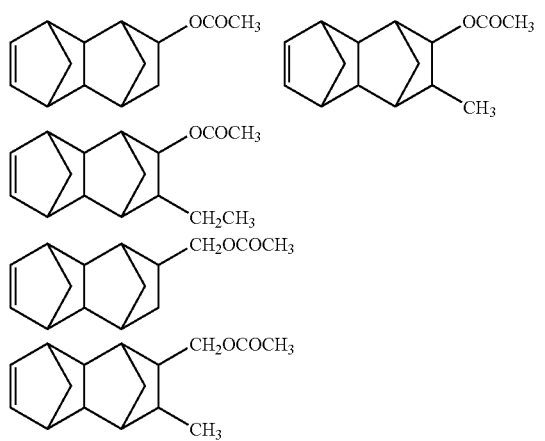
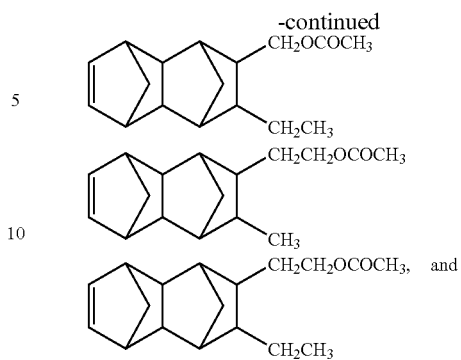
tetracyclic diesters such as
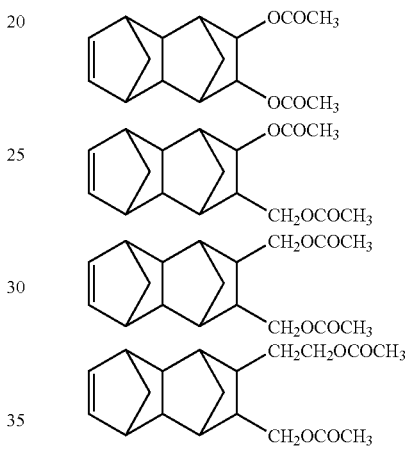
Examples of polar group-containing monomer represented by the formula (8) wherein Y is —C≡N include
bicyclic nitrites such as
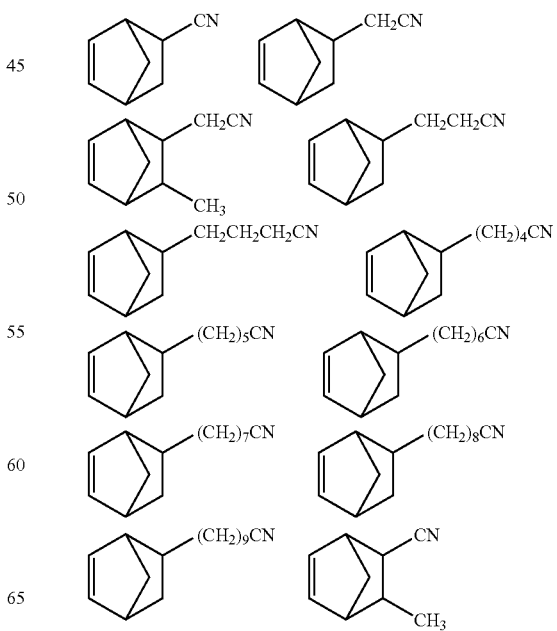

-continued
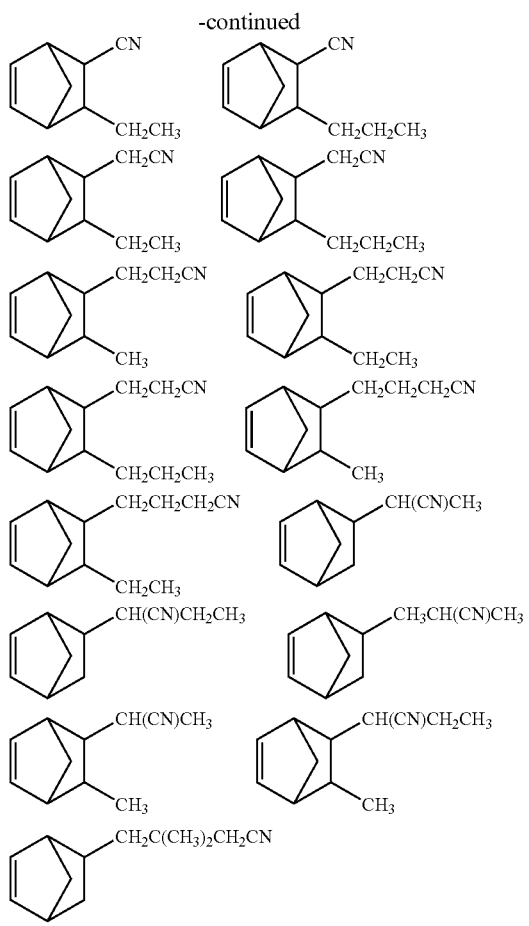
bicyclic dinitriles such as
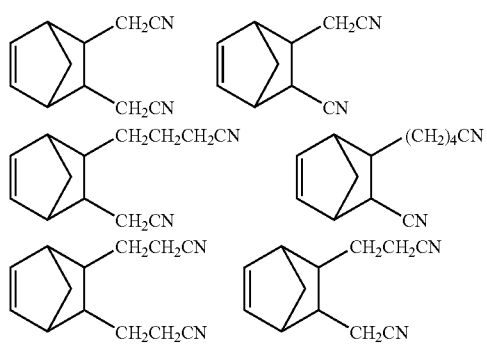
tetracyclic nitrites such as
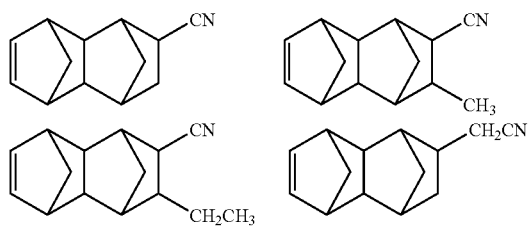
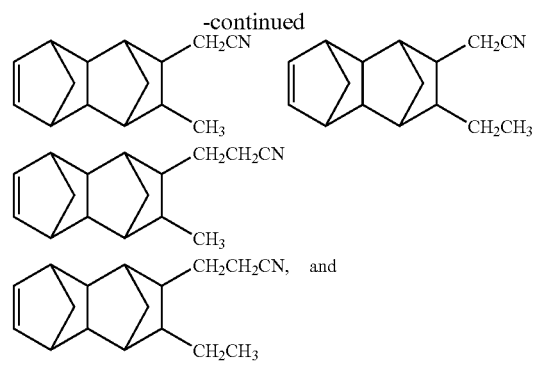
tetracyclic dinitriles such as
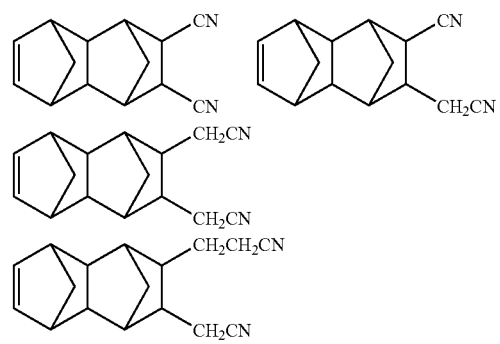
Examples of polar group-containing monomer represented by the formula (8) wherein Y is —OH include
bicyclic alcohols such as
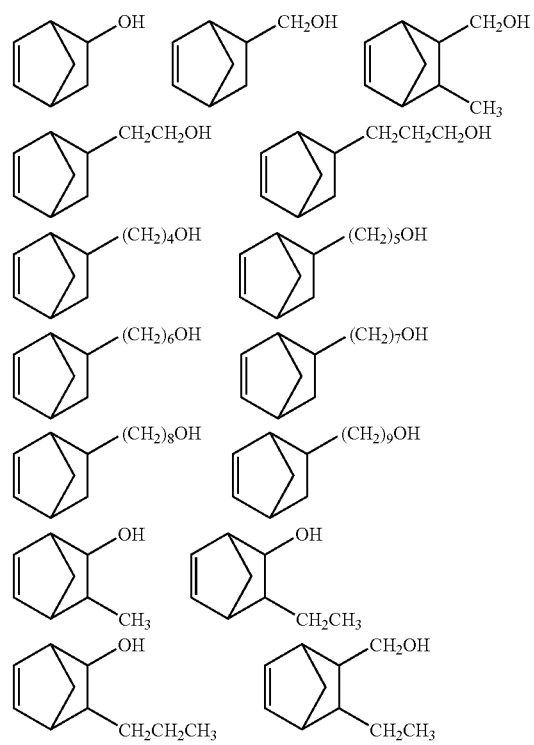

-continued
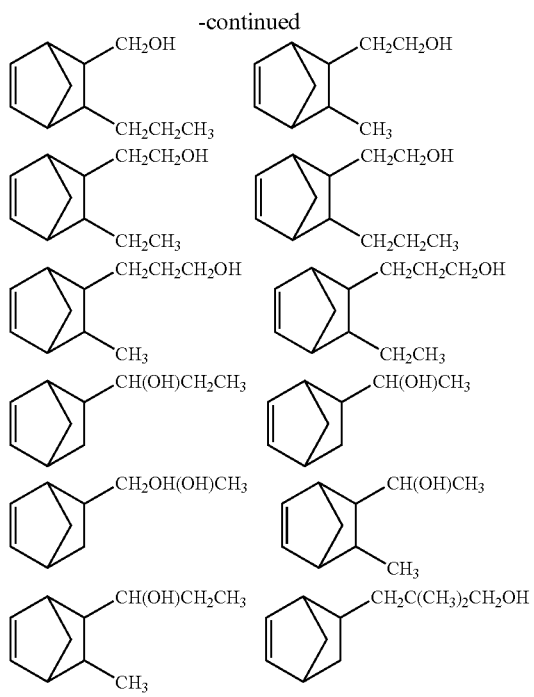
bicyclic diols such as
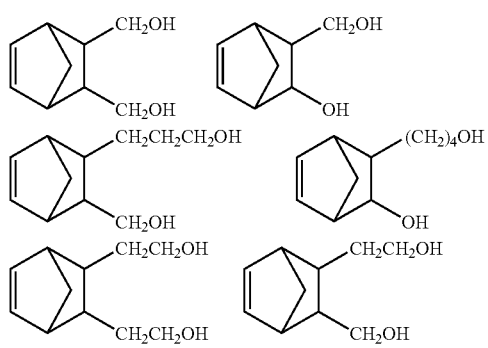
tetracyclic alcohols such as
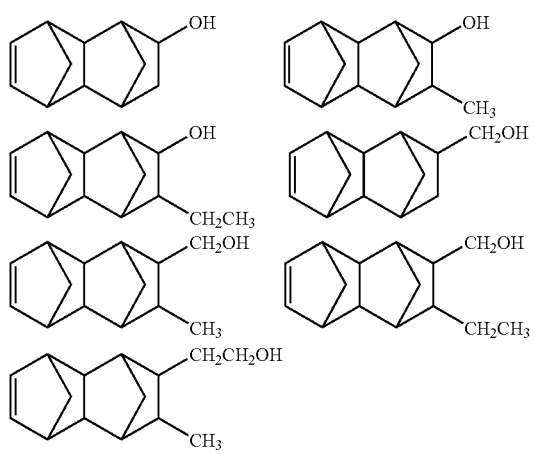
-continued
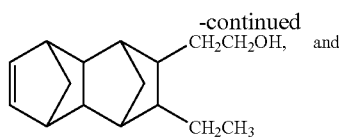
tetracyclic diols such as
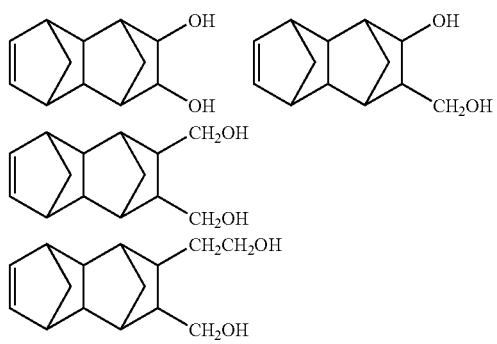
Examples of polar group-containing monomer represented by the formula (8) wherein Y is —COOH include
bicyclic monocarboxylic acids such as
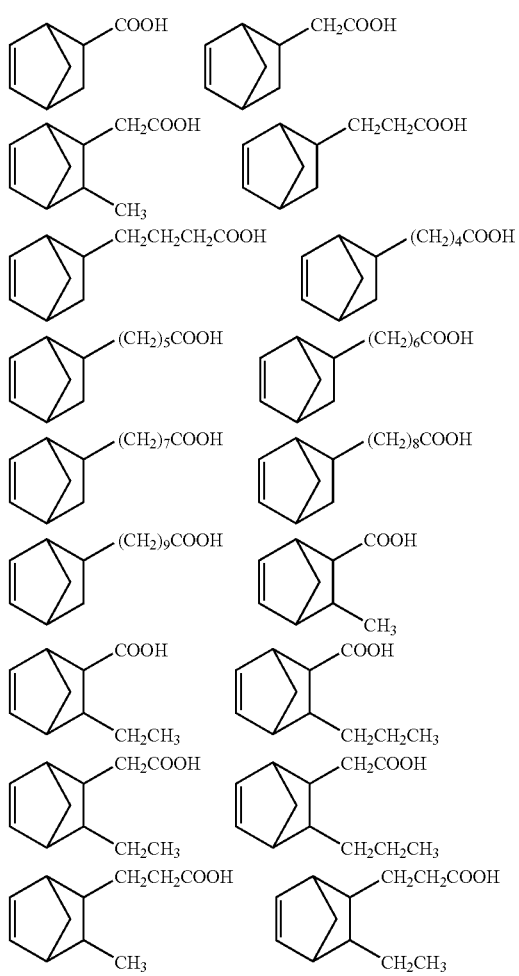

-continued
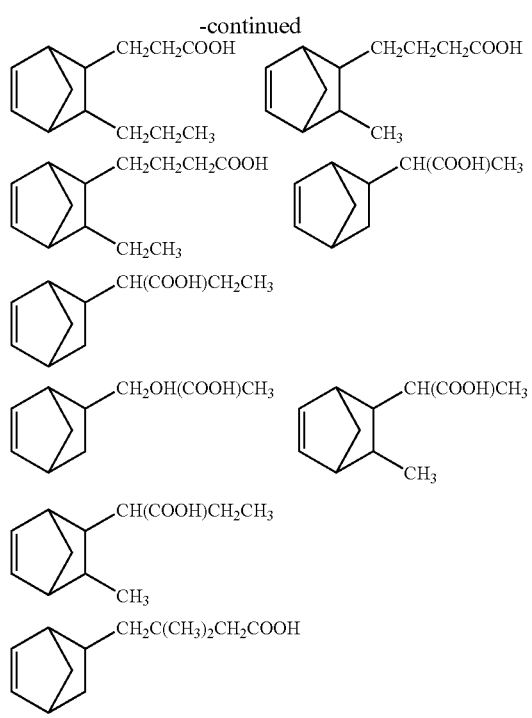
bicyclic dicarboxylic acids such as
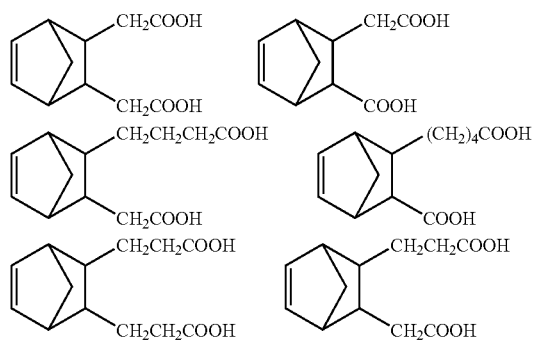
tetracyclic carboxylic acids such as
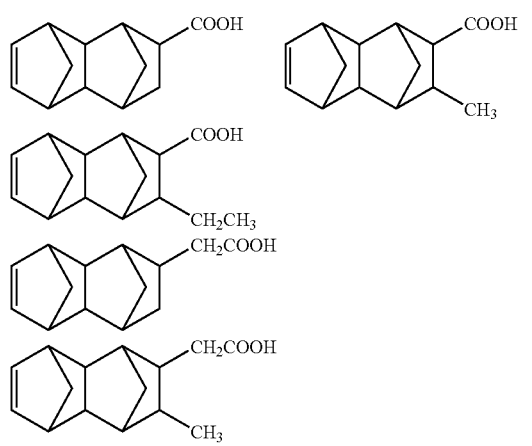
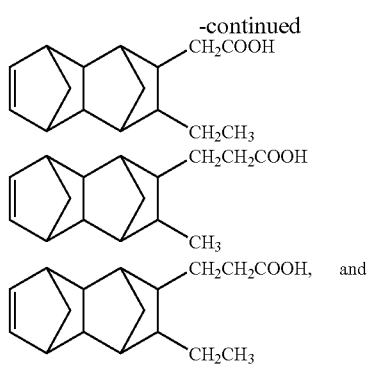
tetracyclic dicarboxylic acids such as
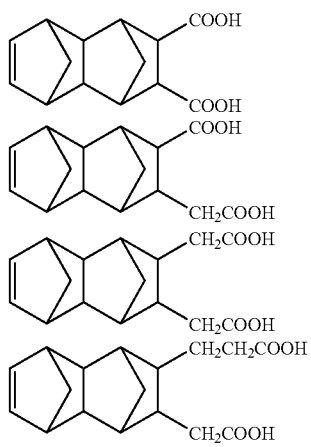
Examples of polar group-containing monomer represented by the formula (8) wherein Y is —CHO include
bicyclic aldehydes such as
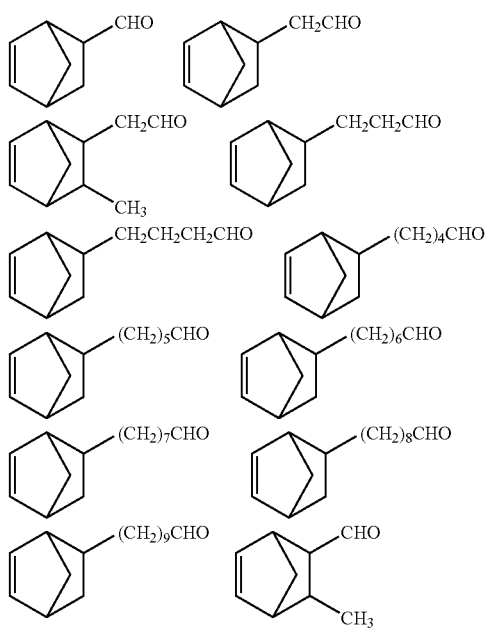

-continued
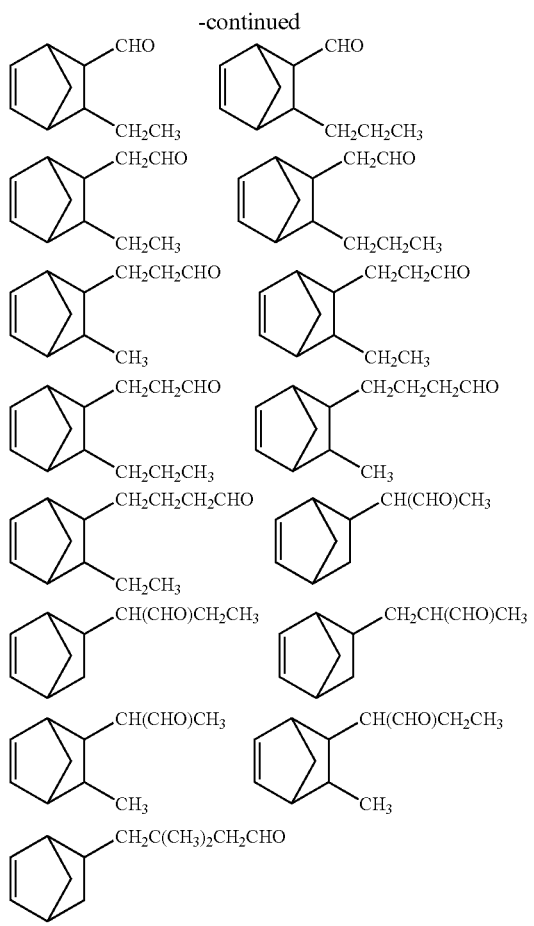
bicyclic dialdehydes such as
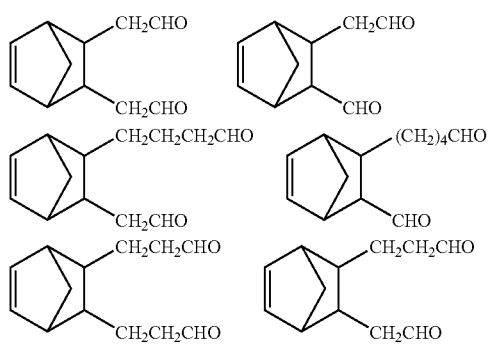
tetracyclic aldehydes such as
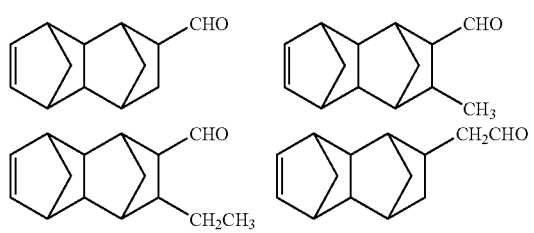
-continued
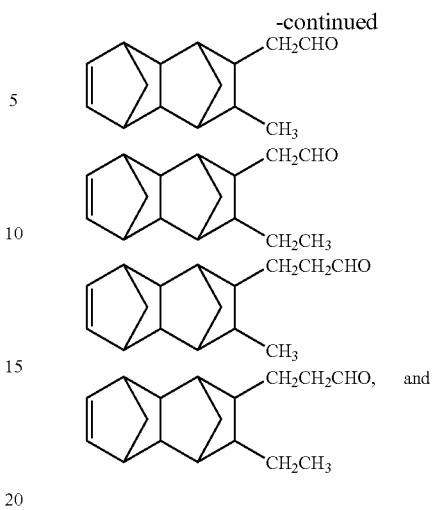
tetracyclic dialdehydes such as
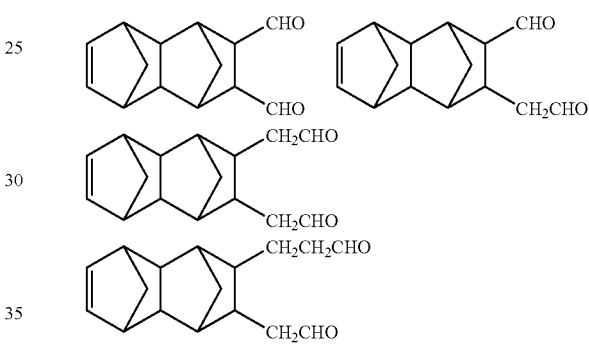
Examples of polar group-containing monomer represented by the formula (8) wherein Y is —NH$_2$ include
bicyclic monoamines such as
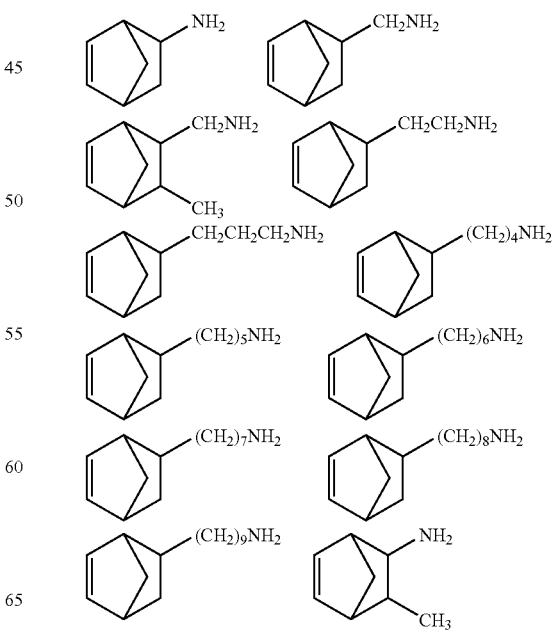

-continued

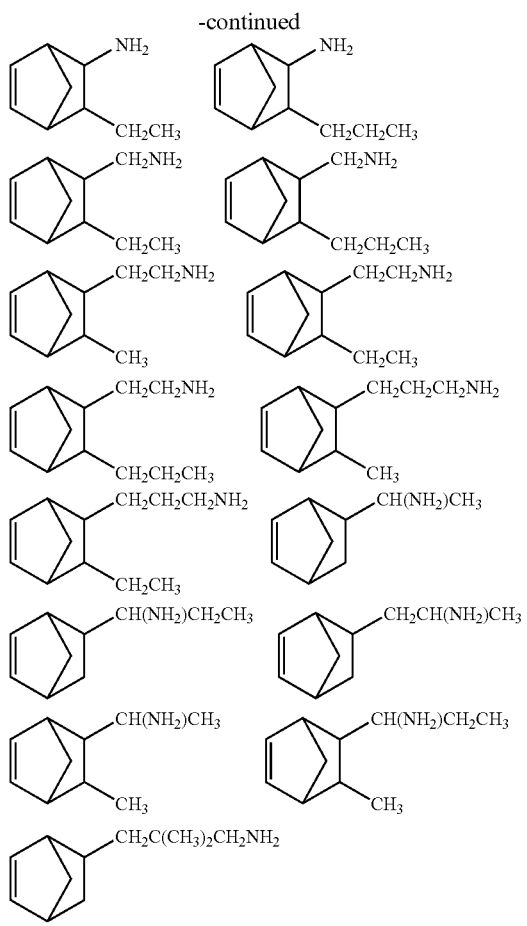

bicyclic diamines such as

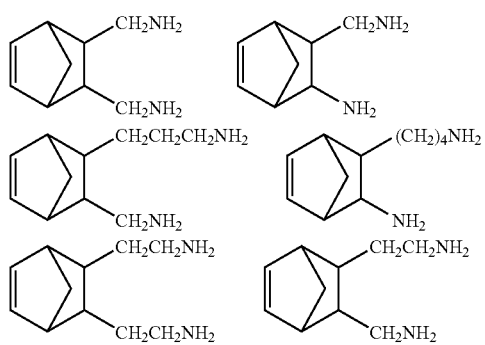

tetracyclic monoamines such as

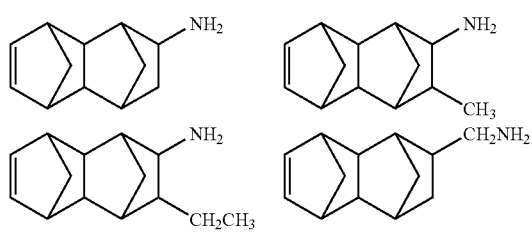

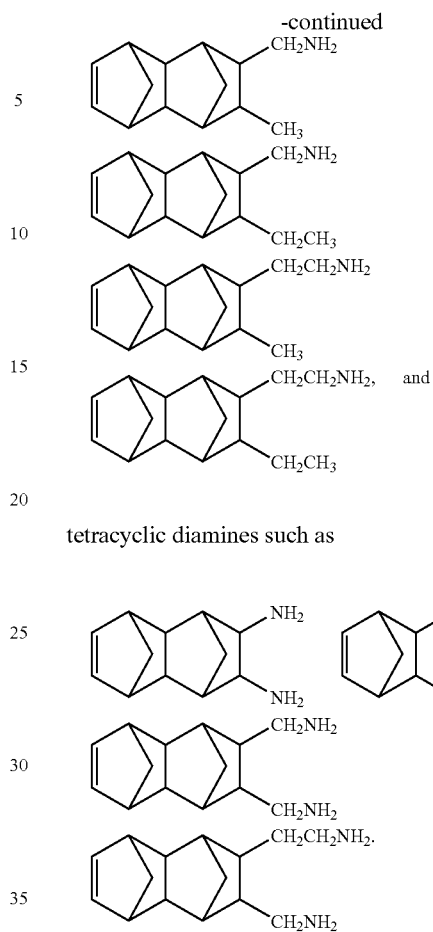

tetracyclic diamines such as

In this invention, it is also possible to copolymerize polyenes with the α-olefins and the polar group-containing monomers. Exemplified polyenes are olefins having an aliphatic ring or an aromatic ring, such as cyclopentene, cycloheptene, 2-methyl-1,4,5,8-dimethano-1,2,3,4,4a,5,8,8a-octahydronaphthalene, styrene and vinylcyclohexane; chain or cyclic diene, such as butadiene, isoprene, 1,4-hexadiene, dicyclopentadiene, 5-ethylidene-2-norbornene, 7-methyl-1,6-octadiene; chain or cyclic triene, such as 6,10-dimethyl-1,5,9-undecatriene and 5,9-dimethyl-1,4,8-decatriene; and chain or cyclic tetraene, such as 6,10,14-trimethyl-1,5,9,13-pentadecatetraene and 5,9,13-trimethyl-1,4,8,12-tetradecatetraene.

In one process for preparing a polar group-containing copolymer according to the first embodiment of the invention, at least one olefin selected from the above-mentioned α-olefin of 2 to 20 carbon atoms is polymerized with a polar group-containing monomer represented by the formula (7) and/or a polar group-containing monomer represented by the formula (8) in the presence of the aforesaid olefin polymerization catalyst under the following polymerization conditions.

When the polar group-containing monomer is such a monomer that X in the formula (7) is —OH and Y in the formula (8) is —OH, it is preferable to use a transition metal compound (A) represented by any one of the formulas (11) to (16), more preferably a transition metal compound (A) represented by any one of the formulas (11) to (15). When the polar group-containing monomer is such a monomer that X in the formula (7) is —NR'R" (R" and R" may be the same as or different from each other and are a hydrogen atom and an alkyl group) and Y in the formula (8) is —NR$_2$ (R is hydrogen or an alkyl group), it is preferable to use a transition metal compound (A) represented by any one of the formulas (11) to (16), more preferably a transition metal compound (A) represented by any one of the formulas (11), (12), (14), (15) and (16).

In the process for preparing a polar group-containing copolymer according to the first embodiment of the invention, a polar group can be selectively introduced to a terminal end of a polymer chain or inside of the main chain by the selection of type of polar group and reaction conditions. Further, characteristics of the polar group-containing polymer can be diversified by using two or more kinds of olefins at polymerization.

Deactivation of the catalyst by the functional group-containing monomer can be made as low as possible by previously contacting the transition metal compound (A) and/or the polar group-containing monomer with the organoaluminum compound.

To contact the polar group-containing monomers with the organoaluminum compound, there are a method of previously contacting them prior to adding them to the polymerization system and a method of adding the two components successively to the polymerization system, and any of these methods is useful.

To contact the transition metal compounds with the organoaluminum compound, there are a method of previously contacting them prior to adding them to the polymerization system and a method of adding the two components successively to the polymerization system similarly to the above, and any of these methods is useful.

In the polymerization, the transition metal compound (A) is used in an amount of usually about 0.00005 to 0.1 mmol, preferably about 0.0001 to 0.05 mmol, in terms of the transition metal atom, based on 1 liter of the polymerization volume.

The organoaluminum oxy-compound (B-1) is used in such an amount that the amount of the aluminum atom becomes usually about 1 to 10,000 mol, preferably 10 to 5,000 mol, based on 1 mol of the transition metal atom.

The ionizing ionic compound (B-2) is used in such an amount that the amount of the boron atom becomes usually about 0.5 to 500 mol, preferably 1 to 100 mol, based on 1 mol of the transition metal atom.

The organoaluminum compound (B-3) is used in such an amount that the amount of the aluminum atom becomes usually about 10 to 500 mol, preferably about 20 to 200 mol, based on 1 mol of the transition metal atom.

When the organoaluminum oxy-compound (B-1) and the organoaluminum compound (B-3) are used in combination, the organoaluminum compound (B-3) is used when needed in an amount of usually about 0 to 200 mol, preferably about 0 to 100 mol, based on 1 mol of the aluminum atom in the organoaluminum oxy-compound (B-1). When the ionizing ionic compound (B-2) and the organoaluminum compound (B-3) are used in combination, the organoaluminum compound (B-3) is used when needed in an amount of usually about 0 to 1000 mol, preferably about 0 to 500 mol, based on 1 mol of the boron atom in the ionizing ionic compound (B-2).

When the organosilicon compound (C) is used, this compound is used in an amount of 1 to 10000 mol, preferably 10 to 5000 mol, based on 1 mol of the transition metal atom.

When the dialkylzinc compound (D) is used, this compound is used in an amount of 1 to 10000 mol, preferably 10 to 5000 mol, based on 1 mol of the transition metal atom.

When hydrogen is used, the hydrogen is used in an amount of $10^{-5}$ to 1 mol, preferably $10^{-4}$ to $10^{-1}$ mol, based on 1 mol of the total of the olefin and the polar group-containing monomer used in the polymerization.

Although there is no specific limitation on the ratio between the polar group-containing monomer and the transition metal atom, the polar group-containing monomer/transition metal atom molar ratio is in the range of usually 1/100 to 10000/1, preferably 1/10 to 5000/1.

Copolymerization of an olefin and the polar group-containing monomer can be carried out by any of a liquid phase polymerization process such as suspension polymerization or solution polymerization, a gas phase polymerization process and a high-pressure process.

In the liquid phase polymerization, an inert hydrocarbon medium is used, and examples thereof include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; and halogenated hydrocarbons, such as ethylene chloride, chlorobenzene and dichloromethane. The olefin itself can be sued as a solvent. These solvents may be used in combination.

When the suspension polymerization is conducted, the polymerization temperature is usually in the range of −50 to 100° C., preferably 0 to 90° C.; when the solution polymerization is conducted, the polymerization temperature is usually in the range of 0 to 300° C., preferably 20 to 250° C.; when the gas phase polymerization is conducted, the polymerization temperature is usually in the range of 0 to 120° C., preferably 20 to 100° C.; and when the high-pressure process is conducted, the polymerization temperature is usually in the range of 50 to 1000° C., preferably 100 to 500° C. The polymerization pressure is usually in the range of atmospheric pressure to 100 kg/cm$^2$, preferably atmospheric pressure to 50 kg/cm$^2$. In case of the high-pressure process, the pressure is usually in the range of 100 to 10000 kg/cm$^2$, preferably 500 to 5000 kg/cm$^2$. The polymerization reaction can be carried out by any of batchwise, semi-continuous and continuous processes. Further, the polymerization can be carried out in two or more steps under different reaction conditions.

The molecular weight of the resulting polar group-containing olefin copolymer can be regulated by controlling the amount of hydrogen, the organosilicon compound or the dialkylzinc compound or changing the polymerization temperature or the polymerization pressure.

In the process for preparing a polar group-containing copolymer according to the first embodiment of the invention, an α-olefin of 2 to 20 carbon atoms and a polar group-containing monomer represented by the following formula (7") and/or (8') are copolymerized in the presence of a catalyst comprising:

(A) the transition metal compound, and (B) at least one compound selected from:

(B-1) an organoaluminum oxy-compound, (B-2) a compound which reacts with the compound (A) to form an ion pair, and (B-3) an organoaluminum compound.

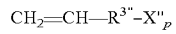

(7")

wherein R³" is a hydrocarbon group of 2 or more carbon atoms, X" is —OR, —COOR, —CRO, —C(O)NR₂, —OC(O)R (R is a hydrogen atom or a hydrocarbon group), an epoxy group, —C≡N or —NH₂, and p is a positive integer of 1 to 3.

The polar group-containing monomer represented by the formula (7") is, for example, the polar group-containing monomer represented by the aforesaid formula (7') wherein X is other group than —OH and —NR₂.

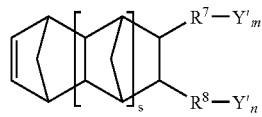
(8')

wherein R⁷ is a direct bond or an aliphatic hydrocarbon group of 1 or more carbon atoms, R⁸ is a hydrogen atom, a direct bond or an aliphatic hydrocarbon group of 1 or more carbon atoms, Y' is —OR, —COOR, —CRO, —C(O)NR₂, —OC(O)R (R is a hydrogen atom or a hydrocarbon group), an epoxy group, —C≡N or —NH₂, m and n are each an integer of 0 to 2, m+n is not 0, and s is 0 or 1.

The polar group-containing monomer represented by the formula (8') is, for example, the polar group-containing monomer represented by the aforesaid formula (8) wherein Y is other group than —OH and —NR₂.

Such polar group-containing monomers can be used singly or in combination of two or more kinds.

The polymerization conditions are the same as used above.

Next, the process for preparing a polar group-containing olefin copolymer according to the second embodiment of the invention is described.

The process for preparing a polar group-containing olefin copolymer according to the second embodiment of the invention comprises copolymerizing at least one α-olefin selected from α-olefins of 2 to 20 carbon atoms, a macromonomer represented by the following formula (9), and at least one polar group-containing monomer selected from a polar group-containing monomer represented by the above formula (7) and a polar group-containing monomer represented by the above formula (8) in the presence of the olefin polymerization catalyst comprising:

(A) a compound of a transition metal selected from Group 3 (including lanthanoid and actinoid) to Group 10 of the periodic table, preferably a transition metal compound represented by any one of the above formulas (11) to (15), and (B) at least one compound selected from:
(B-1) an organoaluminum oxy-compound,
(B-2) a compound which reacts with the compound (A) to form an ion pair, and
(B-3) an organoaluminum compound;

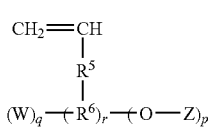
(9)

wherein R⁵, R⁶, Z, W, p, q and r have the same meanings as those of R⁵, R⁶, Z, W, p, q and r in the formula (4), respectively.

When a polar group-containing monomer represented by the formula (7) is used as the polar group-containing monomer in the invention, the aforesaid second embodiment of the polar group-containing olefin copolymer of the invention is obtained.

Examples of macromonomers represented by the formula (9) include the following macromonomers.

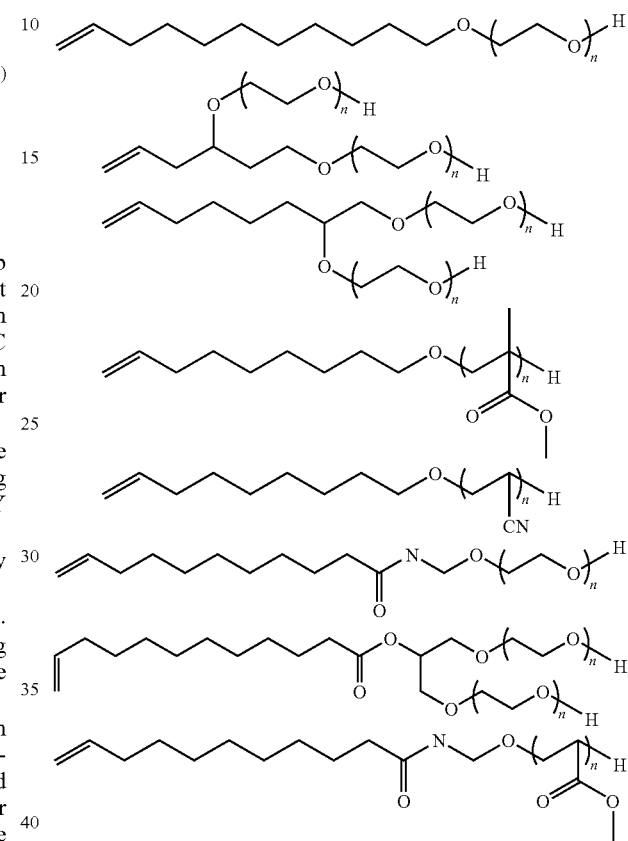

The macromonomer can be prepared by the use of, for example, the polar monomer (later described), and specifically, the macromonomer can be prepared by producing a polymer segment from the polar group of the polar group-containing monomer through anionic polymerization, ring-opening polymerization or polycondensation similarly to the following process (i).

The copolymerization of the α-olefin of 2 to 20 carbon atoms and the macromonomer represented by the formula (9) is carried out using the same olefin polymerization catalyst as used in the copolymerization of an α-olefin of 2 to 20 carbon atoms and the polar group-containing monomer represented by the formula (10) in the following process (i) under the same conditions as used in the copolymerization of an α-olefin of 2 to 20 carbon atoms and the polar group-containing monomer represented by the formula (10) in the following process (i).

In the process for preparing a polar group-containing copolymer according to the second embodiment of the invention, at least one olefin selected from the above-mentioned α-olefin of 2 to 20 carbon atoms, a macromonomer represented by the formula (9) and at least one polar group-containing monomer selected from the group consisting of a polar group-containing monomer represented by the formula (7) and a polar group-containing monomer represented by the formula (8) are polymerized in the presence of the aforesaid olefin polymerization catalyst under the same polymerization conditions as in the process for preparing the polar group-containing olefin copolymer according to the first embodiment.

The process for preparing a polar group-containing olefin copolymer according to the third embodiment of the invention comprises copolymerizing at least one α-olefin selected from α-olefins of 2 to 20 carbon atoms, a polar group-containing monomer represented by the following formula (10) (also referred to as a "polar group-containing monomer (10)" hereinafter), and optionally, a polar group-containing monomer represented by the above formula (8) in the presence of the catalyst comprising:

(A) a compound of a transition metal selected from Group 3 (including lanthanoid and actinoid) to Group 10 of the periodic table, and (B) at least one compound selected from:
(B-1) an organoaluminum oxy-compound,
(B-2) a compound which reacts with the compound (A) to form an ion pair, and
(B-3) an organoaluminum compound, and then conducting any one of the following steps (i) and (ii), to prepare a branched type polar group-containing olefin copolymer;

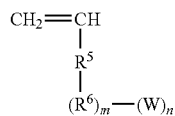

(10)

wherein $R^5$, $R^6$, m, W and n have the same meanings as those of $R^5$, $R^6$, m, W and n in the formula (5), respectively;

(i) from the W portion of the copolymerized polar group-containing monomer (10), a Z portion is formed by anionic polymerization, ring-opening polymerization or polycondensation;

(ii) the W portion of the copolymerized polar group-containing monomer (10) is allowed to react with a terminal functional group of a polymer obtained by anionic polymerization, ring-opening polymerization and polycondensation.

The process (i) is described below in more detail.

In the process (i), an α-olefin of 2 to 20 carbon atoms and the polar group-containing monomer (10), and optionally a polar group-containing monomer represented by the formula (8) are copolymerized to prepare a functional group-containing olefin copolymer, and then from the polar group contained in the W portion of the copolymerized functional group-containing monomer, a polymer segment (Z) is formed by anionic polymerization, ring-opening polymerization or polycondensation.

When a polymer segment is formed from the polar group contained in any one of W portions in the constituent unit of the functional group-containing olefin copolymer, said constituent unit being derived from the polar group-containing monomer (10), this constituent unit becomes the constituent unit (4). When no polymer segment is formed from the polar group contained in any one of W portions in the constituent unit of the polar group-containing olefin copolymer, said constituent unit being derived from the polar group-containing monomer (10), this constituent unit becomes the constituent unit (5).

Examples of the α-olefins of 2 to 20 carbon atoms include ethylene. propylene, 1-butene, 2-butene, 1-pentene, 3-methyl-1-butene, 1-hexene, 4-methyl-1-pentene, 3-methyl-1-pentene, 3-ethyl-1-pentene, 4,4-dimethyl-1-pentene, 4-methyl-1-hexene, 4,4-dimethyl-1-hexene, 4-ethyl-1-hexene, 3-ethyl-1-hexene, 1-octene, 1-decene, 1-dodecene, 1-tetradecene, 1-hexadecene, 1-octadecene and 1-eicosene. Of these, preferable are at least two α-olefins selected from ethylene, propylene, 1-butene, 4-methyl-1-pentene, 1-hexene and 1-octene.

Examples of the polar group-containing monomer (10) include:

compounds represented by the formula (10) wherein W is a hydroxyl group, specifically ω-alkenylalcohols, such as 4-pentene-1-ol, 5-hexene-1-ol, 6-heptene-1-ol, 7-octene-1-ol, 8-nonene-1-ol, 9-decene-1-ol, 10-undecene-1-ol and 11-dodecene-1-ol;

alcohols having straight-chain hydrocarbon groups, such as 5-hexene-2-ol, 6-heptene-2-ol, 7-octene-2-ol, 8-nonene-2-ol, 9-decene-2-ol, 10-undecene-2-ol, 6-heptene-3-ol, 7-octene-3-ol, 8-nonene-3-ol, 9-decene-3-ol, 10-undecene-3-ol, 11-dodecene-3-ol, 7-octene-4-ol, 8-nonene-4-ol, 9-decene-4-ol, 10-undecene-4-ol, 8-nonene-5-ol, 9-decene-5-ol and 10-undecene-5-ol;

alcohols having branched hydrocarbon groups, such as 2-ethyl-5-hexene-1-ol, 3-methyl-6-heptene-1-ol, 3-methyl-7-octene-1-ol, 4-methyl-8-nonene-1-ol, 3-ethyl-9-decene-1-ol, 2-methyl-10-undecene-2-ol, 2,2-dimethyl-7-octene-1-ol, 3-ethyl-2-methyl-8-nonene-1-ol, 2,2,3-trimethyl-9-decene-1-ol and 2,3,3,4-tetramethyl-10-undecene-2-ol; diols, such as 9-decene-1,2-diol, 10-undecene-1,2-diol, 11-dodecene-1,2-diol and 11-dodecene-1,2-diol; and triols, such as 10-undecene-1,2,3-triol; and compounds represented by the formula (10) wherein W is an epoxy group, specifically ω-alkenylepoxides, such as 5-hexene epoxide, 6-heptene epoxide, 7-octene epoxide, 8-nonene epoxide, 9-decene epoxide, 10-undecene epoxide and 11-dodecene epoxide; and ω-alkenylepoxides having branched hydrocarbon groups, such as 2-methyl-5-hexene epoxide, 2-methyl-6-heptene epoxide, 2-methyl-7-octene epoxide, 2-methyl-8-nonene epoxide, 2-methyl-9-decene epoxide and 2-methyl-10-undecene epoxide.

Further, examples of the polar group-containing monomer (10) also include the following compounds.

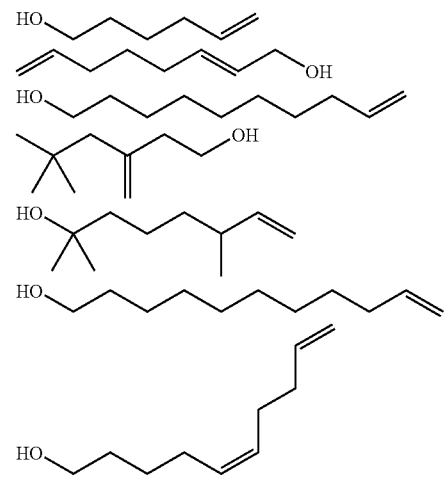

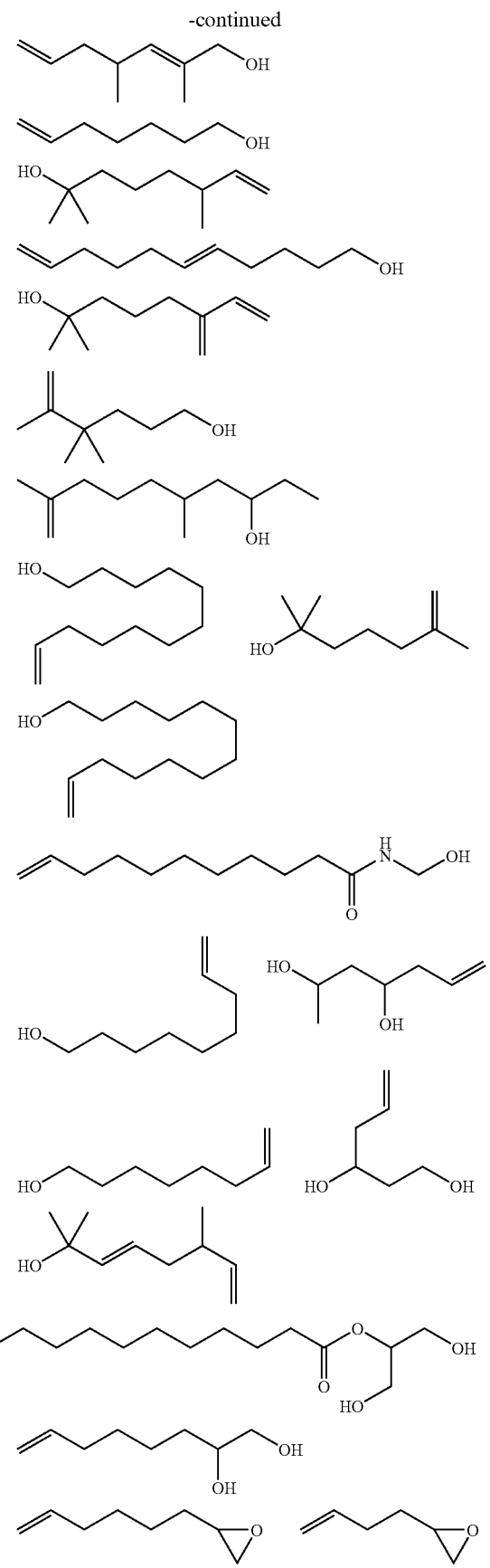

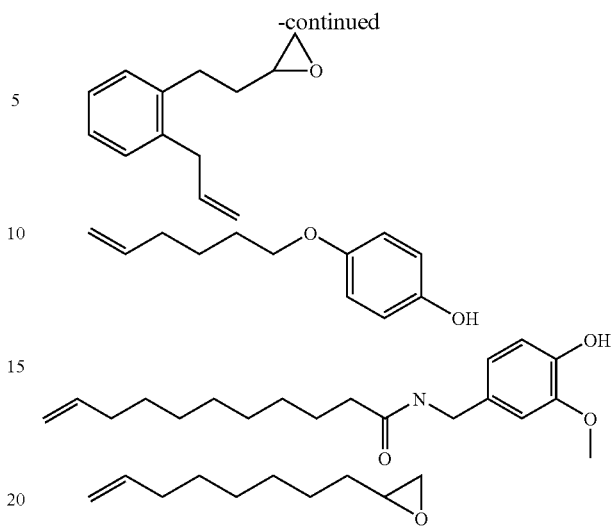

Also available are n-nonyl-1-ol, 1,2-epoxy-nonyl, n-undecyl-1-ol, and 4-hexenyloxyphenol.

The copolymerization of the α-olefin of 2 to 20 carbon atoms and the polar group-containing monomer (10), and optionally a polar group-containing monomer represented by the formula (8) is carried out in the presence of, for example, the above mentioned olefin polymerization catalyst comprising:

(A) a compound of a transition metal selected from Group 3 (including lanthanoid and actinoid) to Group 10 of the periodic table, and (B) at least one compound selected from:
(B-1) an organoaluminum oxy-compound,
(B-2) a compound which reacts with the compound (A) to form an ion pair, and
(B-3) an organoaluminum compound, under the same polymerization conditions as in the process for preparing the polar group-containing olefin copolymer according to the first embodiment.

Then, from the W portion of the copolymerized polar group-containing monomer (10) in the functional group-containing olefin copolymer obtained as above, a Z portion is formed by anionic polymerization, ring-opening polymerization or polycondensation.

To prepare the Z portion from the w portion of the copolymerized polar group-containing monomer (10) by anionic polymerization, ring-opening polymerization or polycondensation, for example, a polar monomer is subjected to anionic polymerization in the presence of the polar group-containing olefin copolymer and a proton abstracting agent or in the presence of the polar group-containing olefin copolymer, a proton abstracting agent and an active hydrogen compound.

Examples of the polar monomers include the examples at the aforesaid constituent unit (4) such as (meth)acrylic esters, (meth)acrylonitriles, acrylamides, vinylpyridines, N-substituted maleimides, vinyl ketones and styrene derivatives.

Of these polar monomers, compounds having two or more ethylenically unsaturated bonds in one molecule give highly crosslinked polymers in the polymerization of the compounds themselves, but when the compounds are copolymerized with polar group-containing ethylenically unsaturated monomers having only one ethylenically unsaturated bond, main chains of the polymers produced from the polar group-containing ethylenically unsaturated monomers having only one ethylenically unsaturated bond can be crosslinked to each other.

Of the above polar monomers, preferable are monoesters of monohydric alcohols and acrylic acid or methacrylic acid, monoesters of dihydric alcohols having one end protected by an ether bond and acrylic acid or methacrylic acid, polyesters wherein all hydroxyl groups of dihydric or higher alcohols and acrylic acid or methacrylic acid are esterified, acrylonitrile, methacrylonitrile, N,N-disubstituted monoacrylamides, vinyl or isopropenyl substituted pyridines, N-aromatic substituted maleimides and vinyl ketones.

More preferable are monoesters of monohydric alcohols and acrylic acid or methacrylic acid, monoesters of dihydric alcohols having one end protected by an ether bond and acrylic acid or methacrylic acid, polyesters wherein all hydroxyl groups of dihydric or higher alcohols and acrylic acid or methacrylic acid are esterified, acrylonitrile, methacrylonitrile and N,N-disubstituted monoacrylamides.

Examples of the polar monomers include examples at the aforesaid constituent unit (4) such as alkylene oxide compounds.

The polar monomers can be used singly or in combination of two or more kinds. In the use of a combination of two or more polar monomers, a combination of the above polar monomer other than the alkylene oxide compound (such a monomer being sometimes referred to as an "ethylenically unsaturated monomer" hereinafter) and an alkylene oxide compound is preferable.

In the copolymerization using plural polar monomers in combination, use of plural ethylenically unsaturated monomers, use of a single ethylenically unsaturated monomer and plural alkylene oxide compounds, use of plural ethylenically unsaturated monomers and a single alkylene oxide compound, or use of plural ethylenically unsaturated monomers and plural alkylene oxide compounds is available, and for adding these components to the polymerization reactor, a method of adding at the same time, a method of adding successively, or a method of repeating successive addition is adoptable.

If plural polar monomers are used in combination and copolymerized at the same time, a polymer segment composed of a copolymer of relatively high randomness is obtained, though it depends upon a difference between reactivities of the compounds used. If two or more monomers are copolymerized successively, a polymer segment composed of a block copolymer containing two or more blocks is obtained. If such successive addition is repeated, a polymer segment composed of a complicated copolymer is obtained.

Above all, it is preferable to use the ethylenically unsaturated monomer and the alkylene oxide compound successively to prepare a polymer segment composed of a block copolymer formed from the plural monomers. In this case, it is more preferable that the alkylene oxide compound is propylene oxide or ethylene oxide, and it is still more preferable that the alkylene oxide is propylene oxide.

The active hydrogen compound is, for example, an active hydrogen compound having active hydrogen on the carbon atom, an active hydrogen compound having active hydrogen on the oxygen atom, an active hydrogen compound having active hydrogen on the nitrogen atom, or an active hydrogen compound having active hydrogen on the sulfur atom.

Examples of the active hydrogen compounds having active hydrogen on the carbon atom include hydrogen cyanide; monocarboxylic esters, such as ethyl acetate, cyclohexyl propionate, isopropyl butyrate, methyl isobutyrate, tert-butyl isobutyrate, hexyl caproate, butyl laurate, methyl stearate, ethyl oleate, methyl phenylacetate, methyl cyclohexanecarboxylate, 1,2-bis(2-propylcarbonyloxy)ethane and 1,2,3-tris(2-propylcarbonyloxy)propane; polycarboxylic esters, such as dimethyl malonate, dimethyl methylmalonate, diethyl succinate, butyl 2,3-dimethylsuccinate, methyl adipate, ethyl suberate, methyl butanetetracarboxylate, 1,2-bis(2-methoxycarbonylethoxy)ethane, 1,2-bis(2-ethoxycarbonylpropoxy)ethane, 1,2-bis(2-ethoxycarbonylpropylmercapto)ethane and N,N,N',N'-tetrakis(2-butoxycarbonylpropyl)ethylenediamine; ketocarboxylic esters, such as ethyl acetoacetate, cyclopentyl acetoacetate, methyl carbamoylacetate, ethyl 2-cyclohexylcarbonylacetate and butyl benzoylacetate; nitriles, such as acetonitrile, 2-cyanopropane, malononitrile, methyl malononitrile, 1,3-dicyanopropane and adiponitrile; and ketones, such as acetone, methyl ethyl ketone, diisopropyl ketone, dicyclohexyl ketone, acetophenone and isopropyl phenyl ketone.

Examples of the active hydrogen compounds having active hydrogen on the oxygen atom include water;

monohydric alcohols, such as methanol, ethanol, n-propanol, isopropanol, n-butyl alcohol, sec-butyl alcohol, tert-butyl alcohol, isopentyl alcohol, tert-pentyl alcohol, n-octyl alcohol, lauryl alcohol, cetyl alcohol, cyclopentanol, cyclohexanol, allyl alcohol, crotyl alcohol, methylvinylcarbinol, benzyl alcohol, 1-phenylethyl alcohol, triphenylcarbinol, cinnamyl alcohol, perfluoro-tert-butyl alcohol, α-hydroxyisopropyl phenyl ketone, α-hydroxycyclohexyl phenyl ketone, α-hydroxyisopropyl naphthyl ketone and methyl α-hydroxyisobutyrate; polyhydric alcohols, such as ethylene glycol, propylene glycol, diethylene glycol, dipropylene glycol, 1,3-propanediol, 1,3-butanediol, 1,4-butanediol, 1,6-hexanediol, 1,4-cyclohexanediol, trimethylolpropane, glycerol, digylcerol, pentaerythritol and dipentaerythritol; and aromatic hydroxy compounds, such as phenol, cresol, xylenol, 2-naphthol, 2,6-dihydroxynaphthalene and bisphenol A.

Examples of the active hydrogen compounds having active hydrogen on the nitrogen atom include aliphatic or aromatic primary amines, such as methylamine, ethylamine, n-propylamine, isopropylamine, n-butylamine, isobutylamine, sec-butylamine, tert-butylamine, cyclohexylamine, benzylamine, β-phenylethylamine, aniline, o-toluidine, m-toluidine and p-toluidine; aliphatic or aromatic secondary amines, such as dimethylamine, methylethylamine, diethylamine, di-n-propylamine, ethyl-n-butylamine, methyl-sec-butylamine, dipentylamine, dicyclohexylamine, N-methylaniline and diphenylamine; polyamines having primary or secondary amino group, such as ethylenediamine, di(2-aminoethyl)amine, hexamethylenediamine, 4,4'-diaminodiphenylethane, tri(2-aminoethyl)amine, N,N'-dimethylethylenediamine, N,N'-diethylethylenediamine and di(2-methylaminoethyl)amine; saturated cyclic secondary amines, such as pyrrolidine, piperidine, morpholine and 1,2,3,4-tetrahydroquinoline; unsaturated cyclic secondary amines, such as 3-pyrroline, pyrrole, indole, carbazole, imidazole, pyrazole and purine; cyclic polyamines having secondary amino group, such as piperazine, pyrazine and 1,4,7-triazacyclononane; unsubstituted or N-monosubstituted acid amides, such as acetamide, propionamide, N-methylpropionamide, N-methylbenzamide and N-ethylstearamide; cyclic amides, such as β-propiolactam, 2-pyrrolidone, δ-valerolactam and ε-caprolactam; and imides of dicarboxylic acids, such as succinimide, maleimide and phthalimide.

Examples of the active hydrogen compounds having active hydrogen on the sulfur atom include monothiols, such as methanethiol, ethanethiol, n-butanethiol, tert-butanethiol, hexanethiol, decanethiol, cyclopentylmercaptan and cyclohexylmercaptan; polythiols, such as 1,2-ethanedithiol, 1,3- propanedithiol, 2,3-butanedithiol, 1,6-hexanedithiol, 1,2,3-propanetrithiol and 2,3-di(mercaptomethyl)-1,4-butanedithiol; and aromatic mercapto compounds, such as thiophenol, o-thiocresol, thionaphthol and 1,2-benzenedithiol.

Also employable as the active hydrogen compounds are, for example, poly(alkylene oxides) having active hydrogen at the end, such as polyethylene oxide and polypropylene oxide; polymers obtained by anionic polymerization or other polymerization of (meth)acrylic esters, (meth)acrylonitriles, acrylamides, vinylpyridines, N-substituted maleimides, vinyl ketones and styrene derivatives; polymers obtained by ring-opening polymerization of lactones, lactams, lactides and cyclic siloxanes; polymers having active hydrogen at the end and/or in the main chain, such as poly((meth)acrylic esters), poly((meth)acrylonitriles), poly(acrylamides), poly(vinylpyridines), poly(N-substituted maleimides), poly(vinyl ketones) and poly(styrene derivatives), polyesters, polyamides, polylactides and polysiloxanes; and copolymers thereof.

Of the above active hydrogen compounds, preferable are hydrogen cyanide, monocarboxylic esters, polycarboxylic esters, water, monohydric alcohols, polyhydric alcohols, monothiols, polymers having active hydrogen at the end and/or in the main chain, such as poly(alkylene oxides), poly((meth)acrylic esters), poly((meth)acrylonitriles), poly(acrylamides), poly(vinylpyridines), poly(N-substituted maleimides), poly(vinyl ketones) and poly(styrene derivatives), and copolymers thereof.

The proton abstracting agents may be used singly or as a mixture of two or more kinds.

In the present invention, at least a polar monomer is subjected to anionic polymerization in the presence of a proton abstracting agent and an active hydrogen compound or in the presence of a proton abstracting agent. In this process, ring-opening polymerization can be carried out.

As the process in which the proton abstracting agent is used or the process in which a proton is abstracted from the active hydrogen compound to give an anion, the following processes are employable:

(1) a process using an alkali metal hydroxide or an alkali metal carbonate, (2) a process using an alkali metal, an alkali metal hydride, an alkali metal amide or an alkali metal alkyl, (3) a process using a zinc compound, (4) a process using ammonium hydroxide, and (5) a process using a phosphazenium salt.

The phosphazenium compound can be prepared by the process described in EP0791600, pp. 12-13, or its analogous process.

The process for preparing a Z portion from the W portion of the polar group-containing monomer (10) by anionic polymerization is not specifically limited, as far as at least the proton abstracting agent and the polar monomer can be effectively contacted, and any of a batchwise process and a process comprising feeding the polar monomer intermittently or continuously is employable.

The polymerization reaction can be carried out when the polar monomer is in a molten state or can be carried out in a liquid phase using an appropriate solvent. The liquid phase may be a homogeneous phase or a suspension phase. Examples of the solvents employable herein include aliphatic or alicyclic hydrocarbons, such as n-hexane, n-heptane and cyclohexane; aromatic hydrocarbons, such as benzene, toluene and xylene; aromatic halides, such as chlorobenzene and dichlorobenzene; ethers, such as diethyl ether, diphenyl ether, tetrahydrofuran, tetrahydropyran, 1,4-dioxane, ethylene glycol dimethyl ether and diethylene glycol diethyl ether; and aprotic polar solvents, such as dimethylformamide, dimethylsulfoxide, sulfolane and N,N'-dimethylimidazolidinone.

Although there is no specific limitation on the amount of the proton abstracting agent used, the amount thereof is in the range of usually $1 \times 10^{-6}$ to $1 \times 10^{-1}$ mol, preferably $1 \times 10^{-4}$ to $3 \times 10^{-1}$ mol. The polymerization reaction temperature is in the range of usually −50 to 250° C., preferably −20 to 150° C., though it varies depending upon the types and amounts of the proton abstracting agent and the polar monomer used, etc. The polymerization reaction pressure is in the range of usually not more than 3.0 MPa (absolute pressure expressed in megapascal, the same shall apply hereinafter), preferably 0.01 to 1.5 MPa, more preferably 0.1 to 1.0 MPa, though it varies depending upon the type and amount of the polar monomer used, the reaction temperature, etc.

The polymerization reaction time is usually not more than 50 hours, preferably 0.1 to 24 hours, though it varies depending upon the types and amounts of the proton abstracting agent and the polar monomer, the reaction temperature, etc.

Next, the process (ii) is described in more detail.

In the process (ii), an α-olefin of 2 to 20 carbon atoms and a polar group-containing monomer (10), and optionally the polar group-containing monomer represented by the formula (8) are copolymerized to prepare a polar group-containing olefin copolymer, and then the W portion of the copolymerized polar group-containing monomer (10) is allowed to react with a terminal functional group of the polymer obtained by anionic polymerization, ring-opening polymerization or polycondensation.

The terminal functional group-containing olefin copolymer can be prepared in the same manner as in the process (i).

Examples of the polymers (sometimes referred to as "terminal functional group-containing polymer" hereinafter) obtained by anionic polymerization, ring-opening polymerization or polycondensation include segments obtained by anionic polymerization of one or more monomers selected from methyl methacrylate, ethyl methacrylate, butyl acrylate, acrylonitrile and acrylamide, segments obtained by ring-opening polymerization of lactone, lactide, siloxane, lactam, cyclic ether, oxazoline, ethylene oxide, propylene oxide, etc., and polymers obtained by polycondensation of monomers, such as polycarboxylic acid and polyhydric alcohol, or polycarboxylic acid and polyamide or hydroxycarboxylic acid. Of these, preferable are segments obtained by anionic polymerization of acrylic esters or methacrylic esters and polymers obtained by ring-opening polymerization of ethylene oxide or propylene oxide.

Such a terminal functional group-containing polymer can be prepared by, for example, subjecting the same polar monomer as used in the process (i) to anionic polymerization, ring-opening polymerization or polycondensation in the presence of the proton abstracting agent or in the presence of the proton abstracting agent and the active hydrogen compound.

Then, the polar group-containing olefin copolymer obtained as above is copolymerized with the terminal functional group-containing polymer.

Thermoplastic Resin Composition

The thermoplastic resin composition of the invention may be formed from two or more copolymers selected from the polar group-containing olefin copolymers or may be formed from the polar group-containing olefin copolymer and a thermoplastic resin other than the polar group-containing olefin copolymer.

Thermoplastic Resin

The thermoplastic resin preferably used in the invention is one kind of a thermoplastic resin selected from polyolefin, polyamide, polyester, polyacetal, polystyrene, acrylonitrile/butadiene/styrene copolymer (ABS), polymethacrylate, polycarbonate, polyphenylene oxide, polyvinyl chloride, polyvinylidene chloride, polyvinyl acetate, ethylene/(meth)acrylic ester copolymer and diene rubber.

Examples of the polyolefins include olefin homopolymers, such as polyethylene, polypropylene, poly-1-butene, polymethylpentene and polymethylbutene; and olefin copolymers, such as an ethylene/α-olefin random copolymer, an ethylene/propylene/diene terpolymer, a propylene/ethylene random copolymer, a propylene/α-olefin random copolymer and a propylene/ethylene/α-olefin terpolymer. Of these, preferable are polyethylene, polypropylene, an ethylene/α-olefin random copolymer, an ethylene/propylene/diene terpolymer, a propylene/ethylene random copolymer and a propylene/α-olefin random copolymer. If the polyolefin is a polyolefin obtained from an olefin of 3 or more carbon atoms, this polyolefin may be an isotactic polymer or may be a syndiotactic polymer.

As the catalyst for the preparation of the polyolefin, any of Ziegler-Natta catalyst, a metallocene catalyst and a known catalyst may be used.

Examples of the polyamides include aliphatic polyamides, such as nylon-6, nylon-66, nylon-10, nylon-12 and nylon-46; and aromatic polyamides prepared from aromatic dicarboxylic acids and aliphatic diamines. Of these, nylon-6 is preferable.

Examples of the polyesters include aromatic polyesters, such as polyethylene terephthalate, polyethylene naphthalate and polybutylene terephthalate; polycaprolactone; and polyhydroxybutyrate. Of these, polyethylene terephthalate is preferable.

Examples of the polyacetals include polyformaldehyde (polyoxymethylene), polyacetaldehyde, polypropionaldehyde and polybutylaldehyde. Of these, polyformaldehyde is preferable.

The polystyrene may be a homopolymer of styrene or may be a copolymer of styrene and acrylonitrile, methyl methacrylate, α-methylstyrene or the like, such as an acrylonitrile/styrene copolymer.

As the ABS, preferably used is ABS comprising constituent units derived from acrylonitrile in amounts of 20 to 35 mol %, constituent units derived from butadiene in amounts of 20 to 30 mol % and constituent units derived from styrene in amounts of 40 to 60 mol %.

As the polymethacrylate, polymethyl methacrylate (PMMA) is preferable.

Examples of the polycarbonates include those obtained from bis(4-hydroxyphenyl)methane, 1,1-bis(4-hydroxyphenyl)ethane, 2,2-bis(4-hydroxyphenyl)propane and 2,2-bis(4-hydroxyphenyl)butane. Of these, polycarbonate obtained from 2,2-bis(4-hydroxyphenyl)propane is preferable.

As the polyphenylene oxide, poly(2,6-dimethyl-1,4-phenylene oxide) is preferable.

The polyvinyl chloride may be a homopolymer of vinyl chloride or may be a copolymer of vinyl chloride and vinylidene chloride, acrylic ester, acrylonitrile, propylene or the like.

As the polyvinylidene chloride, a copolymer comprising vinylidene chloride and vinyl chloride, acrylonitrile, (meth)acrylic ester, allyl ester, unsaturated ether, styrene or the like and generally containing vinylidene chloride units in amounts of not less than 85% is used.

The polyvinyl acetate may be a homopolymer of vinyl acetate or may be a copolymer of vinyl acetate and ethylene or vinyl chloride. Of these, an ethylene/vinyl acetate copolymer is preferable.

As the ethylene/(meth)acrylic ester copolymer, preferable is an ethylene/methyl acrylate copolymer, an ethylene/ethyl acrylate copolymer, an ethylene/methyl methacrylate copolymer or an ethylene/ethyl methacrylate copolymer.

Examples of the diene rubbers include conjugated polydienes sych as polybutadiene, polyisoprene, an elastomer type styrene/butadiene copolymer that is known as SBR (styrene/butadiene rubber). In the diene rubbers, at least a part of double bonds in the molecule may be hydrogenated.

The thermoplastic resins mentioned above can be used singly or in combination of two or more kinds.

Of the thermoplastic resins, polyolefin, polyester, polyamide or polystyrene is preferably used.

The thermoplastic resin composition of the invention can be prepared by blending the polar group-containing olefin copolymer with the thermoplastic resin using, for example, a ribbon blender, a tumbling blender or a Henschel blender.

The thermoplastic resin composition of the invention can be prepared also by melt kneading the polar group-containing olefin copolymer and the thermoplastic resin by the use of a melt kneading device, for example, a kneader such as a co-kneader, a Banbury mixer, a Brabender, a single-screw extruder or a twin-screw extruder, a horizontal stirrer such as a twin-screw surface replacement machine or a twin-screw multi-disc device, or a vertical stirrer such as a double helical ribbon stirrer.

Additives

To the polar group-containing olefin copolymer and the thermoplastic resin composition according to the invention, additives, such as inorganic filler, organic filler, nucleating agent, heat stabilizer, weathering stabilizer, antistatic agent, colorant, lubricant, flame retardant and blooming inhibitor, may be added within limits not detrimental to the objects of the invention.

Inorganic Filler

Examples of the inorganic fillers include silica, diatomaceous earth, alumina, titanium oxide, magnesium oxide, pumice powder, pumice balloon, aluminum hydroxide, magnesium hydroxide, basic magnesium carbonate, dolomite, calcium sulfate, calcium titanate, barium sulfate, calcium sulfite, talc, clay, mica, asbestos, glass fiber, glass flake, glass bead, calcium silicate, montmorillonite, bentonite, graphite, aluminum powder and molybdenum sulfide.

Among these, layered compounds are preferred, and clay minerals having swelling and cleavage properties in dispersion media are particularly preferred for use. The clay minerals are generally classified into a type of two-layer structure consisting of a tetrahedral layer of silica and an octahedral layer containing aluminum or magnesium as a central metal provided on the tetrahedral layer, and a type of three-layer structure consisting of tetrahedral layers of silica and an octahedral layer containing aluminum or magnesium as a central metal sandwiched between the tetrahedral layers. The two-layer structure type (former type) is, for example, a kaolinite group or an antigorite group, and the three-layer structure type (latter type) is, for example, a smectite group, a vermiculite group or a mica group that are grouped according to the number of interlaminar cations.

Specific examples of the clay minerals include kaolinite, dickite, nacrite, halloysite, antigorite, chrysotile, pyrophyllite, montmorillonite, beidellite, nontronite, saponite, sauconite, stevensite, hectorite, tetrasilicic mica, sodium taeniorite, muscovite, margarite, talc, vermiculite, phlogopite, xanthophyllite and chlorite.

Clay minerals having been treated with organic materials (sometimes referred to as "organically-modified clay minerals") are also employable as the inorganic layered compounds. (On the clay minerals having been treated with organic materials, see "Dictionary of Clay" by Asakura Shoten.)

Of the above clay minerals, preferable are a smectite group, a vermiculite group and a mica group, and more preferable is a smectite group, from the viewpoints of swelling properties or cleavage properties. Examples of the smectite group clay minerals include montmorillonite, beidellite, nontronite, saponite, sauconite, stevensite and hectorite.

Examples of the dispersion media to swell or cleave the inorganic layered compounds in the case of natural swelling clay minerals are water; alcohols, such as methanol, ethanol, propanol, isopropanol, ethylene glycol and diethylene glycol; Dimethylformamide; dimethyl sulfoxide and acetone. Of these, water and an alcohol such as methanol are preferable.

In the case of the organically-modified clay minerals, there can be mentioned aromatic hydrocarbons, such as benzene, toluene and xylene; ethers, such as ethyl ether and tetrahydrofuran; ketones, such as acetone, methyl ethyl ketone and methyl isobutyl ketone; aliphatic hydrocarbons, such as n-pentane, n-hexane and n-octane; halogenated hydrocarbons, such as chlorobenzene, carbon tetrachloride, chloroform, dichloromethane, 1,2-dichloroethane and perchloroethylene; ethyl acetate; methyl methacrylate (MMA); dioctyl phthalate (DOP); dimethylformamide; dimethyl sulfoxide; methyl cellosolve and silicone oil.

Nucleating Agent

As the nucleating agents, various nucleating agents hitherto known are used without specific limitation. Examples of the nucleating agents include the following aromatic phosphoric ester salt, benzylidenesorbitol, aromatic carboxylic acid and rosin nucleating agent.

Examples of aromatic phosphoric ester salt are compounds represented by the following formula (A).

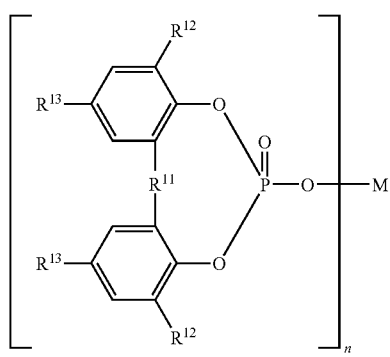

(A)

In the above formula, $R^{11}$ is an oxygen atom, a sulfur atom or a hydrocarbon group of 1 to 10 carbon atoms; $R^{12}$ and $R^{13}$ are each hydrogen or a hydrocarbon group of 1 to 10 carbon atoms and may be the same or different, and $R^{12}$s, $R^{13}$s or $R^{12}$ and $R^{13}$ may be bonded to each other to form a ring; M is a metal atom having a valency of 1 to 3; and n is an integer of 1 to 3.

Concrete examples of the compounds represented by the above formula (A) include sodium-2,2'-methylene-bis(4,6-di-t-butylphenyl)phosphate, sodium-2,2'-ethylidene-bis(4,6-di-t-butylphenyl)phosphate, lithium-2,2'-methylene-bis(4,6-di-t-butylphenyl)phosphate, lithium-2,2'-ethylidene-bis(4,6-di-t-butylphenyl)phosphate, sodium-2,2'-ethylidene-bis(4-i-propyl-6-t-butylphenyl) phosphate, lithium-2,2'-methylene-bis(4-methyl-6-t-butylphenyl)phosphate, lithium-2,2'-methylene-bis(4-ethyl-6-t-butylphenyl)phosphate, calcium-bis[2,2'-thiobis(4-methyl-6-t-butylphenyl)phosphate], calcium-bis[2,2'-thiobis(4-ethyl-6-t-butylphenyl)phosphate], calcium-bis[2,2'-thiobis(4,6-di-t-butylphenyl)phosphate], magnecium-bis[2,2'-thiobis(4,6-di-t-butylphenyl) phosphate], magnecium-bis[2,2'-thiobis(4-t-octylphenyl) phosphate], sodium-2,2'-butylidene-bis(4,6-di-methylphenyl)phosphate, sodium-2,2'-butylidene-bis(4,6-di-t-butylphenyl)phosphate, sodium-2,2'-t-octylmethylene-bis(4,6-di-methylphenyl)phosphate, sodium-2,2'-t-octylmethylene-bis(4,6-di-t-butylphenyl) phosphate, calcium-bis[2,2'-methylene-bis(4,6-di-t-butylphenyl)phosphate], magnecium-bis[2,2'-methylene-bis(4,6-di-t-butylphenyl) phosphate], barium-bis[2,2'-methylene-bis(4,6-di-t-butylphenyl)phosphate], sodium-2,2'-methylene-bis(4-methyl-6-t-butylphenyl)phosphate, sodium-2,2'-methylene-bis(4-ethyl-6-t-butylphenyl)phosphate, sodium-(4,4'-dimethyl-5,6'-di-t-butyl-2,2'-biphenyl)phosphate, calcium-bis-[(4,4'-dimethyl-6,6'-di-t-butyl-2,2'-biphenyl) phosphate], sodium-2,2'-ethylidene-bis(4-m-butyl-6-t-butylphenyl)phosphate, sodium-2,2'-methylene-bis(4,6-di-methylphenyl)phosphate, sodium-2,2'-methylene-bis(4,6-di-ethylphenyl)phosphate, potassium-2,2'-ethylidene-bis(4,6-di-t-butylphenyl)phosphate, calcium-bis[2,2'-ethylidene-bis(4,6-di-t-butylphenyl) phosphate], magnecium-bis[2,2'-ethylidene-bis(4,6-di-t-butylphenyl) phosphate], barium-bis[2,2'-ethylidene-bis(4,6-di-t-butylphenyl)phosphate], aluminium-tris[2,2'-methylene-bis(4,6-di-t-butylphenyl) phosphate] and aluminium-tris[2,2'-ethylidene-bis 4,6-di-t-butylphenyl)phosphate], and mixtures of two or more thereof. Particularly preferable is sodium-2,2'-methylene-bis(4,6-di-t-butylphenyl)phosphate.

Examples of aromatic phosphoric ester salt are compounds represented by the following formula (B).

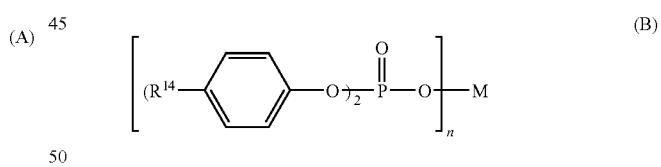

(B)

In the above formula, $R^{14}$ denotes hydrogen or a hydrocarbon group of 1 to 10 carbon atoms; M is a metal atom having a valency of 1 to 3; and n is an integer of 1 to 3.

Concrete examples of the compounds represented by the above formula (B) include sodium-bis(4-t-butylphenyl)phosphate, sodium-bis(4-methylphenyl)phosphate, sodium-bis(4-ethylphenyl)phosphate, sodium-bis(4-i-propylphenyl) phosphate, sodium-bis(4-t-octylphenyl)phosphate, potassium-bis(4-t-butylphenyl)phosphate, calcium-bis(4-t-butylphenyl)phosphate, magnecium-bis(4-t-butylphenyl) phosphate, lithium-bis(4-t-butylphenyl)phosphate, aluminum-bis(4-t-butylphenyl)phosphate, and mixtures of two or more thereof. Particularly preferable is sodium-bis(4-t-butylphenyl)phosphate.

Exemplary benzylidenesorbitol is a compound represented by the following formula (C).

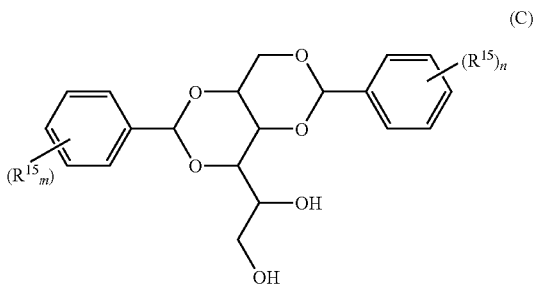
(C)

In the formula, each $R^{15}$ may be the same or different and denotes a hydrogen atom or a hydrocarbon group of 1 to 10 carbon atoms, and m and n are each an integer of 0 to 5.

Examples of the compounds represented by the formula (C) include 1,3,2,4-dibenzylidenesorbitol, 1,3-benzylidene-2,4-p-methylbenzylidenesorbitol, 1,3-benzylidene-2,4-p-ethylbenzylidenesorbitol, 1,3-p-methylbenzylidene-2,4-benzylidenesorbitol, 1,3-p-ethylbenzylidene-2,4-benzylidenesorbitol, 1,3-p-methylbenzylidene-2,4-p-ethylbenzylidenesorbitol, 1,3-p-ethylbenzylidene-2,4-p-methylbenzylidenesorbitol, 1,3,2,4-di(p-methylbenzylidene)sorbitol, 1,3,2,4-di(p-ethylbenzylidene)sorbitol, 1,3,2,4-di(p-n-propylbenzylidene)sorbitol, 1,3,2,4-di(p-i-propylbenzylidene)sorbitol, 1,3,2,4-di(p-n-butylbenzylidene)sorbitol, 1,3,2,4-di(p-s-butylbenzylidene)sorbitol, 1,3,2,4-di(p-t-butylbenzylidene)sorbitol, 1,3,2,4-di(2',4'-dimethylbenzylidene)sorbitol, 1,3,2,4-di(p-methoxybenzylidene)sorbitol, 1,3,2,4-di(p-ethoxybenzylidene)sorbitol, 1,3-benzylidene-2-4-p-chlorobenzylidenesorbitol, 1,3-p-chlorobenzylidene-2-4-benzylidenesorbitol, 1,3-p-chlorobenzylidene-2-4-p-methylbenzylidenesorbitol, 1,3-p-chlorobenzylidene-2-4-p-ethylbenzylidenesorbitol, 1,3-p-methylbenzylidene-2-4-p-chlorobenzylidenesorbitol, 1,3-p-ethylbenzylidene-2-4-p-chlorobenzylidenesorbitol, 1,3,2,4-di(p-chlorobenzylidene)sorbitol, and mixtures of two or more of these compounds. Of these, preferable are 1,3,2,4-dibenzylidenesorbitol, 1,3,2,4-di(p-methylbenzylidene)sorbitol, 1,3,2,4-di(p-ethylbenzylidene)sorbitol, 1,3-p-chlorobenzylidene-2-4-p-methylbenzylidenesorbitol, 1,3,2,4-di(p-chlorobenzylidene)sorbitol, and mixtures of two or more of these compounds.

Of the above benzylidenesorbitols, preferable is a compound represented by the following formula (D).

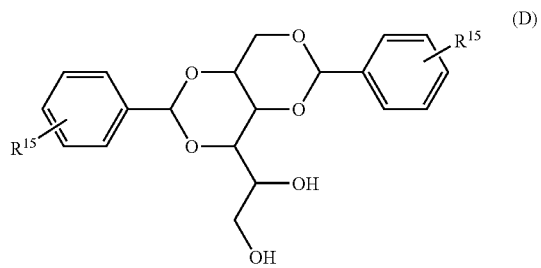
(D)

In the formula, each $R^{15}$ may be the same or different and denotes a methyl group or an ethyl group.

The aromatic carboxylic acid is, for example, aluminum-hydroxydipara-t-butyl benzoate represented by the following formula (E).

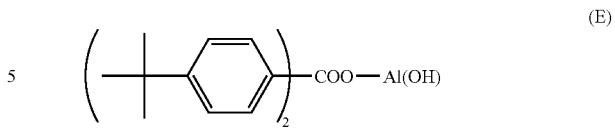
(E)

The rosin type nucleating agent is, for example, a metallic salt of a rosin acid, and the metallic salt of a rosin acid is a reaction product of a rosin acid and a metallic compound. Examples of the rosin acids include natural rosins, such as gum rosin, tall oil rosin and wood rosin; various modified rosins, such as disproportionated rosin, hydrogenated rosin, dehydrogenated rosin, polymerized rosin and α,β-ethylenically unsaturated carboxylic acid-modified rosin; purified products of the natural rosins; and purified products of the modified rosins. Examples of unsaturated carboxylic acids used to prepare the α,β-ethylenically unsaturated carboxylic acid-modified rosins include maleic acid, maleic anhydride, fumaric acid, itaconic acid, itaconic anhydride, citraconic acid, acrylic acid ad methacrylic acid. Of the above rosins, preferable is at least one rosin acid selected from the group consisting of a natural rosin, a modified rosin, a purified product of a natural rosin and a purified product of a modified rosin. The rosin acid comprises plural resin acids selected from pimaric acid, sandarachpimaric acid, palustric acid, isopimaric acid, abietic acid, dehydroabietic acid, neoabietic acid, dihydropimaric acid, dihydroabietic acid and tetrahydroabietic acid.

The metallic compound which reacts with the rosin acid to form a metallic salt is, for example, a compound which comprises a metallic element, such as sodium, potassium and magnecium, and forms a salt together with the rosin acid. Examples of the metallic salts include chlorides, nitrates, acetates, sulfates, carbonates, oxides and hydroxides of the above metals.

Other examples of the nucleating agents include high-melting point polymers, metallic salts of aromatic carboxylic acids or aliphatic carboxylic acids, and inorganic compounds.

Examples of the high-melting point polymers include polyvinylcycloalkanes, such as polyvinylcyclohexane and Polyvinylcyclopentane; poly-3-methyl-1-pentene, poly-3-methyl-1-butene, and polyalkenylsilanes.

Examples of the metallic salts of aromatic carboxylic acids or aliphatic carboxylic acids include aluminum benzoate, aluminum p-t-butylbenzoate, sodium adipate, sodium thiophenecarboxylate and sodium pyrrolecarboxylate.

Molding Method

The polar group-containing olefin copolymer and the thermoplastic resin composition of the invention can be produced by various molding methods such as calendering extrusion molding, injection molding, blow molding, press molding and stamping.

The polar group-containing olefin copolymer and the thermoplastic resin composition can be molded into sheets or films (unstretched) by extrusion molding.

Stretched films can be obtained by stretching the extruded sheets or extruded films (unstretched) through tentering (lengthwise-crosswise stretching, crosswise-lengthwise stretching), simultaneous biaxial orientation or monoaxial stretching. From the polar group-containing olefin copolymer or the thermoplastic resin composition of the invention, inflation films can also be produced.

Filaments can be produced by, for example, extruding a molten composition through spinneret. The filaments may be produced by a melt blown method.

Injection molded products can be produced by injection molding the composition into various shapes by the use of hitherto known injection molding machines under the known conditions. The injection molded products obtained from the polar group-containing olefin copolymer or the thermoplastic resin composition of the invention are hardly electrostatically charged and have excellent rigidity, heat resistance, impact resistance, surface gloss, chemical resistance and abrasion resistance, so that they can be broadly used as automobile interior trim, automobile exterior trim, housings of electric appliances, containers and the likes.

Blow molded products can be produced by the use of hitherto known blow molding machines under the known conditions.

In the injection blow molding method, the polar group-containing olefin copolymer or the thermoplastic resin composition of the invention is injected into a parison mold at a resin temperature of 100 to 300° C. to form a parison, then the parison is held in a mold of desired shape, and air is blown into the parison to fit the parison into the mold, whereby a blow molded product can be produced.

The press molded product is, for example, a mold stamping product.

Uses

The polar group-containing olefin copolymer and the thermoplastic resin composition according to the invention can be applied to various uses, for example, the following uses.

(1) Film and Sheet

A film and a sheet comprising the polar group-containing olefin copolymer or the thermoplastic resin composition according to the invention is excellent in flexibility, transparency, adhesion properties, anti-fogging properties, heat resistance and separating properties.

(2) Laminate

A laminate containing at least one layer comprising the polar group-containing olefin copolymer or the thermoplastic resin composition according to the invention is, for example, agricultural film, wrapping film, shrink film, protective film, separating film such as blood plasma separating film or water permselective vaporization film, or selective separating film such as ion exchange membrane, battery separator or optical resolution film.

(3) The polar group-containing olefin copolymer or the thermoplastic resin composition according to the invention can be used for microcapsule, PTP packaging, chemical bulb and drug delivery system.

(4) Modifier

When the polar group-containing olefin copolymer or the thermoplastic resin composition according to the invention is used as a resin modifier, modifying effects in impact resistance, flowability, coating properties, crystallizability, adhesion properties, transparency, etc. can be obtained.

When the polar group-containing olefin copolymer or the thermoplastic resin composition according to the invention is used as a rubber modifier, modifying effects in weathering resistance, heat resistance, adhesion properties, oil resistance, etc. can be obtained.

Examples of the rubbers include crosslinked rubbers, such as natural rubber (NR), isoprene rubber (IR), butadiene rubber (BR), styrene/butadiene rubber (SBR), chloroprene rubber (CR), acrylonitrile/butadiene rubber (NBR), butyl rubber (IIR), ethylene/propylene rubber (EPM, EPDM), chlorosulfonated polyethylene (CSM), acrylic rubber (ACM, ANM, etc.), epichlorohydrin rubber (CO, ECO, etc.), silicone rubber (Q) and fluororubber (FKM, etc.); and thermoplastic rubbers, such as rubbers of styrene type, olefin type, urethane type, ester type, amide type and vinyl chloride type.

The polar group-containing olefin copolymer and the thermoplastic resin composition of the invention can be used as a modifier for lubricating oils, such as gasoline engine oil, diesel engine oil, marine engine oil, gear oil, metal working oil, motor oil, machine oil, spindle oil and insulating oil. They may also be used as a viscosity modifier or a freezing point depressant of these lubricating oils.

When the polar group-containing olefin copolymer or the thermoplastic resin composition of the invention is used as a modifier for waxes, improvement may be achieved in adhesiveness, flowability and hardness. Examples of the waxes include mineral waxes, such as montan wax, peat wax, ozokerite/ceresin wax and petroleum wax; synthetic waxes, such as polyethylene, Fischer-Tropsch wax, chemically modified hydrocarbon wax and substituted amide wax; vegetable waxes; and animal waxes.

When the polar group-containing olefin copolymer or the thermoplastic resin composition of the invention is used as a modifier for cement, improvement may be achieved in moldability and hardness.

Examples of the cement include air setting cement, such as lime, gypsum and magnesia cement; water setting cement, such as Roman cement, natural cement, Portland cement, alumina cement and high sulfuric salt slag cement; and special cements, such as acid proof cement, refractory cement, water glass cement and dental cement.

(5) Viscosity Modifier, Moldability Improver

The polar group-containing olefin copolymer and the thermoplastic resin composition of the invention can be used as a viscosity modifier or a moldability improver for inks and paints, such as letterpress printing ink, lithographic printing ink, flexo graphic ink, gravure ink, oil paint, cellulose derivative paint, synthetic resin paint, water baking paint, powdery water paint and Japanese lacquer.

(6) Building Material, Civil Engineering Material

The polar group-containing olefin copolymer and the thermoplastic resin composition of the invention can be used for building/civil engineering resins and building/civil engineering molded products, such as flooring, floor tile, floor sheet, sound insulating sheet, heat insulating panel, damping material, decorative sheet, baseboard, asphalt modifier, gasket, sealing material, roofing sheet and cut-off sheet.

(7) Automobile Interior or Exterior Trim, Gasoline Tank

Automobile interior or exterior trims and gasoline tanks comprising the polar group-containing copolymer or the thermoplastic resin composition of the present invention are excellent in rigidity, shock resistance, oil resistance and heat resistance.

(8) Electric or Electronic Parts

The polar group-containing olefin copolymer and the thermoplastic resin composition of the invention can be used for electric or electronic parts. Examples of the electric or electronic parts include electrical insulating materials, electronic part treating instruments, magnetic recording media, binders of magnetic recording media, sealing materials of electric circuits, materials of electric home appliances, base materials of containers such as electronic oven containers, films for electronic ovens, polymer electrolyte base materials and conductive alloy base materials.

Also exemplified are electric or electronic parts, such as connector, socket, resistor, relay case switch coil bobbin, condenser, variable condenser case, optical pickup, optical connector, vibrator, various terminal assemblies, transformer, plug, printed wiring board, tuner, speaker, microphone, headphone, small motor, magnetic head base, power module, housing, semiconductor, liquid crystal display parts, FDD carriage, FDD chassis, HDD parts, motor brush holder, parabola antenna and computer associated parts; VTR parts, TV parts, iron, hair dryer, rice cooker parts, electronic oven parts, acoustic instrument parts, audio machine parts such as audio laser disc and compact disc, domestic or office electric appliance parts, such as light fitment parts, refrigerator parts, air conditioner parts, typewriter parts and word processor parts; office computer associated parts, telephone associated parts, facsimile associated parts, copy machine associated parts, electromagnetic shielding material, speaker cone material, and vibrating element for speaker.

(9) Aqueous Emulsion

An aqueous emulsion comprising the polar group-containing olefin copolymer or the thermoplastic resin composition of the invention can be used as an adhesive for polyolefins of excellent heat sealing properties.

(10) Coating Base

A solvent dispersion containing the polar group-containing olefin copolymer or the thermoplastic resin composition according to the invention has excellent dispersing stability in a solvent and exhibits excellent adhesion properties when metals or polar resins are bonded to polyolefins.

(11) Medical or Hygienic Material

The polar group-containing olefin copolymer and the thermoplastic resin composition of the invention can be used for medical goods, such as nonwoven fabric, nonwoven fabric laminate, electret, medical tube, medical container, transfusion bag, prefill syringe and syringe, medical materials, artificial organs, artificial muscles, filter films, food sanitation/health goods, retort bags, and freshness keeping films.

(12) Miscellaneous Goods

The polar group-containing olefin copolymer and the thermoplastic resin composition of the invention can be used for stationery, such as desk mat, cutting mat, ruler, pen holder, pen grip, pen cap, scissors grip, cutter grip, magnet sheet, pen case, paper holder, binder, label seal, tape and white board; daily use miscellaneous goods, such as clothing, curtain, sheet, carpet, entrance hall mat, bath mat, bucket, hose, bag, planter, air conditioner filter, exhaust fan filter, tableware, tray, cup, lunch box, coffee maker funnel, eyeglass frame, container, storage case, hanger, rope and washing net; sporting goods, such as shoes, goggles, skis, racket, ball, tent, swimming goggles, swim fin, fishing rod, cooler box, leisure sheet and sporting net; toys, such as block and cards; containers, such as kerosine can, drum, detergent bottle and shampoo bottle; and display goods, such as signboard, pylori and plastic chain.

(13) Filler Modifier

The polar group-containing olefin copolymer and the thermoplastic resin composition of the invention can be favorably used as an additive to prepare a filler dispersibility improver or a dispersibility-improved filler.

(14) Compatibilizing Agent

The polar group-containing olefin copolymer or the thermoplastic resin composition according to the invention can be used as a compatibilizing agent. When the polar group-containing olefin copolymer of the invention is used, a polyolefin and a thermoplastic resin containing a polar group can be mixed in an arbitrary mixing ratio. The polar group-containing olefin copolymer of the invention has a main chain of a polyolefin and a side chain having a polar group, so that by the use thereof, components which are inherently incompatible can be compatibilized. Hence, elongation at break can be remarkably improved as compared with the case where the polar group-containing olefin copolymer or the thermoplastic resin composition is not used.

Next, uses of the polar group-containing olefin copolymer and the thermoplastic resin composition according to the invention are described in more detail.

Adhesive Resin

When the polar group-containing olefin copolymer or the thermoplastic resin composition of the invention is used as an adhesive resin, X in the formula (3) is preferably an acid anhydride group, an epoxy group, an amino group or a hydroxyl group, and Y in the formula (6) is preferably an epoxy group, an amino group or a hydroxyl group.

If X is a hydroxyl group and $R^3$ in the formula (3) is a straight-chain or branched aliphatic hydrocarbon group of 9 or less carbon atoms, an adhesive resin having an excellent balance between flowability and adhesion properties can be obtained.

If X is a hydroxyl group and $R^3$ in the formula (3) is a straight-chain or branched aliphatic hydrocarbon group of 11 or more carbon atoms, an adhesive resin having particularly excellent adhesion properties can be obtained.

The adhesive resin of the invention comprises the polar group-containing olefin copolymer or the thermoplastic resin composition, so that it shows excellent adhesion properties to metals, such as iron and aluminum, and polar group-containing polymers, such as polyamide, polyester, polyacetal, polystyrene, acrylonitrile/butadiene/styrene copolymer (ABS), polymethacrylate, polycarbonate, polyphenylene oxide, polyvinyl chloride, polyvinylidene chloride, polyvinyl acetate, polyvinyl alcohol, complete or partial saponification product of ethylene/vinyl acetate copolymer, and ethylene/(meth)acrylic acid ester copolymer. Further, because the main structure is a structure of polyolefin, the adhesive resin of the invention has excellent adhesion properties also to polyolefins and can be used as an adhesive resin between the polar materials or the polar material and a polyolefin.

Compatibilizing Agent

When the polar group-containing olefin copolymer or the thermoplastic resin composition of the invention is used as a compatibilizing agent, a polyolefin and a thermoplastic resin containing a polar group can be mixed in an arbitrary mixing ratio. The polar group-containing olefin copolymer or the thermoplastic resin composition of the invention has a main chain of a polyolefin and a side chain having a polar group, and therefore, components which are inherently incompatible can be compatibilized with each other. Hence, elongation at break can be remarkably improved as compared with the case where the polar group-containing olefin copolymer or the thermoplastic resin composition is not used.

In the use as the compatibilizing agent, X in the formula (3) is preferably an acid anhydride group, an epoxy group, an amino group, a carboxylic acid group, a carboxylic acid ester group or a hydroxyl group, particularly preferably an acid anhydride group, an epoxy group, an amino group or a carboxylic acid ester group, and Y in the formula (6) is preferably an epoxy group, an amino group or a hydroxyl group.

If X is a hydroxyl group and $R^3$ is a hydrocarbon group of 9 or less carbon atoms, preferably 8 or less carbon atoms, more preferably 7 or less carbon atoms, in the formula (3), the compatibilizing agent shows an excellent balance between flowability and compatibility.

If X is a hydroxyl group and $R^3$ is a hydrocarbon group of 11 or more carbon atoms, preferably 12 or more carbon atoms, more preferably 13 or more carbon atoms, in the formula (3), effects of improvement in compatibility can be particularly enhanced.

Resin Modifier

When the polar group-containing olefin copolymer or the thermoplastic resin composition of the invention is used as a resin modifier, effects of modification in hydrophilic nature, antistatic properties, coating properties, printability, etc. can be obtained.

In the use as a hydrophilic nature improver or an antistatic property improver, X in the formula (3) is preferably a hydroxyl group, a carboxylic acid group, an amide group, an amino group, an acid anhydride group or a carboxylic ester group.

In the use as a coating property improver or a printability improver, X in the formula (3) is preferably a hydroxyl group, a carboxylic acid group, an amide group, an amino group, an epoxy group or an acid anhydride group, and Y in the formula (6) is preferably an epoxy group, an amino group or a hydroxyl group.

When the polar group-containing olefin copolymer or the thermoplastic resin composition is used as the coating property improver or the printability improver and when X is a hydroxyl group and $R^3$ is an aliphatic hydrocarbon group of 9 or less carbon atoms, preferably 8 or less carbon atoms, more preferably 7 or less carbon atoms, in the formula (3), the improver shows an excellent balance between flowability and coating properties or printability.

When X is a hydroxyl group and $R^3$ is an aliphatic hydrocarbon group of 11 or more carbon atoms, preferably 12 or more carbon atoms, more preferably 13 or more carbon atoms, in the formula (3), effects of improvement in coating properties and printability can be further enhanced.

Filler Dispersant

The polar group-containing olefin copolymer and the thermoplastic resin composition of the invention can be favorably used as a filler dispersant for improving dispersibility of a filler or an additive for preparing a filler having improved dispersibility.

For example, the filler dispersant is used when a thermoplastic resin is mixed with a filler. Examples of the thermoplastic resins include the aforesaid thermoplastic resins, and preferable are polyolefins.

Examples of the fillers used in the invention include fibers, such as all aromatic polyamide fibers, aliphatic polyamide fibers, polyester fibers and cellulose fibers; organic fillers, such as fine dispersion of liquid polyester or polyamide, and the aforesaid inorganic fillers.

There is no specific limitation on the amount of the filler used, and for example, the filler is used in an amount of 0.01 to 100 parts by weight, preferably 0.1 to 20 parts by weight, based on 100 parts by weight of the thermoplastic resin.

The filler dispersant of the invention has high affinity with a filler and is capable of improving dispersibility of a filler. When such a filler dispersibility improver is used, a thermoplastic resin composition containing a filler can be improved in mechanical properties such as rigidity, hardness, heat resistance, impact resistance and elongation.

The filler dispersant can be used for a thermoplastic resin or a thermosetting resin using a filler, and is preferably used for a polyolefin.

The polar group-containing olefin copolymer and the thermoplastic resin composition containing the filler dispersant of the invention can be molded by any of known processes, for example, the aforesaid processes.

The molded products obtained by such processes are applied to wide uses such as domestic articles to industrial goods. Examples of the molded products obtained by such processes include electrical parts, electronic parts, automobile parts, mechanical mechanism parts, food containers, films, sheets and fibers. More specifically, there can be mentioned office and OA supplies, such as printer, personal computer, word processor, keyboard, PDA (potable data terminal), telephone, facsimile, copy machine, ECR (electronic cash register), electronic calculator, electronic notebook, electronic dictionary, card, holder and stationary; electric appliances, such as washing machine, refrigerator, cleaner, electronic oven, lighting fixture, game machine, iron and foot warmer; AV equipments, such as TV, VTR, video camera, radio cassette recorder, taper recorder, mini disc, CD player, speaker and liquid crystal display; and electric or electronic parts and communications equipments, such as connector, relay, condenser, switch, printed board, coil bobbin, semiconductor sealing material, electric wire, cable, transformer, deflecting yoke, cabinet panel and timepiece.

Other examples include materials for automobiles, ships or air crafts and building materials, such as seats (stuffing, cover), belt, roof foam lining, convertible top, arm rest, door trim, rear package tray, carpet, mat, sun visor, wheel cover, mattress cover, air bag, insulating material, hanger, hand strap, wire coating material, electrical insulating material, coating, coating material, facing material, floor material, corner wall, deck panel, coverings, plywood, ceiling board, partition board, side wall, carpet, wall paper, wall trim material, exterior trim material, interior trim material, roofing material, soundproof material, heat insulating material and window material; and daily or sporting goods, such as clothing, curtain, sheeting, plywood, synthetic fiber board, rug, entrance mat, sheet, bucket, hose, container, eyeglasses, bag, case, goggle, skis, racket, tent and musical instrument.

Also mentioned are bottles of shampoo and detergent, bottles of seasonings such as cooking oil and soy source, bottles of beverages such as mineral water and juice, heat-resistant food containers such as lunch box and cooking bowl, tableware such as plate and chopsticks, other various food containers, packaging films, and packaging bags.

Dispersion

The polar group-containing olefin copolymer or the thermoplastic resin composition of the invention can be used as an aqueous resin dispersion by dispersing it in water or can be used as a solvent dispersion by dispersing it in a solvent Aqueous Resin Dispersion The aqueous resin dispersion of the invention comprises water and the polar group-containing olefin copolymer or the thermoplastic resin composition dispersed therein.

The aqueous resin dispersion of the invention may contain a modified polyolefin and/or a surface active agent when needed, within limits not detrimental to the objects of the invention.

The modified polyolefin is a polyolefin obtained by graft modifying a polymer of an α-olefin of 2 to 20 carbon atoms with an ethylenically unsaturated carboxylic acid compound.

The viscosity-average molecular weight of the polyolefin (starting polyolefin) that is a material of the modified polyolefin is in the range of usually 1,000 to 50,000, preferably 2,000 to 30,000, more preferably 5,000 to 10,000. To obtain excellent emulsion properties, the melt viscosity thereof, as measured at 180° C., is in the range of usually 10 to 5,000 cps, preferably 20 to 2,000 cps, more preferably 30 to 1,000 cps.

To prepare the starting polyolefin, various processes hitherto known are adoptable. For example, a process wherein an α-olefin is polymerized so as to obtain a desired molecular weight using a transition metal catalyst such as a known metallocene catalyst and a process wherein a high-molecular weight polyolefin prepared by the use of a transition metal catalyst is heated to perform degradation are available.

Examples of the ethylenically unsaturated carboxylic acid compounds for use in the graft modification of a starting polyolefin include compounds having an ethylenically unsaturated bond in its molecule and containing a carboxylic acid or a carboxylic anhydride, and their derivatives.

Specifically, there can be mentioned ethylenically unsaturated carboxylic acids, such as acrylic acid, methacrylic acid, α-ethylacrylic acid, maleic acid, fumaric acid, itaconic acid, citraconic acid, tetrahydrophthalic acid, methyltetrahydrophthalic acid, endocis-bicyclo[2.2.1]hept-5-ene-2,3-dicarboxylic acid (Nadic Acid™) and methyl-endocis-bicyclo [2.2.1]hept-5-ene-2,3-dicarboxylic acid (Methylnadic Acid™); and ethylenically unsaturated carboxylic acid derivatives, such as acid halides, amides, imides, acid anhydrides and esters of the above acids. Specific examples of the ethylenically unsaturated carboxylic acid derivatives include maleic acid dichloride, maleimide, maleic anhydride, citraconic anhydride, monomethyl maleate and dimethyl maleate.

Of these, preferable are acrylic acid, methacrylic acid, maleic anhydride, methyl acrylate, ethyl acrylate, methyl methacrylate and ethyl methacrylate.

The ethylenically unsaturated carboxylic acid compounds can be used singly or in combination of two or more kinds, or they can be used in combination with other monomers within limits not detrimental to the effects of the present invention.

Examples of the monomers employable in combination with the ethylenically unsaturated carboxylic acid compound include amino group-containing ethylenically unsaturated compounds, such as dimethylaminoethyl acrylate, arylamine, aminoethyl methacrylate, dimethylaminoethyl methacrylate, aminopropyl methacrylate, N,N-dimethylaminopropylacrylamide and aminostyrene; hydroxyl group-containing ethylenically unsaturated compounds, such as 2-hydroxyethyl acrylate, 2-hydroxypropyl acrylate, 2-hydroxyethyl methacrylate and allyl alcohol; and styrene type hydrocarbon compounds, such as styrene, α-methylstyrene, o-methylstyrene, m-methylstyrene, p-methylstyrene, m-ethylstyrene, p-ethylstyrene, o-isopropylstyrene, m-isopropylstyrene and p-isopropylstyrene. The proportion of the ethylenically unsaturated carboxylic acid compound contained in the all graft monomer components is preferably not less than 50.

The modified polyolefin can be prepared in accordance with a known process, for example, a process described in Japanese Patent Laid Open Publication No. 22988/1973. Specifically, the starting polyolefin is heated at a temperature higher than the melting point to be molten, and thereto are added the ethylenically unsaturated carboxylic acid compound and a peroxide at the same time or successively with stirring to perform graft copolymerization reaction.

The viscosity-average molecular weight of the modified polyolefin is in the range of usually 1,000 to 50,000, preferably 2,000 to 20,000, more preferably 5,000 to 10,000.

The amount of the ethylenically unsaturated carboxylic acid compound contained in the modified polyolefin is in the range of usually $1.0 \times 10^{-3}$ to 0.2 mol equivalent, preferably $5.0 \times 10^{-3}$ to 0.15 mol equivalent, more preferably 0.01 to 0.1 mol equivalent, based on 100 g of the modified polyolefin.

The modified polyolefins can be used singly or in combination of two or more kinds.

Examples of the surface active agents include sulfonic acid or carboxylic acid type anionic surface active agents, such as alkylnaphthalenesulfonic acid salt, Na salt of naphthalenesulfonic acid formaldehyde condensate, Na salt of cresol Shaffer's acid formaldehyde condensate, alkyldiphenyl ether disulfonic acid Na salt, ligninsulfonic acid Ca salt, melanin resin sulfonic acid Na salt, special polyacrylic acid salt, gluconic acid salt, olefin/maleic acid salt copolymer, carboxymethyl cellulose Na salt, metallic soap (Zn, Al, Na or K salt), oleic acid K salt, oleic acid Na salt, stearic acid K salt, stearic acid Na salt, beef tallow acid K salt, beef tallow acid Na salt and triethanol stearate amine salt; nonionic surface active agents, such as fatty acid monoglyceride, sorbitan fatty acid ester, sugar fatty acid partial ester, polyglycerin fatty acid partial ester, polyoxyethylene alkyl ether, polyoxyethylene alkylphenyl ether, polyoxyethylene sorbitan fatty acid partial ester, polyoxyethylene sorbitol fatty acid partial ester, polyoxyethylene glycerin fatty acid partial ester, polyoxyethylene fatty amine, polyoxyethylene (hardened) castor oil, polyoxyethylene glycol fatty acid ester, polyoxyethylene polyoxypropylene block polymer, hydroxyethyl cellulose, polyvinyl alcohol, polyvinyl pyrrolidone and methyl cellulose; cationic surface active agents, such as alkylammonium chloride, trimethylalkylammonium bromide and alkylpyridinium chloride; and amphoteric surface active agents, such as dimethylalkylbetaine and alkylglycine.

Of these, anionic surface active agents are preferably used because more stable aqueous resin dispersion is obtained. Of these, more preferable are higher fatty acids, still more preferable are salts of saturated or unsaturated higher fatty acids of 1 to 20 carbon atoms, and particularly preferable are alkali metal salts thereof.

More specifically, there can be mentioned alkali metal salts of capric acid, undecanoic acid, lauric acid, myristic acid, palmitic acid, margarine acid, stearic acid, archaic acid, lindane acid, thujic acid, petroselinic acid, oleic acid, linoleic acid, linolenic acid, arachidonic acid and beef tallow acid.

The surface active agents can be used singly or in combination of two or more kinds.

The aqueous resin dispersion of the invention can be prepared by, for example, dispersing the polar group-containing olefin copolymer or the thermoplastic resin composition, and optionally, the modified polyolefin, the surface active agent and various additives in an aqueous dispersing medium. Specifically, the following processes (1) and (2) are available.

(1) The polar group-containing olefin copolymer or the thermoplastic resin composition is dissolved in an organic solvent such as toluene or xylene to prepare a solution having a concentration of 10 to 50 weight %. Then, the solution is added to water together with a hydrophilic solvent, such as methyl alcohol, ethyl alcohol or isopropyl alcohol, and an emulsifying agent, and they are stirred by a homomixer or the like to obtain an emulsion. Then, from the emulsion, the organic solvent and the emulsifying agent are removed by an evaporator or the like.

(2) The polar group-containing olefin copolymer or the thermoplastic resin composition is melt kneaded, and to the molten kneadate is added water. Then, a step of kneading the resin and water in a state where the resin is still molten and a step of adding a basic substance if the modified polyolefin is unneutralized are carried out at the same time or successively.

Of the above processes, the process (2) is preferably used to prepare the aqueous resin dispersion. The process (2) is described below in more detail.

First, the polar group-containing olefin copolymer or the thermoplastic resin composition is melt kneaded. The temperature in the melt kneading is higher than the melting point of the polar group-containing olefin copolymer or higher than the melting point of a resin having the highest melting point among the resins contained in the thermoplastic resin composition, preferably such a temperature that the melt viscosity becomes not more than $10^5$ poise.

Then, to the molten kneadate is added water, and the resin and water are kneaded in a state wherein the resin is still molten so that the resin solids become dispersed particles. If an unneutralized and/or unsaponified polyolefin is used, a basic substance can be added in this step to neutralize the polyolefin.

Examples of the basic substances include substances functioning as base in water, such as alkali metals, alkaline earth metals, ammonia and amines; substances functioning as base in water, such as oxides, hydroxides, weak acid salts or hydrides of alkali metals, and oxides, hydroxides, weak acid salts or hydrides of alkaline earth metals; and alkoxides of these metals. Specific examples of such substances are given below.

Examples of the alkali metals include sodium and potassium; examples of the alkaline earth metals include calcium, strontium and barium; examples of amines include inorganic amines such as hydroxylamine and hydrazine, methylamine, ethylamine, ethanolamine and cyclohexylamine; examples of the oxides, hydroxides and hydrides of alkali metals and alkaline earth metals include sodium oxide, sodium peroxide, potassium oxide, potassium peroxide, calcium oxide, strontium oxide, barium oxide, sodium hydroxide, potassium hydroxide, calcium hydroxide, strontium hydroxide, barium hydroxide, sodium hydroxide, potassium hydroxide and calcium hydride; examples of the weak acid salts of alkali metals and alkaline earth metals include sodium carbonate, potassium carbonate, sodium hydrogencarbonate, potassium hydrogencarbonate, calcium hydrogencarbonate, sodium acetate, potassium acetate and calcium acetate; and examples of ammonia and amine compounds include quaternary ammonium compounds such as ammonium hydroxide and tetramethylammonium hydroxide.

Although the basic substance may be added as such, it is preferably added as an aqueous solution.

The step of forming dispersed particles from the resin solids and the step of neutralizing the unneutralized and/or unsaponified modified polyolefin may be carried out successively or at the same time.

Although the melt kneading may be carried out by any known means, preferred examples of the melt kneading means include a kneader, a Banbury mixer and a multi-screw extruder.

The aqueous dispersion, which is obtained by successively adding water and melt kneading and in which the molten resin is dispersed, is then cooled to room temperature naturally or artificially. At this time, the dispersed particles are hardened to obtain a stable aqueous resin dispersion.

It is a matter of course that, in the preparation of the aqueous resin dispersion of the invention, various side materials usually employable for aqueous resin dispersions, such as stabilizer, wetting agent, foaming agent, anti-foaming agent, coagulating agent, gelatinizer, anti-aging agent, plasticizer, filler, colorant, aromatizing agent, anti-blocking agent and release agent, may be used in combination.

The dispersed particle contained in the aqueous resin dispersion of the invention obtained as above is generally spherical, but they do not always need to be spherical. The mean diameter of the dispersed particles is not specifically limited, but it is in the range of usually 1 to 20 μm, preferably 5 to 15 μm. The particle concentration (solids concentration) of the aqueous resin dispersion is not specifically limited, but it is in the range of usually 5 to 40% by weight.

The aqueous resin dispersion of the invention is suitable for bonding of polyolefins which have been difficult to bond, such as polyethylene and polypropylene, and the dispersion is useful for bonding a polyolefin to a polyolefin or a polyolefin to other material.

As the other material, an arbitrary material such as cloth, fiber, plastic, paper or metal is employable.

Examples of the cloths or the fibers include natural fibers such as cotton and hemp; inorganic fibers, such as glass fiber, carbon fiber, asbestos fiber and metallic fiber; regenerated fibers, such as viscose rayon and cupra; semi-synthetic fibers, such as di- or tri-acetate fiber; nylon-6, nylon-66 and polyester (polyethylene terephthalate) fibers; and aromatic polyamide fiber, acrylic fiber, polyvinyl chloride fiber, polyolefin fiber, and insolubilized or sparingly solubilized polyvinyl alcohol fiber. Short fibers are applicable to adhesion bonding through flocking.

As the plastics, not only polyolefins but also other arbitrary plastics, such as polyvinyl chloride, ABS, polyester, polyamide, polycarbonate and an epoxy resin, are available. The plastic molded product to be bonded may be in any shape such as sheet, film or other shape.

The adhesion bonding can be carried out by applying the aqueous resin dispersion of the invention to an adhered surface similarly to a conventional aqueous dispersion type adhesive and then heating the dispersion to dryness when needed.

Solvent Dispersion

The solvent dispersion of the invention comprises an organic medium and the polar group-containing olefin copolymer or the thermoplastic resin composition dispersed therein in a solid state.

Examples of the organic media which are good solvents to polyolefins include aromatic hydrocarbons, such as benzene, toluene and xylene; aliphatic hydrocarbons, such as hexane, heptane, octane and decane; alicyclic hydrocarbons, such as cyclohexane, cyclohexene and methylcyclohexane; aliphatic alcohols, such as ethanol and isopropanol; ketone solvents, such as acetone, methyl isobutyl ketone and methyl ethyl ketone; and halogenated hydrocarbons, such as trichloroethylene, dichloroethylene and chlorobenzene.

Examples of the organic media which are poor solvents to polyolefins include alcohols, ketones, ethers, esters and cellosolves. Specifically, there can be mentioned methanol, ethanol, propanol, butanol, pentanol, hexanol, propanediol, phenol, diethyl ether, dipropyl ether, dibutyl ether, anisole, dioxane, tetrahydrofuran, acetone, methyl ethyl ketone, methyl isobutyl ketone, pentanone, hexanone, isophorone, acetophenone, anhydrous acetic acid, methyl acetate, ethyl acetate, butyl acetate, methyl propionate, butyl formate, ethyl cellosolve and methyl cellosolve.

The organic media can be used singly or in combination of two or more kinds, and it is preferable to use a mixture of a good solvent and a poor solvent from the viewpoints of low-temperature flowability and dispersion stability. There is no specific limitation on the ratio between a good solvent and a poor solvent.

To the solvent dispersion of the invention, known additives, such as pigment, filler and stabilizer, can be added when needed, within limits not detrimental to the objects of the invention.

In the preparation of the solvent dispersion of the invention, for example, the polar group-containing olefin copolymer or the thermoplastic resin composition is mixed with the organic medium and heated to be completely dissolved. The temperature for the melting is in the range of usually 100 to 150° C. Then, the solution is cooled to precipitate the polar group-containing olefin copolymer or the thermoplastic resin composition. In order to precipitate the copolymer or the composition in the temperature range of 60 to 100° C., it is preferable to previously set composition of the organic medium and to adjust the average cooling rate to 1 to 20° C./hr, preferably 2 to 10° C./hr. It is possible to dissolve the polar group-containing olefin copolymer or the thermoplastic resin composition in an organic medium composed of only a good solvent, adding a poor solvent after completion of precipitation and then conducting further precipitation.

The dispersed particles contained in the solvent dispersion of the invention obtained as above are generally spherical, but they do not always need to be spherical. The mean diameter of the dispersed particles is not specifically limited, but it is in the range of usually 1 to 20 μm, preferably 5 to 15 μm. The particle concentration (solids concentration) of the solvent dispersion is not specifically limited, but it is in the range of usually 5 to 40% by weight.

The resin dispersion used as an adhesive for bonding metal to metal, polyolefin to polyolefin or metal to polyolefin exhibits excellent adhesion properties, and hence it is effectively used as an adhesive for PTP packaging of medicines, an adhesive for lamination, a coating material or a primer.

Film and Sheet

The film and the sheet comprising the polar group-containing olefin copolymer or the thermoplastic resin composition may be a stretched one or an unstretched one, and can be produced by an appropriate known method. Examples of the methods to produce the film and the sheet of the invention include extrusion molding, injection molding, inflation molding, blow molding, extrusion blow molding, injection blow molding, press molding, vacuum molding, calendering and expansion molding.

When the film and the sheet comprising the polar group-containing olefin copolymer or the thermoplastic resin composition are produced by extrusion molding, an extrusion molding device and molding conditions hitherto known are adoptable. For example, using a single-screw extruder, a kneading extruder, a ram extruder, a gear extruder or the like, the molten polar group-containing olefin copolymer or the molten thermoplastic resin composition is extruded from a T-die, whereby an unstretched film or sheet can be produced.

The film and the sheet of the invention may be those produced by inflation molding. When the film and the sheet of the invention comprising the polar group-containing olefin copolymer or the thermoplastic resin composition are produced by inflation molding, drawdown is hardly brought about.

When the film and the sheet of the invention comprising the polar group-containing olefin copolymer or the thermoplastic resin composition are produced by injection molding, an injection molding device and molding conditions hitherto known are adoptable. The polar group-containing olefin copolymer or the thermoplastic resin composition can be injection molded into a film or a sheet having desired shape and thickness. The film and the sheet obtained by injection molding may be stretched.

The stretched film or sheet can be obtained by stretching an unstretched film or sheet such as the above-mentioned extruded film or sheet through a known stretching method such as tentering (lengthwise-crosswise stretching, crosswise-lengthwise stretching), simultaneous biaxial orientation or monoaxial stretching.

In the stretching of the unstretched film or sheet, the stretch ratio is desired to be in the range of usually 20 to 70 times in case of biaxial orientation and usually 2 to 10 times in case of monoaxial stretching, though it depends upon the thickness of the unstretched film or sheet. The thickness of the stretched film or sheet is preferably in the range of 5 to 200 μm, though it depends upon use of the film or sheet.

Next, the film and the sheet of the invention having two or more layers of different compositions (sometimes referred to as "laminate(s)" hereinafter) are described below.

The film or the sheet of a multi-layer structure according to the invention is a film or a sheet of a multi-layer structure consisting of two or more layers having different compositions, and at least one layer of those layers may be formed from the polar group-containing olefin copolymer. The film or the sheet of the invention is a film or a sheet of a multi-layer structure consisting of two or more layers having different compositions, and at least one layer of those layers may be formed from the thermoplastic resin composition.

The film or the sheet of a multi-layer structure according to the invention also preferably consists of (a) a layer comprising the polar group-containing olefin copolymer and (b) a thermoplastic resin layer, or also preferably consists of (b) a thermoplastic resin layer and (c) a layer comprising the thermoplastic resin composition.

The laminate of the invention is a film or a sheet of a multi-layer structure consisting of two or more layers having different compositions, and at least one layer of those layers may be formed from the polar group-containing olefin copolymer or the thermoplastic resin composition.

The laminate desirably consists of:

(a) a layer comprising the polar group-containing olefin copolymer, and (b) a thermoplastic resin layer, or (b) a thermoplastic resin layer, and (c) a layer comprising the thermoplastic resin composition.

Examples of the thermoplastic resins for forming the thermoplastic resin layer (b) in the film or the sheet of a multi-layer structure include resins used for the aforesaid thermoplastic resin composition, such as polyolefin, polyamide, polyester, polyacetal, polystyrene, acrylonitrile/butadiene/styrene copolymer (ABS), polycarbonate, polyphenylene oxide, polyacrylate and polyvinyl chloride. These thermoplastic resins can be used singly or in combination.

The thermoplastic resin layer (b) preferably comprises a thermoplastic resin containing at least one resin selected from polyolefin, polyamide, polyester, polyacetal, polyvinyl chloride, polystyrene, acrylonitrile/butadiene/styrene copolymer (ABS) and polycarbonate, and more preferably comprises a thermoplastic resin selected from polyolefin, ethylene/polar group-containing vinyl copolymer, polyester, polycarbonate and polyamide.

The polyester resin is a polyester formed from dihydroxy compound units and dicarboxylic acid units. The dihydroxy compound units are derived from aliphatic glycols, such as ethylene glycol, propylene glycol, 1,4-butanediol, neopentyl glycol and hexamethylene glycol, alicyclic glycols, such as cyclohexanedimethanol, aromatic dihydroxy compounds, such as bisphenol, or derived from two or more dihydroxy compounds selected from these compounds. The dicarboxylic acid units are derived from aromatic dicarboxylic acids, such as terephthalic acid, isophthalic acid and 2,6-naphthalenedicarboxylic acid, aliphatic dicarboxylic acids, such as oxalic acid, succinic acid, adipic acid, sebacic acid and undecadicarboxylic acid, alicyclic dicarboxylic acids, such as hexahydroterephthalic acid, or derived from two or more dicarboxylic acids selected from these acids. The polyester resin may be modified with a small amount of a trivalent or higher polyhydroxy compound or a polycarboxylic acid, such as triol or tricarboxylic acid.

As the thermoplastic polyester resin, polyethylene terephthalate, polybutylene terephthalate, a polyethylene isophthalate/terephthalate copolymer or the like is preferably used.

As the polycarbonate resin, any of various polycarbonates and copolycarbonates obtained by allowing dihydroxy compounds to react with phosgene or diphenyl carbonate by known processes is employable.

Examples of the dihydroxy compounds include hydroquinone, resorcinol, 4,4'-dihydroxydiphenylmethane, 4,4'-dihydroxydiphenylethane, 4,4'-dihydroxydiphenyl-n-butane, 4,4'-dihydroxydiphenylheptane, 4,4'-dihydroxydiphenylphenylmethane, 4,4'-dihydroxydiphenyl-2,2-propane (bisphenol A), 4,4'-dihydroxy-3,3'-dimethyldiphenyl-2,2-propane, 4,4'-dihydroxy-3,3'-diphenyldiphenyl-2,2-propane, 4,4'-dihydroxydichlorodiphenyl-2,2-propane, 4,4'-dihydroxydiphenyl-1,1-cyclopentane, 4,4'-dihydroxydiphenyl-1,1-cyclohexane, 4,4'-dihydroxydiphenylmethylphenylmethane, 4,4'-dihydroxydiphenylethylphenylmethane, 4,4'-dihydroxydiphenyl-2,2,2-trichloro-1,1-ethane, 2,2'-dihydroxydiphenyl, 2,6-dihydroxynaphthalene, 4,4'-dihydroxydiphenyl ether, 4,4'-dihydroxy-,3,3'-dichlorodiphenyl ether and 4,4'-dihydroxy-2,5-diethoxyphenyl ether.

Polycarbonate using 4,4'-dihydroxydiphenyl-2,2-propane (bisphenol A) out of the above compounds is preferable because of its excellent mechanical properties and transparency.

As the polyamide resin, any of various polyamides and copolyamides obtained by ring-opening polymerization of caprolactam or polycondensation reaction of diamines with dicarboxylic acids by known processes is employable. Of these, nylon-6, nylon-6,6 or a m-xylenediamine/adipic acid condensation polymer is preferably used.

Examples of the polyolefins include an ethylene (co)polymer, a propylene (co)polymer, a butene (co)polymer, a 4-methyl-1-pentene (co)polymer, a 3-methyl-1-butene (co)polymer and a hexene (co)polymer. Of these, an ethylene (co)polymer, a propylene (co)polymer or a 4-methyl-1-pentene (co)polymer is preferable. As the ethylene (co)polymer, an ethylene/vinyl acetate copolymer or an ethylene/vinyl acetate copolymer saponification product is more preferable.

The ethylene content of the ethylene/vinyl acetate copolymer is desired to be in the range of 15 to 60% by mol, preferably 25 to 50% by mol. The melt flow rate of the ethylene/vinyl acetate copolymer, as measured at 190° C., is in the range of 0.1 to 500 g/10 min, preferably 0.1 to 400 g/10 min, more preferably 0.1 to 300 g/10 min.

As the ethylene/vinyl acetate copolymer saponification product, preferably used is one obtained by saponifying an ethylene/vinyl acetate copolymer having an ethylene content of 15 to 60% by mol, preferably 25 to 50% by mol, in such a manner that the degree of saponification should become not less than 50%, preferably not less than 90%. When the ethylene content is in the above range, the saponification product is hardly thermally decomposed, easily melt molded and has excellent extensibility, water resistance and gas permeation resistance. When the degree of saponification is not less than 50%, the saponification product has excellent gas permeation resistance and is preferable.

In the laminate of the invention, between the thermoplastic resin layer (b) and the polar group olefin copolymer layer (a) or the thermoplastic resin composition layer (c) can be interposed, for example, an ethylene (co)polymer or a propylene polymer having been graft copolymerized with maleic anhydride.

The film and the sheet of a multi-layer structure (laminate) according to the invention may be produced by any process. For example, materials for forming layers are subjected to integral molding such as co-extrusion to form a film or a sheet, or a material for forming one layer of the multi-layer structure to form a film or a sheet, followed by molding a material for forming another layer thereon to form a sheet or a film, or materials for forming layers are each molded to films or sheets, followed by laminating them by contact bonding, fusion bonding, adhesion bonding or the like.

The laminate of the invention desirably consists of the polar group-containing olefin copolymer layer (a) or the thermoplastic resin composition layer (c), and the thermoplastic resin layer (b). To produce such a laminate, there is employable a co-extrusion molding process wherein a thermoplastic resin for forming the thermoplastic resin layer (b) and the polar group-containing olefin copolymer or the thermoplastic resin composition are independently melted by different extruders, then fed to a die of two-layer or three-layer structure and co-extruded so that the polar group-containing olefin copolymer or the adhesive resin composition forms an intermediate layer, or a sandwich laminating process wherein the thermoplastic resin layer (b), and the polar group-containing olefin copolymer layer (a) or the thermoplastic resin composition layer (c) are each previously formed and between those layers an adhesive resin composition is melt extruded.

Of the above processes, the co-extrusion molding process is preferable from the viewpoint of interlaminar strength. The co-extrusion molding process includes a T-die process using a flat die and an inflation process using a circular die. As the flat die, any of single-manifold type using black box and multi-manifold type is employable. As the die for the inflation process, any of known dies is employable.

The thickness of each layer of the laminate can be properly determined according to the use of the laminate.

When the laminate is obtained as a sheet or a film, the thermoplastic resin layer (b) has a thickness of usually 0.01 to 1 mm, the adhesive layer functioning as an adhesive has a thickness of usually 0.005 to 1 mm, and the polar group-containing olefin copolymer layer (a) or the thermoplastic resin composition layer (c) is usually 0.01 to 5 mm.

When the laminate of the invention comprises, for example, the polar group-containing olefin copolymer layer (a) and the thermoplastic resin layer (b), the structure of the laminate may be a two-layer structure, i.e., (a)/(b), a structure wherein the layer (a) is arranged on each side, i.e., (a)/(b)/(a), or a structure wherein another layer (x) such as a polyolefin layer is added, i.e., (a)/(b)/(x)/(b)/(a), (x)/(a)/(b) or (x)/(b)/(a).

The film or the sheet of the invention wherein at least one layer is the polar group-containing olefin copolymer layer (a) or the thermoplastic resin composition layer (c) is favorably used as agricultural, wrapping, shrink or protective film or sheet. Further, the film or the sheet of the invention can be favorably used as selective separating film, such as blood plasma separating film, water permselective vaporization film, ion exchange membrane, battery separator or optical resolution film.

The sheet or the film of the invention can be applied to various uses such as microcapsule, PTP packaging, chemical bulb and drug delivery system.

Effect of the Invention

The polar group-containing olefin copolymer or the thermoplastic resin composition according to the invention is excellent in adhesion properties to polar materials such as metals and polar resins, compatibility and flexibility.

EXAMPLE

The present invention is further described with reference to the following examples, but it should be construed that the invention is in no way limited to those examples.

In the examples, various properties were measured in the following manner.

Adhesion Properties

Production of Film

On a press plate, an aluminum sheet having a thickness of 0.1 mm, a polyamide sheet and an aluminum sheet having a thickness of 100 μm from the center of which a square of 20 cm×20 cm had been cut away were superposed in this order, and on the center (cut portion) was placed 4.0 g of a sample (polar group-containing olefin copolymer). Then, a polyimide sheet, an aluminum sheet and a press plate were further superposed thereon in this order.

The sample interposed between the press plates were placed in a hot press at 190° C. and preheated for about 5 minutes. In order to remove bubbles from the sample, operations of pressurizing (50 kg/cm$^2$-G) and pressure release were repeated several times. Subsequently, the pressure was increased to 100 kg/cm$^2$-G, and the sample was heated for 5 minutes under pressure. After pressure release, the press plates were taken out of the pressing machine and transferred into a different pressing machine with a compression section kept at 20° C., followed by cooling for 5 minutes under a pressure of 100 kg/cm$^2$-G. After pressure release, the sample was taken out. Of the resulting film (polar group-containing olefin copolymer film), a portion having a uniform thickness of about 150 to 170 μm was used to measure adhesion strength.

Measurement of Adhesion Strength to Al

The polar group-containing olefin copolymer film was sandwiched between two square aluminum sheets of 20 cm×20 cm (thickness: 50 μm), and the aluminum sheets and the polar group-containing olefin copolymer film were laminated under the same pressing conditions as in the above "Production of film". The resulting laminate was cut to give a strip having a width of 15 mm, and the aluminum sheet and the polar group-containing olefin copolymer film were peeled from each other at the adhesive interface at a peel angle of 180°, to measure peel strength.

Measurement of Adhesion Strength to PET

The polar group-containing olefin copolymer film was sandwiched between two square homopolyethylene terephthalate (PET) films of 20 cm×20 cm (thickness: 100 μm), and the PET films and the polar group-containing olefin copolymer film were laminated under the same pressing conditions as in the above "Production of film" except that the press temperature was changed to 280° C. and the preset temperature of the cooling press was changed to −8° C. The resulting laminate was cut to give a strip having a width of 15 mm, and the PET film and the polar group-containing olefin copolymer film were peeled from each other at the adhesive interface at a peel angle of 180°, to measure peel strength.

Measurement of Adhesion Strength to Ny

The polar group-containing olefin copolymer film was sandwiched between two square nylon 6 films of 20 cm×20 cm (thickness: 100 μm), and the nylon 6 films and the polar group-containing olefin copolymer film were laminated under the same pressing conditions as in the above "Production of film" except that the press temperature was changed to 250° C. The resulting laminate was cut to give a strip having a width of 15 mm, and the nylon 6 film and the polar group-containing olefin copolymer film were peeled from each other at the adhesive interface at a peel angle of 180°, to measure peel strength.

Measurement of Adhesion Strength to EVOH

The polar group-containing olefin copolymer film was sandwiched between two square ethylene/vinyl alcohol copolymer films of 20 cm×20 cm (thickness: 100 μm), and the ethylene/vinyl alcohol copolymer films and the polar group-containing olefin copolymer film were laminated under the same pressing conditions as in the above "Production of film" except that the press temperature was changed to 200° C. The resulting laminate was cut to give a strip having a width of 15 mm, and the ethylene/vinyl alcohol copolymer film and the polar group-containing olefin copolymer film were peeled from each other at the adhesive interface at a peel angle of 180°, to measure peel strength.

Impact Resistance Test, Tensile Test

Izod Impact Strength (Notched)

The impact strength was measured at 23° C. in accordance with ASTM D 256.

Tensile Test

A dumbbell specimen punched out of a pressed sheet was subjected to a tensile test under the conditions of a temperature of 23° C., a span of 30 mm and a pulling rate of 30 mm/min in accordance with ASTM D 638, to measure tensile strength and elongation at break.

Anti-fogging Properties

Production of Film

On a press plate, a PET sheet and an aluminum sheet having a thickness of 100 μm from the center of which a square of 20 cm×20 cm had been cut away were superposed in this order, and on the center (cut portion) was placed 3.3 g of a sample (polar group-containing olefin copolymer). Then, a PET sheet, an aluminum sheet and a press plate were further superposed thereon in this order.

The sample interposed between the press plates were placed in a hot press at 200° C. and preheated for about 7 minutes. In order to remove bubbles from the sample, operations of pressurizing (50 kg/cm$^2$-G) and pressure release were repeated several times. Subsequently, the pressure was increased to 100 kg/cm$^2$-G, and the sample was heated for 2 minutes under pressure. After pressure release, the press plates were taken out of the pressing machine and transferred into a different pressing machine with a compression section kept at 0° C., followed by cooling for 4 minutes under a pressure of 100 kg/cm$^2$-G. After pressure release, the sample was taken out. The resulting polar group-containing olefin copolymer film was used to evaluate initial anti-fogging properties.

Evaluation of Initial Anti-fogging Properties

In a 100 cc beaker, 70 cc of water was placed, and the upper part of the beaker was covered with the sample film. Then, the beaker was placed in a constant temperature water bath at 50° C., and the water bath was allowed to stand in a constant temperature room at 20° C. After 24 hours, the degree of fogging on the inside surface of the sample film was observed.

Evaluation Criteria:

AA: Droplets run on the film surface and no droplet sticking to the film surface is observed.

BB: Large droplets are sticking to some parts of the film surface.

CC: Fine droplets are sticking to almost all surface of the film.

Coating Properties

Cross-cut Adhesion Test

A specimen provided with cross cuts in accordance with the cross-cut adhesion test described in JIS K5400 was prepared. To the specimen, Cellotape (trade name, available from Nichiban Co., Ltd.) was attached. Then, the Cellotape was rapidly pulled up at an angle of 90° and thereby separated from the specimen. The number of cross cuts with the coating film remaining thereon was counted and taken as an indication of adhesion properties.

Filler Dispersibility

Preparation of Organicity-imparted Montmorillonite

In 1000 ml of distilled water at 70° C., 40 g of Na type montmorillonite was dispersed. Into the resulting suspension, a solution obtained by mixing 20 g of 12-aminododecanoic acid and 2 ml of hydrochloric acid in 100 ml of distilled water was introduced, and they were stirred at 70° C. for 2 hours to exchange metal ions present between montmorillonite layers with organic cations. Then, the precipitate obtained was filtered, sufficiently washed with warm water to perform purification, then freeze-dried and pulverized to obtain 27 g of organicity-imparted montmorillonite.

Preparation of Sample for Property Evaluation

To a mixture of 92 parts by weight of a propylene/ethylene block copolymer (ethylene content: 5.6 mol %, MFR: 25 g/10 min), 5 parts by weight of the organicity-imparted montmorillonite obtained above and 3 parts by weight of the polar group-containing olefin copolymer obtained in each example, Irganox 1010™, Irgaphos 168™ and calcium stearate were each added in an amount of 0.1 part by weight, and the resulting resin was melt mixed by a twin-screw extruder with a diameter of 20 mm at a cylinder temperature of 200° C. in a nitrogen atmosphere to prepare pellets. The pellets were injection molded under the conditions of a cylinder temperature of 200° C., a mold temperature of 40° C. and an injection pressure of 1000 kg/cm$^2$ to obtain specimens for various property evaluation. The specimens were maintained at 23° C. for 168 hours and then subjected to tests.

Flexural Modulus (FM)

Using an injection molded specimen having a length of 5 inches, a width of ½ inch and a thickness of ⅛ inch, flexural modulus was measured in accordance with ASTM D 638.

Izod Impact Strength (IZ)

Using a specimen (rear notched) having a thickness of ¼ inch, Izod impact strength was measured at 23° C. in accordance with ASTM D 258.

Heat Distortion Temperature (HDT)

Using an injection molded specimen having a length of 5 inches, a width of ¼ inch and a thickness of ½ inch, heat distortion temperature was measured in accordance with ASTM D 648.

Dispersibility in Water

Preparation of Water Dispersion

With 40 g of the polar group-containing olefin copolymer obtained, 4 g of maleic anhydride graft polypropylene (propylene/ethylene: 98/2 by mol, maleic anhydride content: 4.0 weight %, viscosity-average molecular weight: 17,000, density: 0.919 g/cm$^3$, melting point: 136° C., softening point: 143° C., melt viscosity (180° C.): 500 cps) as modified polyolefin and 1.2 g of potassium oleate as a surface active agent were mixed at room temperature. Then, the mixture was melt kneaded for 5 minutes by a labo-plastomill (preset temperature: 200° C.). To the kneadate was then added 1.4 g of a 18.7% aqueous solution of potassium hydroxide, followed by melt kneading for another 5 minutes. Subsequently, the contents were taken out of the mill, and the resulting viscous emulsion was dispersed in hot water of 60° C. to obtain an aqueous resin dispersion.

Measurement of Dispersed Particle Diameter

The dispersed particle diameter was measured using a microtrack manufactured by Honeywell Co.

Dispersing Stability

The aqueous resin dispersion obtained in each example was placed in a glass bottle capable of being closed, and allowed to stand still at room temperature. After one month, separation between the aqueous phase and the resin phase was observed.

Heat-sealing Strength to Al

Each dispersion was coated on an aluminum foil (50 µm) by a bar coater, air dried and then heated for 10 seconds in an air oven preset at 200° C. to obtain a coated foil having a uniform coating film. The coated foil and a LLDPE sheet (available from Akosu Kogyo K.K., thickness: 300 µm) were heat bonded at a temperature of 180° C. for 1 second under a pressure of 1 kg/cm$^2$ by the method in accordance with JIS Z1707, and then cut to give a specimen having a width of 15 mm. The specimen was subjected to a 1800 peel test at a measuring temperature of 23° C. to measure adhesion strength (pulling rate: 300 mm/min).

Dispersibility in Solvent

Preparation of Solvent Dispersion

In a 1-liter glass autoclave equipped with a stirrer, 55 g of the polar group-containing olefin copolymer obtained and 495 g of toluene were placed, and they were heated to 130° C. to completely dissolve the resin. Thereafter, the solution was cooled down to 85° C. over a period of 1 hours, then cooled from 85° C. down to 40° C. over a period of 4.5 hours and then cooled from 40° C. down to 30° C. over a period of 30 minutes, to obtain a resin dispersion.

Measurement of Dispersed Particle Diameter

The dispersed particle diameter was measured using a microtrack manufactured by Honeywell Co.

Dispersing Stability

The solvent dispersion obtained in each example was placed in a glass bottle capable of being closed, and allowed to stand still at room temperature. After one month, separation between the solvent phase and the resin phase was observed.

Heat-Sealing Strength to Al

Each dispersion was coated on an aluminum foil (50 µm) by a bar coater, air dried and then heated for 10 seconds in an air oven preset at 200° C. to obtain a coated foil having a uniform coating film. The coated foil and a LLDPE sheet (available from Akosu Kogyo K.K., thickness: 300 µm) were heat bonded at a temperature of 180° C. for 1 second under a pressure of 1 kg/cm$^2$ by the method in accordance with JIS Z1707, and then cut to give a specimen having a width of 15 mm. The specimen was subjected to a 1800 peel test at a measuring temperature of 23° C. to measure adhesion strength (pulling rate: 300 mm/min).

Example 1

In a 1000 ml glass polymerization reactor thoroughly purged with nitrogen, 400 ml of n-decane was placed, then nitrogen was passed through at a rate of 20 l/hr, and the contents were maintained at 130° C. for 10 minutes. Then, 0.6 mmol of triisobutylaluminum was added, followed by further adding 0.48 mmol of undecene-1-ol (having been dried over activated alumina) represented by the following formula.

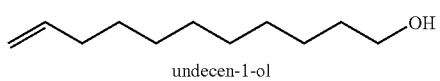

undecen-1-ol

Then, 1.100 mmol of methylaluminoxane was further added, and passing of nitrogen was stopped, followed by passing ethylene at a rate of 12.5 l/hr. Finally, a toluene slurry solution in which 0.002 mmol of dimethylsilylene(2,7-dimethyl-4,5-(2-methyl-benzo)-1-indenyl)(2,7-di-tert-butylfluorenyl)zirconium dichloride and 0.500 mmol of methylaluminoxane had been contacted at room temperature for 10 minutes was added to initiate polymerization. After the polymerization was conducted at 130° C. for 1 hour at atmospheric pressure, a small amount of isobutyl alcohol was added to terminate the polymerization. Then, 100 ml of an isobutyl alcohol solution containing 1 ml of a concentrated hydrochloric acid aqueous solution was added, followed by heating at 75° C. in a nitrogen atmosphere. The polymer solution obtained was introduced into a large excess of methanol to precipitate a polymer and then vacuum dried at 80° C. for 12 hours. As a result, 3.73 g of a polymer was obtained.

Properties of the resulting polar group-containing olefin copolymer are set forth in Table 8.

The polar group-containing olefin copolymer was measured on the adhesion strength (to Al) by the aforesaid method. The result is set forth in Table 9.

Example 2

In a 1000 ml glass polymerization reactor thoroughly purged with nitrogen, 400 ml of toluene was placed, then nitrogen was passed through at a rate of 20 l/hr, and the contents were maintained at 90° C. for 10 minutes. Then, 0.6 mmol of triisobutylaluminum was added, followed by further adding 0.48 mmol of 1,2-epoxy-9-decene (having been dried over silica alumina) represented by the following formula.

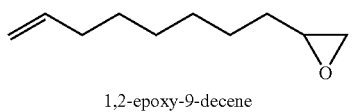

1,2-epoxy-9-decene

Then, 1.100 mmol of methylaluminoxane was further added, and passing of nitrogen was stopped, followed by passing ethylene at a rate of 12.5 l/hr. Finally, a toluene slurry solution in which 0.002 mmol of dimethylsilylene(2,7-dimethyl-4,5-(2-methyl-benzo)-1-indenyl)(2,7-di-tert-butylfluorenyl)zirconium dichloride and 0.500 mmol of methylaluminoxane had been contacted at room temperature for 10 minutes was added to initiate polymerization. After the polymerization was conducted at 90° C. for 1 hour at atmospheric pressure, a small amount of isobutyl alcohol was added to terminate the polymerization. Then, 100 ml of an isobutyl alcohol solution containing 1 ml of a concentrated hydrochloric acid aqueous solution was added, followed by heating at 75° C. in a nitrogen atmosphere. The polymer solution obtained was introduced into a large excess of methanol to precipitate a polymer and then vacuum dried at 80° C. for 12 hours. As a result, 3.64 g of a polymer was obtained.

Properties of the resulting polar group-containing olefin copolymer are set forth in Table 8.

The polar group-containing olefin copolymer was measured on the adhesion strength (to PET) by the aforesaid method. The result is set forth in Table 9.

Example 3

In a 1000 ml glass polymerization reactor thoroughly purged with nitrogen, 400 ml of n-decane was placed, then nitrogen was passed through at a rate of 20 l/hr, and the contents were maintained at 90° C. for 10 minutes. Then, 0.6 mmol of triisobutylaluminum was added, followed by further adding 0.48 mmol of (2,7-octadien-1-yl)succinic anhydride (having been dried over activated alumina) represented by the following formula.

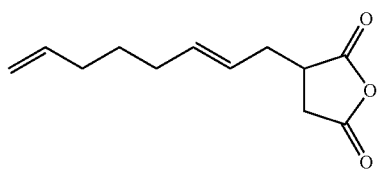

(2,7-octadien-1-yl)succinic anhydride

Then, 1.100 mmol of methylaluminoxane was further added, and passing of nitrogen was stopped, followed by passing ethylene at a rate of 12.5 l/hr. Finally, a toluene slurry solution in which 0.002 mmol of dimethylsilylene(2,7-dimethyl-4,5-(2-methyl-benzo)-1-indenyl)(2,7-di-tert-butylfluorenyl)zirconium dichloride and 0.500 mmol of methylaluminoxane had been contacted at room temperature for 10 minutes was added to initiate polymerization. After the polymerization was conducted at 130° C. for 1 hour at atmospheric pressure, a small amount of isobutyl alcohol was added to terminate the polymerization. Then, 100 ml of an isobutyl alcohol solution containing 1 ml of a concentrated hydrochloric acid aqueous solution was added, followed by heating at 75° C. in a nitrogen atmosphere. The polymer solution obtained was introduced into a large excess of methanol to precipitate a polymer and then vacuum dried at 80° C. for 12 hours. As a result, 3.18 g of a polymer was obtained.

Properties of the resulting polar group-containing olefin copolymer are set forth in Table 8.

The polar group-containing olefin copolymer was measured on the adhesion strength (to Ny) by the aforesaid method. The result is set forth in Table 9.

Example 4

Copolymerization of propylene and a polar group-containing monomer was carried out in the same manner as in Example 1, except that 0.00075 mmol of dimethylsilylene(2-methyl-4-phenanthryl-1-indenyl)zirconium dichloride was used instead of dimethylsilylene(2,7-dimethyl-4,5-(2-methyl-benzo)-1-indenyl)(2,7-di-tert-butylfluorenyl)zirconium dichloride, pentapropenyl succinic anhydride represented by the following formula was used as the polar group-containing monomer, and polymerization was conducted at 60° C. for 30 minutes with passing propylene instead of ethylene.

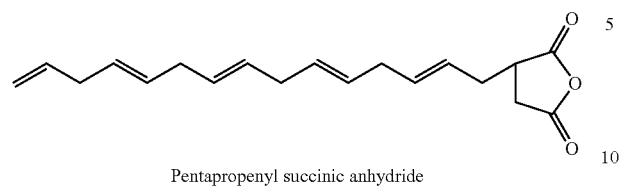

Pentapropenyl succinic anhydride

Properties of the resulting polar group-containing olefin copolymer are set forth in Table 8.

The polar group-containing olefin copolymer was measured on the adhesion strength (to EVOH) by the aforesaid method. The result is set forth in Table 9.

Example 5

Polymerization was carried out in the same manner as in Example 4, except that 1,2-epoxy-9-decene was used instead of pentapropenyl succinic anhydride. Properties of the resulting polar group-containing olefin copolymer are set forth in Table 8.

To 20 weight % of the polar group-containing olefin copolymer obtained above, 80 weight % of nylon 6 (relative viscosity: 2.35 dl/g) was added, and the mixture was melt kneaded by a twin-screw extruder with a diameter of 20 mm at 250° C. to prepare a thermoplastic resin composition. The thermoplastic resin composition was subjected to an impact resistance test and a tensile test by the aforesaid methods. The results are set forth in Table 9.

Example 6

To 10 weight % of the polar group-containing olefin copolymer obtained in Example 4, 30 weight % of nylon 6 (relative viscosity: 2.35 dl/g) and 60 weight % of a propylene homopolymer (MFR (230° C., load of 2.16 kg): 2.2 g/10 min) were added, and the mixture was melt kneaded by a twin-screw extruder with a diameter of 20 mm at 250° C. to prepare a thermoplastic resin composition. The thermoplastic resin composition was subjected to an impact resistance test and a tensile test by the aforesaid methods.

The results are set forth in Table 9.

Comparative Example 1

To 70 weight % of a propylene homopolymer (MFR (230° C., load of 2.16 kg): 2.2 g/10 min), 30 weight % of nylon 6 (relative viscosity: 2.35 dl/g) was added, and the mixture was melt kneaded by a twin-screw extruder with a diameter of 20 mm at 250° C. to prepare a thermoplastic resin composition. The thermoplastic resin composition was subjected to an impact resistance test and a tensile test by the aforesaid methods. The results are set forth in Table 9.

Example 7

From the polar group-containing olefin copolymer obtained in Example 1, a film was produced in the aforesaid manner. Using the film, anti-fogging properties were evaluated. The result is set forth in Table 9.

Example 8

Polymerization was carried out in the same manner as in Example 1, except that delta 12-tridecanol represented by the following formula was used instead of undecen-1-ol and propylene was used instead of ethylene.

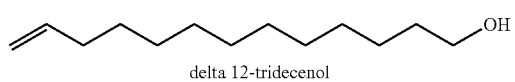

delta 12-tridecenol

Properties of the resulting polar group-containing olefin copolymer are set forth in Table 8.

The polar group-containing olefin copolymer was evaluated on the coating properties by the aforesaid method. The result is set forth in Table 9.

Example 9

Using the polar group-containing olefin copolymer obtained in Example 4, filler dispersibility was evaluated by the aforesaid method. The result is set forth in Table 9.

Comparative Example 2

Filler dispersibility was evaluated in the same manner as in Example 9, except that no polar group-containing olefin copolymer was used. The result is set forth in Table 9.

Example 10

Using the polar group-containing olefin copolymer obtained in Example 1, a water dispersion was prepared in the aforesaid manner, and dispersibility in water was evaluated by the aforesaid method. The result is set forth in Table 9.

Example 11

Copolymerization of ethylene and a polar group-containing monomer was carried out in the same manner as in Example 1, except that undecylenic acid represented by the following formula was used instead of undecen-1-ol.

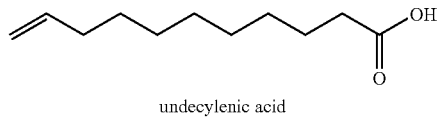

undecylenic acid

Properties of the resulting polar group-containing olefin copolymer are set forth in Table 8.

Using the polar group-containing olefin copolymer thus obtained, a water dispersion was prepared in the aforesaid manner, and dispersibility in water was evaluated by the aforesaid method. The result is set forth in Table 9.

Example 12

Using the polar group-containing olefin copolymer obtained in Example 3, a solvent dispersion was prepared in the aforesaid manner, and dispersibility in solvent was evaluated by the aforesaid method. The result is set forth in Table 9.

TABLE 8

| | Constituent unit (1) | Constituent unit (3) | | Composition (molar ratio) | | MFR | | Tαβ/Tαα |
|---|---|---|---|---|---|---|---|---|
| | R¹ | R³ | R⁴ X | (1)/(3) | Mw | (g/10 分) | Mw/Mn | |
| Ex. 1 | H | C₉H₁₈ | — OH | 99.5/0.5 | 100,000 | 0.7 *1 | 2.7 | 0 |
| Ex. 2 | H | C₆H₁₂ | — epoxy group | 99.5/0.5 | 72,000 | 2.5 *1 | 2.8 | 0 |
| Ex. 3 | H | C₆H₁₀ | — acid anhydride group | 99.5/0.5 | 70,000 | 2.5 *1 | 2.2 | 0 |
| Ex. 4 | CH₃ | C₁₃H₁₈ | — acid anhydride group | 99.5/0.5 | 250,000 | 14.6 *2 | 2.5 | 0.13 |
| Ex. 5 | CH₃ | C₆H₁₂ | — epoxy group | 99.5/0.5 | 250,000 | 14.6 *2 | 2.3 | 0.15 |
| Ex. 8 | CH₃ | C₁₁H₂₂ | — OH | 99.5/0.5 | 250,000 | 14.6 *2 | 2.6 | 0.20 |
| Ex. 11 | H | C₈H₁₆ | — COOH | 99.5/0.5 | 70,000 | 2.5 *1 | 2.6 | 0.01 |

*1: measured at 190° C. under a load of 2.16 kg
*2: measured at 230° C. under a load of 2.16 kg

TABLE 9

| | Property items | Property value | Unit |
|---|---|---|---|
| Ex. 1 | Adhesion strength (to Al) | 2 | Kgf/15 mm |
| Ex. 2 | Adhesion strength (to PET) | broken substrate | Kgf/15 mm |
| Ex. 3 | Adhesion strength (to Ny) | 6.2 | Kgf/15 mm |
| Ex. 4 | Adhesion strength (to EVOH) | 6.5 | Kgf/15 mm |
| Ex. 5 | IZ | 32 | J/m |
| | Tensile strength | 41 | MPa |
| | Elongation at break | 11 | % |
| Ex. 6 | IZ | 28 | J/m |
| | Tensile strength | 40 | MPa |
| | Elongation at break | 13 | % |
| Comp Ex. 1 | IZ | 15 | J/m |
| | Tensile strength | 22 | MPa |
| | Elongation at break | 4 | % |
| Ex. 7 | Anti-fogging properties (visual observation) | AA | — |
| Ex. 8 | Cross-cut adhesion test | 100/100 | number of cuts/number of cuts |
| Ex. 9 | FM | 1900 | MPa |
| | IZ | 55 | J/m |
| | HDT | 129 | ° C. |
| Comp Ex. 2 | FM | 1250 | MPa |
| | IZ | 52 | J/m |
| | HDT | 115 | ° C. |
| Ex. 10 | Dispersed particle diameter | 0.7 | µm |
| | Dispersion stability | not separated | |
| | Heat-sealing strength to Al | 2 | Kgf/15 mm |
| Ex. 11 | Dispersed particle diameter | 0.6 | µm |
| | Dispersion stability | not separated | |
| | Heat-sealing strength to Al | 2.5 | Kgf/15 mm |
| Ex. 12 | Dispersed particle diameter | 10 | µm |
| | Dispersion stability | not separated | |
| | Heat-sealing strength to Al | 3 | Kgf/15 mm |

Example 13

In a 2-liter stainless steel (SUS) autoclave thoroughly purged with nitrogen, 120 g of 1-butene, 880 ml of Mitsui hexane and 1.50 mmol of triisobutylaluminum were placed. The SUS autoclave was heated up to 150° C., and 1.140 mmol of methylaluminoxane was added, followed by further adding 1.350 mmol of undecen-1-ol (having been dried over activated alumina and then vacuum distilled) represented by the following formula. With keeping the temperature at 150° C., the autoclave was pressurized with ethylene so that the total pressure became 30 kg/cm²-G.

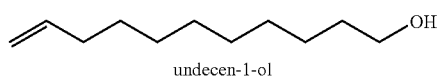

undecen-1-ol

Separately, into a 20 ml glass flask thoroughly purged with nitrogen, a toluene slurry solution in which 0.00075 mmol of dimethylsilylene(2-methyl-4,5-benzo-1-indenyl)(2,7-di-tert-butylfluorenyl)zirconium dichloride and 0.4300 mmol of methylaluminoxane had been contacted at room temperature for 10 minutes was injected with nitrogen, and 600 Nml of hydrogen was further injected. For the period of 10 minutes after the injection, the temperature in the autoclave was maintained at 150° C. and the pressure therein was maintained at that immediately after the injection by pressurizing with ethylene. Then, a small amount of isobutyl alcohol was added to terminate the polymerization. The polymer solution obtained was introduced into a large excess of methanol to precipitate a polymer and then vacuum dried at 80° C. for 12 hours. As a result, 10.40 g of a polymer was obtained. The polymerization activity was 83 kg/mmol.Zr.hr.

Properties of the resulting polar group-containing olefin copolymer are set forth in Table 10.

The polar group-containing olefin copolymer was evaluated on the coating properties by the aforesaid method. The result is set forth in Table 11.

Example 14

Ethylene, 1-butene and a polar group-containing monomer were polymerized in the same manner as in Example 13, except that undecylenic acid represented by the following formula was used instead of undecen-1-ol.

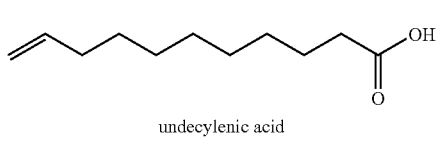

undecylenic acid

Properties of the resulting polar group-containing olefin copolymer are set forth in Table 10.

The polar group-containing olefin copolymer was evaluated on the adhesion strength (to Al) by the aforesaid method. The result is set forth in Table 11.

Example 15

Ethylene, 1-butene and a polar group-containing monomer were polymerized in the same manner as in Example 13, except that 1,2-epoxy-9-decene represented by the following formula was used instead of undecen-1-ol and 550 Nml of hydrogen was used.

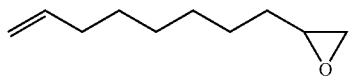

1,2-epoxy-9-decene

Properties of the resulting polar group-containing olefin copolymer are set forth in Table 10.

To 20 weight % of the polar group-containing olefin copolymer obtained above, 80 weight % of nylon 6 (relative viscosity: 2.35 dl/g) was added, and the mixture was melt kneaded by a twin-screw extruder with a diameter of 20 mm at 250° C. to prepare a thermoplastic resin composition. The thermoplastic resin composition was subjected to an impact resistance test and a tensile test by the aforesaid methods. The results are set forth in Table 11.

Example 16

Ethylene, 1-butene and a polar group-containing monomer were polymerized in the same manner as in Example 13, except that (2,7-octadien-1-yl)succinic anhydride represented by the following formula was used instead of undecen-1-ol and 550 Nml of hydrogen was used.

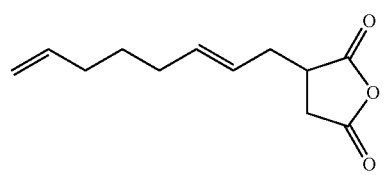

(2,7-octadien-1-yl)succinic anhydride

Properties of the resulting polar group-containing olefin copolymer are set forth in Table 10.

To 20 weight % of the polar group-containing olefin copolymer obtained above, 80 weight % of nylon 6 (relative viscosity: 2.35 dl/g) was added, and the mixture was melt kneaded by a twin-screw extruder with a diameter of 20 mm at 250° C. to prepare a thermoplastic resin composition. The thermoplastic resin composition was subjected to an impact resistance test and a tensile test by the aforesaid methods. The results are set forth in Table 11.

Example 17

Ethylene, propylene and a polar group-containing monomer were polymerized in the same manner as in Example 16, except that propylene was injected at an initial partial pressure of 3 kg/cm² instead of 1-butene, hydrogen was not added, and polymerization was conducted at a polymerization temperature of 80° C.

Properties of the resulting polar group-containing olefin copolymer are set forth in Table 10.

To 20 weight % of the polar group-containing olefin copolymer obtained above, 80 weight % of nylon 6 (relative viscosity: 2.35 dl/g) was added, and the mixture was melt kneaded by a twin-screw extruder with a diameter of 20 mm at 250° C. to prepare a thermoplastic resin composition. The thermoplastic resin composition was subjected to an impact resistance test and a tensile test by the aforesaid methods. The results are set forth in Table 11.

TABLE 10

|  | Constituent unit (1) $R^1$ | Constituent unit (2) $R^2$ | Constituent unit (3) | | | Composition (molar ratio) (1)/(2)/(3) | Mw | MFR (g/10 min) | Mw/Mn | $\dfrac{T\alpha\beta}{T\alpha\alpha}$ |
|---|---|---|---|---|---|---|---|---|---|---|
|  |  |  | $R^3$ | $R^4$ | X |  |  |  |  |  |
| Ex. 13 | H | ethyl | $C_9H_{18}$ | — | —OH | 88/11.5/0.5 | 110,000 | 4.2 | 2.8 | 0 |
| Ex. 14 | H | ethyl | $C_8H_{16}$ | — | —COOH | 88/11.75/0.25 | 100,000 | 5.9 | 2.2 | 0 |
| Ex. 15 | H | ethyl | $C_6H_{12}$ | — | Epoxy group | 88/11.75/0.25 | 130,000 | 2.3 | 2.3 | 0.05 |
| Ex. 16 | H | ethyl | $C_6H_{10}$ | — | acid anhydride group | 88/11.75/0.25 | 122,000 | 2.9 | 2.2 | 0.03 |
| Ex. 17 | H | methyl | $C_6H_{10}$ | — | acid anhydride group | 80/19.75/0.25 | 131,000 | 2.3 | 2.5 | 0.02 |

TABLE 11

|  | Property items | Property value | Unit |
|---|---|---|---|
| Ex. 13 | Cross-cut adhesion test | 100/100 | number of cuts/number of cuts |
| Ex. 14 | Adhesion strength (to Al) | 3.6 | Kgf/15 mm |
| Ex. 15 | IZ | 490 | J/m |
|  | Tensile strength | 40 | MPa |

TABLE 11-continued

|  | Property items | Property value | Unit |
|---|---|---|---|
| Ex. 16 | Elongation at Break | 40 | % |
|  | IZ | 260 | J/m |
|  | Tensile strength | 45 | MPa |
|  | Elongation at Break | 120 | % |
| Ex. 17 | IZ | 265 | J/m |
|  | Tensile strength | 46 | MPa |
|  | Elongation at Break | 122 | % |

Example 18

In a 1000 ml glass polymerization reactor thoroughly purged with nitrogen, 400 ml of n-decane was placed, then nitrogen was passed through at a rate of 20 l/hr, and the contents were maintained at 130° C. for 10 minutes. Then, 0.6 mmol of triisobutylaluminum was added, followed by further adding 0.48 mmol of delta 12-tridecenyl (having been dried over activated alumina and then vacuum distilled) represented by the following formula.

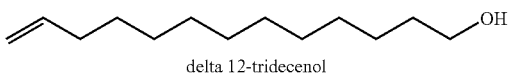

delta 12-tridecenol

Then, 1.100 mmol of methylaluminoxane was further added, and passing of nitrogen was stopped, followed by passing ethylene at a rate of 12.5 l/hr. Finally, a toluene slurry solution in which 0.002 mmol of dimethylsilylene(2,7-dimethyl-4,5-(2-methyl-benzo)-1-indenyl)(2,7-di-tert-butylfluorenyl)zirconium dichloride and 0.500 mmol of methylaluminoxane had been contacted at room temperature for 10 minutes was added to initiate polymerization. After the polymerization was conducted at 130° C. for 1 hour at atmospheric pressure, a small amount of isobutyl alcohol was added to terminate the polymerization. Then, 100 ml of an isobutyl alcohol solution containing 1 ml of a concentrated hydrochloric acid aqueous solution was added. followed by heating at 75° C. in a nitrogen atmosphere. The polymer solution obtained was introduced into a large excess of methanol to precipitate a polymer and then vacuum dried at 80° C. for 12 hours. As a result, 3.44 g of a polymer was obtained.

Properties of the resulting polar group-containing olefin copolymer are set forth in Table 12.

The polar group-containing olefin copolymer was evaluated on the coating properties by the aforesaid method. The result is set forth in Table 13.

Example 19

Propylene and a polar group-containing monomer were copolymerized in the same manner as in Example 18, except that 0.00075 mmol of dimethylsilylene(2-methyl-4-phenanthryl-1-indenyl)zirconium dichloride was used instead of dimethylsilylene(2,7-dimethyl-4,5-(2-methyl-benzo)-1-indenyl)(2,7-di-tert-butylfluorenyl)zirconium dichloride and polymerization was conducted at 60° C. for 30 minutes with passing propylene instead of ethylene.

Properties of the resulting polar group-containing olefin copolymer are set forth in Table 12.

The polar group-containing olefin copolymer was evaluated on the coating properties by the aforesaid method. The result is set forth in Table 13.

Example 20

In a 2-liter stainless steel (SUS) autoclave thoroughly purged with nitrogen, 120 g of 1-butene, 950 ml of Mitsui hexane and 1.50 mmol of triisobutylaluminum were placed. The SUS autoclave was heated up to 150° C., and 1.140 mmol of methylaluminoxane was added, followed by further adding 1.350 mmol of delta 12-tridecenyl (having been dried over silica alumina and then vacuum distilled) represented by the above formula. With keeping the temperature at 150° C., the autoclave was pressurized with ethylene so that the total pressure became 30 kg/cm$^2$-G. Separately, into a 20 ml glass flask thoroughly purged with nitrogen, a toluene slurry solution in which 0.00075 mmol of dimethylsilylene(2-methyl-4,5-benzo-1-indenyl)(2,7-di-tert-butylfluorenyl)zirconium dichloride and 0.4300 mmol of methylaluminoxane had been contacted at room temperature for 10 minutes was injected with nitrogen, and 600 Nml of hydrogen was further injected. For the period of 10 minutes after the injection, the temperature in the autoclave was maintained at 150° C. and the pressure therein was maintained at that immediately after the injection by pressurizing with ethylene. Then, a small amount of isobutyl alcohol was added to terminate the polymerization. The polymer solution obtained was introduced into a large excess of methanol to precipitate a polymer and then vacuum dried at 80° C. for 12 hours. As a result, 10.40 g of a polymer was obtained. The polymerization activity was 83 kg/mmol.Zr.hr.

Properties of the resulting polar group-containing olefin copolymer are set forth in Table 12.

The polar group-containing olefin copolymer was evaluated on the coating properties by the aforesaid method. The result is set forth in Table 13.

Example 21

Ethylene and a polar group-containing monomer were copolymerized in the same manner as in Example 18, except that pentadec-14-enoic acid represented by the following formula was used instead of delta 12-tridecenyl.

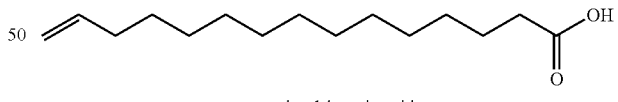

pentadec-14-enoic acid

Properties of the resulting polar group-containing olefin copolymer are set forth in Table 12.

The polar group-containing olefin copolymer was evaluated on the adhesion strength (to Al) by the aforesaid method. The result is set forth in Table 13.

Example 22

Propylene and a polar group-containing monomer were copolymerized in the same manner as in Example 19, except that pentapropenyl succinic anhydride represented by the following formula was used instead of delta 12-tridecenyl.

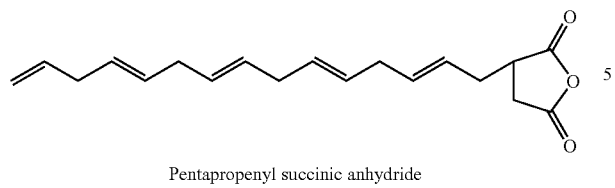

Pentapropenyl succinic anhydride

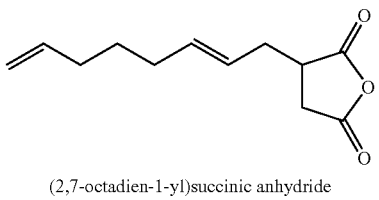

(2,7-octadien-1-yl)succinic anhydride

Properties of the resulting polar group-containing olefin copolymer are set forth in Table 12.

The polar group-containing olefin copolymer was evaluated on the adhesion strength (to Al) by the aforesaid method. The result is set forth in Table 13.

TABLE 12

| | Constituent unit (1), (2) $R^1$ | Constituent unit (3) | | | Composition (molar ratio) (1) + (2)/(3) | Mw | MFR (g/10 min) | Mw/Mn | $\dfrac{T\alpha\beta}{T\alpha\alpha}$ |
|---|---|---|---|---|---|---|---|---|---|
| | | $R^3$ | $R^4$ | X | | | | | |
| Ex. 18 | H | $C_{11}H_{22}$ | — | —OH | 99.5/0.5 | 70,000 | 2.5 *1 | 2.7 | 0 |
| Ex. 19 | methyl | $C_{11}H_{22}$ | — | —OH | 99.5/0.5 | 250,000 | 14.6 *2 | 2.3 | 0.16 |
| Ex. 20 | H, ethyl | $C_{11}H_{22}$ | — | —OH | 88/11.5/0.5 | 110,000 | 4.2 *1 | 2.8 | 0 |
| Ex. 21 | H | $C_{12}H_{24}$ | — | —COOH | 99.75/0.25 | 71,000 | 2.4 *1 | 2.5 | 0 |
| Ex. 22 | methyl | $C_{13}H_{18}$ | — | acid anhydride group | 99.75/0.25 | 249,000 | 14.7 *2 | 2.2 | 0.18 |

*1 Measuring conditions: 190° C., load of 2.16 kg
*2 Measuring conditions: 230° C., load of 2.16 kg

TABLE 13

| | Evaluation items | Property value | Unit |
|---|---|---|---|
| Ex. 18 | Cross-cut adhesion test | 100/100 | number of cuts/number of cuts |
| Ex. 19 | Cross-cut adhesion test | 100/100 | number of cuts/number of cuts |
| Ex. 20 | Cross-cut adhesion test | 100/100 | number of cuts/number of cuts |
| Ex. 21 | Adhesion strength (to Al) | 3 | Kgf/15 mm |
| Ex. 22 | Adhesion strength (to Al) | 3.5 | Kgf/15 mm |

Example 23

In a 1000 ml glass polymerization reactor thoroughly purged with nitrogen, 400 ml of toluene was placed, then nitrogen was passed through at a rate of 20 l/hr, and the contents were maintained at 60° C. for 10 minutes. Then, 0.6 mmol of triisobutylaluminum was added, followed by further adding 0.48 mmol of (2,7-octadien-1-yl)succinic anhydride represented by the following formula.

Then, 1.100 mmol of methylaluminoxane was further added, and passing of nitrogen was stopped, followed by passing propylene at a rate of 12.5 l/hr. Finally, a toluene slurry solution in which 0.0075 mmol of dimethylsilylene(2-methyl-4-phenanthryl-1-indenyl)zirconium dichloride and 0.500 mmol of methylaluminoxane had been contacted at room temperature for 10 minutes was added to initiate polymerization. After the polymerization was conducted at 60° C. for 30 minutes at atmospheric pressure, a small amount of isobutyl alcohol was added to terminate the polymerization. Then, 100 ml of an isobutyl alcohol solution containing 1 ml of a concentrated hydrochloric acid aqueous solution was added, followed by heating at 75° C. in a nitrogen atmosphere. The polymer solution obtained was introduced into a large excess of methanol to precipitate a polymer and then vacuum dried at 80° C. for 12 hours. As a result, 1.75 g of a polymer was obtained.

Properties of the resulting polar group-containing olefin copolymer are set forth in Table 14.

The polar group-containing olefin copolymer was evaluated on the adhesion strength (to Al) by the aforesaid method. The result is set forth in Table 15.

Example 24

In a 1000 ml glass polymerization reactor thoroughly purged with nitrogen, 400 ml of toluene was placed, then nitrogen was passed through at a rate of 20 l/hr, and the contents were maintained at 90° C. for 10 minutes. Then, 0.6 mmol of triisobutylaluminum was added, followed by further adding 0.48 mmol of 1,2-epoxy-9-decene (having been dried over silica alumina) represented by the following formula.

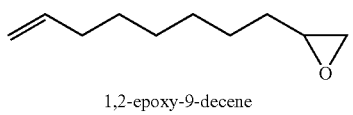

1,2-epoxy-9-decene

Then, 1.100 mmol of methylaluminoxane was further added, and passing of nitrogen was stopped, followed by passing ethylene at a rate of 12.5 l/hr. Finally, a toluene slurry solution in which 0.002 mmol of dimethylsilylene(2,7-dimethyl-4,5-(2-methyl-benzo)-1-indenyl)(2,7-di-tert-butylfluorenyl)zirconium dichloride and 0.500 mmol of methylaluminoxane had been contacted at room temperature for 10 minutes was added to initiate polymerization. After the polymerization was conducted at 90° C. for 1 hour at atmospheric pressure, a small amount of isobutyl alcohol was added to terminate the polymerization. Then, 100 ml of an isobutyl alcohol solution containing 1 ml of a concentrated hydrochloric acid aqueous solution was added, followed by heating at 75° C. in a nitrogen atmosphere. The polymer solution obtained was introduced into a large excess of methanol to precipitate a polymer and then vacuum dried at 80° C. for 12 hours. As a result, 3.08 g of a polymer was obtained.

Properties of the resulting polar group-containing olefin copolymer are set forth in Table 14.

The polar group-containing olefin copolymer was evaluated on the adhesion strength (to Al) by the aforesaid method. The result is set forth in Table 15.

Example 25

Ethylene and a polar group-containing monomer were copolymerized in the same manner as in Example 24, except that 4-hex-5-enyloxy-phenol represented by the following formula was used instead of 1,2-epoxy-9-decene.

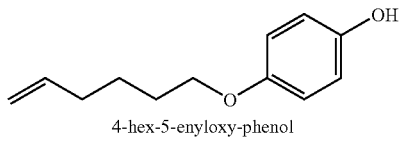

4-hex-5-enyloxy-phenol

Properties of the resulting polar group-containing olefin copolymer are set forth in Table 14.

The polar group-containing olefin copolymer was evaluated on the adhesion strength (to PET) by the aforesaid method. The result is set forth in Table 15.

TABLE 15

| | Evaluation items | Property value | Unit |
|---|---|---|---|
| Ex. 23 | Adhesion strength (to Al) | 3.6 | Kgf/15 mm |
| Ex. 24 | Adhesion strength (to PET) | broken substrate | Kgf/15 mm |
| Ex. 25 | Adhesion strength (to PET) | 3 | Kgf/15 mm |

Example 26

In a 1000 ml glass polymerization reactor thoroughly purged with nitrogen, 400 ml of toluene was placed, then nitrogen was passed through at a rate of 20 l/hr, and the contents were maintained at 0° C. for 10 minutes. Then, 0.6 mmol of triisobutylaluminum was added, followed by further adding 0.48 mmol of undecen-1-ol represented by the following formula.

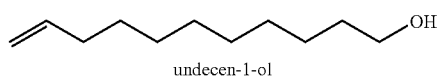

undecen-1-ol

Then, 1.100 mmol of methylaluminoxane was further added, and passing of nitrogen was stopped, followed by passing 1-butene at a rate of 12.5 l/hr. Finally, a toluene slurry solution in which 0.0020 mmol of dimethylsilylene(2-methyl-4-phenanthryl-1-indenyl)zirconium dichloride and 0.500 mmol of methylaluminoxane had been contacted at room temperature for 10 minutes was added to initiate polymerization. After the polymerization was conducted at 0° C. for 60 minutes at atmospheric pressure, a small amount of isobutyl alcohol was added to terminate the polymerization. Then, 100 ml of an isobutyl alcohol solution containing 1 ml of a concentrated hydrochloric acid aqueous solution was added, followed by heating at 75° C. in a nitrogen atmosphere. The polymer solution obtained was introduced into a large excess of methanol to precipitate a polymer and then vacuum dried at 80° C. for 12 hours. As a result, 0.25 g of a polymer was obtained.

Properties of the resulting polar group-containing olefin copolymer are set forth in Table 16.

TABLE 14

| | Constituent unit (1) $R^1$ | Constituent unit (3) | | | Composition (molar ratio) (1)/(3) | Mw | MFR (g/10 min) | Mw/Mn | $\frac{T\alpha\beta}{T\alpha\alpha}$ |
|---|---|---|---|---|---|---|---|---|---|
| | | $R^4$ | $R^5$ | X | | | | | |
| Ex. 23 | methyl | $C_6H_{10}$ | — | acid anhydride | 99.75/0.25 | 250,000 | 14.6 *1 | 0.23 | 0.13 |
| Ex. 24 | H | $C_6H_{12}$ | — | epoxy | 99.75/0.25 | 68,000 | 2.8 *2 | 0.25 | 0 |
| Ex. 25 | H | $C_4H_8$ | 0 | phenol | 99.5/0.5 | 70,000 | 2.5 *2 | 0.25 | 0 |

*1 Measuring conditions: 230° C., load of 2.16 kg
*2 Measuring conditions: 190° C., load of 2.16 kg The polar group-containing olefin copolymer was evaluated on the coating properties by the aforesaid method. The result is set forth in Table 17.

Example 27

1-Butene and a polar group-containing monomer were polymerized in the same manner as in Example 26, except that 1,2-epoxy-9-decene represented by the following formula was used instead of undecen-1-ol.

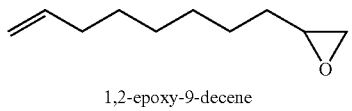

1,2-epoxy-9-decene

Properties of the resulting polar group-containing olefin copolymer are set forth in Table 16.

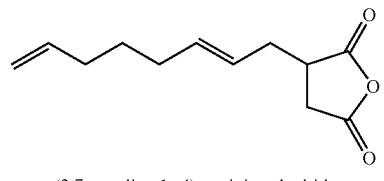

(2,7-octadien-1-yl)succinic anhydride

Properties of the resulting polar group-containing olefin copolymer are set forth in Table 16.

The polar group-containing olefin copolymer was evaluated on the adhesion strength (to Al) by the aforesaid method. The result is set forth in Table 17.

TABLE 16

| | Constituent unit (1) $R^1$ | Constituent unit (3) | | | Composition (molar ratio) (1)/(3) | Mw | MFR *1 (g/10 min) | Mw/Mn | $\dfrac{T\alpha\beta}{T\alpha\alpha}$ | Crystallinity (%) |
| | | $R^4$ | $R^5$ | X | | | | | | |
|---|---|---|---|---|---|---|---|---|---|---|
| Ex. 26 | ethyl | $C_9H_{18}$ | — | —OH | 99.5/0.5 | 770,000 | 2.60 | 2.2 | 0 | 46 |
| Ex. 27 | ethyl | $C_6H_{12}$ | — | epoxy group | 99.75/0.25 | 720,000 | 2.72 | 2.3 | 0 | 48 |
| Ex. 28 | ethyl | $C_8H_{16}$ | — | —COOH | 99.75/0.25 | 680,000 | 3.10 | 2.3 | 0.01 | 48 |
| Ex. 29 | ethyl | $C_6H_{10}$ | — | acid anhydride group | 99.75/0.25 | 710,000 | 2.81 | 2.5 | 0 | 47 |

*1 Measuring conditions: 190° C., load of 2.16 kg

The polar group-containing olefin copolymer was evaluated on the adhesion strength (to PET) by the aforesaid method. The result is set forth in Table 17.

Example 28

1-Butene and a polar group-containing monomer were polymerized in the same manner as in Example 26, except that 1.35 mmol of undecylenic acid represented by the following formula was used instead of undecen-1-ol and 1.5 mmol of triisobutylaluminum was used.

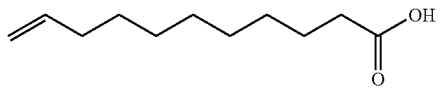

undecylenic acid

Properties of the resulting polar group-containing olefin copolymer are set forth in Table 16.

The polar group-containing olefin copolymer was evaluated on the adhesion strength (to Al) by the aforesaid method. The result is set forth in Table 17.

Example 29

1-Butene and a polar group-containing monomer were polymerized in the same manner as in Example 26, except that (2,7-octadien-1-yl)succinic anhydride represented by the following formula was used instead of undecen-1-ol.

TABLE 17

| | Evaluation items | Property value | Unit |
|---|---|---|---|
| Ex. 26 | Cross-cut adhesion test | 100/100 | number of cuts/number of cuts |
| Ex. 27 | Adhesion strength 23° C. | broken substrate | — |
| | (to PET) 80° C. | broken substrate | — |
| Ex. 28 | Adhesion strength 23° C. | 2.8 | Kgf/15 mm |
| | (to Al) 80° C. | 2.8 | Kgf/15 mm |
| Ex. 29 | Adhesion strength 23° C. | 3.5 | Kgf/15 mm |
| | (to Al) 80° C. | 3.5 | Kgf/15 mm |

Example 30

In a 300 ml glass polymerization reactor thoroughly purged with nitrogen, 40 ml of 1-octene was placed, then nitrogen was passed through at a rate of 20 l/hr, and the contents were maintained at 60° C. for 10 minutes. Then, 0.6 mmol of triisobutylaluminum was added, followed by further adding 0.48 mmol of undecen-1-ol represented by the following formula.

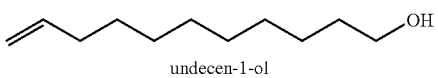

undecen-1-ol

Then, 1.100 mmol of methylaluminoxane and 40 ml of 1-octene were further added. Finally, a toluene slurry solution in which 0.002 mmol of dimethylsilylene(2-methyl-4-phenanthryl-1-indenyl)zirconium dichloride and 0.500 mmol of methylaluminoxane had been contacted at room temperature for 10 minutes was added to initiate polymerization. After the polymerization was conducted at 20° C. for 60 minutes at atmospheric pressure, a small amount of isobutyl alcohol was added to terminate the polymerization. Then, 100 ml of an isobutyl alcohol solution containing 1 ml of a concentrated hydrochloric acid aqueous solution was added, followed by heating at 75° C. in a nitrogen atmosphere. The polymer solution obtained was introduced into a large excess of methanol to precipitate a polymer and then vacuum dried at 80° C. for 12 hours. As a result, 0.25 g of a polymer was obtained.

Properties of the resulting polar group-containing olefin copolymer are set forth in Table 18.

The polar group-containing olefin copolymer was evaluated on the coating properties by the aforesaid method. The result is set forth in Table 19.

Example 31

1-Octene and a polar group-containing monomer were polymerized in the same manner as in Example 30, except that 1,2-epoxy-9-decene represented by the following formula was used instead of undecen-1-ol.

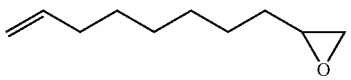

1,2-epoxy-9-decene

Properties of the resulting polar group-containing olefin copolymer are set forth in Table 18.

The polar group-containing olefin copolymer was subjected to an impact resistance test and a tensile test by the aforesaid methods. The results are set forth in Table 19.

Example 32

1-Octene and a polar group-containing monomer were polymerized in the same manner as in Example 30, except that 1.35 mmol of undecylenic acid represented by the following formula was used instead of undecen-1-ol and 1.5 mmol of triisobutylaluminum was used.

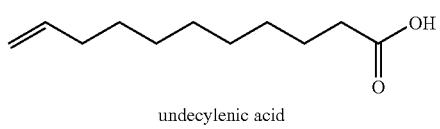

undecylenic acid

Properties of the resulting polar group-containing olefin copolymer are set forth in Table 18.

The polar group-containing olefin copolymer was subjected to an impact resistance test and a tensile test by the aforesaid methods. The results are set forth in Table 19.

Example 33

1-Octene and a polar group-containing monomer were polymerized in the same manner as in Example 30, except that (2,7-octadien-1-yl)succinic anhydride represented by the following formula was used instead of undecen-1-ol.

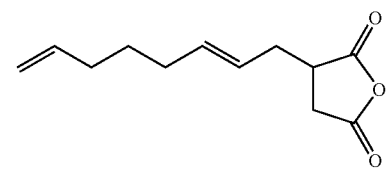

(2,7-octadien-1-yl)succinic anhydride

Properties of the resulting polar group-containing olefin copolymer are set forth in Table 18.

The polar group-containing olefin copolymer was subjected to an impact resistance test and a tensile test by the aforesaid methods. The results are set forth in Table 19.

TABLE 18

| | Constituent unit (1) $R^1$ | Constituent unit (3) | | | Composition (molar ratio) (1)/(3) | $[\eta]$ (dl/g) | MFR *1 (g/10 min) | Mw/Mn | $\dfrac{T\alpha\beta}{T\alpha\alpha}$ | Crystallinity (%) |
| --- | --- | --- | --- | --- | --- | --- | --- | --- | --- | --- |
| | | $R^3$ | $R^4$ | X | | | | | | |
| Ex. 30 | heptyl | $C_9H_{18}$ | — | OH | 99.5/0.5 | 2.5 | 70.00 | 2.3 | 0.12 | 0 |
| Ex. 31 | heptyl | $C_8H_{16}$ | — | epoxy group | 99.75/0.25 | 2.4 | 67.05 | 2.2 | 0.15 | 0 |
| Ex. 32 | heptyl | $C_6H_{12}$ | — | COOH | 99.75/0.25 | 2.3 | 62.13 | 2.4 | 0.10 | 0 |
| Ex. 33 | heptyl | $C_6H_{10}$ | — | acid anhydride group | 99.75/0.25 | 2.5 | 70.00 | 2.2 | 0.05 | 0 |

*1 Measuring conditions: 190° C., load of 2.16 kg

TABLE 19

| | Evaluation items | Property value | Unit |
| --- | --- | --- | --- |
| Ex. 30 | Cross-cut adhesion test | 100/100 | number of cuts/number of cuts |
| Ex. 31 | IZ | 260 | J/m |
| | Tensile strength | 42 | MPa |

TABLE 19-continued

|       | Evaluation items | Property value | Unit |
|---|---|---|---|
|       | Elongation at break | 125 | % |
| Ex. 32 | IZ | 505 | J/m |
|       | Tensile strength | 35 | MPa |
|       | Elongation at break | 42 | % |
| Ex. 33 | Adhesion strength (to Al) | 2 | Kgf/15 mm |

In the following Examples 34 to 39, preparation of specimens and measurements of mechanical properties were made as follows.

Preparation of Specimen

A graft copolymer obtained in the example was molded by a 55-ton injection molding machine (IS55EPN manufactured by Toshiba Machine Co., Ltd.) at a cylinder temperature of 200° C. and a mold temperature of 40° C.

In the following Examples 34 to 39, measurements of flexural modulus, Rockwell hardness and pencil hardness, and calculation of (4)/(5) by $^1$H-NMR were made as follows.

Flexural Modulus

The flexural modulus was measured using a specimen having a thickness of ⅛ inch under the conditions of a span of 51 mm and a flexural rate of 20 mm/min in accordance with ASTM C790.

Rockwell Hardness (HR)

The Rockwell hardness was measured using a square plate of 2 mm (thickness)×120 mm (length)×130 mm (width) in accordance with ASTM D785.

Pencil Hardness

The pencil hardness was measured using a specimen having a thickness of ⅛ inch under the conditions of a temperature of 23° C. in accordance with JIS $K_{5401}$.

Calculation of (4)/(5) by $^1$H-NMR

Device: JOEL GFX400 type nuclear magnetic resonance device

Observation nucleus: $^1$H
    Observation frequency: 400 MHz
    Pulse width: 45°
    Repetition time: 5.0 seconds
    Number of integration times: 8000
    Measuring temperature: 115° C.
    Measuring solvent: orthodichlorobenzene
    Measurement: The resulting polymer of 25 to 40 mg was dissolved in orthodichlorobenzene, and NMR was measured under the above measuring conditions.

Example 34

In a 1000 ml glass polymerization reactor thoroughly purged with nitrogen, 400 ml of toluene was placed, then nitrogen was passed through at a rate of 20 l/hr, and the contents were maintained at 90° C. for 10 minutes. Then, 2.0 mmol of triisobutylaluminum was added, followed by further adding 1.88 mmol of undecen-1-ol (having been dried over activated alumina and then vacuum distilled) represented by the following formula.

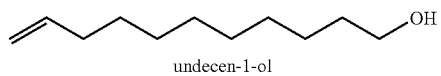
undecen-1-ol

Then, 1.100 mmol of methylaluminoxane was further added, and passing of nitrogen was stopped, followed by passing ethylene at a rate of 5 l/hr. Finally, a toluene slurry solution in which 0.008 mmol of dimethylsilylene(2,7-dimethyl-4,5-(2-methyl-benzo)-1-indenyl) (2,7-di-tert-butylfluorenyl) zirconium dichloride and 2.00 mmol of methylaluminoxane had been contacted at room temperature for 10 minutes was added to initiate polymerization. After the polymerization was conducted at 90° C. for 1 hour at atmospheric pressure, a small amount of isobutyl alcohol was added to terminate the polymerization. Then, 100 ml of an isobutyl alcohol solution containing 1 ml of a concentrated hydrochloric acid aqueous solution was added, followed by heating at 75° C. in a nitrogen atmosphere. The polymer solution obtained was introduced into a large excess of methanol to precipitate a polymer and then vacuum dried at 80° C. for 12 hours. As a result, 12.21 g of a polymer having an ethylene/side chain monomer molar ratio of 99.2/0.8 was obtained.

A 1500 ml autoclave equipped with a thermometry tube, a manometer, a stirrer and an alkylene oxide feed pipe was charged with 12.0 g of the ethylene/side chain monomer copolymer (ethylene/side chain monomer=99.2/0.8 by mol), 31.0 mg of tetrakis[tris(dimethylamino)-phosphoranylideneamino]phosphonium hydroxide ($[(Me_2N)_3P{=}N]\text{-}4P^+OH^-$) synthesized in the same manner as described in EP0791600, p. 32, and 800 g of tetralin. Then, the contents were heated to 125° C. and allowed to undergo reaction at the same temperature for 12 hours with intermittently feeding 3.1 g of ethylene oxide so as to maintain the pressure at 0.9 MPa (absolute pressure). Subsequently, the unreacted ethylene oxide remaining in the autoclave was distilled off at the same temperature under reduced pressure. Then, the contents were cooled to room temperature and poured into 800 ml of methanol. The white solid precipitated was separated by filtration, and to the solid was further added 20 ml of methanol, followed by heating under reflux for 30 minutes. The mixture was subjected to hot filtration, and the resulting solid was dried at 60° C. under reduced pressure, to obtain 10.1 g of a graft copolymer in which about 13 ethylene oxide units were graft polymerized based on one hydroxyl group.

Properties of the resulting polar group-containing branched olefin copolymer are set forth in Table 20.

Further, anti-fogging properties of a film obtained from the polar group-containing branched olefin copolymer were evaluated by the aforesaid method. The result is set forth in Table 21. Measurement of the (4)/(5) ratio of the polymer by $^1$H-NMR resulted in 100/0.

Example 35

In a 1000 ml glass polymerization reactor thoroughly purged with nitrogen, 400 ml of toluene was placed, then nitrogen was passed through at a rate of 20 l/hr, and the contents were maintained at 90° C. for 10 minutes. Then, 1.08 mmol of triisobutylaluminum was added, followed by further adding 0.90 mmol of undecen-1-ol (having been dried over activated alumina and then vacuum distilled). Further, 1.100 mmol of methylaluminoxane was added, and passing of nitrogen was stopped, followed by passing ethylene at a rate of 100 l/hr. Finally, a toluene slurry solution in which 0.008 mmol of dimethylsilylene(2,7-dimethyl-4,5-(2-methyl-benzo)-1-indenyl)(2,7-di-tert-butylfluorenyl) Zirconium dichloride and 2.00 mmol of methylaluminoxane had been contacted at room temperature for 10 minutes was added to initiate polymerization. After the polymerization was conducted at 90° C. for 1 hour at atmospheric pressure, a small amount of isobutyl alcohol was added to terminate the polymerization. Then, 100 ml of an isobutyl alcohol solution containing 1 ml of a concentrated hydrochloric acid aqueous solution was added, followed by heating at 75° C. in a nitrogen atmosphere. The polymer solution obtained was introduced into a large excess of methanol to precipitate a polymer and then vacuum dried at 80° C. for 12 hours. As a result, 14.83 g of a polymer having an ethylene/side chain monomer molar ratio of 99.75/0.25 was obtained.

Then, polymerization was carried out in the same manner as in Example 34, except that 12.0 g of the polymer obtained above and 15.1 g of ethylene oxide was used. As a result, 11.8 g of a graft copolymer in which about 65 ethylene oxide units were graft polymerized based on one hydroxyl group was obtained.

Properties of the resulting polar group-containing branched olefin copolymer are set forth in Table 20.

Further, anti-fogging properties of a film obtained from the polar group-containing branched olefin copolymer were evaluated by the aforesaid method. The result is set forth in Table 21.

Example 36

The procedure of Example 34 was repeated, except that 5.0 g of propylene oxide was used instead of ethylene oxide. As a result, 10.3 g of a graft copolymer in which about 10 propylene oxide units were graft polymerized based on one hydroxyl group was obtained.

Properties of the resulting polar group-containing branched olefin copolymer are set forth in Table 20.

Further, anti-fogging properties of a film obtained from the polar group-containing branched olefin copolymer were evaluated by the aforesaid method.

The result is set forth in Table 21. Measurement of the (4)/(5) ratio of the polymer by $^1$H-NMR resulted in 99/1.

Example 37

Using the ethylene/side chain monomer polymer (ethylene/side chain monomer=99.75/0.25 by mol) prepared in Example 35, polymerization was carried out with intermittently feeding 3.1 g of ethylene oxide. As a result, 11.8 g of a graft copolymer in which about 13 ethylene oxide units were graft polymerized based on one hydroxyl group was obtained.

Properties of the resulting polar group-containing branched olefin copolymer are set forth in Table 20.

Further, anti-fogging properties of a film obtained from the polar group-containing branched olefin copolymer were evaluated by the aforesaid method. The result is set forth in Table 21.

Example 38

The procedure of Example 34 was repeated, except that 7.75 g of α-hydroxyisopropyl phenyl ketone was further charged in addition to the starting materials, the pressure was changed to 0.2 MPa from 0.9 MPa, 5.8 g of methyl methacrylate was used instead of ethylene oxide, and tetrahydrofuran was used instead of methanol. As a result, 11.3 g of a graft copolymer in which about methyl methacrylate units were graft polymerized based on one hydroxyl group was obtained.

Properties of the resulting polar group-containing branched olefin copolymer are set forth in Table 20.

Further, mechanical properties of the polar group-containing branched olefin copolymer were evaluated by the aforesaid method. The result is set forth in Table 21.

Example 39

In a 2-liter stainless steel (SUS) autoclave thoroughly purged with nitrogen, 105 g of 1-octene, 895 ml of Mitsui hexane and 1.50 mmol of triisobutylaluminum were placed. The SUS autoclave was heated up to 150° C., and 1.140 mmol of methylaluminoxane was added, followed by further adding 1.350 mmol of undecen-1-ol (having been dried over activated alumina and then vacuum distilled). With keeping the temperature at 150° C., the autoclave was pressurized with ethylene so that the total pressure became 30 kg/cm²-G. Separately, into a 20 ml glass flask thoroughly purged with nitrogen, a toluene slurry solution in which 0.00075 mmol of dimethylsilylene(2-methyl-4,5-benzo-1-indenyl) (2,7-di-tert-butylfluorenyl)zirconium dichloride and 0.4300 mmol of methylaluminoxane had been contacted at room temperature for 10 minutes was injected with nitrogen, and 600 Nml of hydrogen was further injected. For the period of 10 minutes after the injection, the temperature in the autoclave was maintained at 150° C. and the pressure therein was maintained at that immediately after the injection by pressurizing with ethylene. Then, a small amount of isobutyl alcohol was added to terminate the polymerization. The polymer solution obtained was introduced into a large excess of methanol to precipitate a polymer and then vacuum dried at 80° C. for 12 hours. As a result, 8.45 g of a polymer was obtained.

Using 8 g of this polymer, polymerization was carried out with intermittently feeding 3.1 g of ethylene oxide similarly to Example 34. As a result, 11.8 g of a graft copolymer in which about 13 ethylene oxide units were graft polymerized based on one hydroxyl group was obtained.

Properties of the resulting polar group-containing branched olefin copolymer are set forth in Table 20.

Further, dispersibility of the polar group-containing branched olefin copolymer in water was evaluated by the aforesaid method. The result is set forth in Table 21.

TABLE 20

| Constituent unit (1) | Constituent unit (4) | | | | struc-ture | Composition (molar ratio) (1)/(4) + (5) | Mw | Mw/Mn | Tαβ Tαα |
|---|---|---|---|---|---|---|---|---|---|
| R¹ | R⁵ | R⁶ | Z | p | | | | | |
| Ex. 34 | H | C₉H₁₈ | — | —(CH₂CH₂O)₁₃—H | 1 | ① | 99.2/0.8 | 70,000 | 2.8 | 0 |
| Ex. 35 | H | C₉H₁₈ | — | —(CH₂CH₂O)₆₅—H | 1 | ① | 99.75/0.25 | 70,000 | 2.6 | 0 |
| Ex. 36 | H | C₉H₁₈ | — | —(CH₂CH(CH₃)O)₁₃—H | 1 | ② | 99.2/0.8 | 65,000 | 2.5 | 0 |
| Ex. 37 | H | C₆H₁₀ | — | —(CH₂CH₂O)₁₃—H | 2 | ③ | 99.75/0.25 | 70,000 | 2.3 | 0 |
| Ex. 38 | CH₃ | C₉H₁₈ | — | —(CH₂CH(COOCH₃))₂₀—H | 1 | ④ | 99.2/0.8 | 250,000 | 2.7 | 0.08 |
| Ex. 39 | H, C₆H₁₃ | C₉H₁₈ | — | —(CH₂CH₂O)₁₃—H | 1 | ① | 89.5/10/0.5 *1 | 130,000 | 2.5 | 0.12 |

①
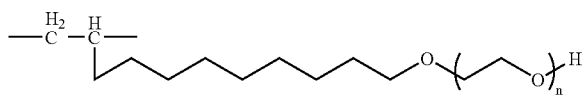

②
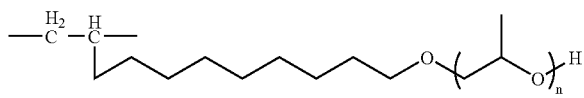

③
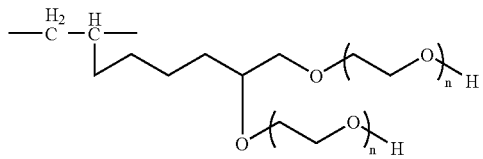

④
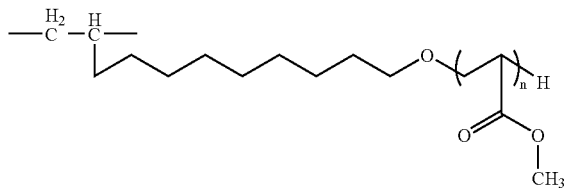

*1 Molar ratio of H/C₆H₁₃/(4) + (5)

TABLE 21

| | Evaluation items | Property value | Unit |
|---|---|---|---|
| Ex. 34 | Anti-fogging properties (visual observation) | AA | — |
| Ex. 35 | Anti-fogging properties (visual observation) | AA | — |
| Ex. 36 | Anti-fogging properties (visual observation) | AA | — |
| Ex. 37 | Anti-fogging properties (visual observation) | AA | — |
| Ex. 38 | FM | 2500 | MPa |
| | Rockwell hardness | 115 | |
| | Pencil hardness | 2H | |
| | HDT | 130 | ° C. |

TABLE 21-continued

| | Evaluation items | Property value | Unit |
|---|---|---|---|
| Ex. 39 | Dispersed particle diameter | 0.4 | μm |
| | Dispersion stability | not separated | |

Example 40

In a 500 ml glass polymerization reactor thoroughly purged with nitrogen, 400 ml of toluene was placed, then nitrogen was passed through at a rate of 20 l/hr, and the contents were maintained at 75° C. for 10 minutes. Then, 0.8000 mmol of methylaluminoxane was added, followed by further adding 0.1000 mmol of undecen-1-ol (having been dried over silica alumina and then vacuum distilled). Then, passing of nitrogen was stopped, and ethylene was passed through at a rate of 100 l/hr.

Finally, 0.0008 mmol of isopropylidene(cyclopentadienyl)(2,7-di-t-butylfluorenyl)zirconium dichloride was added to initiate polymerization. After the polymerization was conducted at 75° C. for 15 minutes at atmospheric pressure, a small amount of isobutyl alcohol was added to terminate the polymerization. The polymer solution obtained was introduced into a large excess of methanol to precipitate a polymer and then vacuum dried at 80° C. for 12 hours. As a result, 0.90 g of a polymer was obtained. The polymerization activity was 4.5 kg/mmol.Zr.hr, and the melting point of the polymer was 129.0° C.

Example 41

In a 500 ml glass polymerization reactor thoroughly purged with nitrogen, 400 ml of toluene was placed, then nitrogen was passed through at a rate of 20 l/hr, and the contents were maintained at 75° C. for 10 minutes. Then, 1.1000 mmol of methylaluminoxane was added, followed by further adding 0.15 mmol of undecen-1-ol (having been dried over silica alumina and then vacuum distilled). Then, passing of nitrogen was stopped, and ethylene was passed through at a rate of 100 l/hr.

Finally, a toluene slurry solution in which 0.0160 mmol of diphenylmethylene(cyclopentadienyl)-(fluorenyl)zirconium dichloride and 1.1000 mmol of methylaluminoxane had been contacted at room temperature for 10 minutes was added to initiate polymerization. After the polymerization was conducted at 75° C. for 30 minutes at atmospheric pressure, a small amount of isobutyl alcohol was added to terminate the polymerization. The polymer solution obtained was introduced into a large excess of methanol to precipitate a polymer and then vacuum dried at 80° C. for 12 hours. As a result, 6.67 g of a polymer was obtained. The polymerization activity was 0.83 kg/mmol.Zr.hr, and [η] of the polymer was 3.82 dl/g.

Example 42

In a 500 ml glass polymerization reactor thoroughly purged with nitrogen, 400 ml of toluene was placed, then nitrogen was passed through at a rate of 20 l/hr, and the contents were maintained at 75° C. for 10 minutes. Then, 1.1000 mmol of methylaluminoxane was added, followed by further adding 0.20 mmol of undecen-1-ol (having been dried over silica alumina and then vacuum distilled). Then, passing of nitrogen was stopped, and ethylene was passed through at a rate of 100 l/hr. Finally, a toluene slurry solution in which 0.0160 mmol of (tert-butylamido)dimethyl-(tetramethylcyclopentadienyl)silanetitanium dichloride and 1.1000 mmol of methylaluminoxane had been contacted at room temperature for 10 minutes was added to initiate polymerization. After the polymerization was conducted at 75° C. for 1 hour at atmospheric pressure, a small amount of isobutyl alcohol was added to terminate the polymerization. The polymer solution obtained was introduced into a large excess of methanol to precipitate a polymer and then vacuum dried at 80° C. for 12 hours. As a result, 2.54 g of a polymer was obtained. The polymerization activity was 0.03 kg/mmol.Zr.hr, [η] of the polymer was 3.55 dl/g, the melting point thereof was 129° C., and the polar group introduction ratio thereof, as measured by $^1$H-NMR, was 0.25 mol %.

Example 43

In a 500 ml glass polymerization reactor thoroughly purged with nitrogen, 400 ml of toluene was placed, then nitrogen was passed through at a rate of 20 l/hr, and the contents were maintained at 75° C. for 10 minutes. Then, 1.1400 mmol of methylaluminoxane was added, followed by further adding 0.20 mmol of undecen-1-ol (having been dried over silica alumina and then vacuum distilled). Then, passing of nitrogen was stopped, and ethylene was passed through at a rate of 100 l/hr.

Finally, a toluene slurry solution in which 0.0008 mmol of dimethylsilylene(2-methyl-4,5-benzo-1-indenyl) (2,7-di-tert-butylfluorenyl)zirconium dichloride and 0.4300 mmol of methylaluminoxane had been contacted at room temperature for 10 minutes was added to initiate polymerization. After the polymerization was conducted at 75° C. for 5 minutes at atmospheric pressure, a small amount of isobutyl alcohol was added to terminate the polymerization. The polymer solution obtained was introduced into a large excess of methanol to precipitate a polymer and then vacuum dried at 80° C. for 12 hours. As a result, 3.23 g of a polymer was obtained. The polymerization activity was 48.45 kg/mmol.Zr.hr, and [η] of the polymer was 9.37 dl/g.

Example 44

In a 500 ml glass polymerization reactor thoroughly purged with nitrogen, 400 ml of toluene was placed, then nitrogen was passed through at a rate of 20 l/hr, and the contents were maintained at 75° C. for 10 minutes. Then, 1.1400 mmol of methylaluminoxane was added, followed by further adding 0.30 mmol of undecen-1-ol (having been dried over silica alumina and then vacuum distilled). Then, passing of nitrogen was stopped, and ethylene was passed through at a rate of 100 l/hr.

Finally, a toluene slurry solution in which 0.0016 mmol of dimethylsilylene(2-methyl-4,5-benzo-1-indenyl) (2,7-di-tert-butylfluorenyl)zirconium dichloride and 0.4300 mmol of methylaluminoxane had been contacted at room temperature for 10 minutes was added to initiate polymerization. After the polymerization was conducted at 75° C. for 5 minutes at atmospheric pressure, a small amount of isobutyl alcohol was added to terminate the polymerization. The polymer solution obtained was introduced into a large excess of methanol to precipitate a polymer and then vacuum dried at 80° C. for 12 hours. As a result, 2.46 g of a polymer was obtained. The polymerization activity was 18.45 kg/mmol.Zr.hr, and [η] of the polymer was 7.89 dl/g.

Example 45

In a 500 ml glass polymerization reactor thoroughly purged with nitrogen, 400 ml of toluene was placed, then nitrogen was passed through at a rate of 20 l/hr, and the contents were maintained at 75° C. for 10 minutes. Then, a toluene solution of 0.480 mmol of triethylaluminum and 0.480 mmol of undecen-1-ol (having been dried over silica alumina and then vacuum distilled) having been pretreated at room temperature for 10 minutes was added, followed by further adding 1.1400 mmol of methylaluminoxane. Then, passing of nitrogen was stopped, and ethylene was passed through at a rate of 100 l/hr.

Finally, a toluene slurry solution in which 0.0020 mmol of dimethylsilylene(2-methyl-4,5-benzo-1-indenyl) (2,7-di-tert-butylfluorenyl)zirconium dichloride and 0.4300 mmol of methylaluminoxane had been contacted at room temperature for 10 minutes was added to initiate polymerization. After the polymerization was conducted at 75° C. for 2 minutes at atmospheric pressure, a small amount of isobutyl alcohol was added to terminate the polymerization. The polymer solution obtained was introduced into a large excess of methanol to precipitate a polymer and then vacuum dried at 80° C. for 12 hours. As a result, 3.63 g of a polymer was obtained. The polymerization activity was 36.3 kg/mmol.Zr.hr, and [η] of the polymer was 4.97 dl/g.

Example 46

In a 500 ml glass polymerization reactor thoroughly purged with nitrogen, 400 ml of toluene was placed, then nitrogen was passed through at a rate of 20 l/hr, and the contents were maintained at 75° C. for 10 minutes. Then, 0.480 mmol of triisobutylaluminum was added, followed by further adding 0.48 mmol of undecen-1-ol (having been dried over silica alumina and then vacuum distilled). After stirring for 3 minutes, 1.1400 mmol of methylaluminoxane was added, then passing of nitrogen was stopped, and ethylene was passed through at a rate of 100 l/hr.

Finally, a toluene slurry solution in which 0.0017 mmol of dimethylsilylene(2-methyl-4,5-benzo-1-indenyl) (2,7-di-tert-butylfluorenyl)zirconium dichloride and 0.4300 mmol of methylaluminoxane had been contacted at room temperature for 10 minutes was added to initiate polymerization. After the polymerization was conducted at 75° C. for 2.5 minutes at atmospheric pressure, a small amount of isobutyl alcohol was added to terminate the polymerization. The polymer solution obtained was introduced into a large excess of methanol to precipitate a polymer and then vacuum dried at 80° C. for 12 hours. As a result, 3.00 g of a polymer was obtained. The polymerization activity was 42.3 kg/mmol.Zr.hr.

Example 47

In a 500 ml glass polymerization reactor thoroughly purged with nitrogen, 400 ml of toluene was placed, then nitrogen was passed through at a rate of 20 l/hr, and the contents were maintained at 75° C. for 10 minutes. Then, 0.750 mmol of triisobutylaluminum was added, followed by further adding 0.48 mmol of undecene-1-aldehyde (having been dried over silica alumina and then vacuum distilled). After stirring for 3 minutes, 1.1400 mmol of methylaluminoxane was added, then passing of nitrogen was stopped, and ethylene was passed through at a rate of 100 l/hr.

Finally, a toluene slurry solution in which 0.0017 mmol of dimethylsilylene(2-methyl-4,5-benzo-1-indenyl) (2,7-di-tert-butylfluorenyl)zirconium dichloride and 0.4300 mmol of methylaluminoxane had been contacted at room temperature for 10 minutes was added to initiate polymerization. After the polymerization was conducted at 75° C. for 2.5 minutes at atmospheric pressure, a small amount of isobutyl alcohol was added to terminate the polymerization. The polymer solution obtained was introduced into a large excess of methanol to precipitate a polymer and then vacuum dried at 80° C. for 12 hours. As a result, 4.50 g of a polymer was obtained. The polymerization activity was 63.5 kg/mmol.Zr.hr.

Example 48

In a 500 ml glass polymerization reactor thoroughly purged with nitrogen, 400 ml of toluene was placed, then nitrogen was passed through at a rate of 20 l/hr, and the contents were maintained at 75° C. for 10 minutes. Then, 0.480 mmol of triisobutylaluminum was added, followed by further adding 0.48 mmol of decene-1-amine (having been dried over silica alumina and then vacuum distilled). After stirring for 3 minutes, 1.1400 mmol of methylaluminoxane was added, then passing of nitrogen was stopped, and ethylene was passed through at a rate of 100 l/hr.

Finally, a toluene slurry solution in which 0.0017 mmol of dimethylsilylene(2-methyl-4,5-benzo-1-indenyl) (2,7-di-tert-butylfluorenyl)zirconium dichloride and 0.4300 mmol of methylaluminoxane had been contacted at room temperature for 10 minutes was added to initiate polymerization. After the polymerization was conducted at 75° C. for 2.5 minutes at atmospheric pressure, a small amount of isobutyl alcohol was added to terminate the polymerization. The polymer solution obtained was introduced into a large excess of methanol to precipitate a polymer and then vacuum dried at 80° C. for 12 hours. As a result, 0.80 g of a polymer was obtained. The polymerization activity was 11.3 kg/mmol.Zr.hr.

Examples 49, 50, 51, 52, 53, 54, 55, 56, 57 and 58

Polar group-containing olefin copolymers were prepared under the same conditions as in Example 40, except that the types and the amounts of the α-olefin and the polar group-containing monomer, the type and the amount of the trialkylaluminum compound, and the polymerization temperature and the polymerization time were changed as shown in Table 22. The results are set forth in Table 22.

TABLE 22

| | Metallocene *1 | | Monomer Feed rate | Comonomer | | | Alkylaluminum | | | | | | | | Polymerization |
|---|---|---|---|---|---|---|---|---|---|---|---|---|---|---|---|
| Ex. | (μmol) | Type | (mmol) | Type | Amount (mmol) | MAO (mmol) | Type | Amount (mmol) | Temp (° C.) | Time (min) | Yield (g) | [η] (dl/g) | Comonomer (mol %) | zation activity *2 |
| 49 | 25 | ethylene | 2 | allyl alcohol | 40 | 1.57 | TEA | 48 | 50 | 105 | 5.05 | 0.41 | 0.33 | 0.12 |
| 50 | 25 | ethylene | 2 | allyl alcohol | 40 | 1.57 | TIBA | 48 | 50 | 25 | 0.95 | 1.55 | 1.20 | 0.09 |
| 51 | 25 | ethylene | 2 | allylamine | 40 | 1.57 | TEA | 48 | 50 | 75 | 1.52 | 1.68 | 0.47 | 0.05 |
| 52 | 25 | ethylene | 2 | allylamine | 40 | 1.57 | TIBA | 48 | 50 | 75 | 1.26 | 1.96 | 0.22 | 0.04 |
| 53 | 2.5 | ethylene | 50 | undecen-1-ol | 40 | 1.57 | TEA | 48 | 80 | 5 | 5.25 | 0.54 | 6.56 | 22.5 |
| 54 | 25 | ethylene | 50 | nonbornene methanol | 40 | 1.57 | TEA | 48 | 50 | 8 | 6.25 | 0.55 | 0.53 | 1.50 |
| 55 | 25 | ethylene | 20 | norbornene methylamine | 40 | 1.57 | TEA | 48 | 50 | 8 | 3.27 | 0.55 | 0.10 | 0.98 |
| 56 | 25 | ethylene | 50 | Tetracyclo dodecene methanol | 40 | 1.57 | TEA | 48 | 50 | 8 | 5.10 | 0.62 | 5.13 | 1.37 |

TABLE 22-continued

| | | Monomer | | Comonomer | | | Alkylaluminum | | | | | | | Polymerization |
| | Metallocene *1 | | Feed rate | | Amount | MAO | | Amount | Temp | Time | Yield | [η] | Comonomer | zation |
| Ex. | (μmol) | Type | (mmol) | Type | (mmol) | (mmol) | Type | (mmol) | (° C.) | (min) | (g) | (dl/g) | (mol %) | activity *2 |
|---|---|---|---|---|---|---|---|---|---|---|---|---|---|---|
| 57 | 25 | ethylene | 20 | Tetracyclo dodecene | 40 | 1.57 | TEA | 48 | 50 | 8 | 3.91 | 0.58 | 0.11 | 1.05 |
| 58 | 25 | propylene | 100 | methylamine undecen-1-ol | 4 | 1.57 | TEA | 4.8 | 50 | 15 | 2.20 | 0.68 | 0.93 | 0.88 |

*1: dimethylsilylene(2-methyl-4,5-benzo-1-indenyl)(2,7-di-tert-butylfluorenyl)zirconium dichloride
*2: unit: kg/mmol-Zr · hr
MAO: methylaluminoxane,
TEA: triethylaluminum,
TIBA: triisobutylaluminum Comparative Example 3

In a 500 ml glass polymerization reactor thoroughly purged with nitrogen, 400 ml of toluene was placed, then nitrogen was passed through at a rate of 20 l/hr, and the contents were maintained at 75° C. for 10 minutes. Then, 0.480 mmol of ethylaluminum sesquichloride was added, followed by further adding 0.48 mmol of decene-1-amine (having been dried over silica alumina and then vacuum distilled). After stirring for 3 minutes, 1.1400 mmol of ethylaluminum sesquichloride was added, then passing of nitrogen was stopped, and ethylene was passed through at a rate of 100 l/hr.

Finally, a toluene slurry solution in which 20.0017 mmol of VO(OC$_2$H$_5$)Cl and 0.4300 mmol of ethylaluminum sesquichloride had been contacted at room temperature for 10 minutes was added to initiate polymerization. After the polymerization was conducted at 75° C. for 2.5 minutes at atmospheric pressure, a small amount of isobutyl alcohol was added to terminate the polymerization. The polymer solution obtained was introduced into a large excess of methanol to attempt precipitation of a polymer, however, any polymer was not obtained.

Example 59

In a 2-liter stainless steel (SUS) autoclave thoroughly purged with nitrogen, 120 g of 1-butene, 880 ml of Mitsui hexane and 1.50 mmol of triisobutylaluminum were placed. The SUS autoclave was heated up to 150° C., and 1.140 mmol of methylaluminoxane was added, followed by further adding 1.350 mmol of undecen-1-ol (having been dried over activated alumina and then vacuum distilled) represented by the following formula. With keeping the temperature at 150° C., the autoclave was pressurized with ethylene so that the total pressure became 2.9 MPa-G (30 kg/cm$^2$-G).

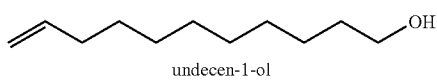

undecen-1-ol

Separately, into a 20 ml glass flask thoroughly purged with nitrogen, a toluene slurry solution in which 0.00075 mmol of dimethylsilylene(2-methyl-4,5-benzo-1-indenyl) (2,7-di-tert-butylfluorenyl)zirconium dichloride and 0.4300 mmol of methylaluminoxane had been contacted at room temperature for 10 minutes was injected with nitrogen, and 600 Nml of hydrogen was further injected. For the period of 10 minutes after the injection, the temperature in the autoclave was maintained at 150° C. and the pressure therein was maintained at that immediately after the injection by pressurizing with ethylene. Then, a small amount of isobutyl alcohol was added to terminate the polymerization. The polymer solution obtained was introduced into a large excess of methanol to precipitate a polymer and then vacuum dried at 80° C. for 12 hours. As a result, 10.40 g of a polymer was obtained. The polymerization activity was 83 kg/mmol.Zr.hr.

Properties of the resulting polar group-containing olefin copolymer are set forth in Table 23.

Example 60

Ethylene, 1-butene and a polar group-containing monomer were polymerized in the same manner as in Example 59, except that undecylenic acid represented by the following formula was used instead of undecen-1-ol.

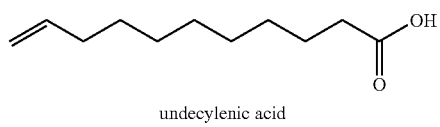

undecylenic acid

Properties of the resulting polar group-containing olefin copolymer are set forth in Table 23.

Example 61

Ethylene, 1-butene and a polar group-containing monomer were polymerized in the same manner as in Example 59, except that 1,2-epoxy-9-decene represented by the following formula was used instead of undecen-1-ol and 550 Nml of hydrogen was used.

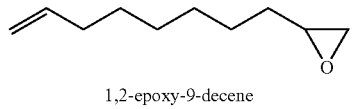

1,2-epoxy-9-decene

Properties of the resulting polar group-containing olefin copolymer are set forth in Table 23.

Example 62

Ethylene, 1-butene and a polar group-containing monomer were polymerized in the same manner as in Example 59, except that (2,7-octadien-1-yl)succinic anhydride represented by the following formula was used instead of undecen-1-ol and 550 Nml of hydrogen was used.

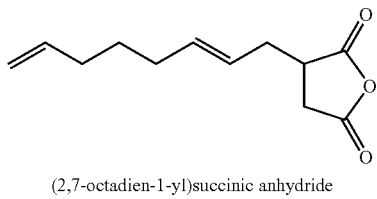

(2,7-octadien-1-yl)succinic anhydride

Properties of the resulting polar group-containing olefin copolymer are set forth in Table 23.

Example 63

Ethylene, propylene and a polar group-containing monomer were polymerized in the same manner as in Example 62, except that propylene was injected at an initial partial pressure of 3 kg/cm² instead of 1-butene, hydrogen was not added, and the polymerization was conducted at a polymerization temperature of 80° C.

Properties of the resulting polar group-containing olefin copolymer are set forth in Table 23.

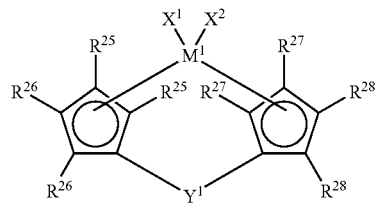

(11)

wherein $M^1$ is a transition metal atom of Group 4 of the periodic table; $R^{25}$, $R^{26}$, $R^{27}$ and $R^{28}$ may be the same or different and are each a hydrogen atom, a nitrogen-containing group, a phosphorus-containing group, a hydrocarbon group of 1 to 20 carbon atoms, a halogenated hydrocarbon group of 1 to 20 carbon atoms, an oxygen-containing group, a sulfur-containing group, a silicon-containing group or a halogen atom; of the groups indicated by $R^{25}$, $R^{26}$, $R^{27}$ and $R^{28}$, a part of the groups neighboring with each other may be bonded to form a ring together with carbon atoms to which those groups are bonded; $X^1$ and $X^2$ may be the same or different and are each a hydrocarbon group of 1 to 20 carbon atoms, a halogenated hydrocarbon group of 1 to 20 carbon atoms an oxygen-containing group, a sulfur-containing group, a silicon-containing group, a hydrogen atom or a halogen atom; and $Y^1$ is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —Ge—, —Sn—, —NR$^{21}$—, —P(R$^{21}$)—, —P(O)(R$^2$—, —BR$^{21}$— or

TABLE 23

| | Constituent unit (1) | Constituent unit (1) | Constituent unit (3) R³ | Constituent unit (3) Xp | Composition (molar ratio) (1)*1/(1)/(3) | Mw | MFR (g/10 min) | Mw/Mn | Tαβ/Tαα |
|---|---|---|---|---|---|---|---|---|---|
| Ex. 59 | ethylene | 1-butene | C₉H₁₈ | —OH | 88/11.5/0.5 | 110,000 | 4.2 | 2.8 | 0 |
| Ex. 60 | ethylene | 1-butene | C₈H₁₆ | —COOH | 88/11.75/0.25 | 100,000 | 5.9 | 2.2 | 0 |
| Ex. 61 | ethylene | 1-butene | C₆H₁₂ | epoxy group | 88/11.75/0.25 | 130,000 | 2.3 | 2.3 | 0.05 |
| Ex. 62 | ethylene | 1-butene | C₆H₁₀ | acid anhydride group | 88/11.75/0.25 | 122,000 | 2.9 | 2.2 | 0.03 |
| Ex. 63 | ethylene | propylene | C₆H₁₀ | acid anhydride group | 80/19.75/0.25 | 131,000 | 2.3 | 2.5 | 0.02 |

*1 ethylene

What is claimed is:

1. A process for preparing a polar group-containing olefin copolymer, consisting of copolymerizing at least one α-olefin selected from α-olefins of 2 to 20 carbon atoms and at least one polar group-containing monomer selected from a polar group-containing monomer represented by the following formula (7) and a polar group-containing monomer represented by the following formula (8) in the presence of a catalyst comprising:

(A) a compound of a transition metal represented by any one of the following formulas (11), (12), (13), (14), (15), and (16):

—AlR$^{21}$—, in which each $R^{21}$ may be the same or different and is a hydrocarbon group of 1 to 20 carbon atoms, a halogenated hydrocarbon group of 1 to 20 carbon atoms, a hydrogen atom, a halogen atom or a nitrogen compound residue in which one or two hydrocarbon groups of 1 to 20 carbon atoms are bonded to the nitrogen atom);

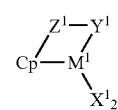

(12)

wherein $M^1$ is a transition metal atom selected from Group 4 of the periodic table; Cp is a cyclopentadienyl group or its derivative that is π-bonded to $M^1$; $Z^1$ is a ligand containing an oxygen atom, a sulfur atom, a boron atom or an element of Group 14 of the periodic table; $Y^1$ is a ligand containing an atom selected from a nitrogen atom, a phosphorus atom, an oxygen atom and a sulfur atom; and each $X^1$ may be the same or different and is a hydrogen atom, a halogen atom, a hydrocarbon group which has 20 or less carbon atoms and may contain 1 or more double bonds, a silyl group containing 20 or less silicon atoms, a germyl group containing 20 or less germanium atoms or a boronyl group containing 20 or less boron atoms;

(13)

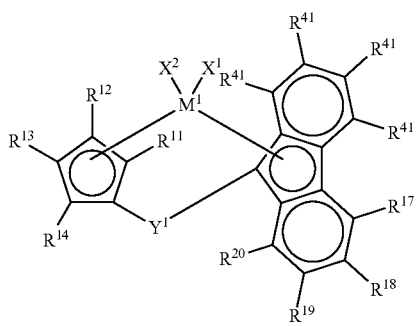

wherein $M^1$ is a transition metal atom selected from Group 4 of the periodic table; $R^{11}$ to $R^{14}$, $R^{17}$ to $R^{20}$, and $R^{41}$ may be the same or different and are each a hydrocarbon group of 1 to 40 carbon atoms, a halogenated hydrocarbon group of 1 to 40 carbon atoms, an oxygen-containing group, a sulfur-containing group, a silicon-containing group, a halogen atom or a hydrogen atom;

of the groups indicated by $R^{11}$, $R^{12}$, $R^{13}$, $R^{14}$, $R^{17}$, $R^{18}$, $R^{19}$, $R^{20}$ and $R^{41}$, a part of the groups neighboring with each other may be bonded to form a ring together with carbon atoms to which those groups are bonded, except a case where all of $R^{11}$, $R^{12}$, $R^{13}$, $R^{14}$, $R^{17}$, $R^{18}$, $R^{19}$, $R^{20}$ and $R^{41}$ are hydrogen atoms and a case where $R^{12}$ or $R^{13}$ is a tert-butyl group and the residual $R^{11}$, $R^{12}$, $R^{13}$, $R^{14}$, $R^{17}$, $R^{18}$, $R^{19}$, $R^{20}$ and $R^{41}$ are hydrogen atoms; $X^1$ and $X^2$ may be the same or different and are each a hydrocarbon group of 1 to 20 carbon atoms, a halogenated hydrocarbon group of 1 to 20 carbon atoms, an oxygen-containing group, a sulfur-containing group, a silicon-containing group, a hydrogen atom or a halogen atom; and $Y^1$ is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —Ge—, —Sn—, —NR$^{21}$—, —P(R$^{21}$), —P(O)(R$^{21}$)—, —BR$^{21}$—or —AlR$^{21}$—, in which each $R^{21}$ may be the same or different and is a hydrocarbon group of 1 to 20 carbon atoms, a halogenated hydrocarbon group of 1 to 20 carbon atoms, a hydrogen atom, a halogen atom or a nitrogen compound residue in which one or two hydrocarbon groups of 1 to 20 carbon atoms are bonded to the nitrogen atom;

(14)

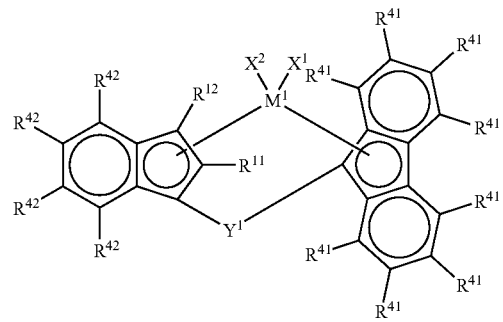

wherein $M^1$ is a transition metal atom selected from Group 4 of the periodic table; $R^{11}$, $R^{12}$, $R^{41}$ and $R^{42}$ may be the same or different and are each a hydrocarbon group of 1 to 40 carbon atoms, a halogenated hydrocarbon group of 1 to 40 carbon atoms, an oxygen-containing group, a sulfur-containing group, a silicon-containing group, a halogen atom or a hydrogen atom; of the groups indicated by $R^{11}$, $R^{12}$, $R^{41}$ and $R^{42}$, a part of the groups neighboring with each other may be bonded to form a ring together with carbon atoms to which those groups are bonded; $X^1$ and $X^2$ may be the same or different and are each a hydrocarbon group of 1 to 20 carbon atoms, a halogenated hydrocarbon group of 1 to 20 carbon atoms, an oxygen-containing group, a sulfur-containing group, a silicon-containing group, a hydrogen atom or a halogen atom; and $Y^1$ is a divalent hydrocarbon group of 1 to 20 carbon atoms, provided that when all of $R^{11}$, $R^{12}$, $R^{41}$ and $R^{42}$ are hydrogen atoms, $Y^1$ is not ethylene, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —Ge—, —Sn—, —NP$^{21}$—, —P(R$^{21}$)—, —P(O)(R$^{21}$)—, —BR$^{21}$—or —AlR$^{21}$—, in which each $R^{21}$ may be the same or different and is a hydrocarbon group of 1 to 20 carbon atoms, a halogenated hydrocarbon group of 1 to 20 carbon atoms, a hydrogen atom, a halogen atom or a nitrogen compound residue in which one or two hydrocarbon groups of 1 to 20 carbon atoms are bonded to the nitrogen atom;

(15)

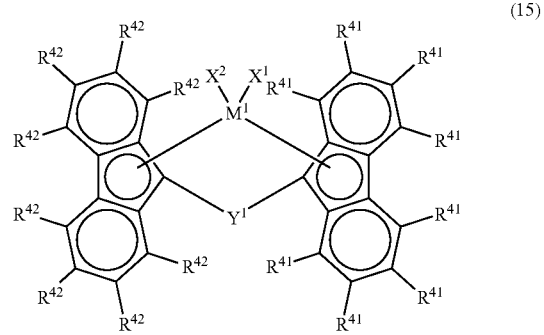

wherein $M^1$ is a transition metal atom selected from Group 4 of the periodic table; $R^{41}$ and $R^{42}$ may be the same or different and are each a hydrocarbon group of 1 to 40 carbon atoms, a halogenated hydrocarbon group of 1 to 40 carbon atoms, an oxygen-containing group, a sulfur-containing group, a silicon-containing group, a halogen atom or a hydrogen atom; of the groups indicated by $R^{41}$ and $R^{42}$, a part of the groups neighboring with each other may be bonded to form a ring together with carbon atoms to which those groups are bonded; $X^1$ and $X^2$ may be the same or different and are each a hydrocarbon group of 1 to 20 carbon atoms, a halogenated hydrocarbon group of 1 to 20 carbon atoms, an oxygen-containing group, a sulfur-containing group, a silicon-containing group, a hydrogen atom or a halogen atom; and $Y^1$ is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —Ge—Sn——NP$^{21}$—, —P(R$^{21}$)—, —P(O)(R$^{21}$)—, —BR$^{21}$— or —AlR$^{21}$—, in which each $R^{21}$ may be the same or different and is a hydrocarbon group of 1 to 20 carbon atoms, a halogenated hydrocarbon group of 1 to 20 carbon atoms, a hydrogen atom, a halogen atom or a nitrogen compound residue in which one or two hydrocarbon groups of 1 to 20 carbon atoms are bonded to the nitrogen atom;

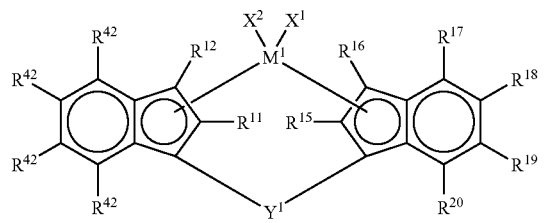

(16)

wherein $M^1$ is a transition metal atom selected from Group 4 of the periodic table; $R^{11}$, $R^{12}$, $R^{15}$, to $R^{20}$, and $R^{42}$ may be the same or different and are each a hydrocarbon group of 1 to 40 carbon atoms, a halogenated hydrocarbon group of 1 to 40 carbon atoms, an oxygen-containing group, a sulfur-containing group, a silicon-containing group, a halogen atom or a hydrogen atom; of the groups indicated by $R^{11}$, $R^{12}$, $R^{15}$, $R^{16}$, $R^{17}$, $R^{18}$, $R^{19}$, $R^{20}$ and $R^{42}$, a part of the groups neighboring with each other may be bonded to form a ring together with carbon atoms to which those groups are bonded; $X^1$ and $X^2$ may be the same or different and are each a hydrocarbon group of 1 to 20 carbon atoms, a halogenated hydrocarbon group of 1 to 20 carbon atoms, an oxygen-containing group, a sulfur-containing group, a silicon-containing group, a hydrogen atom or a halogen atom; and $Y^1$ is a divalent hydrocarbon group of 1 to 20 carbon atoms, provided that when all of $R^{11}$, $R^{12}$, $R^{15}$, $R^{16}$, $R^{17}$, $R^{18}$, $R^{19}$, $R^{20}$ and $R^{42}$ are hydrogen atoms, $Y^1$ is not ethylene, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —Ge—, —Sn—, —NR$^{21}$—, —P(R$^{21}$)—, —P(O)(R$^{21}$)—, —BR$^{21}$— or —AlR$^{21}$—, in which each $R^{21}$ may be the same or different and is a hydrocarbon group of 1 to 20 carbon atoms, a halogenated hydrocarbon group of 1 to 20 carbon atoms, a hydrogen atom, a halogen atom or a nitrogen compound residue in which one or two hydrocarbon groups of 1 to 20 carbon atoms are bonded to the nitrogen atom, and (B) at least one compound selected from:
(B-1) an organoaluminum oxy-compound,
(B-2) a compound which reacts with the compound (A) to form an ion pair, and
(B-3) an organoaluminum compound;

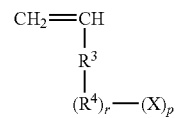

(7)

wherein $R^3$ is a hydrocarbon group; $R^4$ is a hetero atom or a group containing a hetero atom; r is 0 or 1; X is a polar group selected from an alcoholic hydroxyl group, a phenolic hydroxyl group, a carboxylic acid group, a carboxylic acid ester group, an acid anhydride group, an amino group, an amide group, an epoxy group and a mercapto group; p is an integer of 1 to 3; when p is 2 or 3, each X may be the same or different, and in this case, if r is 0, X may be bonded to the same or different atom of $R^3$, and if r is 1, X may be bonded to the same or different atom of $R^4$;

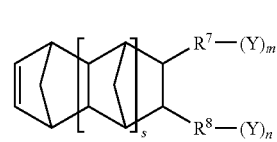

(8)

wherein $R^7$ is a direct bond or an aliphatic hydrocarbon group of 1 or more carbon atoms; $R^8$ is a hydrogen atom, a direct bond or an aliphatic hydrocarbon group of 1 or more carbon atoms; Y is a polar group containing O and/or N; m and n are each an integer of 0 to 2, and m +n is not 0; and s is 0 or 1.

2. A process for preparing a polar group-containing olefin copolymer, consisting of copolymerizing at least one α-olefin selected from α-olefins of 2 to 20 carbon atoms and at least one polar group-containing monomer selected from a polar group-containing monomer represented by the following formula (7), a polar group-containing monomer represented by the following formula (8) and a macromonomer represented by the following formula (9) in the presence of a catalyst comprising:

(A) a compound of a transition metal represented by any one of the following formulas (11), (12), (13), (14), (15), and (16):

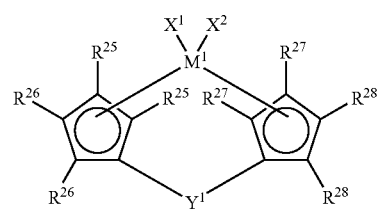

(11)

wherein $M^1$ is a transition metal atom of Group 4 of the periodic table; $R^{25}$, $R^{26}$, $R^{27}$ and $R^{28}$ may be the same or different and are each a hydrogen atom, a nitrogen-containing group, a phosphorus-containing group, a hydrocarbon group of 1 to 20 carbon atoms, a halogenated hydrocarbon group of 1 to 20 carbon atoms, an oxygen-containing group, a sulfur-containing group, a silicon-containing group or a halogen atom; of the groups indicated by $R^{25}$, $R^{26}$, $R^{27}$ and $R^{28}$, a part of the groups neighboring with each other may be bonded to form a ring together with carbon atoms to which those groups are bonded; $X^1$ and $X^2$ may be the same or different and are each a hydrocarbon group of 1 to 20 carbon atoms, a halogenated hydrocarbon group of 1 to 20 carbon atoms, an oxygen-containing group, a sulfur-containing group, a silicon-containing group, a hydrogen atom or a halogen atom; and $Y^1$ is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —Ge—, —Sn—, —NR$^{21}$—, —P(R$^{21}$)—, —P(O)(R$^{21}$)—, —BR$^{21}$— or —AlR$^{21}$—, in which each $R^{21}$ may be the same or different and is a hydrocarbon group of 1 to 20 carbon atoms, a halogenated hydrocarbon group of 1 to 20 carbon atoms, a hydrogen atom, a halogen atom or a nitrogen compound residue in which one or two hydrocarbon groups of 1 to 20 carbon atoms are bonded to the nitrogen atom);

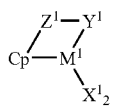

(12)

wherein $M^1$ is a transition metal atom selected from Group 4 of the periodic table; Cp is a cyclopentadienyl group or its derivative that is 7t-bonded to $M^1$; $Z^1$ is a ligand containing an oxygen atom, a sulfur atom, a boron atom or an element of Group 14 of the periodic table; $Y^1$ is a ligand containing an atom selected from a nitrogen atom, a phosphorus atom, an oxygen atom and a sulfur atom; and each $X^1$ may be the same or different and is a hydrogen atom, a halogen atom, a hydrocarbon group which has 20 or less carbon atoms and may contain 1 or more double bonds, a silyl group containing 20 or less silicon atoms, a germyl group containing 20 or less germanium atoms or a boronyl group containing 20 or less boron atoms;

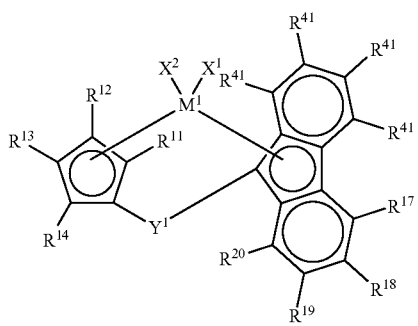

(13)

wherein $M^1$ is a transition metal atom selected from Group 4 of the periodic table; $R^{11}$ to $R^{14}$, $R^{17}$ to $R^{20}$, and $R^{41}$ may be the same or different and are each a hydrocarbon group of 1 to 40 carbon atoms, a halogenated hydrocarbon group of 1 to 40 carbon atoms, an oxygen-containing group, a sulfur-containing group, a silicon-containing group, a halogen atom or a hydrogen atom; of the groups indicated by $R^{11}$, $R^{12}$, $R^{13}$, $R^{14}$, $R^{17}$, $R^{18}$, $R^{19}$, $R^{20}$ and $R^{41}$, a part of the groups neighboring with each other may be bonded to form a ring together with carbon atoms to which those groups are bonded, except a case where all of $R^{11}$, $R^{12}$, $R^{13}$, $R^{14}$, $R^{17}$, $R^{18}$, $R^{19}$, $R^{20}$ and $R^{41}$ are hydrogen atoms and a case where $R^{12}$ or $R^{13}$ is a tert-butyl group and the residual $R^{11}$, $R^{12}$, $R^{13}$, $R^{14}$, $R^{17}$, $R^{18}$, $R^{19}$, $R^{20}$ and $R^{41}$ are hydrogen atoms; $X^1$ and $X^2$ may be the same or different and are each a hydrocarbon group of 1 to 20 carbon atoms, a halogenated hydrocarbon group of 1 to 20 carbon atoms, an oxygen-containing group, a sulfur-containing group, a silicon-containing group, a hydrogen atom or a halogen atom; and $Y^1$ is a divalent hydrocarbon group of 1 to 20 carbon atoms, a divalent halogenated hydrocarbon group of 1 to 20 carbon atoms a divalent silicon-containing group, a divalent germanium-containing group, a divalent tin-containing group, —O—, —CO—, —S—, —SO—, —SO$_2$—, —Ge—, —Sn—, —NR$^{21}$—, —P(R$^{21}$), —P(O)(R$^{21}$)—, —BR$^{21}$—or —AlR$^{21}$—, in which each $R^{21}$ may be the same or different and is a hydrocarbon group of 1 to 20 carbon atoms, a halogenated hydrocarbon group of 1 to 20 carbon atoms, a hydrogen atom, a halogen atom or a nitrogen compound residue in which one or two hydrocarbon groups of 1 to 20 carbon atoms are bonded to the nitrogen atom;

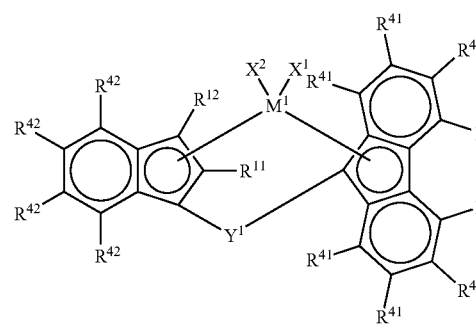

(14)

wherein $M^1$ is a transition metal atom selected from Group 4 of the periodic table; $R^{11}$ $R^{12}$, $R^{41}$ and $R^{42}$ may be the same or different and are each a hydrocarbon group of 1 to 40 carbon atoms, a halogenated hydrocarbon group of 1 to 40 carbon atoms, an oxygen-containing group, a sulfur-containing group, a silicon-containing group, a halogen atom or a hydrogen atom; of the groups indicated by $R^{11}$ $R^{12}$, $R^{41}$, and $R^{42}$, a part of the groups neighboring with each other may be bonded to form a ring together with carbon atoms to which those groups are bonded; $X^1$ and $X^2$ may be the same or different and are each a hydrocarbon group of 1 to 20 carbon atoms, a halogenated hydrocarbon group of 1 to 20 carbon atoms, an oxygen-containing group, a sulfur-containing group, a silicon-containing group, a hydrogen atom or a halogen atom; and $Y^1$ is a divalent hydrocarbon group of 1 to 20 carbon atoms, provided that when all of $R^{11}$, $R^{12}$, $R^{41}$ and $R^{42}$ are hydrogen atoms, $Y^1$ is not ethylene, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —Ge—, —Sn—, —NR$^{21}$—, —P(R$^{21}$)—, —P(O)(R$^{21}$)—, —BR$^{21}$—or —AlR$^1$—, in which each $R^{21}$ may be the same or different and is a hydrocarbon group of 1 to 20 carbon atoms, a halogenated hydrocarbon group of 1 to 20 carbon atoms, a hydrogen atom, a halogen atom or a nitrogen compound residue in which one or two hydrocarbon groups of 1 to 20 carbon atoms are bonded to the nitrogen atom;

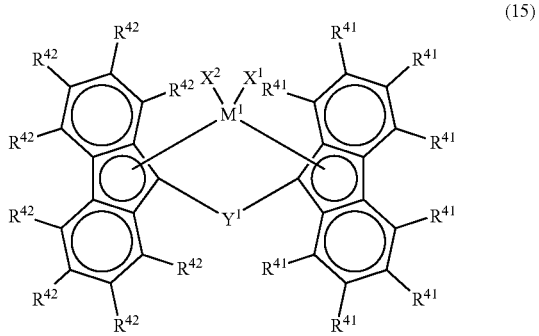

(15)

wherein $M^1$ is a transition metal atom selected from Group 4 of the periodic table; $R^{41}$ and $R^{42}$ may be the same or different and are each a hydrocarbon group of 1 to 40 carbon atoms, a halogenated hydrocarbon group of 1 to 40 carbon atoms an oxygen-containing group a sulfur-containing group, a silicon-containing group, a halogen atom or a hydrogen atom; of the groups indicated by $R^{41}$ and $R^{42}$, a part of the groups neighboring with each other may be bonded to form a ring together with carbon atoms to which those groups are bonded $X^1$ and $X^2$ may be the same or different and are each a hydrocarbon group of 1 to 20 carbon atoms, a halogenated hydrocarbon group of 1 to 20 carbon atoms, an oxygen-containing group, a sulfur-containing group, a silicon-containing group, a hydrogen atom or a halogen atom; and $Y^1$ is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group —O—, —CO—, —S—, —SO—, —SO$_2$—, —Ge—, —Sn—, —NR$^{21}$—, —P(R$^{21}$)—, —P(O)(R$^{21}$)—, —BR$^{21}$—or —AlR$^1$—, in which each $R^{21}$ may be the same or different and is a hydrocarbon group of 1 to 20 carbon atoms, a halogenated hydrocarbon group of 1 to 20 carbon atoms, a hydrogen atom, a halogen atom or a nitrogen compound residue in which one or two hydrocarbon groups of 1 to 20 carbon atoms are bonded to the nitrogen atom;

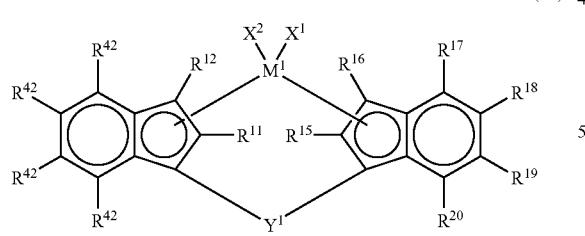

(16)

wherein $M^1$ is a transition metal atom selected from Group 4 of the periodic table; $R^{11}$, $R^{12}$, $R^{15}$ to $R^{20}$, and $R^{42}$ may be the same or different and are each a hydrocarbon group of 1 to 40 carbon atoms, a halogenated hydrocarbon group of 1 to 40 carbon atoms, an oxygen-containing group, a sulfur-containing group, a silicon-containing group, a halogen atom or a hydrogen atom; of the groups indicated by $R^{11}$, $R^{12}$, $R^{15}$, $R^{16}$, $R^{17}$, $R^{18}$, $R^{19}$, $R^{20}$ and $R^{42}$, a part of the groups neighboring with each other may be bonded to form a ring together with carbon atoms to which those groups are bonded $X^1$ and $X^2$ may be the same or different and are each a hydrocarbon group of 1 to 20 carbon atoms, a halogenated hydrocarbon group of 1 to 20 carbon atoms, an oxygen-containing group, a sulfur-containing group, a silicon-containing group, a hydrogen atom or a halogen atom; and $Y^1$ is a divalent hydrocarbon group of 1 to 20 carbon atoms, provided that when all of $R^{11}$, $R^{12}$, $R^{15}$, $R^{16}$, $R^{17}$, $R^{18}$, $R^{19}$, $R^{20}$ and $R^{42}$ are hydrogen atoms, $Y^1$ is not ethylene, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —Ge—, —Sn—, —NR$^{21}$—, —P(R$^{21}$)—, —P(O)(R$^{21}$)—, —BR$^{21}$—or —AlR$^{21}$—, in which each $R^{21}$ may be the same or different and is a hydrocarbon group of 1 to 20 carbon atoms, a halogenated hydrocarbon group of 1 to 20 carbon atoms, a hydrogen atom, a halogen atom or a nitrogen compound residue in which one or two hydrocarbon groups of 1 to 20 carbon atoms are bonded to the nitrogen atom, and (B) at least one compound selected from:
 (B-1) an organoaluminum oxy-compound,
 (B-2) a compound which reacts with the compound (A) to form an ion pair, and
 (B-3) an organoaluminum compound;

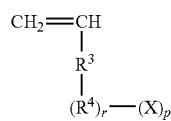

(7)

wherein $R^3$ is a hydrocarbon group; $R^4$ is a hetero atom or a group containing a hetero atom; r is 0 or 1; X is —OR, —COOR, —CRO, —C(O)NR$_2$, —C(O)R (R is a hydrogen atom or a hydrocarbon group), an epoxy group, —C≡N or —NR'R" (R' and R" may be the same or different and are each a hydrogen atom or an alkyl group); p is an integer of 1 to 3; and when p is 2 or 3, each X may be the same or different, and in this case, if r is 0, X may be bonded to the same or different atom of $R^3$, and if r is 1, X may be bonded to the same or different atom of $R^4$;

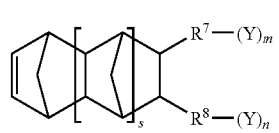

(8)

wherein $R^7$ is a direct bond or an aliphatic hydrocarbon group of 1 or more carbon atoms; $R^8$ is a hydrogen atom, a direct bond or an aliphatic hydrocarbon group of 1 or more carbon atoms; Y is —OR, —COOR, —CRO, —C(O)NR$_2$, —C(O)R (R is a hydrogen atom or a hydrocarbon group), an epoxy group, —C≡N or —NR'R" (R' and R" may be the same or different and are each a hydrogen atom or an alkyl group); m and n are each an integer of 0 to 2, and m+n is not 0; and s is 0 or 1;

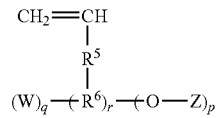

(9)

wherein $R^5$ is a hydrocarbon group; $R^6$ is a hetero atom or a group containing a hetero atom; r is 0 or 1; Z is a polymer segment obtained by any one of anionic polymerization, ring-opening polymerization and polycondensation; W is a hydroxyl group or an epoxy group; p is an integer of 1 to 3, q is 0, 1 or 2, and p+q≦3; when p is 2 or 3, each —O—Z may be the same or different, and in this case, if r is 0, —O—Z may be bonded to the same or different atom of $R^5$, and if r is 1, —O—Z may be bonded to the same or different atom of $R^6$; when q is 2, each W may be the same or different, and in this case, if r is 0, W may be bonded to the same or different atom of $R^5$, and if r is 1, W may be bonded to the same or different atom of $R^6$; and in case of p≧1 and q≧1, if r is 0, W and —O—Z may be each bonded to the same or different atom of $R^5$, and if r is 1, W and —O—Z may be each bonded to the same or different atom of $R^6$.

3. A process for preparing a branched type polar group-containing olefin copolymer, consisting of copolymerizing at least one α-olefin selected from α-olefins of 2 to 20 carbon atoms, a polar group-containing monomer represented by the following formula (10), and optionally, a polar group-containing monomer represented by the following formula (8) in the presence of a catalyst comprising:

(A) a compound of a transition metal represented by any one of the following formulas (11), (12), (13), (14), (15), and (16):

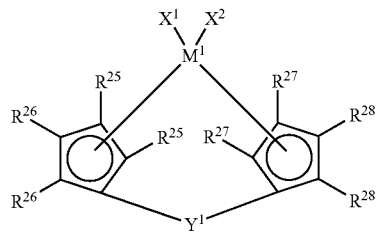

(11)

wherein $M^1$ is a transition metal atom of Group 4 of the periodic table; $R^{25}$, $R^{26}$, $R^{27}$ and $R^{28}$ may be the same or different and are each a hydrogen atom, a nitrogen-containing group, a phosphorus-containing group, a hydrocarbon group of 1 to 20 carbon atoms, a halogenated hydrocarbon group of 1 to 20 carbon atoms, an oxygen-containing group, a sulfur-containing group, a silicon-containing group or a halogen atom; of the groups indicated by $R^{25}$, $R^{26}$, $R^{27}$ and $R^{28}$, a part of the groups neighboring with each other may be bonded to form a ring together with carbon atoms to which those groups are bonded; $X^1$ and $X^2$ may be the same or different and are each a hydrocarbon group of 1 to 20 carbon atoms, a halogenated hydrocarbon group of 1 to 20 carbon atoms, an oxygen-containing group, a sulfur-containing group, a silicon-containing group, a hydrogen atom or a halogen atom; and $Y^1$ is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —Ge—, —Sn—, —NR$^{21}$—, —P(R$^{21}$)—, —P(O)(R$^{21}$)—, —BR$^{21}$— or —AlR$^1$—, in which each $R^{21}$ may be the same or different and is a hydrocarbon group of 1 to 20 carbon atoms, a halogenated hydrocarbon group of 1 to 20 carbon atoms, a hydrogen atom, a halogen atom or a nitrogen compound residue in which one or two hydrocarbon groups of 1 to 20 carbon atoms are bonded to the nitrogen atom);

(12)

wherein $M^1$ is a transition metal atom selected from Group 4 of the periodic table; Cp is a cyclopentadienyl group or its derivative that is π-bonded to $M^1$; $Z^1$ is a ligand containing an oxygen atom, a sulfur atom, a boron atom or an element of Group 14 of the periodic table; $Y^1$ is a ligand containing an atom selected from a nitrogen atom, a phosphorus atom, an oxygen atom and a sulfur atom; and each $X^1$ may be the same or different and is a hydrogen atom, a halogen atom, a hydrocarbon group which has 20 or less carbon atoms and may contain 1 or more double bonds, a silyl group containing 20 or less silicon atoms, a germyl group containing 20 or less germanium atoms or a boronyl group containing 20 or less boron atoms;

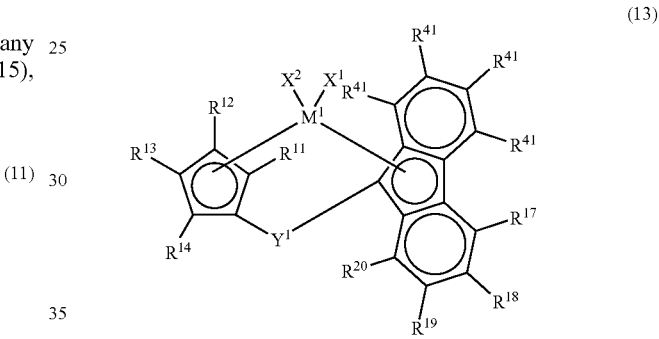

(13)

wherein $M^1$ is a transition metal atom selected from Group 4 of the periodic table; $R^{11}$ to $R^{14}$, $R^{17}$ to $R^{20}$, and $R^{41}$ may be the same or different and are each a hydrocarbon group of 1 to 40 carbon atoms, a halogenated hydrocarbon group of 1 to 40 carbon atoms, an oxygen-containing group, a sulfur-containing group, a silicon-containing group, a halogen atom or a hydrogen atom; of the groups indicated by $R^{11}$, $R^{12}$, $R^{13}$, $R^{14}$, $R^{17}$, $R^{18}$, $R^{19}$, $R^{20}$, and $R^{41}$, a part of the groups neighboring with each other may be bonded to form a ring together with carbon atoms to which those groups are bonded, except a case where all of $R^{11}$, $R^{12}$, $R^{13}$, $R^{14}$, $R^{17}$, $R^{18}$, $R^{19}$, $R^{20}$ and $R^{41}$ are hydrogen atoms and a case where $R^{12}$ or $R^{13}$ is a tert-butyl group and the residual $R^{11}$, $R^{12}$, $R^{13}$, $R^{14}$, $R^{17}$, $R^{18}$, $R^{19}$, $R^{20}$ and $R^{41}$ are hydrogen atoms; $X^1$ and $X^2$ may be the same or different and are each a hydrocarbon group of 1 to 20 carbon atoms, a halogenated hydrocarbon group of 1 to 20 carbon atoms, an oxygen-containing group, a sulfur-containing group, a silicon-containing group, a hydrogen atom or a halogen atom; and $Y^1$ is a divalent hydrocarbon group of 1 to 20 carbon atoms a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —Ge—, —Sn—, —NR$^{21}$—, —P(R$^{21}$), —P(O)(R$^{21}$)—, —BR$^{21}$— or —AlR$^{21}$—, in which each $R^{21}$ may be the same or different and is a hydrocarbon group of 1 to 20 carbon atoms, a halogenated hydrocarbon group of 1 to 20 carbon atoms, a hydrogen atom, a halogen atom or a nitrogen compound residue in which one or two hydrocarbon groups of 1 to 20 carbon atoms are bonded to the nitrogen atom;

(14)

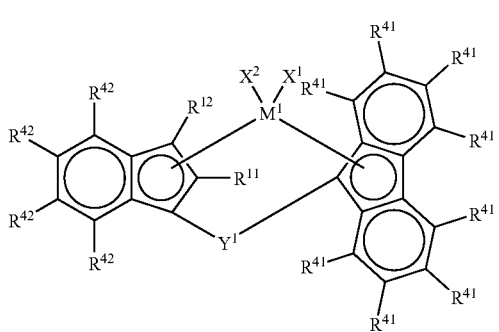

wherein $M^1$ is a transition metal atom selected from Group 4 of the periodic table $R^{11}$ $R^{12}$, $R^{41}$ and $R^{42}$ may be the same or different and are each a hydrocarbon group of 1 to 40 carbon atoms, a halogenated hydrocarbon group of 1 to 40 carbon atoms, an oxygen-containing group, a sulfur-containing group, a silicon-containing group, a halogen atom or a hydrogen atom; of the groups indicated by $R^{11}$, $R^{12}$, $R^{41}$ and $R^{42}$, a part of the groups neighboring with each other may be bonded to form a ring together with carbon atoms to which those groups are bonded; $X^1$ and $X^2$ may be the same or different and are each a hydrocarbon group of 1 to 20 carbon atoms, a halogenated hydrocarbon group of 1 to 20 carbon atoms, an oxygen-containing group, a sulfur-containing group, a silicon-containing group, a hydrogen atom or a halogen atom; and $Y^1$ is a divalent hydrocarbon group of 1 to 20 carbon atoms, provided that when all of $R^{11}$, $R^{12}$, $R^{41}$ and $R^{42}$ are hydrogen atoms, $Y^1$ is not ethylene, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —Ge—, —Sn—, —NR$^{21}$—, —P(R$^{21}$)—, —P(O)(R$^{21}$)—, —BR$^{21}$—or —AlR$^1$—, in which each $R^{12}$ may be the same or different and is a hydrocarbon group of 1 to 20 carbon atoms, a halogenated hydrocarbon group of 1 to 20 carbon atoms, a hydrogen atom, a halogen atom or a nitrogen compound residue in which one or two hydrocarbon groups of 1 to 20 carbon atoms are bonded to the nitrogen atom;

(15)

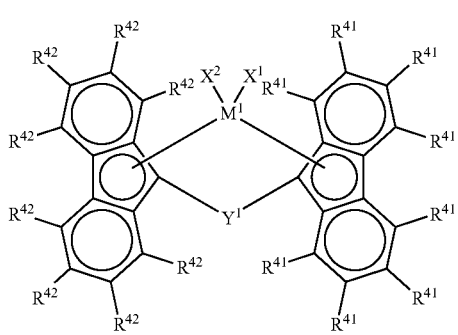

wherein $M^1$ is a transition metal atom selected from Group 4 of the periodic table; $R^{41}$ and $R^{42}$ may be the same or different and are each a hydrocarbon group of 1 to 40 carbon atoms, a halogenated hydrocarbon group of 1 to 40 carbon atoms, an oxygen-containing group, a sulfur-containing group, a silicon-containing group, a halogen atom or a hydrogen atom; of the groups indicated by $R^{41}$ and $R^{42}$, a part of the groups neighboring with each other may be bonded to form a ring together with carbon atoms to which those groups are bonded; $X^1$ and $X^2$ may be the same or different and are each a hydrocarbon group of 1 to 20 carbon atoms, a halogenated hydrocarbon group of 1 to 20 carbon atoms, an oxygen-containing group, a sulfur-containing group, a silicon-containing group, a hydrogen atom or a halogen atom; and $Y^1$ is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —Ge—, —Sn—, —NR$^{21}$—, —P(R$^{21}$)—, —P(O)(R$^{21}$)—, —BR$^{21}$— or —AlR$^1$—, in which each $R^{21}$ may be the same or different and is a hydrocarbon group of 1 to 20 carbon atoms, a halogenated hydrocarbon group of 1 to 20 carbon atoms, a hydrogen atom, a halogen atom or a nitrogen compound residue in which one or two hydrocarbon groups of 1 to 20 carbon atoms are bonded to the nitrogen atom;

(16)

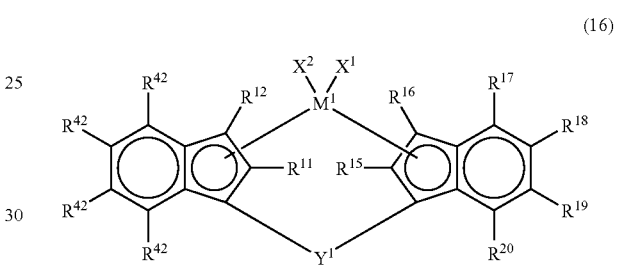

wherein $M^1$ is a transition metal atom selected from Group 4 of the periodic table; $R^{11}$, $R^{12}$, $R^{15}$ to $R^{20}$, and $R^{42}$ may be the same or different and are each a hydrocarbon group of 1 to 40 carbon atoms, a halogenated hydrocarbon group of 1 to 40 carbon atoms, an oxygen-containing group, a sulfur-containing group, a silicon-containing group, a halogen atom or a hydrogen atom; of the groups indicated by of $R^{11}$, $R^{12}$, $R^{15}$, $R^{16}$, $R^{17}$, $R^{18}$, $R^{19}$, $R^{20}$ and $R^{42}$, a part of the groups neighboring with each other may be bonded to form a ring together with carbon atoms to which those groups are bonded; $X^1$ and $X^2$ may be the same or different and are each a hydrocarbon group of 1 to 20 carbon atoms, a halogenated hydrocarbon group of 1 to 20 carbon atoms, an oxygen-containing group, a sulfur-containing group, a silicon-containing group, a hydrogen atom or a halogen atom; and $Y^1$ is a divalent hydrocarbon group of 1 to 20 carbon atoms, provided that when all of $R^{11}$, $R^{12}$, $R^{15}$, $R^{16}$, $R^{17}$, $R^{18}$, $R^{19}$, $R^{20}$ and $R^{42}$ are hydrogen atoms, $Y^1$ is not ethylene, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —Ge—, —Sn—, —NR$^{21}$—, —P(R$^{21}$)—, —P(O)(R$^{21}$)—, —BR$^{21}$—or —AlR$^1$—, in which each $R^{21}$ may be the same or different and is a hydrocarbon group of 1 to 20 carbon atoms, a halogenated hydrocarbon group of 1 to 20 carbon atoms, a hydrogen atom, a halogen atom or a nitrogen compound residue in which one or two hydrocarbon groups of 1 to 20 carbon atoms are bonded to the nitrogen atom, and (B) at least one compound selected from:
(B-1) an organoaluminum oxy-compound,
(B-2) a compound which reacts with the compound (A) to form an ion pair, and
(B-3) an organoaluminum compound, and then conducting any one of the following steps (i) and (ii);

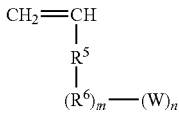
(10)

wherein $R^5$ is a hydrocarbon group; $R^6$ is a hetero atom or a group containing a hetero atom; m is 0 or 1; W is a hydroxyl group or an epoxy group; n is an integer of 1 to 3; and when n is 2 or 3, each W may be the same or different, and in this case, if m is 0, W may be bonded to the same or different atom of $R^5$, and if m is 1, W may be bonded to the same or different atom of $R^6$;

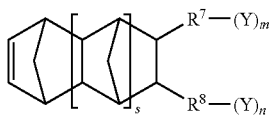
(8)

wherein $R^7$ is a direct bond or an aliphatic hydrocarbon group of 1 or more carbon atoms; $R^8$ is a hydrogen atom, a direct bond or an aliphatic hydrocarbon group of 1 or more carbon atoms; Y is —OR, —COOR, —CRO, —C(O)NR$_2$, —C(O)R (R is a hydrogen atom or a hydrocarbon group), an epoxy group, —C≡N or —NR'R" (R' and R" may be the same or different and are each a hydrogen atom or an alkyl group); m and n are each an integer of 0 to 2, and m+n is not 0; and s is 0 or 1;

(i) from the W portion of the copolymerized polar group-containing monomer, a Z portion is formed by anionic polymerization, ring-opening polymerization or polycondensation;

(ii) the W portion of the copolymerized polar group-containing monomer is reacted with a terminal functional group of a polymer obtained by anionic polymerization, ring-opening polymerization and polycondensation.

4. The process for preparing a polar group-containing olefin copolymer as claimed in claim 1, wherein the polar group-containing monomer is a polar group-containing monomer of the formula (7) wherein X is —OH.

5. The process for preparing a polar group-containing olefin copolymer as claimed in claim 1, wherein the polar group-containing monomer is a polar group-containing monomer of the formula (7) wherein X is —NR'R", wherein R' and R" may be the same or different and are each a hydrogen atom or an alkyl group.

* * * * *